United States Patent
Lampe et al.

(10) Patent No.: US 12,535,484 B2
(45) Date of Patent: Jan. 27, 2026

(54) AUTOANTIBODIES AND AUTOANTIBODY-AUTOANTIGEN COMPLEXES AS BIOMARKERS OF SMALL CELL LUNG CANCER

(71) Applicant: FRED HUTCHINSON CANCER RESEARCH CENTER, Seattle, WA (US)

(72) Inventors: Paul Lampe, Seattle, WA (US); Ashley McGarry Houghton, Seattle, WA (US); Kristin Lastwika, Seattle, WA (US)

(73) Assignee: Fred Hutchinson Cancer Center, Seattle, WA (US)

( * ) Notice: Subject to any disclaimer, the term of this patent is extended or adjusted under 35 U.S.C. 154(b) by 1091 days.

(21) Appl. No.: 17/040,008

(22) PCT Filed: Mar. 22, 2019

(86) PCT No.: PCT/US2019/023741
§ 371 (c)(1),
(2) Date: Sep. 21, 2020

(87) PCT Pub. No.: WO2019/183591
PCT Pub. Date: Sep. 26, 2019

(65) Prior Publication Data
US 2021/0018506 A1 Jan. 21, 2021

Related U.S. Application Data

(60) Provisional application No. 62/646,727, filed on Mar. 22, 2018.

(51) Int. Cl.
*G01N 33/53* (2006.01)
*G01N 33/536* (2006.01)
*G01N 33/563* (2006.01)
*G01N 33/574* (2006.01)

(52) U.S. Cl.
CPC ....... *G01N 33/57423* (2013.01); *G01N 33/53* (2013.01); *G01N 33/536* (2013.01); *G01N 33/563* (2013.01)

(58) Field of Classification Search
None
See application file for complete search history.

(56) References Cited

U.S. PATENT DOCUMENTS

| | | | |
|---|---|---|---|
| 2007/0269902 A1* | 11/2007 | Beechem | B82Y 5/00 435/5 |
| 2011/0091454 A1 | 4/2011 | Diber | |
| 2015/0355177 A1* | 12/2015 | Komorowski | G01N 33/564 435/7.1 |
| 2018/0259509 A1* | 9/2018 | Ogbonna | G01N 33/6893 |
| 2018/0364228 A1* | 12/2018 | Stoecker | C07K 16/18 |
| 2018/0371052 A1 | 12/2018 | Ma | |
| 2019/0011456 A1* | 1/2019 | Oved | G01N 33/6863 |

FOREIGN PATENT DOCUMENTS

| | | |
|---|---|---|
| WO | 2009102960 A1 | 8/2009 |
| WO | 2017205832 A1 | 11/2017 |

OTHER PUBLICATIONS

Pellkofer et al., Modelling paraneoplastic CNS disease: T-cells specific for onconeuronal antigang PNMA1 mediate autoimmune encephalomyelitis in the rat, Brain, 2004,127, pp. 1822-1830. (Year: 2004).*
Garett-Sinha et al., Spi-1 and Spi-B control the expression of the Grap2 gene in B cells, Gene 353, 2005, pp. 134-146. (Year: 2005).*
Li et al., CA9 as a molecular marker for differential diagnosis of cystic renal tumors, Urologic Oncology: Seminarsand Original Investigations 30, 2012, pp. 463-468. (Year: 2012).*
Brezina, S., et al (2015) Immune-Signatures for Lung Cancer Diagnostics: Evaluation of Protein Microarray Data Normalization Strategies Microarrays 4; 162-187 (Year: 2015).
Zhou, R., et al (2015) Tumor invasion and metastasis regulated by microRNA-184 and microRNA-574-5p in small-cell lung cancer Oncotarget 6(42); 44609-44622 (Year: 2015).
Doria, M.I., et al (1988) Immunophenotype of small cell lung cancer Cancer (62); 1939-1945 (Year: 1988).
Karachaliou, N., et al (2016) Cellular and molecular biology of small cell lung cancer: an overview Transl Lung Cancer Res 5(1); 2-15 (Year: 2016).
Rho, J .h. and P.D. Lampe (2013) High-throughput screening for native autoantigen-autoantibody complexes using antibody microarrays J. Proteome Res 12(5) 2311-2320 (Year: 2013).
Huang, R. (2015) Associated links among smoking, chronic obstructive pulmonary disease, and small cell lung cancer: A pooled analysis in the international lung cancer consortium EBioMEdicine 2; 1677-1685 (Year: 2015).
Kazarian, M. and A. Laird-Offringa, "Small-cell lung cancer-associated autoantibodies: potential applications to cancer diagnosis, early detection, and therapy" Molecular Cancer 10(33) 1-19 (Year: 2011).
Lu, et al., "Advances in antibody therapeutics targeting small-cell lung cancer" Advances in Clinical Experimental Medicine; 27(9); pp. 1317-1323 (2018).
Kazarian, et al., "Small-cell lung cancer-associated autoantibodies: Potential Applications to Cancer Diagnosis, Early Detection, and Therapy" Molecular Cancer 10(33); pp. 2-19 (2011).
Aluicio-Sarduy, et al., "PET Radiometals for Antibody Labeling" Journal of Labelled Comp Radiopharm 61(9); pp. 636-651 (2018).

(Continued)

*Primary Examiner* — Gary Counts
(74) *Attorney, Agent, or Firm* — Schwabe, Williamson & Wyatt PC

(57) ABSTRACT

Disclosed herein are high performance biomarkers and panel for small cell lung cancer (SCLC) early detection useful for identifying, diagnosing and treating SCLC patients at an early stage. The method of detecting and diagnosing small cell lung cancer (SCLC) includes contacting a sample from a subject suspected of being at-risk of acquiring or having SCLC with at least two SCLC-specific autoantibody molecules and detecting binding of four different protein types—SCLC autoantibody-antigen complexes, SCLC uncomplexed autoantibodies, SCLC associated proteins and SCLC glycoproteins—in the sample, thereby detecting SCLC in the subject.

19 Claims, 18 Drawing Sheets

(56) References Cited

OTHER PUBLICATIONS

Hampe, et al., "A Novel Monoclonal Antibody Specific for the N-terminal End of GAD65" Journal of Neuroimmunology 113; pp. 63-71 (2001).
Byers, et al., "Phase 1 Study of AMG 119, A Chimeric Antigen Receptor (CAR) T Cell Therapy Targeting DLL3, in patients with relapsed-refractory small cell lung cancer (SCLC)" Journal of Clinical Oncology (2019) ASCO Annual Meeting I, Meeting Abstract; vol. 37(15); 4 pages.
Corte, et al., "Beyond Chemotherapy: Emerging Biomarkers and Therapies as Small Cell Lung Cancer Enters the Immune Checkpoint Era" Cancer 125(4); pp. 496-498 (2019).
Deneka, et al., "Tumor-Targeted Drug Conjugates as an Emerging Novel Therapeutic Approach in Small Cell Lung Cancer (SCLC)" Cancers 11; 23 pages (2019).
Chapman, Caroline J. et al., "Immuno-Biomarkers in Small Cell Lung Cancer: Potential Early Cancer Signals", Clinical Cancer Research, Dec. 7, 2010, 25 pages.
Pan, Jianbo et al., "Identification of Serological Biomarkers for Early Diagnosis of Lung Cancer Using a Protein Array-Based Approach", Molecular & Cellular Proteomics 16.12, 2017, pp. 2069-2078.
Shembekar, N., et al., "Single-cell droplet microfluidic screening for antibodies specifically binding to target cells" CellPress 22; 2206-2215 (Year: 2018).
Lastwika et al., "Posttranslational modifications induce autoantibodies with risk prediction capability in patients with small cell lung cancer," Science Translational Medicine, Lung Cancer, vol. 15, pp. 1-11 (Jan. 11, 2023).

\* cited by examiner

|  | AUC | Sens | Spec | PPV | NPV | LR | Delong |
|---|---|---|---|---|---|---|---|
| AAb | 0.779 | 0.917 | 0.571 | 0.647 | 0.889 | - | - |
| Mayo | 0.731 | 0.639 | 0.786 | 0.719 | 0.717 | | |
| Mayo + AAb | 0.835 | 0.917 | 0.690 | 0.717 | 0.906 | 0.0011 | 0.0336 |
| Brock | 0.770 | 0.722 | 0.762 | 0.722 | 0.762 | | |
| Brock + AAb | 0.869 | 0.917 | 0.738 | 0.75 | 0.912 | 0.0013 | 0.0179 |
| Gould | 0.663 | 0.806 | 0.548 | 0.604 | 0.767 | | |
| Gould + AAb | 0.824 | 0.917 | 0.643 | 0.688 | 0.900 | 0.0001 | 0.0087 |

Figure 5K

AUTOANTIBODIES AND AUTOANTIBODY-AUTOANTIGEN COMPLEXES AS BIOMARKERS OF SMALL CELL LUNG CANCER

CROSS REFERENCE TO RELATED APPLICATION APPLICATIONS

This application is a 371 U.S. national stage application of PCT/US2019/023741, filed on Mar. 22, 2019, which claims the benefit of priority to U.S. Patent Application No. 62/646,727 filed on Mar. 22, 2018. Each of these applications is incorporated by reference in its entirety.

FIELD

This disclosure relates to the field of small cell lung cancer (SCLC) and in particular, to autoantibodies and autoantibody-autoantigen complexes as biomarkers of SCLC, platforms and methods of use thereof.

BACKGROUND

Small cell lung cancer (SCLC) accounts for approximately 10-15% of lung cancers and shares one very important characteristic with essentially all solid tumor malignancies: early detection of the cancer leads to improved survival metrics. There currently is no blood test recommended for lung cancer early detection. Since the majority of SCLC patients are diagnosed at extensive stage—where current treatment options offer limited benefit—many investigators have not appreciated the fact that nearly approximately 20% of limited stage SCLC patients can be cured with conventional cytotoxic chemotherapy. Furthermore, surgical resection—generally not considered for SCLC—can be curative when combined with chemotherapy for highly selected and very early stage patients. The low-dose CT screening protocols that have proven effective for NSCLC have not displayed benefit in SCLC. This is likely a result of the aggressive nature and mediastinal location of SCLC, such that annual imaging is not sufficient. As such, assays and methods for identifying SCLC in the early stage are needed.

SUMMARY

Diagnostic methods capable of identifying SCLC at the microscopic stage, prior to clinical detection, would be desirable to reliably identify limited stage SCLC. Thus, the amplification of antibodies inherent to immune activation could allow detection of even very small (i.e. microscopic) tumors. Based on reports, estimated doubling times for SCLC range from 54-132 days. Assuming that it takes at least $1\times10^6$ cells for a cancer to be clinically detectable, it would require 21 doublings for a single cell to reach that tumor volume. Based on these numbers, even a cancer as aggressive as SCLC likely takes between 44 to 88 months to progress from a single cell to clinical relevance. This indicates that there exists a period of time prior to clinical recognition that SCLC would represent enough of a cellular mass such that its unique molecular features could be detected.

Disclosed herein are high performance biomarkers and panel for SCLC early detection useful for identifying, diagnosing and treating SCLC patients at an early stage. In some embodiments, a biomarker detection panel for small cell lung cancer (SCLC) comprises two or more SCLC autoantibody molecules capable of detecting autoantibody molecules of Tables 1A-4, such as Tables 1B, 2A, 2B, 3 and 4, wherein the autoantibody molecules complexed or not complexed with cognate autoantigen are capable of detecting SCLC with a sensitivity and specificity of at least 75%. In some embodiments, a method of detecting SCLC is disclosed which includes contacting a sample from a subject suspected of being at-risk of acquiring or having SCLC with at least two autoantibody molecules capable of detecting molecules provided herein, such as in Tables 1B, 2A, 2B, 3 and 4, and detecting binding of SCLC autoantibody-antigen complexes, SCLC associated proteins, SCLC autoantibodies and SCLC glycoproteins in the sample, thereby detecting SCLC in the subject.

The foregoing and other features of the disclosure will become more apparent from the following detailed description, which proceeds with reference to the accompanying figures.

BRIEF DESCRIPTION OF THE DRAWINGS

FIG. 5A, B-cell content from N=75 NSCLC tumor specimens. FIG. 5B, CD20 IHC depicting B-cell clusters within lymphoid aggregates in a lung adenocarcinoma. FIGS. 5C-5D, B-cells following column purification by flow cytometry and Ig isolation. FIG. 5E, HuProt Arrays identified 13 antibodies present in tumor-derived B-cell extract and paired plasma, but not in control plasma.

FIG. 5F, 10/13 free autoantibodies are also present as antigen-complexed autoantibodies at higher levels in cases (N=10) verses controls (N=10). 4/10 autoantibodies reach statistical significance (unpaired t test). Five autoantibodies are significantly higher in plasma from NSCLC nodules (n=126) compared to benign nodules (n=126) patients (unpaired t test).

FIGS. 5G-5K Tumor-derived B-cells produce tumor-specific autoantibodies. (FIG. 5G) Flow cytometry quantification of CD19+ B cells in CD45+ leukocytes by stage of non small cell lung cancer. Tumors have significantly more CD19+ B cells in all stages of NSCLC compared to NAL. Stage 1 n=47, stage 2 n=13, stage 3 n=9 (mean±s.e.m.) p-values via Welch's t test. (FIG. 5H) Quantification of fluorescent intensity of top autoantibodies with ≥50% sensitivity and ≥70% specificity (n=10/group) (mean±s.e.m., unpaired student's t-test*=p<0.02, =p<0.0002, *=p<0.00001). (FIG. 5I) 5 autoantibodies are significantly higher in plasma from NCSLC nodule (n=125) compared to benign nodules (n=125) patients (unpaired t-test). (FIG. 5J) ROC curves of 4-autoantibody panel (AAb) alone, Mayo model alone, Brock model alone, Gould model alone and the combinations of AAb panel and each model in indeterminate pulmonary nodules (IPNs) with the largest diameter between 8 mm and 20 mm (n=42 cases, 36 controls). (FIG. 5K) Adding the AAb panel to a malignancy risk prediction model significantly improved the ability to detect malignant IPNs. Sens=sensitivity, Spec=specificity, PPV=positive predictive value, NPV=negative predictive value, LR=likelihood ratio for malignancy detection, Delong=two-sided Delong's t test.

FIG. 10 SCLC panel autoantibodies are upregulated at least 1 year prior to diagnosis. *=p<0.05. The CHS specimens (N=17) utilized to generate preliminary data were drawn either 0-1 or 1-2 years prior to diagnosis. Data from FIG. 8 was re-analyzed as a function of the time of blood draw. The data show that most of the markers were similarly effective when the plasma was drawn 1-2 years prior to diagnosis as when drawn less than one year prior to diagnosis. These data indicate that autoantibody-antigen complex markers can be effective at least 2 years prior to clinical diagnosis.

DETAILED DESCRIPTION OF SEVERAL EMBODIMENTS

I. Terms

Figure 1:
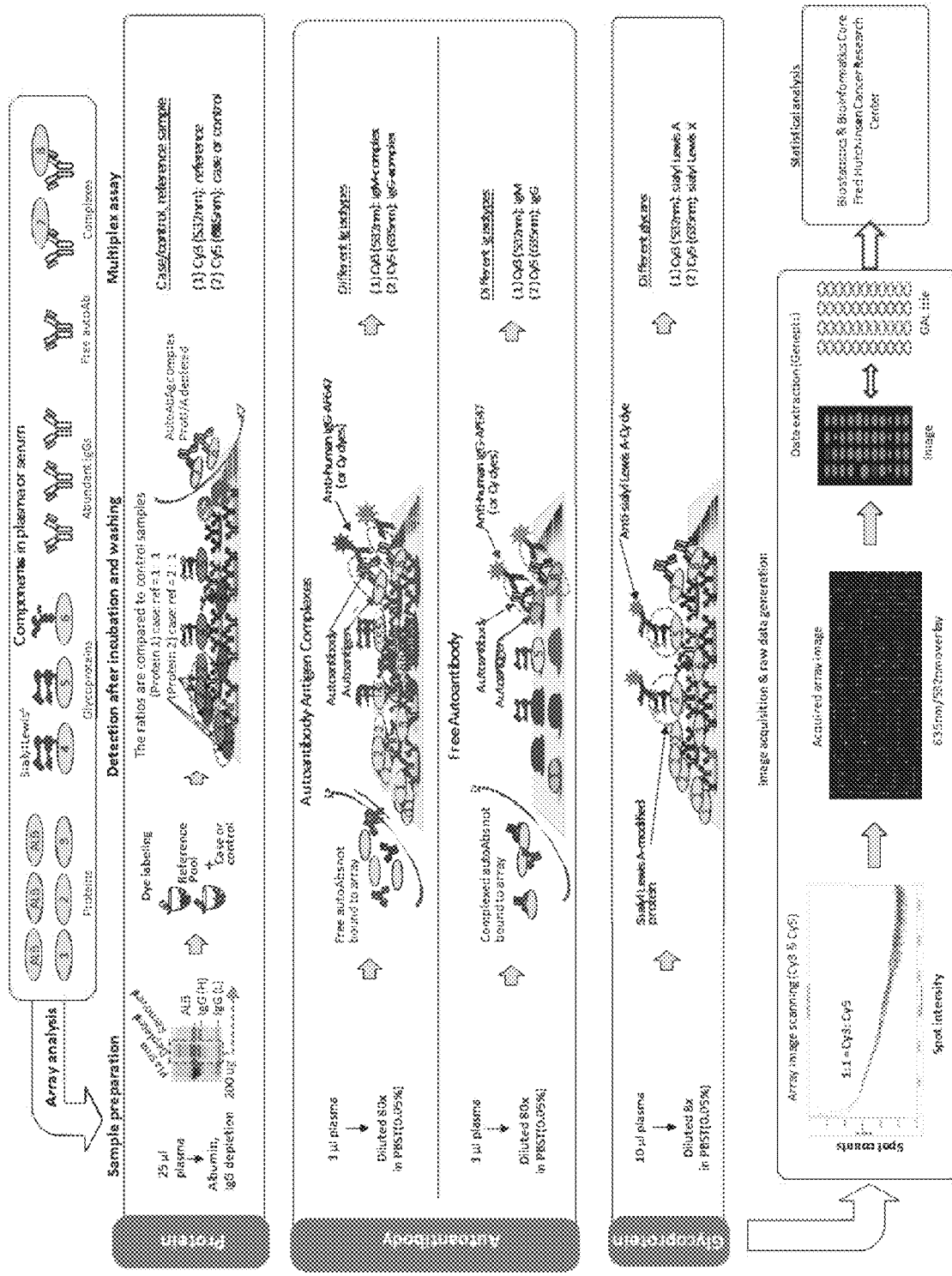
FIG. 1 Hybrid marker array schematic. Schematic showing how the array platform can be used to obtain proteomic, autoantibody-antigen complexes, free autoantibody, or glycomic levels using distinct probing strategies in accordance with embodiments disclosed herein. For proteomics, the samples (case or control) are labeled with Cy5 and a reference plasma pool with Cy3 to obtain the level of each protein relative to the reference. For free and complexed autoantibodies the antibody to the human IgG and IgM are directly labeled, an anti SleX and SleA detect the presence of cancer specific glycan moieties.

The following explanations of terms and methods are provided to better describe the present disclosure and to guide those of ordinary skill in the art in the practice of the present disclosure. The singular terms "a," "an," and "the" include plural referents unless context clearly indicates otherwise. Similarly, the word "or" is intended to include "and" unless the context clearly indicates otherwise. The term "comprises" means "includes." Thus, "comprising A or B," means "including A, B, or A and B," without excluding additional elements.

Although methods and materials similar or equivalent to those described herein can be used in the practice or testing of this disclosure, suitable methods and materials are described below.

Unless otherwise explained, all technical and scientific terms used herein have the same meaning as commonly understood by one of ordinary skill in the art to which this disclosure belongs. Definitions of common terms in molecular biology may be found in Benjamin Lewin, *Genes V*, published by Oxford University Press, 1994 (ISBN 0-19-854287-9); Kendrew et al. (eds.), *The Encyclopedia of Molecular Biology*, published by Blackwell Science Ltd., 1994 (ISBN 0-632-02182-9); and Robert A. Meyers (ed.), *Molecular Biology and Biotechnology: a Comprehensive Desk Reference*, published by VCH Publishers, Inc., 1995 (ISBN 1-56081-569-8).

All publications, patent applications, patents, and other references mentioned herein are incorporated by reference in their entirety. All sequences provided in the disclosed Genbank Accession numbers are incorporated herein by reference as available on Mar. 22, 2018. In case of conflict, the present specification, including explanations of terms, will control. In addition, the materials, methods, and examples are illustrative only and not intended to be limiting.

In order to facilitate review of the various embodiments of this disclosure, the following explanations of specific terms are provided:

Administration: To provide or give a subject an agent by any effective route. Exemplary routes of administration include, but are not limited to, injection (such as subcutaneous, intramuscular, intradermal, intraperitoneal, and intravenous), oral, sublingual, rectal, transdermal, intranasal, vaginal and inhalation routes or any combination of techniques thereof. In some particular examples, administration of anti-sense nucleic acids are provided as described by Rudolph Juliano (Nucleic Acids Res. 106 August 19; 44(14): 6518-6548) which is hereby incorporated by reference.

Suitable solid or liquid pharmaceutical preparation forms are, for example, aerosols, (micro)capsules, creams, drops, drops or injectable solution in ampoule form, emulsions, granules, powders, suppositories, suspensions, syrups, tablets, coated tablets, and also preparations with protracted release of active compounds, in whose preparation excipients and additives and/or auxiliaries such as binders, coating agents, disintegrants, flavorings, lubricants, solubilizers, sweeteners, or swelling agents are customarily used as described above. The pharmaceutical compositions are suitable for use in a variety of drug delivery systems. For a brief review of various methods for drug delivery, see Langer, "New Methods of Drug Delivery," *Science* 249:1527-1533 (1990), incorporated by reference herein to the extent not inconsistent with the present disclosure.

The disclosed compositions or other therapeutic agents of the present disclosure can be formulated into therapeutically-active pharmaceutical compositions that can be administered to a subject parenterally or orally. Parenteral administration routes include, but are not limited to epidermal, intraarterial, intramuscular (IM, and depot IM), intraperitoneal (IP), intravenous (IV), intrasternal injection or infusion techniques, intranasal (inhalation), intrathecal, injection into the stomach, subcutaneous injections (subcutaneous (SQ and depot SQ), transdermal, topical, and ophthalmic.

The disclosed compositions or other therapeutic agent can be mixed or combined with a suitable pharmaceutically acceptable excipients to prepare pharmaceutical compositions. Pharmaceutically acceptable excipients include, but are not limited to, alumina, aluminum stearate, buffers (such as phosphates), glycine, ion exchangers (such as to help control release of charged substances), lecithin, partial glyceride mixtures of saturated vegetable fatty acids, potassium sorbate, serum proteins (such as human serum albumin), sorbic acid, water, salts or electrolytes such as cellulose-based substances, colloidal silica, disodium hydrogen phosphate, magnesium trisilicate, polyacrylates, polyalkylene glycols, such as polyethylene glycol, polyethylene-polyoxypropylene-block polymers, polyvinyl pyrrolidone, potassium hydrogen phosphate, protamine sulfate, group 1 halide salts such as sodium chloride, sodium carboxymethylcellulose, waxes, wool fat, and zinc salts, for example. Liposomal suspensions may also be suitable as pharmaceutically acceptable carriers.

Upon mixing or addition of a disclosed composition, or other therapeutic agent, the resulting mixture may be a solid, solution, suspension, emulsion, or the like. These may be prepared according to methods known to those of ordinary skill in the art. The form of the resulting mixture depends upon a number of factors, including the intended mode of administration and the solubility of the agent in the selected carrier.

Pharmaceutical carriers suitable for administration of the disclosed compositions or other therapeutic agent include any such carriers known to be suitable for the particular mode of administration. In addition, the disclosed composition or other therapeutic substance can also be mixed with other inactive or active materials that do not impair the desired action, or with materials that supplement the desired action, or have another action.

Methods for solubilizing may be used where the agents exhibit insufficient solubility in a carrier. Such methods are known and include, but are not limited to, dissolution in aqueous sodium bicarbonate, using cosolvents such as dimethylsulfoxide (DMSO), and using surfactants such as TWEEN® (ICI Americas, Inc., Wilmington, DE).

The disclosed compositions or other therapeutic agent can be prepared with carriers that protect them against rapid elimination from the body, such as coatings or time-release formulations. Such carriers include controlled release formulations, such as, but not limited to, microencapsulated delivery systems. The disclosed compositions or other therapeutic agent is included in the pharmaceutically acceptable carrier in an amount sufficient to exert a therapeutically useful effect, typically in an amount to avoid undesired side effects, on the treated subject. The therapeutically effective concentration may be determined empirically by testing the compounds in known in vitro and in vivo model systems for the treated condition. For example, an acceptable SCLC animal model may be used to determine effective amounts or concentrations that can then be translated to other subjects, such as humans, as known in the art.

Injectable solutions or suspensions can be formulated, using suitable non-toxic, parenterally-acceptable diluents or solvents, such as 1,3-butanediol, isotonic sodium chloride solution, mannitol, Ringer's solution, saline solution, or water; or suitable dispersing or wetting and suspending agents, such as sterile, bland, fixed oils, including synthetic mono- or diglycerides, and fatty acids, including oleic acid; a naturally occurring vegetable oil such as coconut oil, cottonseed oil, peanut oil, sesame oil, and the like; glycerine; polyethylene glycol; propylene glycol; or other synthetic solvent; antimicrobial agents such as benzyl alcohol and methyl parabens; antioxidants such as ascorbic acid and sodium bisulfite; buffers such as acetates, citrates, and phosphates; chelating agents such as ethylenediaminetetraacetic acid (EDTA); agents for the adjustment of tonicity such as sodium chloride and dextrose; and combinations thereof. Parenteral preparations can be enclosed in ampoules, disposable syringes, or multiple dose vials made of glass, plastic, or other suitable material. Buffers, preservatives, antioxidants, and the like can be incorporated as required. Where administered intravenously, suitable carriers include physiological saline, phosphate-buffered saline (PBS), and solutions containing thickening and solubilizing agents such as glucose, polyethylene glycol, polypropyleneglycol, and mixtures thereof. Liposomal suspensions, including tissue-targeted liposomes, may also be suitable as pharmaceutically acceptable carriers.

If a disclosed composition or other therapeutic agent is administered orally as a suspension, the pharmaceutical compositions can be prepared according to techniques well known in the art of pharmaceutical formulation and may contain a suspending agent, such as alginic acid or sodium alginate, bulking agent, such as microcrystalline cellulose, a viscosity enhancer, such as methylcellulose, and sweeteners/flavoring agents. Oral liquid preparations can contain conventional additives such as suspending agents, e.g., gelatin, glucose syrup, hydrogenated edible fats, methyl cellulose, sorbitol, and syrup; emulsifying agents, e.g., acacia, lecithin, or sorbitan monooleate; non-aqueous carriers (including edible oils), e.g., almond oil, fractionated coconut oil, oily esters such as glycerine, propylene glycol, or ethyl alcohol; preservatives such as methyl or propyl p-hydroxybenzoate or sorbic acid; and, if desired, conventional flavoring or coloring agents. When formulated as immediate release tablets, these compositions can contain dicalcium phosphate, lactose, magnesium stearate, microcrystalline cellulose, and starch and/or other binders, diluents, disintegrants, excipients, extenders, and lubricants.

If oral administration is desired, a disclosed composition, or other therapeutic substance can be provided in a composition that protects it from the acidic environment of the stomach. For example, a disclosed composition, or other therapeutic agent can be formulated with an enteric coating that maintains its integrity in the stomach and releases the active compound in the intestine. A disclosed composition or other therapeutic agent can also be formulated in combination with an antacid or other such ingredient.

Oral compositions generally include an inert diluent or an edible carrier and can be compressed into tablets or enclosed in gelatin capsules. For the purpose of oral therapeutic administration, the disclosed composition or other therapeutic substance can be incorporated with excipients and used in the form of capsules, tablets, or troches. Pharmaceutically compatible adjuvant materials or binding agents can be included as part of the composition.

The capsules, pills, tablets, troches, and the like can contain any of the following ingredients or compounds of a similar nature: a binder such as, but not limited to, acacia, corn starch, gelatin, gum tragacanth, polyvinylpyrrolidone, or sorbitol; a filler such as calcium phosphate, glycine, lactose, microcrystalline cellulose, or starch; a disintegrating agent such as, but not limited to, alginic acid and corn starch; a lubricant such as, but not limited to, magnesium stearate, polyethylene glycol, silica, or talc; a gildant, such as, but not limited to, colloidal silicon dioxide; a sweetening agent such as sucrose or saccharin; disintegrants such as potato starch; dispersing or wetting agents such as sodium lauryl sulfate; and a flavoring agent such as peppermint, methyl salicylate, or fruit flavoring.

When the dosage unit form is a capsule, it can contain, in addition to material of the above type, a liquid carrier, such as a fatty oil. In addition, dosage unit forms can contain various other materials that modify the physical form of the dosage unit, for example, coatings of sugar and other enteric agents. The disclosed composition or other therapeutic agent can also be administered as a component of an elixir, suspension, syrup, wafer, tea, chewing gum, or the like. A syrup may contain, in addition to the active compounds, sucrose or glycerin as a sweetening agent and certain preservatives, dyes and colorings, and flavors.

When administered orally, the compounds can be administered in usual dosage forms for oral administration. These dosage forms include the usual solid unit dosage forms of tablets and capsules as well as liquid dosage forms such as solutions, suspensions, and elixirs. When the solid dosage forms are used, they can be of the sustained release type so that the compounds need to be administered less frequently.

Agent: Any protein, nucleic acid molecule (including chemically modified nucleic acids), compound, antibody, small molecule, organic compound, inorganic compound, or other molecule of interest. Agent can include a therapeutic agent, a diagnostic agent or a pharmaceutical agent. A therapeutic or pharmaceutical agent is one that alone or together with an additional compound induces the desired response (such as inducing a therapeutic or prophylactic effect when administered to a subject, including treating a subject with or at-risk of acquiring SCLC).

In some examples, an agent can act directly or indirectly to alter the activity and/or expression of SLCL associated molecule, such as a SLCL early detection molecule. In a particular example, a therapeutic agent (such as an antisense compound or antibody) significantly alters the expression and/or activity of a SCLC associated molecule. An example of a therapeutic agent is one that can decrease the activity of a gene or gene product associated with SLCL, for example as measured by a clinical response (such as an increase survival time or a decrease in one or more signs or symptoms associated with SCLC). Therapeutically agents also include organic or other chemical compounds that mimic the effects of the therapeutically effective peptide, antibody, or nucleic acid molecule.

A "pharmaceutical agent" is a chemical compound or composition capable of inducing a desired therapeutic or prophylactic effect when administered to a subject, alone or in combination with another therapeutic agent(s) or pharmaceutically acceptable carriers. In a particular example, a pharmaceutical agent significantly reduces the expression and/or activity of a SCLC associated molecule thereby increasing a subject's survival time, reducing a sign or symptom associated with the disease, prolonging the onset of SCLC signs or symptoms.

Antibody: A polypeptide including at least a light chain or heavy chain immunoglobulin variable region which specifically recognizes and binds an epitope of an antigen, such as a SCLC associated molecule or a fragment thereof. Antibodies are composed of a heavy and a light chain, each of which has a variable region, termed the variable heavy ($V_H$) region and the variable light ($V_L$) region. Together, the $V_H$ region and the $V_L$ region are responsible for binding the antigen recognized by the antibody. Antibodies of the present disclosure include those that are specific for a disclosed SCLC-associated molecule.

The term antibody includes intact immunoglobulins, as well the variants and portions thereof, such as Fab' fragments, F(ab)'2 fragments, single chain Fv proteins ("scFv"), and disulfide stabilized Fv proteins ("dsFv"). A scFv protein is a fusion protein in which a light chain variable region of an immunoglobulin and a heavy chain variable region of an immunoglobulin are bound by a linker, while in dsFvs, the chains have been mutated to introduce a disulfide bond to stabilize the association of the chains. The term also includes genetically engineered forms such as chimeric antibodies (for example, humanized murine antibodies), heteroconjugate antibodies (such as, bispecific antibodies). See also, *Pierce Catalog and Handbook*, 1994-1995 (Pierce Chemical Co., Rockford, IL); Kuby, J., *Immunology*, $3^{rd}$ Ed., W. H. Freeman & Co., New York, 1997.

Typically, a naturally occurring immunoglobulin has heavy (H) chains and light (L) chains interconnected by disulfide bonds. There are two types of light chain, lambda (λ) and kappa (κ). There are five main heavy chain classes (or isotypes) which determine the functional activity of an antibody molecule: IgM, IgD, IgG, IgA and IgE.

Each heavy and light chain contains a constant region and a variable region, (the regions are also known as "domains"). In combination, the heavy and the light chain variable regions specifically bind the antigen. Light and heavy chain variable regions contain a "framework" region interrupted by three hypervariable regions, also called "complementarity-determining regions" or "CDRs". The extent of the framework region and CDRs have been defined (see, Kabat et al., *Sequences of Proteins of Immunological Interest*, U.S. Department of Health and Human Services, 1991). The Kabat database is now maintained online. The sequences of the framework regions of different light or heavy chains are relatively conserved within a species. The framework region of an antibody, that is the combined framework regions of the constituent light and heavy chains, serves to position and align the CDRs in three-dimensional space.

The CDRs are primarily responsible for binding to an epitope of an antigen. The CDRs of each chain are typically referred to as CDR1, CDR2, and CDR3, numbered sequentially starting from the N-terminus, and are also typically identified by the chain in which the particular CDR is located. Thus, a $V_H$ CDR3 is located in the variable domain of the heavy chain of the antibody in which it is found, whereas a $V_L$ CDR1 is the CDR1 from the variable domain of the light chain of the antibody in which it is found. An antibody that binds RET will have a specific $V_H$ region and the $V_L$ region sequence, and thus specific CDR sequences. Antibodies with different specificities (such as different combining sites for different antigens) have different CDRs. Although it is the CDRs that vary from antibody to antibody, only a limited number of amino acid positions within the CDRs are directly involved in antigen binding. These positions within the CDRs are called specificity determining residues (SDRs).

References to "$V_H$" or "VH" refer to the variable region of an immunoglobulin heavy chain, including that of an Fv, scFv, dsFv or Fab. References to "$V_L$" or "VL" refer to the variable region of an immunoglobulin light chain, including that of an Fv, scFv, dsFv or Fab.

A "monoclonal antibody" is an antibody produced by a single clone of B-lymphocytes or by a cell into which the light and heavy chain genes of a single antibody have been transfected. Monoclonal antibodies are produced by methods known to those of skill in the art, for instance by making hybrid antibody-forming cells from a fusion of myeloma cells with immune spleen cells. Monoclonal antibodies include humanized monoclonal antibodies.

A "polyclonal antibody" is an antibody that is derived from different B-cell lines. Polyclonal antibodies are a mixture of immunoglobulin molecules secreted against a specific antigen, each recognizing a different epitope. These antibodies are produced by methods known to those of skill in the art, for instance, by injection of an antigen into a suitable mammal (such as a mouse, rabbit or goat) that induces the B-lymphocytes to produce IgG immunoglobulins specific for the antigen, which are then purified from the mammal's serum.

A "chimeric antibody" has framework residues from one species, such as human, and CDRs (which generally confer antigen binding) from another species, such as a murine antibody that specifically binds a SCLC-associated molecule.

A "humanized" immunoglobulin is an immunoglobulin including a human framework region and one or more CDRs from a non-human (for example a mouse, rat, or synthetic) immunoglobulin. The non-human immunoglobulin providing the CDRs is termed a "donor," and the human immunoglobulin providing the framework is termed an "acceptor." In one example, all the CDRs are from the donor immunoglobulin in a humanized immunoglobulin. Constant regions need not be present, but if they are, they are ly identical to human immunoglobulin constant regions, e.g., at least about 85-90%, such as about 95% or more identical. Hence, all parts of a humanized immunoglobulin, except possibly the CDRs, are substantially identical to corresponding parts of natural human immunoglobulin sequences. Humanized immunoglobulins can be constructed by means of genetic engineering (see for example, U.S. Pat. No. 5,585,089).

An "autoantibody" is an antibody produced by the immune system that is directed against one or more of the individual's own proteins.

Alteration or modulation in expression: An alteration in expression of a gene, gene product or modulator thereof, such as one or more SCLC associated molecules disclosed herein, refers to a change or difference, such as an increase or decrease, in the level of the gene, gene product, or modulators thereof that is detectable in a biological sample (such as a sample from a subject at-risk or having SCLC) relative to a control (such as a sample from a subject without a SCLC) or a reference value known to be indicative of the level of the gene, gene product or modulator thereof in the absence of the disease. An "alteration" in expression includes an increase in expression (up-regulation) or a decrease in expression (down-regulation).

Array: An arrangement of molecules, such as biological macromolecules (such as peptides or nucleic acid molecules) or biological samples (such as tissue sections), in addressable locations on or in a substrate. A "microarray" is an array that is miniaturized so as to require or be aided by microscopic examination for evaluation or analysis. Arrays are sometimes called DNA chips or biochips.

The array of molecules ("features") makes it possible to carry out a very large number of analyses on a sample at one time. In certain example arrays, one or more molecules (such as an oligonucleotide probe or antibody) will occur on the array a plurality of times (such as twice), for instance to provide internal controls. The number of addressable locations on the array can vary, for example from at least two, to at least four, to at least 9, at least 10, at least 14, at least 15, at least 20, at least 30, at least 50, at least 75, at least 100, at least 150, at least 200, at least 300, at least 500, least 550, at least 600, at least 800, at least 1000, at least 10,000, or more. In a particular example, an array includes 2-100 addressable locations, such as 2-40 addressable locations. In particular examples, an array consists essentially of probes or primers or antibodies (such as those that permit amplification or detection) specific for SCLC as disclosed herein, such as the molecules disclosed in Tables 1-3 and in some examples, also 1 to 10 or 1 to 6 control molecules (such as housekeeping genes or proteins).

In particular examples, an array includes nucleic acid molecules, such as oligonucleotides that are at least 15 nucleotides in length, at least 30 nucleotides, at least 40 nucleotides, or at least 50 nucleotides in length.

Within an array, each arrayed sample is addressable, in that its location can be reliably and consistently determined within at least two dimensions of the array. The feature application location on an array can assume different shapes. For example, the array can be regular (such as arranged in uniform rows and columns) or irregular. Thus, in ordered arrays the location of each sample is assigned to the sample at the time when it is applied to the array, and a key may be provided in order to correlate each location with the appropriate target or feature position. Often, ordered arrays are arranged in a symmetrical grid pattern, but samples could be arranged in other patterns (such as in radially distributed lines, spiral lines, or ordered clusters). Addressable arrays usually are computer readable, in that a computer can be programmed to correlate a particular address on the array with information about the sample at that position (such as hybridization or binding data, including for instance signal intensity). In some examples of computer readable formats, the individual features in the array are arranged regularly, for instance in a Cartesian grid pattern, which can be correlated to address information by a computer.

Protein-based arrays include probe molecules that are or include proteins, or where the target molecules are or include proteins, and arrays including nucleic acids to which proteins are bound, or vice versa. In some examples, an array contains antibodies to SCLC-associated molecules, such as those disclosed in Tables 1-3 and in some examples also 1 to 10 controls.

Binding or stable binding: An association between two substances or molecules, such as the hybridization of one nucleic acid molecule to another (or itself), the association of an antibody with a peptide, or the association of a protein with another protein or nucleic acid molecule. An oligonucleotide molecule binds or stably binds to a target nucleic acid molecule if a sufficient amount of the oligonucleotide molecule forms base pairs or is hybridized to its target nucleic acid molecule, to permit detection of that binding. "Preferentially binds" indicates that one molecule binds to another with high affinity, and binds to heterologous molecules at a low affinity.

Binding can be detected by any procedure known to one skilled in the art, such as by physical or functional properties of the target complex. For example, binding can be detected functionally by determining whether binding has an observable effect upon a biosynthetic process such as expression of a gene, DNA replication, transcription, translation, and the like. Methods of detecting binding of an antibody to a protein are disclosed herein and also can include known methods of protein detection, such as Western blotting.

Biological activity: The beneficial or adverse effects of an agent on living matter. When the agent is a complex chemical mixture, this activity is exerted by the substance's active ingredient or pharmacophore, but can be modified by the other constituents. Activity is generally dosage-dependent and it is not uncommon to have effects ranging from beneficial to adverse for one substance when going from low to high doses. In one example, the agent significantly reduces the biological activity of the one or more SCLC associated molecules disclosed herein which reduces one or more signs or symptoms associated with the SCLC.

Biomarker: Molecular, biological or physical attributes that characterize a physiological state and can be objectively measured to detect or define disease progression or predict or quantify therapeutic responses. For instance, a substance used as an indicator of a biologic state. It is a characteristic that is objectively measured and evaluated as an indicator of normal biologic processes, pathogenic processes, or pharmacologic responses to a therapeutic intervention. In one example, a biomarker is a protein or nucleic acid sequence of a corresponding gene that is indicator of SCLC.

Clinical outcome: Refers to the health status of a patient following treatment for a disease or disorder, such as SCLC, or in the absence of treatment. Clinical outcomes include, but are not limited to, an increase in the length of time until death, a decrease in the length of time until death, an increase in the chance of survival, an increase in the risk of death, survival, disease-free survival, chronic disease, metastasis, advanced or aggressive disease, disease recurrence, death, and favorable or poor response to therapy.

Contacting: Placement in direct physical association, including both a solid and liquid form. Contacting an agent with a cell can occur in vitro by adding the agent to isolated cells or in vivo by administering the agent to a subject.

Control: A sample or standard used for comparison with a test sample, such as a biological sample obtained from a patient (or plurality of patients) without a particular disease or condition, such as SCLC. In some embodiments, the control is a sample obtained from a healthy patient (or plurality of patients) (also referred to herein as a "normal" control), such as a normal biological sample or from a non-cancerous biological sample from the patient that has particular disease or condition, such as SCLC. In some embodiments, the control is a historical control or standard value (e.g., a previously tested control sample or group of samples that represent baseline or normal values (e.g., expression values), such as baseline or normal values of a particular gene, gene product in a subject without SCLC). In some examples, the control is a standard value representing the average value (or average range of values) obtained from a plurality of patient samples (such as an average value or range of values of the gene or gene products in the subjects without SCLC).

Consists essentially of: In the context of the present disclosure, "consists essentially of" indicates that the expression of additional SCLC-associated molecules can be evaluated, but not more than ten additional SCLC-associated molecules. In some examples, "consist essentially of" indicates that no more than 5 other molecules are evaluated, such as no more than 4, 3, 2, or 1 other molecules. In some examples, fewer than the recited molecules are evaluated, but not less than 5, 4, 3, 2 or 1 fewer molecules. In some examples, the expression of one or more controls is evaluated. In this context "consist of" indicates that only the expression of the stated molecules are evaluated; the expression of additional molecules is not evaluated.

CRMP5 (Collapsin response-mediator protein-5): One of the five intracellular phosphoproteins of the CRMP family which are predominantly expressed in the nervous system during development and play important roles in axon formation from neurites and in growth cone guidance and collapse through their interactions with microtubules. Cleaved forms of CRMPs have also been linked to neuron degeneration after trauma induced injury. CRMP5 is only 50-51% homologous with each of the other CRMPs.

Decrease: To reduce the quality, amount, or strength of something. In one example, a therapy decreases one or more symptoms associated with SCLC, for example as compared to the response in the absence of the therapy. In a particular example, a therapy decreases (also known as down-regulates) the expression of a SCLC-associated molecule, such as a decrease of at least 10%, at least 20%, at least 25%, at least 30%, at least 40%, at least 50%, or even at least 90% in a SCLC associated molecule expression. A gene product can be RNA (such as mRNA, rRNA, tRNA, and structural RNA) or protein. Therefore, gene downregulation or deactivation includes processes that decrease transcription of a gene or translation of mRNA.

Examples of processes that decrease transcription include those that facilitate degradation of a transcription initiation complex, those that decrease transcription initiation rate, those that decrease transcription elongation rate, those that decrease processivity of transcription and those that increase transcriptional repression. Gene downregulation can include reduction of expression above an existing level. Examples of processes that decrease translation include those that decrease translational initiation, those that decrease translational elongation and those that decrease mRNA stability.

Gene downregulation includes any detectable decrease in the production of a gene product. In certain examples, production of a gene product decreases by at least 2-fold, for example at least 3-fold or at least 4-fold, as compared to a control (such an amount of gene expression in a normal cell). In one example, a control is a relative amount of gene expression or protein expression in a biological sample taken from a subject who does not have SCLC. Such decreases can be measured using the methods disclosed herein. For example, "detecting or measuring expression of a gene product" includes quantifying the amount of the gene, gene product or modulator thereof present in a sample. Quantification can be either numerical or relative. Detecting expression of the gene, gene product or modulators thereof can be achieved using any method known in the art or described herein, such as by measuring nucleic acids by PCR (such as RT-PCR) and proteins by ELISA. In primary embodiments, the change detected is an increase or decrease in expression as compared to a control, such as a reference value or a healthy control subject. In some examples, the detected increase or decrease is an increase or decrease of at least two-fold compared with the control or standard. Controls or standards for comparison to a sample, for the determination of differential expression, include samples believed to be normal (in that they are not altered for the desired characteristic, for example a sample from a subject who does not have SCLC) as well as laboratory values (e.g., range of values), even though possibly arbitrarily set, keeping in mind that such values can vary from laboratory to laboratory.

Laboratory standards and values can be set based on a known or determined population value and can be supplied in the format of a graph or table that permits comparison of measured, experimentally determined values.

In other embodiments of the methods, the increase or decrease is of a diagnostically significant amount, which refers to a change of a sufficient magnitude to provide a statistical probability of the diagnosis.

The level of expression in either a qualitative or quantitative manner can detect nucleic acid or protein. Exemplary methods include microarray analysis, RT-PCR, Northern blot, Western blot, and mass spectrometry.

Detecting: Identifying the presence, absence or relative or absolute amount of the object to be detected.

Diagnosis: The process of identifying a disease, such as SCLC, by its signs, symptoms and results of various tests. The conclusion reached through that process is also called "a diagnosis." Forms of testing commonly performed include blood tests, medical imaging, urinalysis, and biopsy.

Effective amount: An amount of agent that is sufficient to generate a desired response, such as reducing lessening, ameliorating, eliminating, preventing, or inhibiting one or more signs or symptoms associated with a condition or disease treated and may be empirically determined. When administered to a subject, a dosage will generally be used that will achieve target tissue/cell concentrations. In some examples, an "effective amount" is one that treats one or more symptoms and/or underlying causes of any of a disorder or disease. In some examples, an "effective amount" is a therapeutically effective amount in which the agent alone with an additional therapeutic agent(s) (for example anti-pathogenic agents), induces the desired response such as treatment of SCLC.

In particular examples, it is an amount of an agent capable of modulating one or more of the disclosed genes, gene products or modulators thereof associated with SCLC by least 20%, at least 50%, at least 60%, at least 70%, at least 80%, at least 90%, at least 95%, at least 98%, or even at least 100% (elimination of the disease to a point beyond detection) by the agent.

In some examples, an effective amount is an amount of a pharmaceutical preparation that alone, or together with a pharmaceutically acceptable carrier or one or more additional therapeutic agents, induces the desired response.

In one example, a desired response is to increase the subject's survival time by slowing the progression of the disease. The disease does not need to be completely inhibited for the pharmaceutical preparation to be effective. For example, a pharmaceutical preparation can decrease the progression of the disease by a desired amount, for example by at least 20%, at least 50%, at least 60%, at least 70%, at least 80%, at least 90%, at least 95%, at least 98%, or even at least 100%, as compared to the progression typical in the absence of the pharmaceutical preparation.

In another or additional example, it is an amount sufficient to partially or completely alleviate symptoms of the SCLC within the subject. Treatment can involve only slowing the progression of the disease temporarily, but can also include halting or reversing the progression of the disease permanently.

Effective amounts of the agents described herein can be determined in many different ways, such as assaying for a reduction in of one or more signs or symptoms associated with the SCLC in the subject or measuring the expression level of one or more molecules known to be associated with the SCLC. Effective amounts also can be determined through various in vitro, in vivo or in situ assays, including the assays described herein.

The disclosed therapeutic agents can be administered in a single dose, or in several doses, for example daily, during a course of treatment. However, the effective amount can be dependent on the source applied (for example a nucleic acid molecule isolated from a cellular extract versus a chemically synthesized and purified nucleic acid), the subject being treated, the severity and type of the condition being treated, and the manner of administration.

Expression: The process by which the coded information of a gene is converted into an operational, non-operational, or structural part of a cell, such as the synthesis of a protein. Gene expression can be influenced by external signals. For instance, exposure of a cell to a hormone may stimulate expression of a hormone-induced gene. Different types of cells can respond differently to an identical signal. Expression of a gene also can be regulated anywhere in the pathway from DNA to RNA to protein. Regulation can include controls on transcription, translation, RNA transport and processing, degradation of intermediary molecules such as mRNA, or through activation, inactivation, compartmentalization or degradation of specific protein molecules after they are produced.

The expression of a nucleic acid molecule can be altered relative to a normal (wild type) nucleic acid molecule. Alterations in gene expression, such as differential expression, include but are not limited to: (1) overexpression; (2) underexpression; or (3) suppression of expression. Alternations in the expression of a nucleic acid molecule can be associated with, and in fact cause, a change in expression of the corresponding protein.

Protein expression can also be altered in some manner to be different from the expression of the protein in a normal (wild type) situation. This includes but is not necessarily limited to: (1) a mutation in the protein such that one or more of the amino acid residues is different; (2) a short deletion or addition of one or a few (such as no more than 10-20) amino acid residues to the sequence of the protein; (3) a longer deletion or addition of amino acid residues (such as at least 20 residues), such that an entire protein domain or sub-domain is removed or added; (4) expression of an increased amount of the protein compared to a control or standard amount; (5) expression of a decreased amount of the protein compared to a control or standard amount; (6) alteration of the subcellular localization or targeting of the protein; (7) alteration of the temporally regulated expression of the protein (such that the protein is expressed when it normally would not be, or alternatively is not expressed when it normally would be); (8) alteration in stability of a protein through increased longevity in the time that the protein remains localized in a cell; and (9) alteration of the localized (such as organ or tissue specific or subcellular localization) expression of the protein (such that the protein is not expressed where it would normally be expressed or is expressed where it normally would not be expressed), each compared to a control or standard. Controls or standards for comparison to a sample, for the determination of differential expression, include samples believed to be normal (in that they are not altered for the desired characteristic, for example a sample from a subject who does not have SCLC) as well as laboratory values (e.g., range of values), even though possibly arbitrarily set, keeping in mind that such values can vary from laboratory to laboratory.

Laboratory standards and values can be set based on a known or determined population value and can be supplied in the format of a graph or table that permits comparison of measured, experimentally determined values.

GAD65 (Glutamic Acid Decarboxylase isoform): An isoform of glutamic acid decarboxylase or glutamate decarboxylase which encodes GAD2 gene. GAD65 is expressed in the brain where GABA is used as a neurotransmitter. GAD65 also expressed in the insulin-producing β-cells of the pancreas, in varying ratios depending upon the species. This enzyme maintains the only physiological supply of GABA in mammals.

Inhibiting a disease or condition: A phrase referring to inhibiting the development of a disease or condition, such as reducing, decreasing or delaying a sign or symptom associated with the disease or condition, for example, in a subject who is at-risk of acquiring the disease/condition or has the particular disease/condition. Particular methods of the present disclosure provide methods for inhibiting SCLC.

Isolated: An "isolated" biological component (such as a nucleic acid molecule, protein, or cell) has been substantially separated or purified away from other biological components in the cell of the organism, or the organism itself, in which the component naturally occurs, such as other chromosomal and extra-chromosomal DNA and RNA, proteins and cells. Nucleic acid molecules and proteins that have been "isolated" include nucleic acid molecules and proteins purified by standard purification methods. The term also embraces nucleic acid molecules and proteins prepared by recombinant expression in a host cell as well as chemically synthesized nucleic acid molecules and proteins.

Label or Detectable Moiety: A composition detectable by spectroscopic, photochemical, biochemical, immunochemical, electromagnetic, or chemical means. For example, useful labels include radiolabels such as $^{32}P$, $^{35}S$, or $^{125}I$; heavy isotopes such as $^{15}N$ or $^{13}C$ or heavy atoms such as selenium or metals; fluorescent dyes; chromophores, electron-dense reagents; enzymes that generate a detectable signal (e.g., alkaline phosphatase or peroxidase, as commonly used in an ELISA); or spin labels. The label or detectable moiety has or generates a measurable signal, such as a radioactive, chromogenic, or fluorescent signal, that can be used to quantify the amount of bound detectable moiety in a sample. The detectable moiety can be incorporated in or attached to a molecule (such as a protein, for example, an antibody) either covalently, or through ionic, van der Waals or hydrogen bonds, e.g., or by incorporation of labeled precursors. The label or detectable moiety may be directly or indirectly detectable. Indirect detection can involve the binding of a second directly or indirectly detectable moiety to the detectable moiety. For example, the detectable moiety can be the ligand of a binding partner, such as biotin, which is a binding partner for streptavidin, which can be linked to a directly detectable label. The binding partner may itself be directly detectable, for example, an antibody may be itself labeled with a fluorescent molecule. The binding partner also may be indirectly detectable, for example, it may be bound by another moiety that comprises a label. Quantitation of the signal is achieved by any appropriate means, e.g., fluorescence detection, spectrophotometric detection (e.g., absorption at a particular wavelength), scintillation counting, mass spectrometry, densitometry, or flow cytometry. Methods for labeling and guidance in the choice of labels appropriate for various purposes are discussed for example in Sambrook et al. (Molecular Cloning: A Laboratory Manual, Cold Spring Harbor, New York, 1989) and Ausubel et al. (In Current Protocols in Molecular Biology, John Wiley & Sons, New York, 1998). In particular examples, a label or detectable moiety is conjugated to a binding agent that specifically binds to one or more of the SCLC-associated molecules.

Measure: To detect, quantify or qualify the amount (including molar amount), concentration or mass of a physical entity or chemical composition either in absolute terms in the case of quantifying, or in terms relative to a comparable physical entity or chemical composition.

PNMA1 (paraneoplastic Ma antigen 1) and/or PNMA2 (paraneoplastic Ma antigen 2): Proteins encoded by the PNMA1 or PNMA2 genes, respectively.

Prognosis: A prediction of the course of a disease, such as SCLC. The prediction can include determining the likelihood of a subject to develop aggressive, recurrent disease, to survive a particular amount of time (e.g. determine the likelihood that a subject will survive 1, 2, 3 or 5 years), to respond to a particular therapy or combinations thereof.

Purified: The term "purified" does not require absolute purity; rather, it is intended as a relative term. Thus, for example, a purified protein preparation is one in which the protein referred to is more pure than the protein in its natural environment within a cell. For example, a preparation of a protein is purified such that the protein represents at least 50% of the total protein content of the preparation. Similarly, a purified mRNA preparation is one in which the mRNA is more pure than in an environment including a complex mixture of nucleic acid molecules.

Sample (or biological sample): A biological specimen containing genomic DNA, RNA (including mRNA), protein, or combinations thereof, obtained from a subject. Examples include, but are not limited to, peripheral blood, urine, saliva, tissue biopsy, surgical specimen, and autopsy material.

Screening: As used herein, "screening" refers to the process used to evaluate and identify candidate agents that can be used to identify SCLC, such as early stage SCLC. In some cases, screening involves contacting a candidate agent (such as an antibody, small molecule or cytokine) with SCLC cells and testing the effect of the agent on expression of SCLC associated molecules. Expression of a microRNA can be quantified using any one of a number of techniques known in the art and described herein, such as by microarray analysis or by qRT-PCR.

Sensitivity: The percent of diseased individuals (individuals with prostate cancer) in which the biomarker of interest is detected (true positive number/total number of diseased× 100). Nondiseased individuals diagnosed by the test as diseased are "false positives".

In some examples, sensitivity of an assay describes the ability of the assay to accurately predict whether one has SCLC using the disclosed SCLC associated molecules, such as those provided in Tables 1-3, as compared to another assay method. For example, a marker with a sensitivity of at least 70%, including 75%, 80%, 90%, 95% or greater sensitivity is one that is capable of accurately predicting SCLC.

Specificity: The percent of nondiseased individuals for which the biomarker of interest is not detected (true negative/total number without disease×100). Diseased individuals not detected by the assay are "false negatives." Subjects who are not diseased and who test negative in the assay, are termed "true negatives."

Sequence identity/similarity: The identity/similarity between two or more nucleic acid sequences, or two or more amino acid sequences, is expressed in terms of the identity or similarity between the sequences. Sequence identity can be measured in terms of percentage identity; the higher the percentage, the more identical the sequences are. Sequence similarity can be measured in terms of percentage similarity (which takes into account conservative amino acid substitutions); the higher the percentage, the more similar the sequences are.

Methods of alignment of sequences for comparison are well known in the art. Various programs and alignment algorithms are described in: Smith & Waterman, *Adv. Appl. Math.* 2:482, 1981; Needleman & Wunsch, *J. Mol. Biol.* 48:443, 1970; Pearson & Lipman, *Proc. Natl. Acad. Sci. USA* 85:2444, 1988; Higgins & Sharp, *Gene*, 73:237-44, 1988; Higgins & Sharp, *CABIOS* 5:151-3, 1989; Corpet et al., *Nuc. Acids Res.* 16:10881-90, 1988; Huang et al. *Computer Appls. in the Biosciences* 8, 155-65, 1992; and Pearson et al., *Meth. Mol. Bio.* 24:307-31, 1994. Altschul et al., *J. Mol. Biol.* 215:403-10, 1990, presents a detailed consideration of sequence alignment methods.

The NCBI Basic Local Alignment Search Tool (BLAST) (Altschul et al., *J. Mol. Biol.* 215:403-10, 1990) is available from several sources, including the National Center for Biological Information (NCBI, National Library of Medicine, Building 38A, Room 8N805, Bethesda, MD 20894) and on the Internet, for use in connection with the sequence analysis programs blastp, blastn, blastx, tblastn and tblastx. Additional information can be found at the NCBI web site.

BLASTN is used to compare nucleic acid sequences, while BLASTP is used to compare amino acid sequences. If the two compared sequences share homology, then the designated output file will present those regions of homology as aligned sequences. If the two compared sequences do not share homology, then the designated output file will not present aligned sequences.

Once aligned, the number of matches is determined by counting the number of positions where an identical nucleotide or amino acid residue is presented in both sequences. The percent sequence identity is determined by dividing the number of matches either by the length of the sequence set forth in the identified sequence, or by an articulated length (such as 100 consecutive nucleotides or amino acid residues from a sequence set forth in an identified sequence), followed by multiplying the resulting value by 100. For example, a nucleic acid sequence that has 1166 matches when aligned with a test sequence having 1154 nucleotides is 75.0 percent identical to the test sequence (1166÷1554*100=75.0). The percent sequence identity value is rounded to the nearest tenth. For example, 75.11, 75.12, 75.13, and 75.14 are rounded down to 75.1, while 75.15, 75.16, 75.17, 75.18, and 75.19 are rounded up to 75.2. The length value will always be an integer. In another example, a target sequence containing a 20-nucleotide region that aligns with 20 consecutive nucleotides from an identified sequence as follows contains a region that shares 75 percent sequence identity to that identified sequence (that is, 15÷20*100=75).

For comparisons of amino acid sequences of greater than about 30 amino acids, the Blast 2 sequences function is employed using the default BLOSUM62 matrix set to default parameters, (gap existence cost of 11, and a per residue gap cost of 1). Queries searched with the blastn program are filtered with DUST (Hancock and Armstrong, 1994, *Comput. Appl. Biosci.* 10:67-70). Other programs may use SEG. In addition, a manual alignment can be performed. Proteins with even greater similarity will show increasing percentage identities when assessed by this method. Thus, in some examples, expression of a SCLC-associated protein having at least 80%, at least 85%, at least 90%, at least 95%, at least 98%, or at least 99% sequence identity to a native SCLC protein sequence, while retaining the biological function of the protein, can be examined using the disclosed methods. One of skill in the art will appreciate that the particular sequence identity ranges are provided for guidance only.

Signs or symptoms: Any subjective evidence of disease or of a subject's condition, e.g., such evidence as perceived by the subject; a noticeable change in a subject's condition indicative of some bodily or mental state. A "sign" is any abnormality indicative of disease, discoverable on examination or assessment of a subject. A sign is generally an objective indication of disease.

Small Cell Lung Cancer or Carcinoma: A type of highly malignant cancer within the lung. Compared to non-small cell carcinoma, small cell lung carcinoma has a shorter doubling time, higher growth fraction, and earlier development of metastases. Small-cell lung carcinoma usually presents in the central airways and infiltrates the submucosa leading to narrowing of bronchial airways. Common symptoms include cough, dyspnea, weight loss, and debility. Smoking is a significant risk factor. Over 70% of patients with small-cell lung carcinoma present with metastatic disease; common sites include liver, adrenals, bone, and brain. Due to its high grade neuroendocrine nature, small-cell carcinomas can produce ectopic hormones, including adrenocorticotropic hormone (ACTH) and anti-diuretic hormone (ADH). Ectopic production of large amounts of ADH leads to syndrome of inappropriate antidiuretic hormone hypersecretion (SIADH). Lambert-Eaton myasthenic syndrome (LEMS) is a well-known paraneoplastic condition linked to small-cell carcinoma. SCLC is also referred to as "oat cell carcinoma" due to the flat cell shape and scanty cytoplasm.

SCLC is thought to originate from neuroendocrine cells (APUD cells) in the bronchus called Feyrter cells. Hence, they express a variety of neuroendocrine markers, and may lead to ectopic production of hormones like ADH and ACTH that may result in paraneoplastic syndromes and Cushing's syndrome. Approximately half of all individuals diagnosed with Lambert-Eaton myasthenic syndrome (LEMS) will eventually be found to have a small-cell carcinoma of the lung.

Combined small-cell lung carcinoma can occur in combination with a wide variety of other histological variants of lung cancer, including extremely complex malignant tissue admixtures. When it is found with one or more differentiated forms of lung cancer, such as squamous cell carcinoma or adenocarcinoma, the malignant tumor is then diagnosed and classified as a combined small cell lung carcinoma (c-SCLC). C-SCLC is the only currently recognized subtype of SCLC.

Standard: A substance or solution of a substance of known amount, purity or concentration. A standard can be compared (such as by spectrometric, chromatographic, or spectrophotometric analysis) to an unknown sample (of the same or similar substance) to determine the presence of the substance in the sample and/or determine the amount, purity or concentration of the unknown sample. In one embodiment, a standard is a peptide standard. An internal standard is a compound that is added in a known amount to a sample prior to sample preparation and/or analysis and serves as a reference for calculating the concentrations of the components of the sample. In one example, nucleic acid standards serve as reference values for tumor or non-tumor expression levels of specific nucleic acids. In some examples, peptide standards serve as reference values for tumor or non-tumor expression levels of specific peptides. Isotopically-labeled peptides are particularly useful as internal standards for peptide analysis since the chemical properties of the labeled peptide standards are almost identical to their non-labeled counterparts. Thus, during chemical sample preparation steps (such as chromatography, for example, HPLC) any loss of the non-labeled peptides is reflected in a similar loss of the labeled peptides.

Subject: Living multi-cellular vertebrate organisms, a category that includes Living multi-cellular vertebrate organisms, a category that includes both human and non-human mammals.

Tissue: A plurality of functionally related cells. A tissue can be a suspension, a semi-solid, or solid. Tissue includes cells collected from a subject, such as from the lung.

Treating a disease: A therapeutic intervention that ameliorates a sign or symptom of a disease or pathological condition related to a SCLC, such as a sign or symptom of SCLC. Treatment can induce remission or cure of a condition or slow progression, for example, in some instances can include inhibiting the full development of a disease, for example preventing development of a SCLC. Prevention of a disease does not require a total absence of disease. For example, a decrease of at least 10%, such as at least 20%, at least 25%, at least 30%, at least 40%, at least 50%, decrease in a sign or symptom associated with the condition or disease, such as SCLC, can be sufficient. As used herein, the term "ameliorating," with reference to a disease or condition, refers to any observable beneficial effect of the treatment. The beneficial effect can be evidenced, for example, by a delayed onset of clinical symptoms of the disease or condition in a susceptible subject, a reduction in severity of some or all clinical symptoms of the disease or condition, a slower progression of the disease or condition, a reduction in the number of relapses of the disease or condition, an improvement in the overall health or well-being of the subject, by other parameters well known in the art that are specific to the particular disease or condition, and combinations of such factors.

II. Hybrid Plasma Marker Panel, Assay and Methods of Use Thereof

Disclosed herein is a hybrid plasma marker panel. The disclosed hybrid biomarker platform measures four different protein types—SCLC autoantibody-antigen complexes, SCLC uncomplexed autoantibodies, SCLC associated proteins and SCLC glycoproteins. These new discovery methods allow the antibody arrays to perform not only proteomics, but also to determine whether the specific proteins that were bound also have cancer-specific glycosylation differences or were bound to the array as a complex with human IgG or IgM (i.e., autoantibody-antigen complexes), as illustrated in FIG. 1. In essence, the array fractionates and purifies the proteins to localize them to the specific spots on the array, which can then probe the bound protein with either a fluorescently labeled antibody specific for the cancer modified carbohydrate (most clinically used cancer biomarkers are glycosylated proteins, CA-125, PSA, CA19-9, etc.) such as sialyl Lewis A or sialyl Lewis X or a fluorescently labeled antibody to human IgG or IgM for autoantibody-antigen complex detection. Both methods are highly sensitive and combined with proteomic analysis allow the level of protein, modified carbohydrate and the presence of autoantibody for any protein for which a specific antibody is present on the array to be determined. Methods for the discovery of either glycomic or autoantibody-antigen complexes as biomarkers are quite novel as separate techniques and certainly unprecedented in combination. The disclosed assay measures both "free" autoantibody that binds SCLC associated molecules as well the autoantibody-antigen (SCLC associated molecule) complex.

In some embodiments, a hybrid plasma marker panel for detecting SCLC associated molecules is disclosed. A biomarker detection panel disclosed herein comprises a plurality of molecules, such as a plurality of autoantibody molecules not bound to their cognate autoantigen and/or bound to their cognate autoantigen (i.e., an autoantigen-autoantibody complex), for example, 2 or more, 3 or more, 4 or more, 5 or more, 6 or more, 7 or more, 10 or more, 20 or more, 50 or more, 100 or more, 200 or more, 500 or more, 1,000 or more, 2,000 or more, 5,000 or more, or 10,000 or more, of which at least two of the autoantibody molecules are from Tables 1A-4 and/or those shown in FIGS. 5E-5K. In some embodiments, the disclosed panel includes detecting molecules for one or more of the disclosed SCLC associated molecules, such as those provided in Tables 1A-4. In some examples, a disclosed panel includes at least two autoantibody molecules listed or capable of detecting molecules in Tables 1B, 2A, 2B, 3 or 4, such as two, three, four, five, six, seven, eight, nine, ten, eleven, twelve, thirteen or more. In some examples, a disclosed panel includes at least two autoantibody molecules from Table 3 or 4, such as two, three, four, five, six, seven, eight, nine, ten, eleven, twelve or thirteen molecules listed in Table 3 or 4. In some examples, a disclosed panel includes two or four autoantibodies disclosed in Table 3, including autoantibody molecules for PNMA1 and/or PNMA2. In some examples, a disclosed panel includes at least autoantibody molecules to PNMA1 and PNMA2. In some examples, a disclosed panel includes at least autoantibody molecules capable of detecting PNMA1, PNMA2 and GAD65 autoantibodies and/or autoantibody-autoantigen complexes. In some examples, a disclosed panel includes at least autoantibody molecules for detecting PNMA1, PNMA2 and CRMP5 autoantibodies and/or autoantibody-autoantigen complexes. In some examples, a disclosed panel includes at least autoantibody molecules to PNMA1, PNMA2, GAD65 and CRMP5 autoantibodies. In some embodiments, the disclosed panel further includes controls or standards. In some examples, a disclosed panel includes or consists essentially of autoantibody molecules to PNMA1 and PNMA2. In some examples, a disclosed panel includes or consists essentially of autoantibody molecules to PNMA1, PNMA2 and GAD65. In some examples, a disclosed panel includes or consists essentially of autoantibody molecules to PNMA1, PNMA2 and CRMP5 autoantibodies. In some examples, a disclosed panel includes or consists essentially of autoantibody molecules to PNMA1, PNMA2, GAD65 and CRMP5 autoantibodies.

An autoantibody molecule can be a target antibody, target antigen and/or a target autoantibody-antigen complex. A target antigen can be an entire protein, such as a protein referred to as a target antigen, or can be a variant, processed, unprocessed, or modified form of the designated protein, or can be or comprise an epitope-containing fragment of the protein designated. An autoantibody molecule that is a target antibody is an antibody that can detect an autoantibody in a sample that is complexed to an autoantigen. An autoantibody molecule in certain embodiments is at least 70%, 75%, 80%, 85%, 90%, 95%, or 100% identical to an at least 25, 50, 75, 100 or the entire amino acid segment of the native autoantibody. The autoantibody molecule in certain illustrative embodiments binds to an autoantibody provided in Tables 2A-4 and/or FIGS. 5E-5K.

The biomarker detection panel in some embodiments has a specificity of 80% or greater, 85% or greater, 90% or greater, 96% or greater, or 98% or greater, and/or a sensitivity of 80% or greater, 90% or greater, 96% or greater, 98% or greater, or 100%, for diagnosing SCLC.

Methods of using a disclosed hybrid marker antibody array methods of detecting SCLC, methods of diagnosing a subject with SCLC and methods of identifying SCLC associated molecules. In some examples, a disclosed method include providing a biological sample, such as a plasma or serum sample, to a disclosed panel, such as a panel array, for analysis. In some examples, the sample biological sample used in the assays and detection and diagnosis methods is a saliva sample or a blood sample, or a fraction thereof, such as plasma or serum. In some embodiments, the sample is blood or a fraction thereof, such as, for example, serum. In other embodiments, the sample is a non-fluid sample, such as a tissue sample. In some examples, the method includes obtaining a sample from a subject that is either at-risk of acquiring or having a specific condition. For example, a sample is obtained from a subject at-risk of acquiring SCLC, such as a chronic smoker or an individual that used to be a chronic smoker, such as an individual that previously smoked for 30 pack years.

The method further includes analyzing purified biological samples for SCLC associated markers by first preparing protein samples, autoantibody samples (which include free autoantigen, free autoantibody and autoantigen-autoantibody complexes) and glycoprotein samples for analysis, such as purifying the samples by techniques known to one of skill in the art. The various SCLC associated molecules, such as one or more disclosed in Tables 1A-4 and/or FIGS. 5E-5K, are then detected in the four types of prepared samples (protein samples, autoantigen antibody samples, autoantibody samples and glycoprotein samples) by incubating the four sample types with the panel including molecules of interest under the appropriate conditions sufficient for promoting interaction/binding and then removing any excess substances by washing. Results can then be visualized by methods known to those of skill in the art such as by protein arrays. FIG. 1 provides a representative schematic illustrating an exemplary method of detection.

While ELISAs remain the "gold standard" for proteomic validation studies, high dimensional analyses have become popular choices for discovery-based methods. Antibodies typically have nano- to sub-nanomolar affinities and can therefore be used to detect proteins even when present at low abundance (e.g., PSA), and the number of commercially available antibodies easily exceeds the number of proteins that have been identified in blood. (1) When used in a microarray format, antibodies represent a cost-effective advance in precision, throughput, and protein coverage (2) and offer a direct route to validation and clinical application. Antibody array technology has been developing for over a decade, and has been applied successfully by many groups for the discovery and validation of potential biomarkers. (3-11) Commercial antibody arrays containing tens to a few hundred antibodies are available from several companies (e.g., R&D, Millipore, Hypromatrix, RayBiotech, Lab Vision, Sigma, etc.), but the defined size and inflexibility of content limits their utility. Disclosed herein are arrays that are much larger and currently contain approximately 3,200 antibodies that are printed in triplicate (10,800 total spots/ slide). In addition to simply being ten times larger (antibody number) than most other available antibody arrays, the disclosed hybrid biomarker platform can measure three distinctly different types of biomarkers: proteomics, glycomics or autoantibodies. In essence, the array fractionates and purifies the proteins to localize them to the specific spots on the array, and we can then probe the bound protein with either a fluorescently labeled antibody specific for the cancer modified carbohydrate such as sialyl Lewis A (the CA19-9 antigen) or sialyl Lewis X or a fluorescently labeled antibody to human IgG or IgM for autoantibody-antigen complex (AAb:AAg) detection. Together, the triple hybrid platform is highly sensitive (picogram level) (12) and reproducible (coefficient of variation, CV <10%). (12-14) Using it, viable proteomic biomarker candidates in ovarian (12, 15, 16), breast (17), pancreas (18, 19), colon cancer (13, 14), and lung cancer are disclosed.

In particular, FIG. 1 provides a schematic showing how the array platform can be used to obtain proteomic, autoantibody-antigen complexes, free autoantibody, or glycomic levels using distinct probing strategies. For proteomics, the samples (case or control) are labeled with Cy5 and a reference plasma pool with Cy3 to obtain the level of each protein relative to the reference. For free and complexed autoantibodies the antibody to the human IgG and IgM are directly labeled, an anti SleX and SleA detect the presence of cancer specific glycan moieties.

Figure 2:
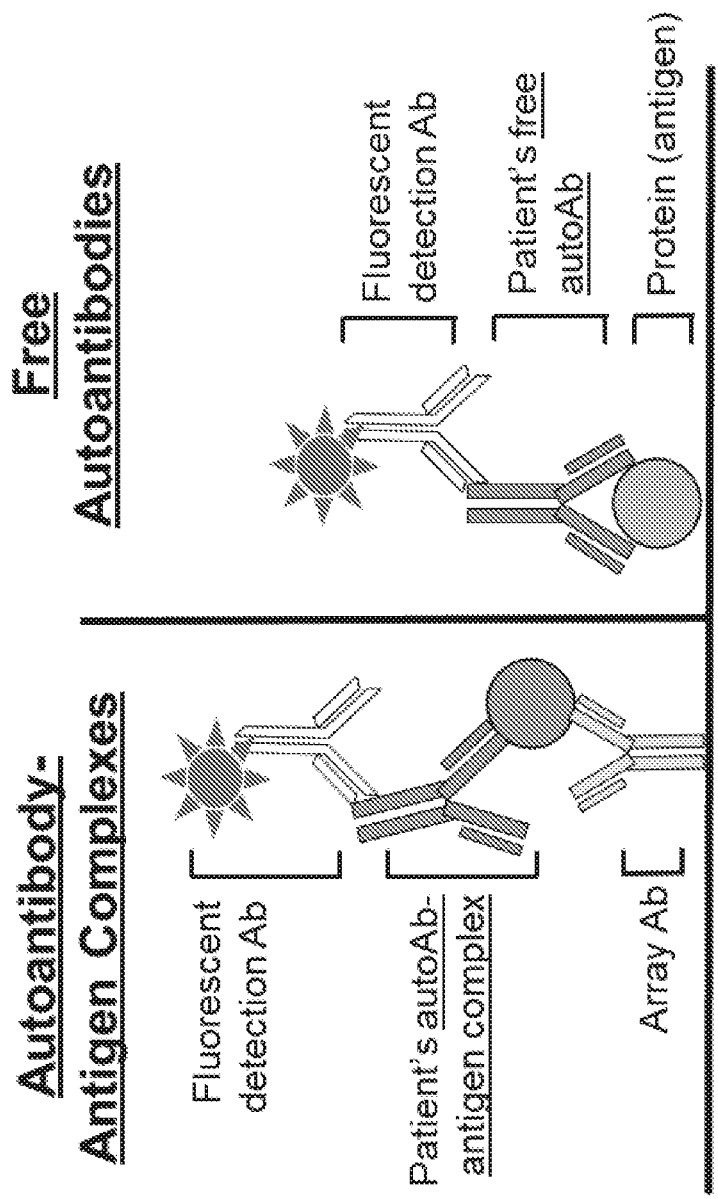
FIG. 2 Autoantibody Detection Platforms for SCLC Early Detection. Antibody (Ab) arrays have antibodies covalently linked to the array surface to detect autoantibody-antigen complexes. Proteins covalently linked to a surface can detect free autoantibodies. This approach used to diagnose paraneoplastic syndromes associated with SCLC in the clinic.

Additionally, FIG. 2 provides a representative schematic illustrating autoantibody detection platforms for SCLC Early Detection disclosed herein. The inventors have developed a novel large format antibody array containing >3200 different antibodies to interrogate pre-diagnostic plasma sample sets for the purpose of cancer early detection. The antibody arrays are used for both proteomic and autoantibody-antigen complex interrogation which is highly sensitive (picogram level) and reproducible (coefficient of variation, CV <10%) (12-14). Viable biomarker candidates in ovarian (12, 15, 16), breast (20), pancreas (18, 19), colon cancer (13, 14), and NSCLC (21) are disclosed. In some embodiments, the disclosed panel is used to detect SCLC in the early stages including months, as well as years such as one year, two years or three years prior to clinical symptoms of the disease, such as lesions in the lung. In some cases, detection of SCLC associated molecules, such as those disclosed in any one of Tables 1A-4, is followed up with periodic monitoring, such as CT screening and/or additional plasma screening. For examples, a high-risk signature that is not associated with a detectable lesion by CT imaging, possible preventive treatments could be administered such as targeting one or more of the molecules associated with SCLC or known to be involved in the onset. In some examples, identification of SCLC associated molecules would be followed by serial CT imaging, such as on a monthly, every other month, every six months basis. In one example, serial CT imaging is done every two months initially to ensure that if a microscopic SCLC lesion existed, it would be identified while still at limited stage. In some examples, complementary diagnostic markers based on tagged antibody imaging may be used.

In particular examples, the method includes detecting expression of one or more disclosed SCLC associated molecules/biomarkers, such as two or more SCLC biomarkers, wherein the SCLC biomarkers include, consist essentially of, or consist of those disclosed in Tables 1A-4 and/or FIGS. 5E-5K, by the panel disclosed herein. In some examples, controls are also detected, such as 1 to 10, 1 to five, or one to two controls. In some embodiments of the method, an alteration in expression of two or more SCLC biomarkers in the patients sample relative to the control indicates a diagnosis of the subject with early stage SCLC.

In some embodiments of the method, following identifying a subject with early stage SCLC additional methods of diagnosis are performed such as CT scans of the patient's lungs to determine if lesions are present. In some embodiments, the method is repeated over time for the individual. In some embodiments, the individual is monitored at regular or irregular intervals after cancer treatment by determining immune reactivity of samples of the patient to a biomarker detection panel of the disclosure. The immune reactivity of a sample tested at a later date can be compared with the immune reactivity of a sample taken at an earlier date.

In some embodiments, the biomarker detection panel is provided bound to one or more solid or semi-solid supports, such as, for example, a gel or matrix, beads, particles, fibers, rods, filaments, or a filter, strip, sheet, membrane, plate (for example, a multiwell plate), dish, chip or array. In some embodiments, at least 50% of the human proteins bound to the solid support are test antigens of the biomarker detection panel. In some preferred embodiments, at least 55%, at least 60%, at least 65%, at least 70%, at least 75%, at least 80%, at least 85%, at least 90%, or at least 95% of the human proteins bound to the solid support are test antigens of the biomarker detection panel. In some embodiments, the biomarker detection panel is provided in or on a protein array. In some embodiments, antibodies and/or affinity reagents are provided on the solid supports.

Also disclosed are kits that include one or more biomarker detection panels as provided herein. The kits can include one or more reagents for detecting binding of an antibody, or an antigen-antibody complex, from a sample. Detection reagents can include one or more antibodies, labels, labeling reagents, or buffers. In some embodiments, the one or more autoantibody molecules of a biomarker panel of a kit are provided bound to a solid support. In some embodiments of kits, the kit provides a biomarker detection panel in which the target antigens of the detection panel are bound to a chip or array. In some embodiments, a disclosed kit includes two or more autoantibody molecules of Tables 1A-4 and/or FIGS. 5E-5K associated with different vessels and/or solid supports.

The disclosure is further illustrated by the following non-limiting Example.

EXAMPLE

Small cell lung cancer (SCLC) shares one very important characteristic with essentially all solid tumor malignancies: early detection of the cancer leads to improved survival metrics. Since the majority of SCLC patients are diagnosed at extensive stage—where current treatment options offer limited benefit—many investigators have not appreciated the fact that nearly approximately 20% of limited stage SCLC patients can be cured with conventional cytotoxic chemotherapy. Furthermore, surgical resection—generally not considered for SCLC—can be curative when combined with chemotherapy for highly selected and very early stage patients. This example describes the discovery and validation of a novel hybrid plasma marker panel capable of reliably detecting SCLC while still at an early, limited stage.

One of the major reasons that SCLC early detection could prove successful is that there exists a clearly defined high-risk population: heavy cigarette smokers. The lack of at-risk populations for many cancer types has been the greatest obstacle preventing development and implementation of early detection methodologies. In general populations, diagnostic tests need to display nearly perfect sensitivity and specificity to keep false positives and subsequent follow up harms to a minimum. The existence of an at-risk population for non-small cell lung cancer (NSCLC) is one of major reasons why CT screening has proven successful. However, it is important to note that the patient population currently approved for CT screening—age 55-80, >30 pack years smoking, quit smoking <15 years ago—reportedly represents just 45% of NSCLC cases. Although NSCLC has a very clear association with cigarette smoking, many patients (mostly adenocarcinoma) report only modest pack-year consumption and are diagnosed decades removed from active cigarette smoking. In this respect, SCLC provides a much more uniform at-risk population, since essentially all SCLC patients have a substantial cigarette smoking history. Ultimately, we believe that the addition of a blood test capable of SCLC early detection could be added to annual low-dose CT screening protocols, as the at-risk SCLC population resides within the at-risk NSCLC cohort. Our scientific premise is clear: that a hybrid plasma marker panel based on molecular features unique to SCLC (i.e. autoantibody production) is capable of identifying SCLC at the microscopic stage, prior to clinical detection. Identification of SCLC at such an early stage will undoubtedly improve survival rates for this deadly disease.

Since SCLC and NSCLC share overlapping at-risk populations, consideration of what has proved successful and unsuccessful for NSCLC early detection is relevant here. Several groups have attempted to identify blood borne early detection markers for lung and other cancers.

Unfortunately, most have failed to identify reliable biomarkers for a variety of reasons, including: a) poorly matched cases and controls, b) discovery techniques that have high dimensionality but low throughput, c) use of late stage cases that identify markers of disease burden, not early detection, d) failure to include discovery and validation cohorts within the study design, and e) slow translation of discovery results into tests that can be utilized in validation trials. No lung cancer biomarkers have progressed past formal validation trials, much less FDA approval. The one exception to this is the Percepta Bronchial Genomic Classifier (Veracyte) though this assay has not been implemented into routine clinical practice given the requirement for a bronchoscopy and bronchial brush biopsy. Carcinoembryonic antigen (CEA), an oncofetal protein not typically expressed in adults, is the most established blood marker, but its primary utility is as an indicator of treatment response. Unfortunately, it is not useful for early detection because it is frequently found in the blood of "healthy" smokers and people with many other types of cancer. CYFRA-21-2, a fragment of cytokeratin is probably the second most widely used, but, in addition to NSCLC, it also detects other epithelial cancers and has shown a broad range of sensitivities in different studies. No marker or panel has sufficient sensitivity and specificity to be recommended for use even in a recurrence or response to treatment setting. Given the genetic and molecular heterogeneity inherent to cigarette smoke related cancers, it remains unclear if a single biomarker approach is feasible. Accordingly, our group has developed a hybrid marker approach, capable of identifying markers related to distinct molecular features of the cancer (e.g. excessive glycosylation of proteins).

Technological advances in the detection and separation of biomolecules, coupled with an increasing capacity to analyze enormous volumes of the resultant data, have allowed investigators to take an objective approach to biomarker discovery. While ELISAs remain the "gold standard" for validation studies, high dimensional analyses have become popular choices for discovery-based methods. Although the components of the blood proteome span 10 or more orders of magnitude of concentration, conventional mass spectrometry and other analytical techniques typically span 3-4 orders of protein concentration and are more susceptible to the obscuring effects of highly abundant plasma proteins (e.g. albumin) requiring extensive upfront purification and reduced throughput. Antibodies typically have nano- to sub-nanomolar affinities and can therefore be used to detect proteins even when present at low abundance (e.g., PSA), and the number of commercially available antibodies easily exceeds the number of proteins that have been identified in blood. When used in a microarray format, antibodies represent a cost-effective advance in precision, throughput, and protein coverage and offer a direct route to validation and clinical application. We have addressed the above common pitfalls by employing a novel hybrid plasma marker panel based on antibody mediated detection methods and by employing numerous distinct SCLC cohorts for purposes of discovery and validation to avoid the "over-fitting" of the data frequently encountered in such efforts.

TABLE 1A

Paraneoplastic syndrome-associated antibodies in SCLC
Table 1A. Paraneoplastic Syndrome (PNS)-Associated Antibodies in SCLC

| Antibody | Antigen | UniProt Accession | GenBank Protein Accession | PNS | ~Antibody frequency in SCLC patient without PNS symptoms (%) |
|---|---|---|---|---|---|
| Anti-Hu | HuB, HuC, HuD | Q12926;; Q14576;; P26378 | EAW58581; XP_005251452; XP_011516079; XP_011516088; XP_016869903; XP_016869906; XP_016869909; NP_001338391; NP_001338396; NP_001338397; NP_001338398; NP_001338399; NP_001338403; BAD92531; XP_006716799; XP_011516076; XP_011516086; XP_016869898; XP_016869915; NP_001338392; XP_005251451; XP_016869902; XP_016869905; XP_016869907; XP_016869908; XP_016869912; EAW58582; XP_011516081; XP_016869897; XP_016869900; NP_001338389; NP_001338400; NP_001338402; NP_001338404; NP_004423; EAW58586; Q12926; AAA69537; XP_005251450; XP_011516080; XP_011516082; XP_011516087; XP_016869901; NP_001338385; NP_001338393; NP_001338401; NP_001338405; NP_001338406; ; EAW58583; EAW58584; EAW58585; | Encephalomyelitis | 15-25 |

TABLE 1A-continued

Paraneoplastic syndrome-associated antibodies in SCLC
Table 1A. Paraneoplastic Syndrome (PNS)-Associated Antibodies in SCLC

| Antibody | Antigen | UniProt Accession | GenBank Protein Accession | PNS | Antibody frequency in SCLC patient without PNS symptoms (%) |
|---|---|---|---|---|---|
| | | | XP_016869899; XP_016869904; XP_016869910; XP_016869914; NP_001338386; NP_001338388; NP_001338390; NP_001338395; NP_001338407; AAH30692; XP_006716797; XP_006716798; XP_011516078; XP_011516085; XP_016869911; XP_016869913; NP_001164668; NP_001338384; NP_001338387; NP_001164666; NP_001338394 ;; ; CAC21655; BAA21838; AAA58677; EAW84221; NP_001411; CCQ43760; AAK57545; AAK67714; AAH11875; NP_115657; EAW84220; XP_011526080; Q14576 ;; EAX06844; BAH12553; AAK57538; AAK57540; AAK57541; XP_011539195; NP_001311138; NP_001311145; NP_001138248; NP_001138249; NP_001311141; BAH12899; NP_001281277; NP_001311142; NP_001311143; NP_001311146; NP_068771; ; P26378; BAH12876; AAK57539; AAA58396; XP_011539192; XP_016856029; AAH36071; AAD14142; XP_011539196; EAX06841; XP_016856031; NP_001138246; NP_001311137; NP_001311144; EAX06842; XP_011539197; XP_016856027; EAX06843; EAX06845; XP_006710474; XP_011539191; XP_016856028; XP_016856030; NP_001138247 | | |
| Anti-CRMP5 | Collapsin response mediator protein (CRMP-5) | Q9BPU6 | AAK16830; CAT03392; CAD28503; EAX00668; Q9BPU6; EAX00667; AAY14652; NP_064519; CAR95653; AAF80348; AAP35517; AAX93268; CAB95124; AAH02874; NP_001240652; NP_001240653 | Encephalomyelitis | 10 |
| Anti-ZIC | ZIC2 (derived from zinc fingers of cerebellum) | O95409 | EAX09030; XP_011519412; EAX09031; AAG38995; AAG28409; NP_009060; O95409; ; AAC96325 | Encephalomyelitis | 15 |

TABLE 1A-continued

Paraneoplastic syndrome-associated antibodies in SCLC
Table 1A. Paraneoplastic Syndrome (PNS)-Associated Antibodies in SCLC

| Antibody | Antigen | UniProt Accession | GenBank Protein Accession | PNS | Antibody frequency in SCLC patient without PNS symptoms (%) |
|---|---|---|---|---|---|
| Anti-Ma | Paraneoplastic Ma protein-1 (PNMA-1) | Q8ND90 | CAG33393; NP_006020; AAN05100; BAF83669; CAD38995; Q8ND90; EAW81126; AAH39577 | Encephalomyelitis | Unknown |
| Anti-Ta | PNMA-2 | Q9UL42 | BAG51501; AAH47515; AAF05626; EAW63575; BAA74906; NP_009188; AAH36489; AAD02098; AAH62301; XP_011542667; AAF05625; Q9UL42 | Encephalomyelitis | Unknown |
| Anti-VGCC | Voltage-gated calcium channel (VGCC) | O00555; Q00975 | ; AAB33068; AAB64179; EAW84365; ABV80232; NP_001120693; NP_001120694; ; EAW84364; BAA94766; AAB49676; AAB49678; EAW84361; O00555; AAB61612; AAB61613; AAF03935; EAW84363; EAW84366; CAA68172; AAC77460; AAB49674; AAC26839; AAD38386; EAW84362; NP_001167551; NP_075461; BAA94765; AAB49675; AAB49677; NP_000059 ;; AAG13643; AAG14397; EAW88417; AAA51898; XP_016870606; XP_016870608; XP_016870609; NP_001230741; AAG13646; AAG14396; EAW88418; XP_011517295; AAG13649; AAA51897; XP_011517296; XP_016870605; AAG13645; AAG13648; AAG14398; CAJ41866; XP_016870607; AAC51138; AAG13647; AAG13650; EAW88415; NP_000709; ; EAW88416; Q00975; XP_011517293; XP_011517294; XP_016870604; AAG13642; AAG13644; BAD92704 | Lambert-Eaton | 5 |
| Anti-SOX | Sry-like high mobility group box (SOX) | O00570 | CAA73847; NP_005977; EAX09158; O00570 | Lambert-Eaton | 25-35 |
| Anti-GAD65 | Glutamic acid decarboxylase-2 | Q05329 | EAW86101; EAW86104; EAW86103; CAB62572; AAA62367; Q05329; AAH29517; AAA58491; EAW86102; NP_000809; AAP88040; NP_001127838; AAI26328; AAI26330; BAC86947 | Lambert-Eaton | 15 |
| Anti-IA2 | Protein tyrosine phosphatase receptor type N (PTPRN) | Q16849 | BAG57712; AAA90974; BAD92605; BAF84158; XP_011509868; AAP35621; NP_001186693; ; BAG59024; XP_016860101; NP_001186692; EAW70725; Q16849; AAH07713; XP_016860098; XP_016860100; BAG53662; AAH70053; CAA44688; XP_016860099; NP_002837; AAY24038; EAW70724; EAW70726 | Lambert-Eaton | 10 |

TABLE 1A-continued

Paraneoplastic syndrome-associated antibodies in SCLC
Table 1A. Paraneoplastic Syndrome (PNS)-Associated Antibodies in SCLC

| Antibody | Antigen | UniProt Accession | GenBank Protein Accession | PNS | Antibody frequency in SCLC patient without PNS symptoms (%) |
|---|---|---|---|---|---|
| Anti-Rc | Recoverin | P35243 | P35243; BAG36819; AAB23163; AAB23392; AAB26894; AAP88840; NP_002894; EAW90014; BAJ84088; BAA19460; AAH01720 | CAR | 10-15 |
| Anti-Ri | Neuro-oncological ventral antigen (Nova) | P51513 | EAW65994; AAA16022; XP_011535102; XP_016876832; XP_016876836; P51513; BAF82328; XP_016876833; NP_006480; ; EAW65990; EAW65993; EAW65995; AAH75038; AAH75039; CAA94810; XP_016876834; NP_002506; BAH13506; XP_016876837; XP_016876838; BAF83711; BAF84157; XP_016876835; EAW65991; EAW65992; XP_016876831; NP_006482 | Opsoclonus-myoclonus | 5 |

Since data from the National Lung Screening Trial does not support the use of CT screening of SCLC early detection, novel approaches must be considered. SCLC has a unique cell of origin, the pulmonary neuroendocrine cell (PNEC), which represents just 0.4% of lung airway cells, but accounts for nearly 15% of lung cancers. Likely as a function of its unique cell of origin, antibodies against CNS antigens are frequently encountered in SCLC patients, which occasionally give rise to paraneoplastic syndromes (PNS). This serves as a key proof of concept that specific autoantibodies exist in some SCLC patients that can be leveraged for diagnostic purposes. There are several PNS associated with SCLC, though four of them occur more commonly: limbic encephalitis (paraneoplastic encephalomyelitis), Lambert-Eaton Myasthenic syndrome (LEMS), cancer-associated retinopathy (CAR), and opsoclonus-myoclonus syndrome (OMS). Although these syndromes are admittedly rare, the key principle highlighted by these syndromes is that there exist circulating antibodies against auto-antigens in these subjects, and that these antibodies are frequently identified in SCLC patients who do not display evidence of the PNS (see Table 1A). We present data demonstrating the ability to use such markers for the purpose of SCLC early detection (Table 3).

Identification of SCLC Specific Autoantibodies

SCLCs also generate highly glycosylated proteins that could potentially mark the presence of the cancer. For example, a recent report highlighted glycosylation differences in serum alpha-1 antitrypsin in SCLC patients. The ability of our hybrid plasma marker panel to identify glycosylation differences allows us to assay for these modifications using the same base assays and specimen set.

Novel Highly Multiplexed Antibody Array

Disclosed herein is a novel hybrid biomarker platform to generate a highly sensitive and specific plasma-based early detection panel for SCLC. Our hybrid biomarker platform measures three distinctly different types of biomarkers (see FIG. 1), in addition to simply being ten times larger (antibody number) than most other available antibody arrays. These new discovery methods have allowed us to use the antibody arrays to perform not only proteomics but also to determine whether the specific proteins that were bound also have cancer-specific glycosylation differences or were bound to the array as a complex with human IgG or IgM (i.e., autoantibody-antigen complexes), as illustrated in the figure. In essence, the array fractionates and purifies the proteins to localize them to the specific spots on the array, and we can then probe the bound protein with either a fluorescently labeled antibody specific for the cancer modified carbohydrate (most clinically used cancer biomarkers are glycosylated proteins, CA-125, PSA, CA19-9, etc.) such as sialyl Lewis A or sialyl Lewis X or a fluorescently labeled antibody to human IgG or IgM for autoantibody-antigen complex detection. Protein arrays can also be used to determine the levels of uncomplexed or "free" autoantibody present in a subjects plasma. Both methods are highly sensitive and combined with proteomic analysis have allowed us to determine the level of protein, modified carbohydrate and the presence of autoantibody for any protein for which we have a specific antibody on the array. Methods for the discovery of either glycomic or autoantibody-antigen complexes as biomarkers are quite novel as separate techniques and certainly unprecedented in combination. Both the glycosylation marks and autoantibody marks are highly relevant to SCLC, as discussed above. Lastly, the hybrid nature of our panels enables us to choose a set of markers that all display high specificity but need not display high sensitivity on an individual basis, so long as the set cumulatively provides the necessary sensitivity.

SCLC Specific Antibody Discovery

Another innovative aspect of this disclosure is the performance of an unbiased screen to identify SCLC-specific circulating antibodies. The ideal biomarker would represent a tumor-specific process, and therefore carry a high specificity. Because tumors can express unique mutant, oncofetal, CNS site-privileged, or cleaved proteins, the possibility exists that infiltrating lymphocytes would recognize this new epitope as "foreign," and generate an autoantibody against it. Some autoantibodies may be relatively uncommon (low sensitivity) but should be highly specific. Using this strategy, we have been able to develop a set of markers that cumulatively have a high sensitivity, while maintaining high specificity. We have recently employed a similar strategy using tumor-derived B cells to discover novel autoantibodies that effectively mark NSCLC. As a proof of concept, we have identified 28 distinct autoantibody-antigen complexes (Table 1B) that distinguish SCLC cases from controls in a discovery set.

TABLE 1B

Autoantibody-antigen complexes
Table 1B. CHS Discovery SCLC Antigen-Complexed Autoantibodies

| Gene | UniProt Accession | GenBank Protein Accession |
| --- | --- | --- |
| GPLD1 | P80108 | AAH20748; CAC14844; EAW55451; P80108; XP_016866243; EAW55450; AAH07614; AAH93645; AAI12002; AAA36444; EAW55448; AAG16627; AAA36445; XP_011512811; XP_016866242; CAC87068; NP_001494; EAW55449 |
| PTPRU | Q92729 | EAX07652; BAG52941; XP_016855484; AAC51938; XP_016855482; NP_573439; AAB07074; BAD92092; AAI46656; ; Q92729; CAA65832; XP_006710332; XP_016855481; XP_016855483; CAA65016; NP_573438; EAX07650; EAX07651; NP_005695; CCQ43332; AAB51343; NP_001181930 |
| NUDT5 | Q9UKK9 | ; EAW86320; CAG33476; NP_001308576; NP_054861; EAW86322; AAF25479; EAW86321; AAF29079; BAF83820; NP_001308577; Q9UKK9; AAF06734; AAH00025 |
| INHA | P05111 | EAW70774; ACI28454; AAH06391; CAA01158; CAA28040; AAP35600; AAA59166; AAA59167; ; P05111; NP_002182 |
| INHBC | P55103 | EAW97011; BAG37366; NP_005529; ; P55103; AAI30325; AAI30327 |
| ANAPC2 | Q9UJX6 | BAG58931; ; AAF05751; AAH01579; Q9UJX6; AAH32503; NP_037498; AAH09487; EAW88361; BAA92644; BAG57788 |
| PLD3 | Q8IV08 | EAW56954; EAW56956; XP_005258761; EAW56951; AAH00553; AAH36327; AAH96820; XP_005258766; EAW56957; XP_005258764; EAW56953; EAW56955; Q8IV08; AAB16799; XP_016882037; NP_036400; ; EAW56958; XP_005258767; XP_011524995; XP_016882035; NP_001278240; EAW56950; EAW56952; CAD57504; EAW56959; XP_011524994; BAG57127; XP_005258765; XP_006723185; XP_016882036; XP_016882038; NP_001026866 |
| PTEN | P60484 | AAD13528; AMQ76358; EAW50172; AAC51182; AAD38372; CCF23296; ADM26755; ADM26756; AEZ67429; AEZ67430; AMQ76357; CCV19970; DAA64601; NP_001291646; ADM26753; AEZ67432; AEZ67435; AEZ67436; AEZ67437; CAG29302; AHW56562; NP_001291647; AAC08699; AEZ67438; CDI44160; EAW50173; ADZ48535; ARB02560; ADM26759; AEZ67434; AMQ76359; CCV66764; P60484; AAC51183; NP_000305; AAY57327; ADM26754; AEZ67431; BAA24090; EAW50174; EAW50175; AAH05821; AAB66902; ; ADM26749; AEZ67433; BAG36351 |
| CTSB | P07858 | AAL99369; EAW65631; EAW65632; CAI46053; NP_680093; EAW65633; CAA77178; XP_006716308; XP_016868588; EAW65634; BAG52127; BAG59411; XP_016868586; P07858; BAG52477; XP_011542114; XP_016868590; EAW65630; EAW65635; XP_006716307; XP_016868587; XP_016868589; ; AAL99368; NP_680090; EAW65636; BAF82928; AAH95408; AAC37547; AAA52125; NP_001899; NP_680092; BAG53460; BAG60046; AAH10240; AAA52129; NP_001304166; NP_680091 |
| SSRP1 | Q08945 | CCQ43203; EAW73734; XP_016873669; AAH05116; NP_003137; Q08945; AAA58660; ; BAD92369; EAW73735; AAH91486; XP_016873670 |
| MMP15 | P51511 | ; AAP35361; EAW82966; P51511; BAA13071; CAA88373; NP_002419; EAW82965; AAH55428; ABJ53423; BAA22225; AAH36495 |
| B3GNT6 | Q6ZMB0 | BAB88882; BAD18819; BAG36432; ; AAI03909; AAI03910; BAC87028; AAI03911; EAW75013; AAH25357; NP_619651; Q6ZMB0; BAF85462 |
| ACP1 | P24666 | CAA76416; NP_004291; AAB59628; BAF82623; AAI06012; AAP35800; AAB59355; AAC52067; EAX01115; EAX01116; AAH07422; AAY14958; EAX01111; BAD93075; AAB27085; NP_001035739; EAX01112; P24666; AEE61174; AAB59354; NP_009030; ; EAX01113; EAX01114; BAF84550 |
| NLRP7 | Q8WX94 | AAL69963; XP_006723138; EAW72313; BAG63894; DAA01246; ; NP_996611; BAG60806; XP_006723139; XP_011524898; XP_011524903; EAW72315; EAW72316; AAO18158; AAI09125; AAI09126; XP_011524901; EAW72314; Q8WX94; NP_001120727; NP_631915 |
| CDH5 | P33151 | AAI17521; P33151; BAG62180; BAG62074; ; BAD93145; AAH96364; XP_011521103; BAA87418; CAA42468; AAH96363; AAH96365; EAW83009; BAG62052; AAB41796; CAA56306; NP_001786 |

TABLE 1B-continued

Autoantibody-antigen complexes
Table 1B. CHS Discovery SCLC Antigen-Complexed Autoantibodies

| Gene | UniProt Accession | GenBank Protein Accession |
|---|---|---|
| HSPG2 | P98160 | AAB95116; P98160; AAI09205; AAA52700; XP_016856611; NP_001278789; EAW94994; EAW94995; EAW94996; CAA44373; CAC18534; EAW94997; BAD93088; XP_011539620; XP_016856609; NP_005520; AAL79552; AAB21121; ; AAA52699; XP_016856610 |
| SPINK1 | P00995 | ABH06584; AAA36521; CAA68697; P00995; ; AAG00531; NP_001341895; ABH06583; EAW61817; NP_003113; AAH25790; AAA36522 |
| CD34 | P28906 | CAJ01226; EAW93459; AAN15135; BAF85719; BAG57638; BAG62486; AAH39146; AAB25223; BAE46748; AAA03181; NP_001764; AAA03659; CAD98000; ; P28906; AAF14634; AAM82157; AAB25222; EAW93458; BAF84218; NP_001020280 |
| MAPRE1 | Q15691 | AAI06069; AAC09471; EAW76349; BAG59745; AAI28443; NP_036457; ; Q15691; AAI09282; EAW76348; BAG35484; XP_011526998 |
| NADSYN1 | Q6IA69 | BAC65148; Q6IA69; EAW74792; BAB14034; CAG33567; BAA91722; BAG53556; AAH03638; AAH03666; NP_060631; ; EAW74793 |
| SPINT2 | O43291 | ; BAA25024; AAV38918; AAC02781; EAW56766; AAB84031; AAV38919; CAG28532; NP_001159575; EAW56767; AAH11951; O43291; BAG59653; CAE06264; AAH11955; BAF84221; AAH12868; NP_066925; AAH07705; AAV38920; AEE61093; AAH01668 |
| CA9 | Q16790 | CBL94025; CAB82444; NP_001207; ; Q16790; ABL67717; ALQ33410; ALQ33411; EAW58359; CAA47315; AAH14950 |
| HIF1A | Q16665 | ; AAF20139; AAG43026; BAG35314; EAW80807; EAW80808; AAF20140; BAG59438; NP_001521; AAF20149; BAG65259; ACN88547; AAC68568; BAB70608; BAI49183; BAM28632; BAG61496; EAW80806; AAP88778; AAC50152; BAG65167; AAC51210; NP_001230013; NP_851397; EAW80809; Q16665; AAH12527 |
| TFRC | P02786 | AAH01188; CAD97930; NP_001121620; NP_001300895; NP_003225; EAW53670; EAW53672; AAF04564; EAW53671; EAW53673; AAA61153; BAF84412; BAD92491; CAA25527; ABF47088; P02786; NP_001300894; ; BAH11872 |
| PROM1 | O43490 | AAM33415; BAF98780; AAS19705; XP_011512192; NP_001139323; NP_006008; CAE90442; AAB92514; AAS19706; AAS19707; AER93377; XP_016864288; EAW92750; EAW92752; BAG51317; AAS19709; XP_011512205; XP_016864289; XP_016864290; XP_016864293; NP_001139320; NP_001139324; O43490; XP_011512195; XP_011512199; XP_016864291; BAG51316; BAG52133; AAH12089; XP_005248253; XP_011512196; XP_011512201; XP_011512202; XP_016864292; NP_001139319; EAW92751; AAS19708; XP_011512194; XP_016864294; NP_001139321; CAE83895; AER93376; XP_011512204; ; AAO15307; XP_005248252; XP_006714037; XP_011512197; XP_011512198; XP_011512200; NP_001139322 |
| CDH23 | Q9H251 | BAB47441; AAG48303; CAB59256; AAT72162; AAI08255; XP_011538346; EAW54429; BAB61902; AAG27034; AAT72166; AAH65284; AAI39904; XP_006718003; NP_001165403; NP_001165405; NP_443068; AAT72165; AAI36977; XP_011538348; XP_011538351; XP_011538353; NP_001165404; EAW54428; AAH11570; AAI36978; XP_006718005; XP_011538345; XP_011538354; XP_016871995; NP_001165406; NP_001165407; ; EAW54432; BAC04231; AAH32581; XP_011538350; XP_016871988; XP_016871997; NP_001165401; NP_071407; EAW54430; AAQ88980; XP_011538341; XP_011538344; XP_016871990; XP_016871992; XP_016871994; NP_001165402; CCQ43681; EAW54427; BAB84986; XP_011538349; XP_016871989; XP_016871991; XP_016871993; EAW54426; EAW54431; Q9H251; AAT72161; XP_011538347; XP_016871996 |
| SLMO2 | Q9Y3B1 | Q9Y3B1; ; NP_057129; AAH13969; AAD34102; NP_001243332; EAW75443; BAG60414; AAH10649; EAW75442; BAA92114 |
| GRAP2 | O75791 | AAC69273; AAF60319; NP_001278755; EAW60357; EAW60360; AAF31758; AAD41782; BAH14008; CAG46647; AAD13027; CAA09757; BAH13929; XP_006724439; EAW60356; BAH13978; NP_001278753; NP_001278754; NP_001278757; O75791; AAD04926; AAL58573; AAH26002; CAG30384; NP_004801; ; CAG38761; EAW60358; EAW60359; EAW60361; AAF60320; BAH13944; BAH13969; BAG35685; AAH25692; CAA77021 |

Multiple Dataset Discovery/Validation

One of the major shortcomings of the early detection biomarker field has been the lack of appropriate validation efforts. Unbiased screens can routinely generate markers that distinguish between case and control within any given dataset, as a function of "over-fitting" the data. Such markers frequently fail when tested in independent datasets. It is essential that all early detection studies have validation efforts integrated into the project from the outset, as is the case here. With respect to SCLC, this is easier said than done. Biorepositories for SCLC specimens are in short supply. This is largely related to the fact that SCLCs are rarely resected, such that tissue banks, for the most part, don't exist. Since translational research programs have been rare in SCLC, even plasma specimens are difficult to obtain. Through our involvement with early detection networks and collaborators, we have accumulated >250 SCLC specimens for this project allowing us to validate our biomarker panel in several distinct cohorts minimizing the likelihood that we are developing cohort specific markers.

Validation and Performance of the Antibody Array for Plasma Biomarkers

Figure 3B:
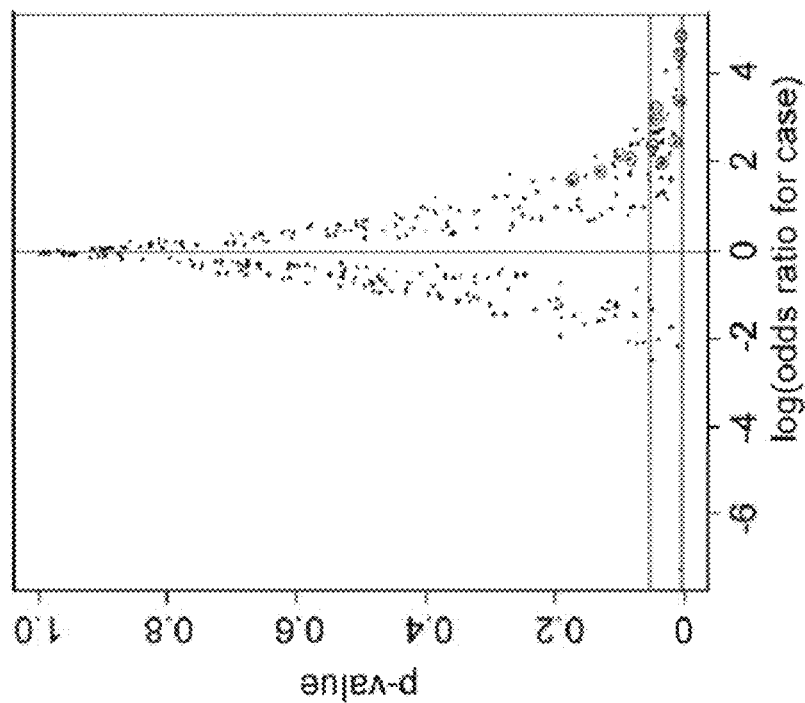
FIG. 3B Antibody Array Accuracy Proof of Principle in Ovarian Cancer. Scatter plot with the p-value of each antibody displayed as a function of the log of the odds ratio for case. Those data points between the horizontal aqua lines indicate discriminating antibodies (p<0.05); data points to the right of the vertical aqua line indicate case>control, left control>case. All antibodies to known biomarkers preferentially recognized case sera, 8/12 with p<0.05 (red circles=CA125, green=mesothelin, and blue=HE4).
Figure 3A:
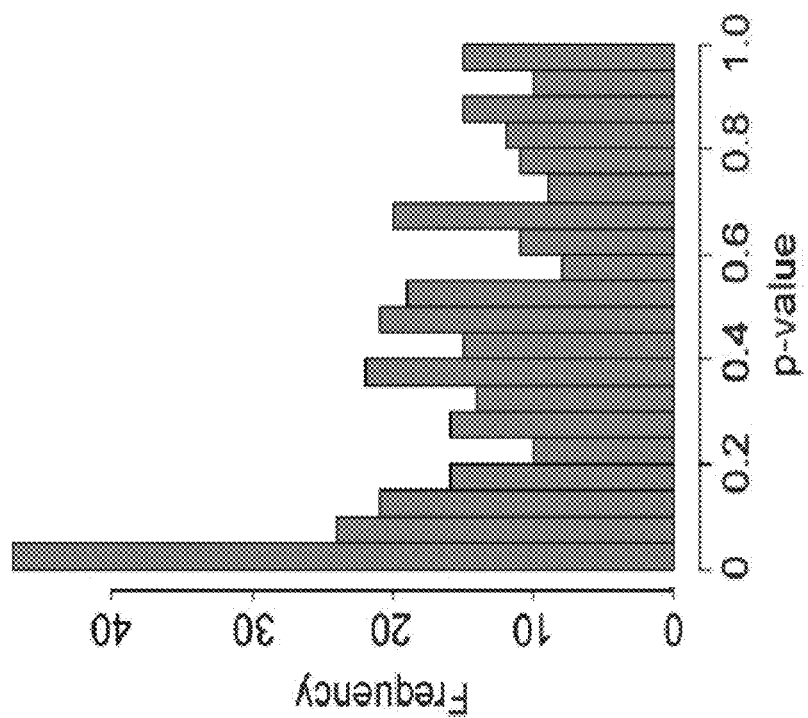
FIG. 3A Antibody Array Accuracy Proof of Principle in Ovarian Cancer. Histogram of p-values from antibody array using ovarian cancer plasma specimens. Logistic regression was used to estimate each antibody's ability to predict disease. The probability score for each antibody (p-value by Wilcoxon sign-rank testing) is displayed as a function of the number of antibodies with that score. The leftward skew indicates that this array was enriched for antibodies capable of identifying case/control status with high probability.

We demonstrated our ability to successfully immobilize 320 unique full-length and 4800 recombinant antibodies on a high density microarray with functionality suitable for biomarker discovery and validation. Among the top-performing array features were 10 of the 10 antibodies to the known ovarian cancer biomarkers CA125 and mesothelin (FIGS. 3A and 3B). These markers were significant classifiers of disease status on their own based on their low false discovery rate (FDR or q-value) and p-value and also, as a group had a mean CV value of 3.67% (the vast majority of array features have CV's under 10% in multiple studies). Our fractionation/concentration procedures yield detectable protein for even low-abundance proteins such as IL1β which we could readily detect at endogenous levels as well as when 2 and 5 pg of IL1β were spiked-in. Taken together, these data indicate our platform is reproducible, efficient and reliable for high-throughput analysis of human plasma proteins for utility as biomarkers of disease.

Lung Cancer Biomarkers Identified Using Pre-Diagnostic Plasma Specimens

Figure 4:
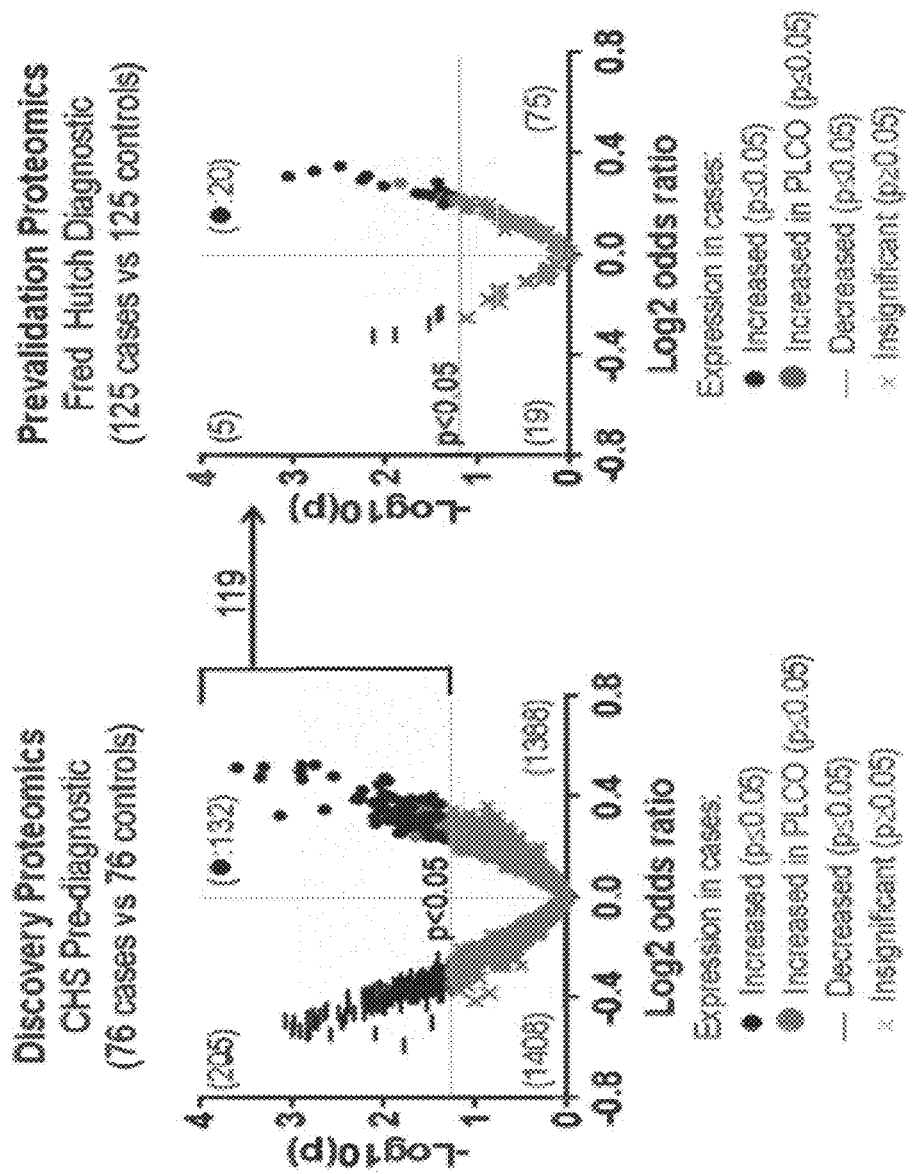
FIG. 4 Validated Proteomic Markers in NSCLC. Volcano plot of proteomic antibody array for N=76 cases/controls from CHS identified several markers significantly up- or down-regulated compared to control. A total of 25 markers validated in the Fred Hutch cohort (N=125) of which 20 were up-regulated and 5 down-regulated. Notably, 3 of these upregulated markers also validated in the PLCO cohort (N=265), indicating significant validation in the PLCO cohort (N=265), indicating significant validation.

We have performed proteomic analysis of Cardiovascular Health Study (CHS) study participants that were diagnosed with NSCLC <2 years since their last study blood draw (i.e., pre-diagnostic samples) comparing 76 cases to 76 matched cancer-free controls. Cases and controls were matched on age, gender and smoking status (never, past, current). We typically focus on upregulated biomarkers as they intuitively might be more likely to be directly related to the presence of the cancer. N=132 proteins showed significant (p<0.05) differences in people that were subsequently diagnosed with NSCLC. We have also performed analysis on samples from the Fred Hutch Lung Cancer Early Detection and Prevention Clinic (LCEDPC) cohort of ~500 subjects that were referred to our center for pulmonary nodule evaluation. For this reason, this cohort has a high number of both benign and malignant pulmonary nodules and a higher proportion of later stage cancers than a typical screening cohort. Chest CT, plasma specimens, pathology reports and a detailed clinical history were also available for all subjects as part of an annotated database. N=125 subjects with nodules that were later determined to be cancerous were matched 1:1 with subjects with benign nodules (as determined by >2 year follow-up CT showing regression or no change or definitive follow-up testing) first based on gender (exact match), then age (±2 yr), and finally pack years of smoking (best available match). Of the cancers, 63% were lung adenocarcinoma (LUAD) and 19% were lung squamous cell carcinoma (LUSQ). Of the N=119 upregulated proteins discovered in the CHS samples, N=20 were validated as upregulated at p<0.05 in the LCEDPC study–(7× what would be expected by chance). We have also completed proteomic analysis of N=265 Prostate, Lung, Colorectal, and Ovarian Cancer Screening Study (PLCO) participants that were diagnosed with NSCLC up to 2 years after the blood draw and N=265 controls matched on BMI, gender, smoking status, age, race and family history of lung cancer. We found 3 of the 20 significantly upregulated proteins in the CHS and LCEDPC cohorts were also up in the PLCO samples (FIG. 4). The fact that 3 proteomic markers were significant in 3 separate studies, two from pre-diagnostic (i.e., similar to NLST and models for screening/early detection) sample sets and the third being a nodule diagnostic cohort indicates significant validation. Furthermore, 20 more biomarkers overlap between the different sample sets but do not quite reach as high significance in the third and some markers are significant in all groups for different subtypes of lung cancer (i.e., squamous cell carcinoma (LUSQ) or adenocarcinoma (LUAD) specific).

Our array approach can also be used to measure glycomic and autoantibody-autoantigen complex differences. Examination of proteins with significant increases in sialyl Lewis-A and -X content in the CHS samples showed N=14 proteins with increased sialyl Lewis-A (p<0.043) and N=16 with sialyl Lewis-X (p<0.025) modifications. The LCEDPC samples showed validation of 4/14 and 2/16 of the glycomic markers at p<0.006. In terms of autoantibody-autoantigen complexes, we found 51 IgG (p<0.01) and 33 IgM (p<0.023) complexes significantly increased in the CHS samples (not shown). In LCEDPC samples, 15/51 IgG and 2/33 IgM markers validate at p<0.02. Currently, we are finishing the glycomic and autoantibody testing of the PLCO samples. Thus, we have 5 proteomic, 6 glycomic and 17 autoantibodies that have been discovered and then validated in at least one additional NSCLC sample set. In terms of sensitivity and specificity, 23 of the 28 markers have individual AUC values >0.60 for the CHS samples. Most markers are expressed in the plasma membrane, secreted or both. Several are WNT-related, some associated with immune function, cell-cell adhesion and fetal or pregnancy associated indicating potential reactivation of developmental programs. Interestingly, multiple proteins from the same family are upregulated at the protein level or have cancer-specific glycosylation. When the top 4 markers are combined they yield an area under the curve (AUC)=0.82 (45% sensitivity at 90% specificity). When we tested this 4-marker combination rule in the LCEDPC samples, we obtained an AUC=0.83 (50% sensitivity at 90% specificity). Given these are quite different sample sets (i.e., one from participants up to 2 years prior to diagnosis—and one from patients at a nodule evaluation clinic), this level of validation is exciting. In fact, an optimal AUC for the LCEDPC samples for the best 4 markers (all different than the 4 above) was 0.93 (87% sensitivity at 90% specificity).

Tumor-Derived B Cells Produce Tumor Specific Autoantibodies

Figure 5A:
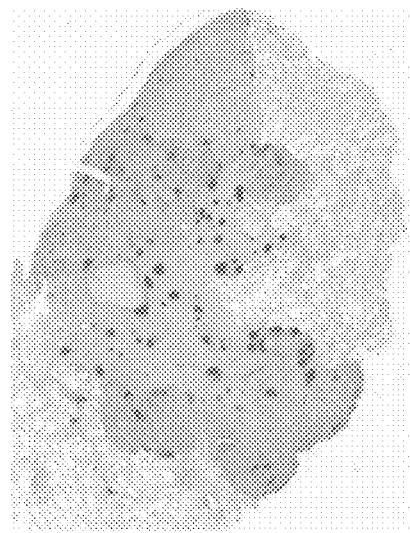
FIGS. 5A-5F Tumor-derived B cells produce tumor-specific autoantibodies.
Figure 5B:
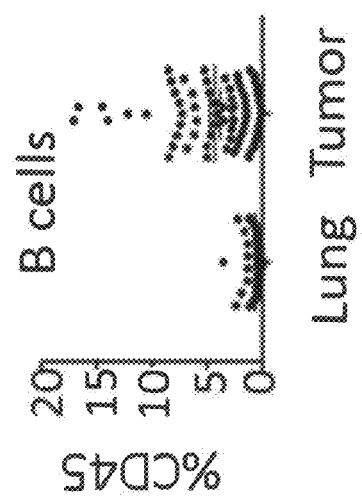
Figure 5D:
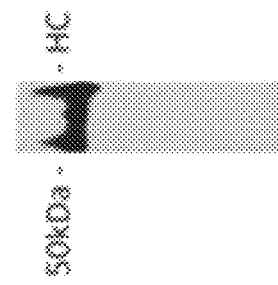
Figure 5C:
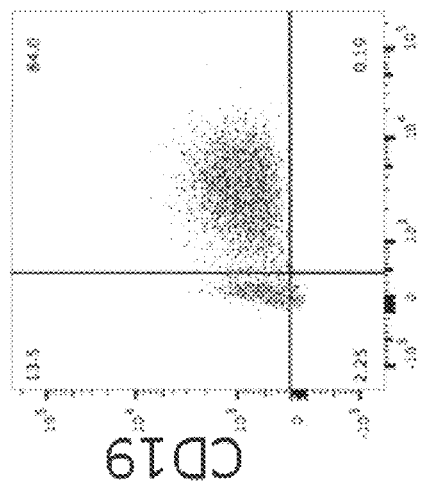
Figure 5E:
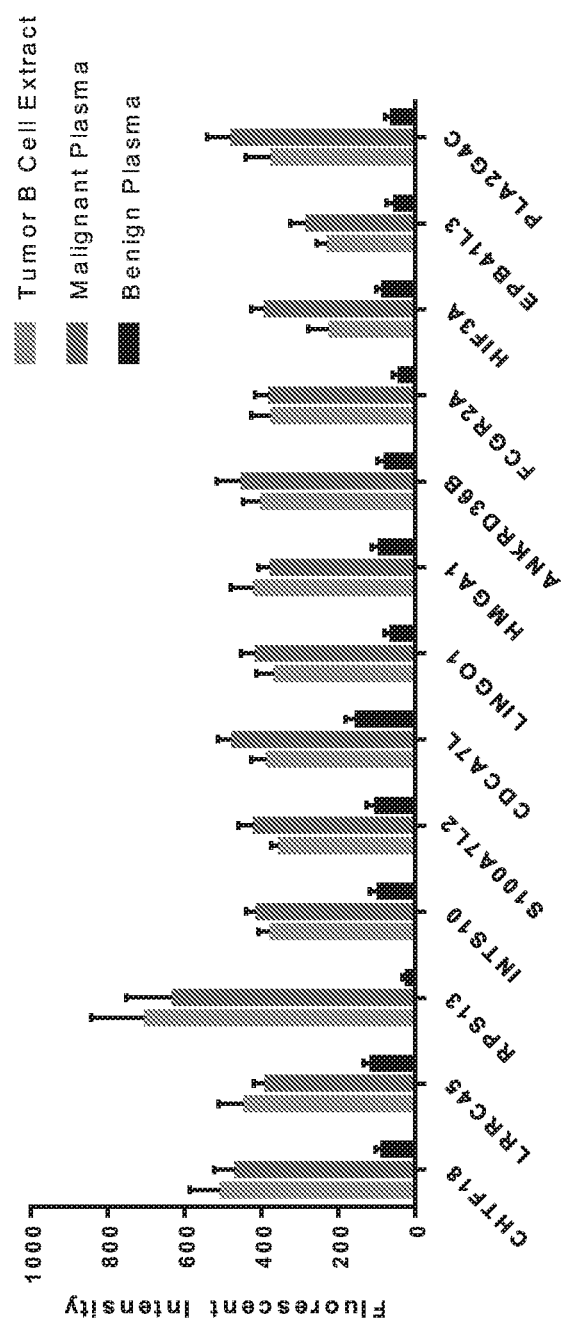
Figure 5F:
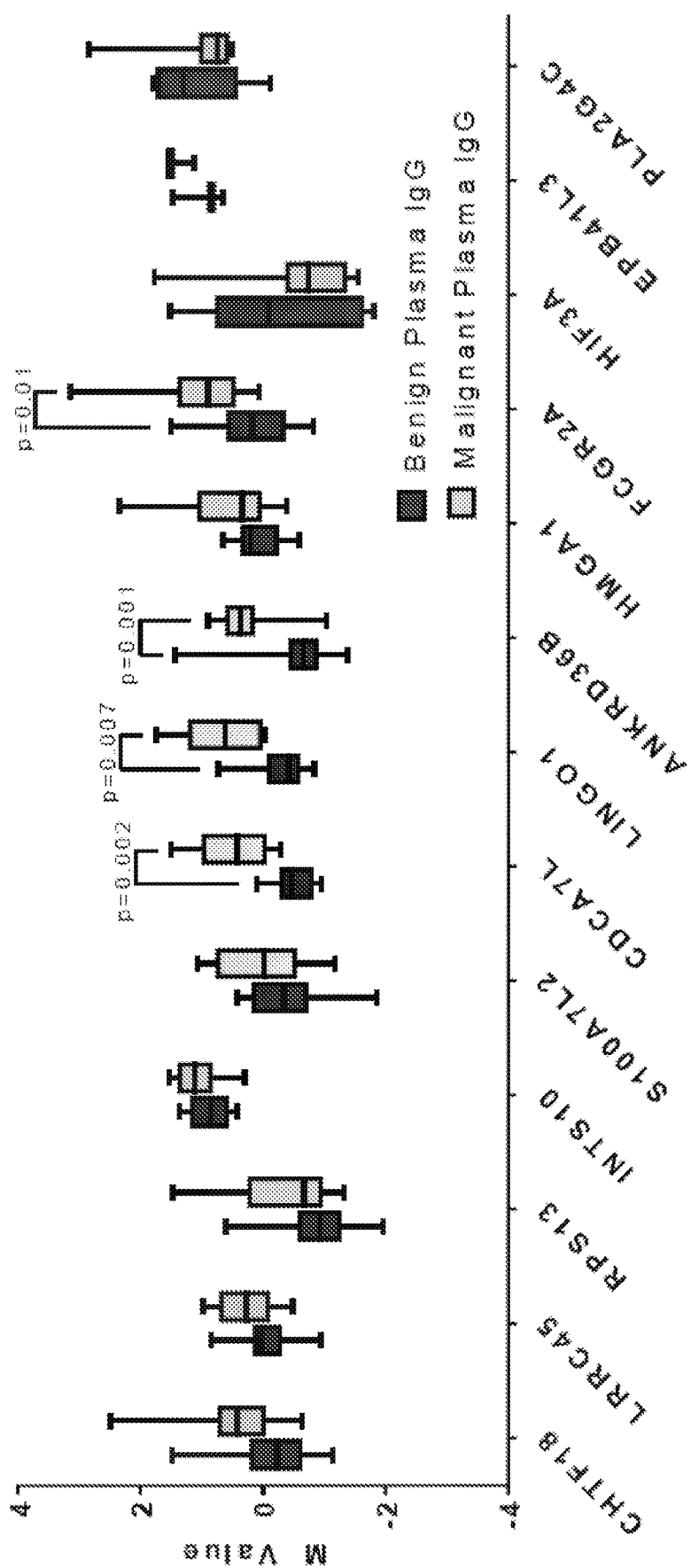
Figure 5G:
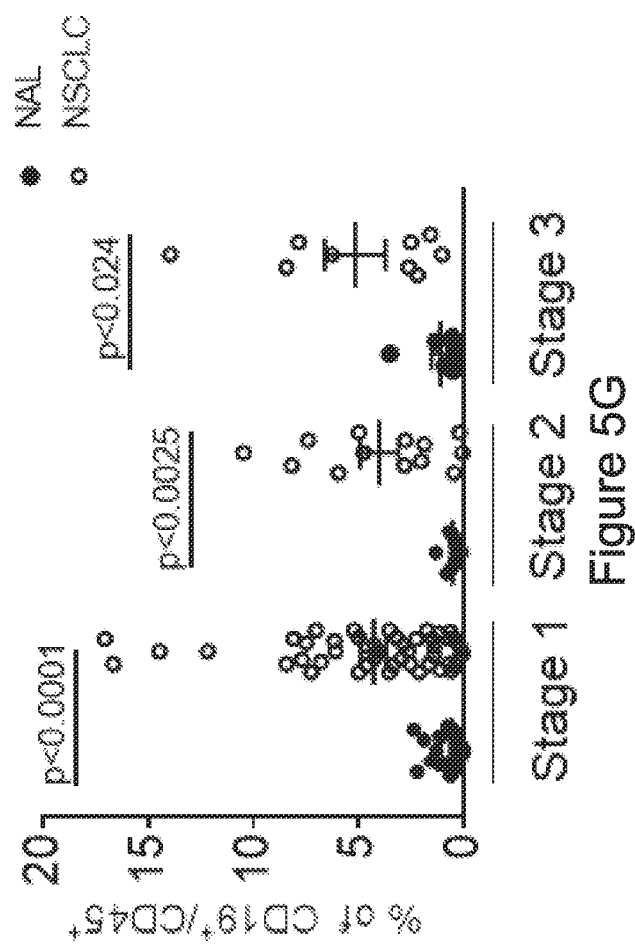
Figure 5H:
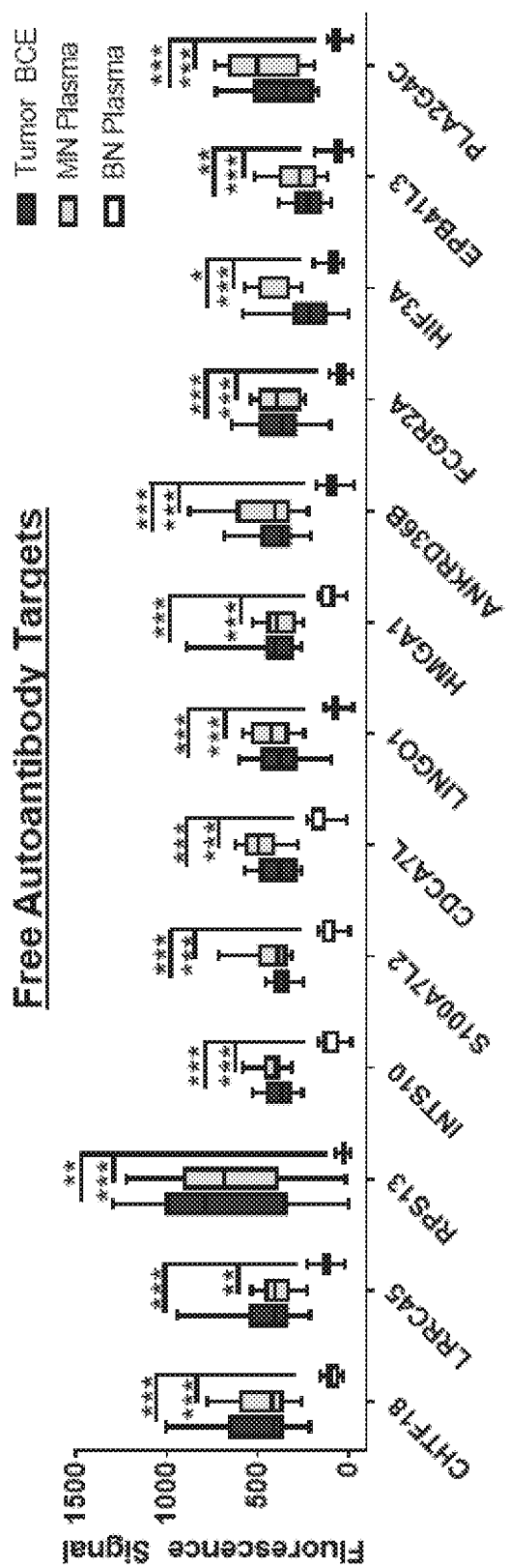
Figure 5J:
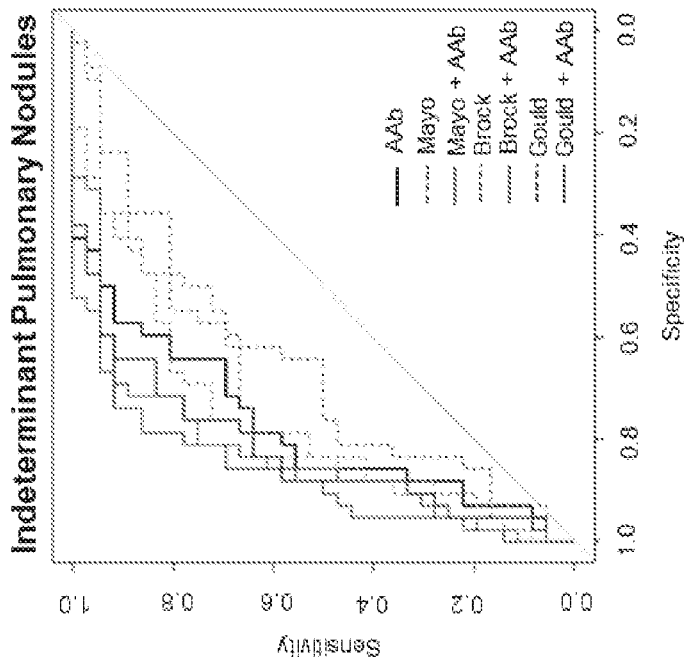
Figure 5I:
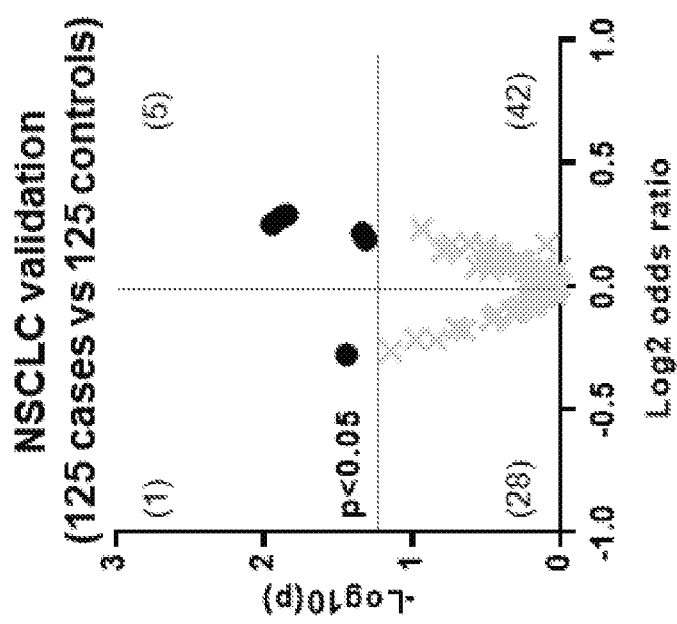

We recently concluded a study in which we identified B cells as the immune population with the largest increase in content when comparing NSCLC tumor immune cell content to that identified in non-adjacent lung tissue (FIGS. 5A, 5B and 5G). Cancer cells can produce unique epitopes to tumor-infiltrating lymphocytes through multiple mechanisms including altered antigen exposure via immunogenic cell death, defects in immune tolerance, inflammation, changes in protein expression levels or location, or altered protein structure. To explore this, flow cytometry of single cell suspensions from freshly dissociated NSCLC tumor yielded ~5% of CD45+ cells (leukocytes) as CD19+ B-cells. After CD19+ column purification, flow cytometry yielded >96% pure B-cells. After culturing B cells for 48 hours, the Ig-rich supernatant was removed, the B cells were lysed and IgG and IgM content of the combined supernatant and lysate (termed B cell extract) determined (FIGS. 5C-5D and 5H-5I). The extract was incubated on a HuProt® array that contains ~17,000 proteins expressed in yeast. After washing, bound IgG and IgM were simultaneously detected. An analysis of 10 lung tumors (7 ADCA, 3 SCCA), 10 matched plasma, and 10 control plasma from benign nodules on HuProt® arrays showed an average of 105 autoantibodies present per lung tumor sample and of these, 45 autoantibodies to specified proteins were found in >50% of the samples (i.e., autoantibodies to 45 proteins showed at least 50% sensitivity) and 9 showed at least 80% sensitivity. One of these was found in all tumors but was not present in any benign sample while several more had ≥70% specificity in these 10 samples. We narrowed down the list of 45 autoantibodies to 13 with ≥50% sensitivity and ≥70% specificity to examine further (FIGS. 5E and 5H). Consistent with their utility, 10 of the 13 were increased in cases on the antibody array we probed looking for autoantibody-antigen complexes (N=20) (FIG. 5F). To determine if these free autoantibodies were also present in these samples in complex with their autoantigens, we made a targeted antibody array and found 11 of these 13 were also present as autoantibody-antigen complexes. Five of the 13 maintained significant increases (p<0.05) when we probed on the Fred Hutch LCEDPC set (N=250) (FIG. 5I). A combination of 4 autoantibodies could detect malignant nodules with an AUC=0.74, which increased to an AUC=0.78 in a sub-cohort of indeterminate pulmonary nodules (FIG. 5J) (21). Combining this 4-marker panel with any of 3 published nodule prediction models (Brock, Mayo, or Gould) showed statistically significant improved identification of indeterminate malignant nodules compared to any model alone (FIGS. 5J-5K). It is contemplated that a related autoantibody discovery strategy can be employed by subjecting SCLC case/control plasma to HuProt® arrays in order to comprehensively identify SCLC specific circulating antibodies which can be transferred to our antibody platform and validated in independent cohorts.

Figure 6:
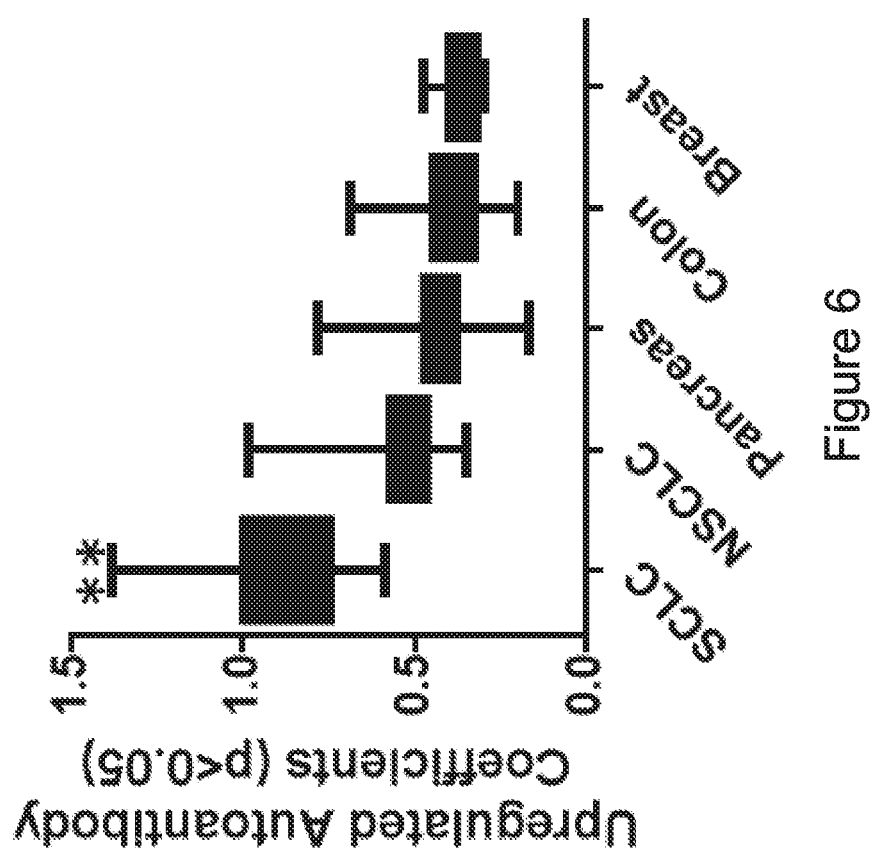
FIG. 6 IgG antigen-complexed autoantibodies is significantly higher in SCLC compared to other cancer types. The mean coefficient signal of upregulated (p<0.05) IgG autoantibodies in SCLC is significantly higher (**p<0.0001, one-way ANOVA) than any other cancer type analyzed on our antibody arrays.

FIG. 6 illustrates signal of upregulated IgG antigen-complexed autoantibodies is significantly higher in SCLC compared to other cancer types. Since data from the National Lung Screening Trial (NLST) does not support the use of CT screening of SCLC early detection (28), novel approaches must be considered. SCLC has a unique cell of origin, the pulmonary neuroendocrine cell (PNEC), which represents just 0.4% of lung airway cells, but accounts for nearly 15% of lung cancers (30, 31). Likely as a function of its unique cell of origin, antibodies against CNS antigens are encountered in SCLC patients, which occasionally give rise to paraneoplastic syndromes (PNS) (32). This serves as a key proof of concept that specific autoantibodies exist in some SCLC patients that can be leveraged for diagnostic purposes. Although numerous cancer histologic types can be affected by PNS, lung cancer is by far the most likely to be implicated (33). Some of these syndromes involve the secretion of biologically active hormones, such as the case with the syndrome of inappropriate anti-diuretic hormone (SIADH) and hypercalcemia induced by parathyroid related protein. Both of these syndromes are associated with lung squamous cell carcinoma in addition to SCLC; however, the antibody associated PNS affect SCLC approximately 10-fold more than any other cancer type. SCLC accounts for about 50% of the limbic encephalitis cases, with breast cancer (8%) and testis cancer (20%) also representing important subsets. The other CNS PNS are almost entirely comprised of SCLC cases (34). The most common PNS, Lambert-Eaton myasthenic syndrome (LEMS) affects nearly 1% of all SCLC patients, much greater than any other cancer type. Cancer-associated retinopathy (CAR) is almost exclusively associated with SCLC, with other subtypes still case-reportable. Consistent with these reports, data disclosed herein clearly shows that plasma autoantibody-antigen complexes are an order of magnitude higher in SCLC than it is in NSCLC, pancreatic cancer, breast cancer, and colon cancer (FIG. 6). The scientific rationale for the disclosed methods and systems is based on these findings: that tumor-specific autoantibodies are more common in SCLC than in any other cancer type and that the presence of known and not-yet identified tumor-specific antigen-antibody complexes and free autoantibody can be utilized to identify the presence of SCLC prior to clinical detection.

Autoantibodies Distinguish SCLC Cases from Controls

Figure 7A:
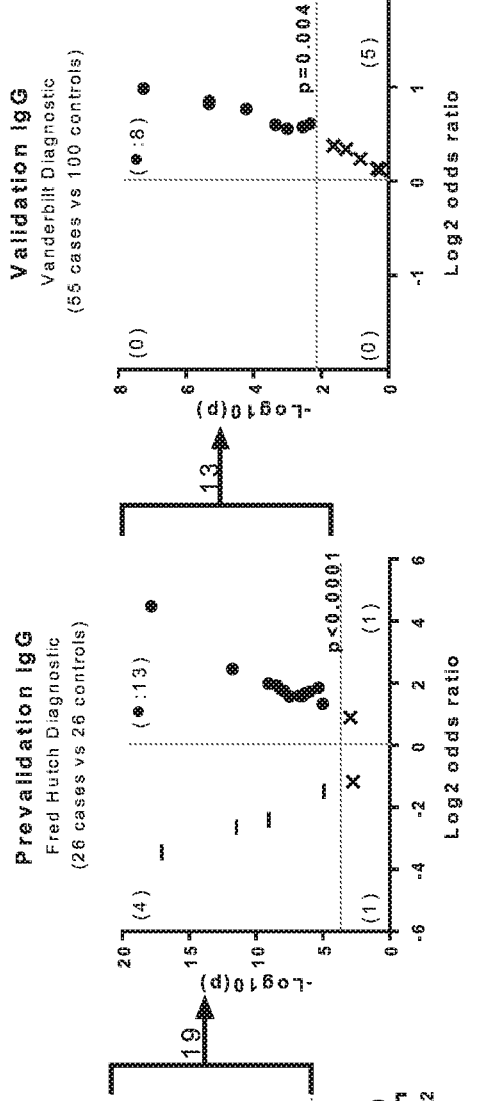
FIG. 7A-7C illustrates sequential discovery and validation of SCLC Autoantibodies IgG and IgM autoantibodies (FIG. 7A) discovered in the CHS pre-diagnostic cohort (FIG. 7B) pre-validated in the Fred Hutch diagnostic cohort and (FIG. 7C) validated in a third cohort from Vanderbilt. Expression in cases: (solid circles, increased); (dash, decreased); (x, insignificant).
Figure 7B:
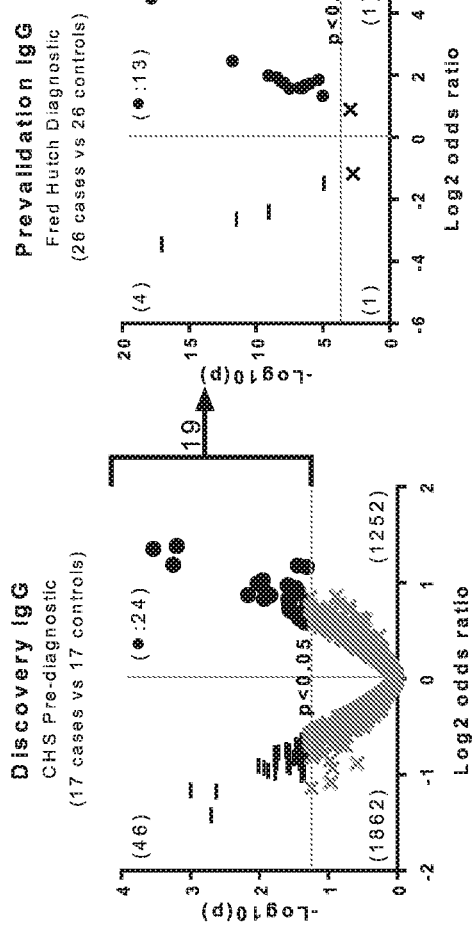
Figure 7C:
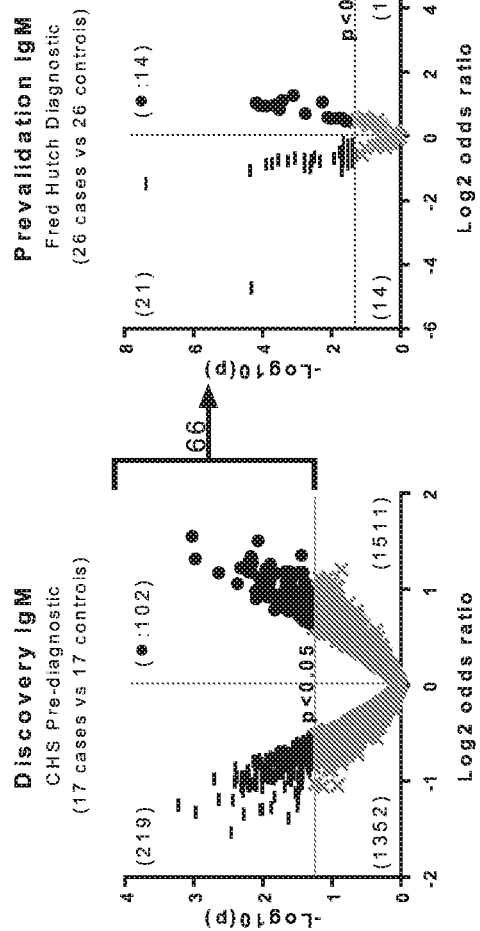

We have acquired three sample sets totaling N=98 SCLC cases and N=143 matched controls where we sequentially discovered and validated autoantibody-antigen complexes. When we subjected the CHS pre-diagnostic specimens (N=34) to our antibody array and probed for autoantibody-antigen complexes, we were able to identify 24 IgG and 102 IgM markers that were significantly up-regulated at p<0.05 (FIG. 7A). We carried forward 19 IgG and 66 upregulated IgM autoantibodies and tested their expression in the Fred Hutch SCLC diagnostic cohort (N=52). 13/19 IgG markers (68% p<0.0001) and 14/66 IgM markers (21.2% p<0.02) validated in this second cohort (FIG. 7B). In a third cohort from Vanderbilt (N=155) 8/13 (61.5% p<0.004) IgG autoantibodies and 11/13 (84.6% p<0.03) IgM autoantibodies were validated (FIG. 7C). Thirteen validated autoantibodies are listed in Table 2A.

TABLE 2A

Autoantibody Markers.
Table 2A. Autoantibody Antigen-Complex Markers in SCLC Cohorts

| Gene | UniProt Accession | GenBank Protein Accession | CHS | | | | | FH | | | | |
|---|---|---|---|---|---|---|---|---|---|---|---|---|
| | | | coef | p value | AUC | Spec | Sens | coef | p value | AUC | Spec | Sens |
| GPLD1 | P80108 | AAH20748; CAC14844; EAW55451; P80108; XP_016866243; EAW55450; AAH07614; AAH93645; AAI12002; AAA36444; EAW55448; AAG16627; | 0.77 | 0.05 | 0.689 | 0.71 | 0.65 | 1.33 | 9.28E−06 | 0.866 | 0.84 | 0.92 |

TABLE 2A-continued

Autoantibody Markers.
Table 2A. Autoantibody Antigen-Complex Markers in SCLC Cohorts

| Gene | UniProt Accession | GenBank Protein Accession | CHS | | | | | FH | | | | |
|---|---|---|---|---|---|---|---|---|---|---|---|---|
| | | | coef | p value | AUC | Spec | Sens | coef | p value | AUC | Spec | Sens |
| PTPRU | Q92729 | AAA36445; XP_011512811; XP_016866242; ; CAC87068; NP_001494; EAW55449 EAX07652; BAG52941; XP_016855484; AAC51938; XP_016855482; NP_573439; AAB07074; BAD92092; AAI46656; ; Q92729; CAA65832; XP_006710332; XP_016855481; XP_016855483; CAA65016; NP_573438; EAX07650; EAX07651; NP_005695; CCQ43332; AAB51343; NP_001181930 | 0.69 | 0.03 | 0.713 | 0.71 | 0.71 | 0.91 | 0.001 | 0.797 | 0.77 | 0.77 |
| NUDT5 | Q9UKK9 | ; EAW86320; CAG33476; NP_001308576; NP_054861; EAW86322; AAF25479; EAW86321; AAF29079; BAF83820; NP_001308577; Q9UKK9; AAF06734; AAH00025 | 0.87 | 0.01 | 0.74 | 0.59 | 0.88 | 1.68 | 4.70E-07 | 0.914 | 0.80 | 0.92 |
| INHA | P05111 | EAW70774; ACI28454; AAH06391; CAA01158; CAA28040; AAP35600; AAA59166; AAA59167; ; P05111; NP_002182 | 0.83 | 0.03 | 0.713 | 0.59 | 0.76 | 4.48 | 1.37E-18 | 0.999 | 0.96 | 1.00 |
| INHBC | P55103 | EAW97011; BAG37366; NP_005529; ; P55103; AAI30325; AAI30327 | 0.71 | 0.03 | 0.737 | 0.76 | 0.71 | 1.99 | 8.11E-10 | 0.986 | 0.92 | 1.00 |
| ANAPC2 | Q9UJX6 | BAG58931; F05751; AAH01579; Q9UJX6; AAH32503; NP_037498; AAH09487; EAW88361; BAA92644; BAG57788 | 0.99 | 0.01 | 0.743 | 0.47 | 1.00 | 1.59 | 2.91E-07 | 0.899 | 0.79 | 1.00 |
| PLD3 | Q8IV08 | EAW56954; EAW56956; XP_005258761; EAW56951; AAH00553; | 0.75 | 0.03 | 0.757 | 0.81 | 0.76 | 1.80 | 6.93E-09 | 0.95 | 0.96 | 0.88 |

TABLE 2A-continued

Autoantibody Markers.
Table 2A. Autoantibody Antigen-Complex Markers in SCLC Cohorts

| Gene | UniProt Accession | GenBank Protein Accession | CHS | | | | | FH | | | | |
|------|---------|-----------|------|---------|-----|------|------|------|---------|-----|------|------|
| | | | coef | p value | AUC | Spec | Sens | coef | p value | AUC | Spec | Sens |
| | | AAH36327; AAH96820; XP_005258766; EAW56957; XP_005258764; EAW56953; EAW56955; Q8IV08; AAB16799; XP_016882037; NP_036400; ; EAW56958; XP_005258767; XP_011524995; XP_016882035; NP_001278240; EAW56950; EAW56952; CAD57504; EAW56959; XP_011524994; BAG57127; XP_005258765; XP_006723185; XP_016882036; XP_016882038; NP_001026866 | | | | | | | | | | |
| PTEN | P60484 | AAD13528; AMQ76358; EAW50172; AAC51182; AAD38372; CCF23296; ADM26755; ADM26756; AEZ67429; AEZ67430; AMQ76357; CCV19970; DAA64601; NP_001291646; ADM26753; AEZ67432; AEZ67435; AEZ67436; AEZ67437; CAG29302; AHW56562; NP_001291647; AAC08699; AEZ67438; CDI44160; EAW50173; ADZ48535; ARB02560; ADM26759; AEZ67434; AMQ76359; CCV66764; P60484; AAC51183; NP_000305; AAY57327; ADM26754; AEZ67431; BAA24090; EAW50174; EAW50175; AAH05821; AAB66902; ; ADM26749; | 0.97 | 0.03 | 0.689 | 0.65 | 0.71 | 2.46 | 1.66E-12 | 0.979 | 1.00 | 0.92 |

TABLE 2A-continued

Autoantibody Markers.
Table 2A. Autoantibody Antigen-Complex Markers in SCLC Cohorts

| Gene | UniProt Accession | GenBank Protein Accession | CHS | | | | | FH | | | | |
|---|---|---|---|---|---|---|---|---|---|---|---|---|
| | | | coef | p value | AUC | Spec | Sens | coef | p value | AUC | Spec | Sens |
| CTSB | P07858 | AEZ67433; BAG36351 AAL99369; EAW65631; EAW65632; CAI46053; NP_680093; EAW65633; CAA77178; XP_006716308; XP_016868588; EAW65634; BAG52127; BAG59411; XP_016868586; P07858; BAG52477; XP_011542114; XP_016868590; EAW65630; EAW65635; XP_006716307; XP_016868587; XP_016868589; ; AAL99368; NP_680090; EAW65636; BAF82928; AAH95408; AAC37547; AAA52125; NP_001899; NP_680092; BAG53460; BAG60046; AAH10240; AAA52129; NP_001304166; NP_680091 | 0.83 | 0.01 | 0.744 | 0.65 | 0.82 | 1.93 | 3.53E−09 | 0.975 | 1.00 | 0.88 |
| SSRP1 | Q08945 | CCQ43203; EAW73734; XP_016873669; AAH05116; NP_003137; Q08945; AAA58660; ; BAD92369; EAW73735; AAH91486; XP_016873670 | 0.82 | 0.03 | 0.699 | 0.81 | 0.65 | 1.57 | 3.16E−08 | 0.953 | 0.88 | 0.92 |
| MMP15 | P51511 | ; AAP35361; EAW82966; P51511; BAA13071; CAA88373; NP_002419; EAW82965; AAH55428; ABJ53423; BAA22225; AAH36495 | 0.94 | 0.03 | 0.702 | 1.00 | 0.44 | 1.60 | 1.62E−07 | 0.925 | 0.84 | 0.96 |
| B3GNT6 | Q6ZMB0 | BAB88882; BAD18819; BAG36432; ; AAI03909; AAI03910; BAC87028; AAI03911; EAW75013; AAH25357; NP_619651; | 0.94 | 0.03 | 0.709 | 0.47 | 0.88 | 1.86 | 4.46E−06 | 0.897 | 0.84 | 0.92 |

TABLE 2A-continued

Autoantibody Markers.
Table 2A. Autoantibody Antigen-Complex Markers in SCLC Cohorts

| Gene | UniProt Accession | GenBank Protein Accession | CHS | | | | | FH | | | | |
|---|---|---|---|---|---|---|---|---|---|---|---|---|
| | | | coef | p value | AUC | Spec | Sens | coef | p value | AUC | Spec | Sens |
| ACP1 | P24666 | Q6ZMB0; BAF85462 CAA76416; NP_004291; AAB59628; BAF82623; AAI06012; AAP35800; AAB59355; AAC52067; EAX01115; EAX01116; AAH07422; AAY14958; EAX01111; BAD93075; AAB27085; NP_001035739; EAX01112; P24666; AEE61174; AAB59354; NP_009030; ; EAX01113; EAX01114; BAF84550 | 1.16 | 0.05 | 0.671 | 0.71 | 0.59 | 1.73 | 9.64E-07 | 0.891 | 0.77 | 0.77 |

We were able to identify several 2-marker combinations displaying perfect 100% sensitivity and specificity in this study (see Table 2B, below).

TABLE 2B

SCLC 2-marker combinations.
Table 2B. AUCs of 2-autoantibody combination in FH Cohort

| | | Marker 1 | | | | Marker 2 | | |
|---|---|---|---|---|---|---|---|---|
| AUC | Antigen | UniProt Accession Number | GenBank Protein Accession Number | Isotype | Antigen | Isotype | UniProt Accession Number | GenBank Protein Accession Number |
| 1 | CRMP5 | Q9BPU6 | ; AAK16830; CAT03392; CAD28503; EAX00668; Q9BPU6; EAX00667; AAY14652; NP_064519; CAR95653; AAF80348; AAP35517; AAX93268; CAB95124; AAH02874; NP_001240652; NP_001240653 | IgG | Ma_PNMA1 | IgG | Q8ND90 | CAG33393; NP_006020; AAN05100; BAF83669; CAD38995; Q8ND90; EAW81126; AAH39577 |
| 1 | CRMP5 | Q9BPU6 | ; AAK16830; CAT03392; CAD28503; EAX00668; Q9BPU6; EAX00667; AAY14652; NP_064519; CAR95653; AAF80348; | IgG | Ta_PNMA2 | IgG | Q9UL42 | BAG51501; AAH47515; AAF05626; EAW63575; BAA74906; NP_009188; AAH36489; AAD02098; AAH62301; XP_011542667; |

TABLE 2B-continued

SCLC 2-marker combinations.
Table 2B. AUCs of 2-autoantibody combination in FH Cohort

| | | Marker 1 | | | | Marker 2 | | |
|---|---|---|---|---|---|---|---|---|
| AUC | Antigen | UniProt Accession Number | GenBank Protein Accession Number | Isotype | Antigen | Isotype | UniProt Accession Number | GenBank Protein Accession Number |
| 1 | Ma_PNMA1 | Q8ND90 | CAG33393; NP_006020; ; AAN05100; BAF83669; CAD38995; Q8ND90; EAW81126; AAH39577 | IgG | Ta_PNMA2 | IgG | Q9UL42 | AAP35517; AAX93268; CAB95124; AAH02874; NP_001240652; NP_001240653 BAG51501; AAH47515; AAF05626; EAW63575; BAA74906; NP_009188; AAH36489; AAD02098; AAH62301; XP_011542667; AAF05625; ; Q9UL42 |
| 1 | Ma_PNMA1 | Q8ND90 | CAG33393; NP_006020; ; AAN05100; BAF83669; CAD38995; Q8ND90; EAW81126; AAH39577 | IgG | Yo_CDR1 | IgG | P51861 | ; AAA51962; NP_004056; AAI13473; P51861; AAI13475; AAA52472 |
| 1 | Ma_PNMA1 | Q8ND90 | CAG33393; NP_006020; ; AAN05100; BAF83669; CAD38995; Q8ND90; EAW81126; AAH39577 | IgG | Sox | IgG | O00570 | CAA73847; NP_005977; EAX09158; ; O00570 |
| 1 | Ma_PNMA1 | Q8ND90 | CAG33393; NP_006020; ; AAN05100; BAF83669; CAD38995; Q8ND90; EAW81126; AAH39577 | IgG | GABA-b | IgG | Q9UBS5;; O75899 | AQY76821; EAX03206; AAC98508; EAX03212; Q9UBS5; BAD92027; EAX03207; CAA12359; CAA12360; BAF82880; XP_006715110; XP_016866165; EAX03208; CAA09940; BAD97339; AAH50532; AQY76820; EAX03205; BAG35233; XP_011512755; NP_068703; AQY76819; AQY76823; AQY76824; AQY76825; CAA09031; EAX03211; AAH42598; AQY76827; BAC05730; EAX03209; EAX03210; CAA09939; CAA09980; ; AQY76822; AQY76826; |

TABLE 2B-continued

SCLC 2-marker combinations.
Table 2B. AUCs of 2-autoantibody combination in FH Cohort

| | | Marker 1 | | | | Marker 2 | | |
|---|---|---|---|---|---|---|---|---|
| AUC | Antigen | UniProt Accession Number | GenBank Protein Accession Number | Isotype | Antigen | Isotype | UniProt Accession Number | GenBank Protein Accession Number |
| | | | | | | | | CAA21453; CAA21454; CAI79356; AAG23962; CAA09941; AAH41332; XP_005249039; XP_011512757; NP_001305982; NP_001461; NP_068704;; EAW58889; EAW58890; EAW58891; O75899; AAD03336; AAD30389; CAI79357; XP_005252373; XP_016870821; ; BAA34793; AAC99345; AAH35071; NP_005449; AAC63228; AFF59483; XP_016870820; AAD45867; CAA09942 |
| 1 | Ma_PNMA1 | Q8ND90 | CAG33393; NP_006020; ; AAN05100; BAF83669; CAD38995; Q8ND90; EAW81126; AAH39577 | IgG | GAD65 | IgG | Q05329 | EAW86101; EAW86104; EAW86103; CAB62572; AAA62367; ; Q05329; AAH29517; AAA58491; EAW86102; NP_000809; AAP88040; NP_001127838; AAI26328; AAI26330; BAC86947 |
| 1 | Ma_PNMA1 | Q8ND90 | CAG33393; NP_006020; ; AAN05100; BAF83669; CAD38995; Q8ND90; EAW81126; AAH39577 | IgG | CRMP5 | IgM | Q9BPU6 | ; AAK16830; CAT03392; CAD28503; EAX00668; Q9BPU6; EAX00667; AAY14652; NP_064519; CAR95653; AAF80348; AAP35517; AAX93268; CAB95124; AAH02874; NP_001240652; NP_001240653 |
| 1 | Ma_PNMA1 | Q8ND90 | CAG33393; NP_006020; ; AAN05100; BAF83669; CAD38995; Q8ND90; EAW81126; AAH39577 | IgG | Ma_PNMA1 | IgM | Q8ND90 | CAG33393; NP_006020; ; AAN05100; BAF83669; CAD38995; Q8ND90; EAW81126; AAH39577 |

TABLE 2B-continued

SCLC 2-marker combinations.
Table 2B. AUCs of 2-autoantibody combination in FH Cohort

| | Marker 1 | | | | Marker 2 | | | |
|---|---|---|---|---|---|---|---|---|
| AUC | Antigen | UniProt Accession Number | GenBank Protein Accession Number | Isotype | Antigen | Isotype | UniProt Accession Number | GenBank Protein Accession Number |
| 1 | Ma_PNMA1 | Q8ND90 | CAG33393; NP_006020; ; AAN05100; BAF83669; CAD38995; Q8ND90; EAW81126; AAH39577 | IgG | Ta_PNMA2 | IgM | Q9UL42 | BAG51501; AAH47515; AAF05626; EAW63575; BAA74906; NP_009188; AAH36489; AAD02098; AAH62301; XP_011542667; AAF05625; ; Q9UL42 |
| 1 | Ma_PNMA1 | Q8ND90 | CAG33393; NP_006020; ; AAN05100; BAF83669; CAD38995; Q8ND90; EAW81126; AAH39577 | IgG | Yo_CDR1 | IgM | P51861 | ; AAA51962; NP_004056; AAI13473; P51861; AAI13475; AAA52472 |
| 1 | Ma_PNMA1 | Q8ND90 | CAG33393; NP_006020; ; AAN05100; BAF83669; CAD38995; Q8ND90; EAW81126; AAH39577 | IgG | Sox | IgM | O00570 | CAA73847; NP_005977; EAX09158; ; O00570 |
| 1 | Ma_PNMA1 | Q8ND90 | CAG33393; NP_006020; ; AAN05100; BAF83669; CAD38995; Q8ND90; EAW81126; AAH39577 | IgG | GABA-b | IgM | Q9UBS5; ; O75899 | AQY76821; EAX03206; AAC98508; EAX03212; Q9UBS5; BAD92027; EAX03207; CAA12359; CAA12360; BAF82880; XP_006715110; XP_016866165; EAX03208; CAA09940; BAD97339; AAH50532; AQY76820; EAX03205; BAG35233; XP_011512755; NP_068703; AQY76819; AQY76823; AQY76824; AQY76825; CAA09031; EAX03211; AAH42598; AQY76827; BAC05730; EAX03209; EAX03210; CAA09939; CAA09980; ; AQY76822; AQY76826; CAA21453; CAA21454; CAI79356; AAG23962; CAA09941; AAH41332; |

TABLE 2B-continued

SCLC 2-marker combinations.
Table 2B. AUCs of 2-autoantibody combination in FH Cohort

| | Marker 1 | | | | Marker 2 | | | |
|---|---|---|---|---|---|---|---|---|
| AUC | Antigen | UniProt Accession Number | GenBank Protein Accession Number | Isotype | Antigen | Isotype | UniProt Accession Number | GenBank Protein Accession Number |
| | | | | | | | | XP_005249039; XP_011512757; NP_001305982; NP_001461; NP_068704;; EAW58889; EAW58890; EAW58891; O75899; AAD03336; AAD30389; CAI79357; XP_005252373; XP_016870821; ; BAA34793; AAC99345; AAH35071; NP_005449; AAC63228; AFF59483; XP_016870820; AAD45867; CAA09942 |
| 1 | Ma_PNMA1 | Q8ND90 | CAG33393; NP_006020; ; AAN05100; BAF83669; CAD38995; Q8ND90; EAW81126; AAH39577 | IgG | GAD65 | IgM | Q05329 | EAW86101; EAW86104; EAW86103; CAB62572; AAA62367; ; Q05329; AAH29517; AAA58491; EAW86102; NP_000809; AAP88040; NP_001127838; AAI26328; AAI26330; BAC86947 |
| 1 | Ta_PNMA2 | Q9UL42 | BAG51501; AAH47515; AAF05626; EAW63575; BAA74906; NP_009188; AAH36489; AAD02098; AAH62301; XP_011542667; AAF05625; ; Q9UL42 | IgG | Yo_CDR1 | IgG | P51861 | AAA51962; NP_004056; AAI13473; P51861; AAI13475; AAA52472 |
| 1 | Ta_PNMA2 | Q9UL42 | BAG51501; AAH47515; AAF05626; EAW63575; BAA74906; NP_009188; AAH36489; AAD02098; AAH62301; XP_011542667; AAF05625; ; Q9UL42 | IgG | Sox | IgG | O00570 | CAA73847; NP_005977; EAX09158; ; O00570 |
| 1 | Ma_PNMA1 | Q8ND90 | CAG33393; NP_006020; ; AAN05100; BAF83669; CAD38995; Q8ND90; EAW81126; AAH39577 | IgG | GABA-b | IgM | Q9UBS5;; O75899 | AQY76821; EAX03206; AAC98508; EAX03212; Q9UBS5; BAD92027; EAX03207; CAA12359; |

TABLE 2B-continued

SCLC 2-marker combinations.
Table 2B. AUCs of 2-autoantibody combination in FH Cohort

| | | Marker 1 | | | | Marker 2 | | |
|---|---|---|---|---|---|---|---|---|
| AUC | Antigen | UniProt Accession Number | GenBank Protein Accession Number | Isotype | Antigen | Isotype | UniProt Accession Number | GenBank Protein Accession Number |
| | | | | | | | | CAA12360; BAF82880; XP_006715110; XP_016866165; EAX03208; CAA09940; BAD97339; AAH50532; AQY76820; EAX03205; BAG35233; XP_011512755; NP_068703; AQY76819; AQY76823; AQY76824; AQY76825; CAA09031; EAX03211; AAH42598; AQY76827; BAC05730; EAX03209; EAX03210; CAA09939; CAA09980; ; AQY76822; AQY76826; CAA21453; CAA21454; CAI79356; AAG23962; CAA09941; AAH41332; XP_005249039; XP_011512757; NP_001305982; NP_001461; NP_068704;; EAW58889; EAW58890; EAW58891; O75899; AAD03336; AAD30389; CAI79357; XP_005252373; XP_016870821; ; BAA34793; AAC99345; AAH35071; NP_005449; AAC63228; AFF59483; XP_016870820; AAD45867; CAA09942 |
| 1 | Ma_PNMA1 | Q8ND90 | CAG33393; NP_006020; ; AAN05100; BAF83669; CAD38995; Q8ND90; EAW81126; AAH39577 | IgG | GAD65 | IgM | Q05329 | EAW86101; EAW86104; EAW86103; CAB62572; AAA62367; ; Q05329; AAH29517; AAA58491; EAW86102; NP_000809; AAP88040; |

TABLE 2B-continued

SCLC 2-marker combinations.
Table 2B. AUCs of 2-autoantibody combination in FH Cohort

| | | Marker 1 | | | | Marker 2 | | |
|---|---|---|---|---|---|---|---|---|
| AUC | Antigen | UniProt Accession Number | GenBank Protein Accession Number | Isotype | Antigen | Isotype | UniProt Accession Number | GenBank Protein Accession Number |
| 1 | Ta_PNMA2 | Q9UL42 | BAG51501; AAH47515; AAF05626; EAW63575; BAA74906; NP_009188; AAH36489; AAD02098; AAH62301; XP_011542667; AAF05625; ; Q9UL42 | IgG | Yo_CDR1 | IgG | P51861 | NP_001127838; AAI26328; AAI26330; BAC86947 AAA51962; NP_004056; AAI13473; P51861; AAI13475; AAA52472 |
| 1 | Ta_PNMA2 | Q9UL42 | BAG51501; AAH47515; AAF05626; EAW63575; BAA74906; NP_009188; AAH36489; AAD02098; AAH62301; XP_011542667; AAF05625; ; Q9UL42 | IgG | Sox | IgG | O00570 | CAA73847; NP_005977; EAX09158; ; O00570 |
| 1 | Ta_PNMA2 | Q9UL42 | BAG51501; AAH47515; AAF05626; EAW63575; BAA74906; NP_009188; AAH36489; AAD02098; AAH62301; XP_011542667; AAF05625; ; Q9UL42 | IgG | GABA-b | IgG | Q9UBS5;; O75899 | AQY76821; EAX03206; AAC98508; EAX03212; Q9UBS5; BAD92027; EAX03207; CAA12359; CAA12360; BAF82880; XP_006715110; XP_016866165; EAX03208; CAA09940; BAD97339; AAH50532; AQY76820; EAX03205; BAG35233; XP_011512755; NP_068703; AQY76819; AQY76823; AQY76824; AQY76825; CAA09031; EAX03211; AAH42598; AQY76827; BAC05730; EAX03209; EAX03210; CAA09939; CAA09980; ; AQY76822; AQY76826; CAA21453; CAA21454; CAI79356; AAG23962; CAA09941; AAH41332; |

TABLE 2B-continued

SCLC 2-marker combinations.
Table 2B. AUCs of 2-autoantibody combination in FH Cohort

| | | Marker 1 | | | | Marker 2 | | |
|---|---|---|---|---|---|---|---|---|
| AUC | Antigen | UniProt Accession Number | GenBank Protein Accession Number | Isotype | Antigen | Isotype | UniProt Accession Number | GenBank Protein Accession Number |
| | | | | | | | | XP_005249039; XP_011512757; NP_001305982; NP_001461; NP_068704 EAW58889; EAW58890; EAW58891; O75899; AAD03336; AAD30389; CAI79357; XP_005252373; XP_016870821; ; BAA34793; AAC99345; AAH35071; NP_005449; AAC63228; AFF59483; XP_016870820; AAD45867; CAA09942 |
| 1 | Ta_PNMA2 | Q9UL42 | BAG51501; AAH47515; AAF05626; EAW63575; BAA74906; NP_009188; AAH36489; AAD02098; AAH62301; XP_011542667; AAF05625; ; Q9UL42 | IgG | GAD65 | IgG | Q05329 | EAW86101; EAW86104; EAW86103; CAB62572; AAA62367; ; Q05329; AAH29517; AAA58491; EAW86102; NP_000809; AAP88040; NP_001127838; AAI26328; AAI26330; BAC86947 |
| 1 | Ta_PNMA2 | Q9UL42 | BAG51501; AAH47515; AAF05626; EAW63575; BAA74906; NP_009188; AAH36489; AAD02098; AAH62301; XP_011542667; AAF05625; ; Q9UL42 | IgG | CRMP5 | IgM | Q9BPU6 | ; AAK16830; CAT03392; CAD28503; EAX00668; Q9BPU6; EAX00667; AAY14652; NP_064519; CAR95653; AAF80348; AAP35517; AAX93268; CAB95124; AAH02874; NP_001240652; NP_001240653 |
| 1 | Ta_PNMA2 | Q9UL42 | BAG51501; AAH47515; AAF05626; EAW63575; BAA74906; NP_009188; AAH36489; AAD02098; AAH62301; XP_011542667; AAF05625; ; Q9UL42 | IgG | Ma_PNMA1 | IgM | Q8ND90 | CAG33393; NP_006020; ; AAN05100; BAF83669; CAD38995; Q8ND90; EAW81126; AAH39577 |
| 1 | Ta_PNMA2 | Q9UL42 | BAG51501; AAH47515; AAF05626; EAW63575; | IgG | Ta_PNMA2 | IgM | Q9UL42 | BAG51501; AAH47515; AAF05626; EAW63575; |

TABLE 2B-continued

SCLC 2-marker combinations.
Table 2B. AUCs of 2-autoantibody combination in FH Cohort

| | | Marker 1 | | | Marker 2 | | | |
|---|---|---|---|---|---|---|---|---|
| AUC | Antigen | UniProt Accession Number | GenBank Protein Accession Number | Isotype | Antigen | Isotype | UniProt Accession Number | GenBank Protein Accession Number |
| 1 | Ta_PNMA2 | Q9UL42 | BAA74906; NP_009188; AAH36489; AAD02098; AAH62301; XP_011542667; AAF05625; ; Q9UL42 BAG51501; AAH47515; AAF05626; EAW63575; | IgG | Yo_CDR1 | IgM | P51861 | BAA74906; NP_009188; AAH36489; AAD02098; AAH62301; XP_011542667; AAF05625;; Q9UL42 ; AAA51962; NP_004056; AAI13473; P51861; AAI13475; AAA52472 |
| 1 | Ta_PNMA2 | Q9UL42 | BAA74906; NP_009188; AAH36489; AAD02098; AAH62301; XP_011542667; AAF05625; ; Q9UL42 BAG51501; AAH47515; AAF05626; EAW63575; | IgG | Sox | IgM | O00570 | CAA73847; NP_005977; EAX09158; ; O00570 |
| 1 | Ta_PNMA2 | Q9UL42 | BAA74906; NP_009188; AAH36489; AAD02098; AAH62301; XP_011542667; AAF05625; ; Q9UL42 BAG51501; AAH47515; AAF05626; EAW63575; | IgG | GABA-b | IgM | Q9UBS5;; O75899 | AQY76821; EAX03206; AAC98508; EAX03212; Q9UBS5; BAD92027; EAX03207; CAA12359; CAA12360; BAF82880; XP_006715110; XP_016866165; EAX03208; CAA09940; BAD97339; AAH50532; AQY76820; EAX03205; BAG35233; XP_011512755; NP_068703; AQY76819; AQY76823; AQY76824; AQY76825; CAA09031; EAX03211; AAH42598; AQY76827; BAC05730; EAX03209; EAX03210; CAA09939; CAA09980; ; AQY76822; AQY76826; CAA21453; CAA21454; |

TABLE 2B-continued

SCLC 2-marker combinations.
Table 2B. AUCs of 2-autoantibody combination in FH Cohort

| | Marker 1 | | | | Marker 2 | | | |
|---|---|---|---|---|---|---|---|---|
| AUC | Antigen | UniProt Accession Number | GenBank Protein Accession Number | Isotype | Antigen | Isotype | UniProt Accession Number | GenBank Protein Accession Number |
| | | | | | | | | CAI79356; AAG23962; CAA09941; AAH41332; XP_005249039; XP_011512757; NP_001305982; NP_001461; NP_068704;; EAW58889; EAW58890; EAW58891; O75899; AAD03336; AAD30389; CAI79357; XP_005252373; XP_016870821; ; BAA34793; AAC99345; AAH35071; NP_005449; AAC63228; AFF59483; XP_016870820; AAD45867; CAA09942 |
| 1 | Ta_PNMA2 | Q9UL42 | BAG51501; AAH47515; AAF05626; EAW63575; BAA74906; NP_009188; AAH36489; AAD02098; AAH62301; XP_011542667; AAF05625; ; Q9UL42 | IgG | GAD65 | IgM | Q05329 | EAW86101; EAW86104; EAW86103; CAB62572; AAA62367; ; Q05329; AAH29517; AAA58491; EAW86102; NP_000809; AAP88040; NP_001127838; AAI26328; AAI26330; BAC86947 |
| 1 | IgG | GPLD1 | P80108 | AAH20748; CAC14844; EAW55451; P80108; XP_016866243; EAW55450; AAH07614; AAH93645; AAI12002; AAA36444; EAW55448; AAG16627; AAA36445; XP_011512811; XP_016866242; ; CAC87068; NP_001494; EAW55449 | IgG | INHA | P05111 | EAW70774; ACI28454; AAH06391; CAA01158; CAA28040; AAP35600; AAA59166; AAA59167; ; P05111; NP_002182 |
| 1 | IgG | PTPRU | Q92729 | EAX07652; BAG52941; XP_016855484; AAC51938; XP_016855482; NP_573439; AAB07074; BAD92092; AAI46656; ; Q92729; | IgG | INHA | P05111 | EAW70774; ACI28454; AAH06391; CAA01158; CAA28040; AAP35600; AAA59166; AAA59167; ; P05111; NP_002182 |

TABLE 2B-continued

SCLC 2-marker combinations.
Table 2B. AUCs of 2-autoantibody combination in FH Cohort

| | Marker 1 | | | | Marker 2 | | | |
|---|---|---|---|---|---|---|---|---|
| AUC | Antigen | UniProt Accession Number | GenBank Protein Accession Number | Isotype | Antigen | Isotype | UniProt Accession Number | GenBank Protein Accession Number |
| 1 | IgG | NUDT5 | Q9UKK9 | CAA65832; XP_006710332; XP_016855481; XP_016855483; CAA65016; NP_573438; EAX07650; EAX07651; NP_005695; CCQ43332; AAB51343; NP_001181930; EAW86320; CAG33476; NP_001308576; NP_054861; EAW86322; AAF25479; EAW86321; AAF29079; BAF83820; NP_001308577; Q9UKK9; AAF06734; AAH00025 | IgG | INHA | P05111 | EAW70774; ACI28454; AAH06391; CAA01158; CAA28040; AAP35600; AAA59166; AAA59167; ; P05111; NP_002182 |
| 1 | IgG | INHA | P05111 | EAW70774; ACI28454; AAH06391; CAA01158; CAA28040; AAP35600; AAA59166; AAA59167; ; P05111; NP_002182 | IgG | INHBC | P55103 | EAW97011; BAG37366; NP_005529; ; P55103; AAI30325; AAI30327 |
| 1 | IgG | INHA | P05111 | EAW70774; ACI28454; AAH06391; CAA01158; CAA28040; AAP35600; AAA59166; AAA59167; ; P05111; NP_002182 | IgG | ANAPC2 | Q9UJX6 | BAG58931; ; AAF05751; AAH01579; Q9UJX6; AAH32503; NP_037498; AAH09487; EAW88361; BAA92644; BAG57788 |
| 1 | IgG | INHA | P05111 | EAW70774; ACI28454; AAH06391; CAA01158; CAA28040; AAP35600; AAA59166; AAA59167; ; P05111; NP_002182 | IgG | PLD3 | Q8IV08 | EAW56954; EAW56956; XP_005258761; EAW56951; AAH00553; AAH36327; AAH96820; XP_005258766; EAW56957; XP_005258764; EAW56953; EAW56955; Q8IV08; AAB16799; XP_016882037; NP_036400; ; EAW56958; XP_005258767; XP_011524995; XP_016882035; NP_001278240; EAW56950; EAW56952; CAD57504; EAW56959; |

TABLE 2B-continued

SCLC 2-marker combinations.
Table 2B. AUCs of 2-autoantibody combination in FH Cohort

| | | Marker 1 | | | | Marker 2 | | |
|---|---|---|---|---|---|---|---|---|
| AUC | Antigen | UniProt Accession Number | GenBank Protein Accession Number | Isotype | Antigen | Isotype | UniProt Accession Number | GenBank Protein Accession Number |
| 1 | IgG | INHA | P05111 | EAW70774; ACI28454; AAH06391; CAA01158; CAA28040; AAP35600; AAA59166; AAA59167; ; P05111; NP_002182 | IgG | PTEN | P60484 | XP_011524994; BAG57127; XP_005258765; XP_006723185; XP_016882036; XP_016882038; NP_001026866 AAD13528; AMQ76358; EAW50172; AAC51182; AAD38372; CCF23296; ADM26755; ADM26756; AEZ67429; AEZ67430; AMQ76357; CCV19970; DAA64601; NP_001291646; ADM26753; AEZ67432; AEZ67435; AEZ67436; AEZ67437; CAG29302; AHW56562; NP_001291647; AAC08699; AEZ67438; CDI44160; EAW50173; ADZ48535; ARB02560; ADM26759; AEZ67434; AMQ76359; CCV66764; P60484; AAC51183; NP_000305; AAY57327; ADM26754; AEZ67431; BAA24090; EAW50174; EAW50175; AAH05821; AAB66902; ADM26749; ; AEZ67433; |
| 1 | IgG | INHA | P05111 | EAW70774; ACI28454; AAH06391; CAA01158; CAA28040; AAP35600; AAA59166; AAA59167; ; P05111; NP_002182 | IgG | CTSB | P07858 | BAG36351 AAL99369; EAW65631; EAW65632; CAI46053; NP_680093; EAW65633; CAA77178; XP_006716308; XP_016868588; EAW65634; BAG52127; BAG59411; XP_016868586; P07858; BAG52477; XP_011542114; XP_016868590; |

TABLE 2B-continued

SCLC 2-marker combinations.
Table 2B. AUCs of 2-autoantibody combination in FH Cohort

| | | Marker 1 | | | | Marker 2 | | |
|---|---|---|---|---|---|---|---|---|
| AUC | Antigen | UniProt Accession Number | GenBank Protein Accession Number | Isotype | Antigen | Isotype | UniProt Accession Number | GenBank Protein Accession Number |
| | | | | | | | | EAW65630; EAW65635; XP_006716307; XP_016868587; XP_016868589; ; AAL99368; NP_680090; EAW65636; BAF82928; AAH95408; AAC37547; AAA52125; NP_001899; NP_680092; BAG53460; BAG60046; AAH10240; AAA52129; NP_001304166; NP_680091 |
| 1 | IgG | INHA | P05111 | EAW70774; ACI28454; AAH06391; CAA01158; CAA28040; AAP35600; AAA59166; AAA59167; ; P05111; NP_002182 | IgG | SSRP1 | Q08945 | CCQ43203; EAW73734; XP_016873669; AAH05116; NP_003137; Q08945; AAA58660; ; BAD92369; EAW73735; AAH91486; XP_016873670 |
| 1 | IgG | INHA | P05111 | EAW70774; ACI28454; AAH06391; CAA01158; CAA28040; AAP35600; AAA59166; AAA59167; ; P05111; NP_002182 | IgG | MMP15 | P51511 | ; AAP35361; EAW82966; P51511; BAA13071; CAA88373; NP_002419; EAW82965; AAH55428; ABJ53423; BAA22225; AAH36495 |
| 1 | IgG | INHA | P05111 | EAW70774; ACI28454; AAH06391; CAA01158; CAA28040; AAP35600; AAA59166; AAA59167; ; P05111; NP_002182 | IgG | B3GNT6 | Q6ZMB0 | BAB88882; BAD18819; BAG36432; ; AAI03909; AAI03910; BAC87028; AAI03911; EAW75013; AAH25357; NP_619651; Q6ZMB0; BAF85462 |
| 1 | IgG | INHA | P05111 | EAW70774; ACI28454; AAH06391; CAA01158; CAA28040; AAP35600; AAA59166; AAA59167; ; P05111; NP_002182 | IgG | ACP1 | P24666 | CAA76416; NP_004291; AAB59628; BAF82623; AAI06012; AAP35800; AAB59355; AAC52067; EAX01115; EAX01116; AAH07422; AAY14958; EAX01111; BAD93075; AAB27085; NP_001035739; |

TABLE 2B-continued

SCLC 2-marker combinations.
Table 2B. AUCs of 2-autoantibody combination in FH Cohort

| | | Marker 1 | | | | | Marker 2 | |
|---|---|---|---|---|---|---|---|---|
| AUC | Antigen | UniProt Accession Number | GenBank Protein Accession Number | Isotype | Antigen | Isotype | UniProt Accession Number | GenBank Protein Accession Number |
| | | | | | | | | EAX01112; P24666; AEE61174; AAB59354; NP_009030; ; EAX01113; EAX01114; BAF84550 |
| 1 | IgG | INHA | P05111 | EAW70774; ACI28454; AAH06391; CAA01158; CAA28040; AAP35600; AAA59166; AAA59167; ; P05111; NP_002182 | IgM | NLRP7 | Q8WX94 | AAL69963; XP_006723138; EAW72313; BAG63894; DAA01246; ; NP_996611; BAG60806; XP_006723139; XP_011524898; XP_011524903; EAW72315; EAW72316; AAO18158; AAI09125; AAI09126; XP_011524901; EAW72314; Q8WX94; NP_001120727; NP_631915 |
| 1 | IgG | INHA | P05111 | EAW70774; ACI28454; AAH06391; CAA01158; CAA28040; AAP35600; AAA59166; AAA59167; ; P05111; NP_002182 | IgM | CDH5 | P33151 | AAI17521; P33151; BAG62180; BAG62074; ; BAD93145; AAH96364; XP_011521103; BAA87418; CAA42468; AAH96363; AAH96365; EAW83009; BAG62052; AAB41796; CAA56306; NP_001786 |
| 1 | IgG | INHA | P05111 | EAW70774; ACI28454; AAH06391; CAA01158; CAA28040; AAP35600; AAA59166; AAA59167; ; P05111; NP_002182 | IgM | HSPG2 | P98160 | AAB95116; P98160; AAI09205; AAA52700; XP_016856611; NP_001278789; EAW94994; EAW94995; EAW94996; CAA44373; CAC18534; EAW94997; BAD93088; XP_011539620; XP_016856609; NP_005520; AAL79552; AAB21121; ; AAA52699; XP_016856610 |
| 1 | IgG | INHA | P05111 | EAW70774; ACI28454; AAH06391; CAA01158; CAA28040; AAP35600; | IgM | SPINK1 | P00995 | ABH06584; AAA36521; CAA68697; P00995; ; AAG00531; NP_001341895; |

TABLE 2B-continued

SCLC 2-marker combinations.
Table 2B. AUCs of 2-autoantibody combination in FH Cohort

| | | Marker 1 | | | | Marker 2 | | |
|---|---|---|---|---|---|---|---|---|
| AUC | Antigen | UniProt Accession Number | GenBank Protein Accession Number | Isotype | Antigen | Isotype | UniProt Accession Number | GenBank Protein Accession Number |
| | | | | AAA59166; AAA59167; ; P05111; NP_002182 | | | | ABH06583; EAW61817; NP_003113; AAH25790; AAA36522 |
| 1 | IgG | INHA | P05111 | EAW70774; ACI28454; AAH06391; CAA01158; CAA28040; AAP35600; AAA59166; AAA59167; ; P05111; NP_002182 | IgM | CD34 | P28906 | CAJ01226; EAW93459; AAN15135; BAF85719; BAG57638; BAG62486; AAH39146; AAB25223; BAE46748; AAA03181; NP_001764; AAA03659; CAD98000; ; P28906; AAF14634; AAM82157; AAB25222; EAW93458; BAF84218; NP_001020280 |
| 1 | IgG | INHA | P05111 | EAW70774; ACI28454; AAH06391; CAA01158; CAA28040; AAP35600; AAA59166; AAA59167; ; P05111; NP_002182 | IgM | MAPRE1 | Q15691 | AAI06069; AAC09471; EAW76349; BAG59745; AAI28443; NP_036457; ; Q15691; AAI09282; EAW76348; BAG35484; XP_011526998 |
| 1 | IgG | INHA | P05111 | EAW70774; ACI28454; AAH06391; CAA01158; CAA28040; AAP35600; AAA59166; AAA59167; ; P05111; NP_002182 | IgM | NADSYN1 | Q6IA69 | BAC65148; Q6IA69; EAW74792; BAB14034; CAG33567; BAA91722; BAG53556; AAH03638; AAH03666; NP_060631; ; EAW74793 |
| 1 | IgG | INHA | P05111 | EAW70774; ACI28454; AAH06391; CAA01158; CAA28040; AAP35600; AAA59166; AAA59167; ; P05111; NP_002182 | IgM | SPINT2 | O43291 | ; BAA25024; AAV38918; AAC02781; EAW56766; AAB84031; AAV38919; CAG28532; NP_001159575; EAW56767; AAH11951; O43291; BAG59653; CAE06264; AAH11955; BAF84221; AAH12868; NP_066925; AAH07705; AAV38920; AEE61093; AAH01668 |
| 1 | IgG | INHA | P05111 | EAW70774; ACI28454; | IgM | CA9 | Q16790 | CBL94025; CAB82444; |

TABLE 2B-continued

SCLC 2-marker combinations.
Table 2B. AUCs of 2-autoantibody combination in FH Cohort

| | | Marker 1 | | | | Marker 2 | | |
|---|---|---|---|---|---|---|---|---|
| AUC | Antigen | UniProt Accession Number | GenBank Protein Accession Number | Isotype | Antigen | Isotype | UniProt Accession Number | GenBank Protein Accession Number |
| 1 | IgG | INHA | P05111 | AAH06391; CAA01158; CAA28040; AAP35600; AAA59166; AAA59167; ; P05111; NP_002182 | IgM | HIF1A | Q16665 | NP_001207; ; Q16790; ABL67717; ALQ33410; ALQ33411; EAW58359; CAA47315; AAH14950 ; AAF20139; AAG43026; BAG35314; EAW80807; EAW80808; AAF20140; BAG59438; NP_001521; AAF20149; BAG65259; ACN88547; AAC68568; BAB70608; BAI49183; BAM28632; BAG61496; EAW80806; AAP88778; AAC50152; BAG65167; AAC51210; NP_001230013; NP_851397; EAW80809; Q16665; AAH12527 |
| 1 | IgG | INHA | P05111 | EAW70774; ACI28454; AAH06391; CAA01158; CAA28040; AAP35600; AAA59166; AAA59167; ; P05111; NP_002182 | IgM | TFRC | P02786 | AAH01188; CAD97930; NP_001121620; NP_001300895; NP_003225; EAW53670; EAW53672; AAF04564; EAW53671; EAW53673; AAA61153; BAF84412; BAD92491; CAA25527; ABF47088; P02786; NP_001300894; ; BAH11872 |
| 1 | IgG | INHA | P05111 | EAW70774; ACI28454; AAH06391; CAA01158; CAA28040; AAP35600; AAA59166; AAA59167; ; P05111; NP_002182 | IgM | CDH23 | Q9H251 | BAB47441; AAG48303; CAB59256; AAT72162; AAI08255; XP_011538346; EAW54429; BAB61902; AAG27034; AAT72166; AAH65284; AAI39904; XP_006718003; NP_001165403; NP_001165405; NP_443068; AAT72165; AAI36977; |

TABLE 2B-continued

SCLC 2-marker combinations.
Table 2B. AUCs of 2-autoantibody combination in FH Cohort

| | | Marker 1 | | | | | Marker 2 | |
|---|---|---|---|---|---|---|---|---|
| AUC | Antigen | UniProt Accession Number | GenBank Protein Accession Number | Isotype | Antigen | Isotype | UniProt Accession Number | GenBank Protein Accession Number |
| | | | | | | | | XP_011538348; XP_011538351; XP_011538353; NP_001165404; EAW54428; AAH 11570; AAI36978; XP_006718005; XP_011538345; XP_011538354; XP_016871995; NP_001165406; NP_001165407; ; EAW54432; BAC04231; AAH32581; XP_011538350; XP_016871988; XP_016871997; NP_001165401; NP_071407; EAW54430; AAQ88980; XP_011538341; XP_011538344; XP_016871990; XP_016871992; XP_016871994; NP_001165402; CCQ43681; EAW54427; BAB84986; XP_011538349; XP_016871989; XP_016871991; XP_016871993; EAW54426; EAW54431; Q9H251; AAT72161; XP_011538347; XP_016871996 |
| 1 | IgG | INHA | P05111 | EAW70774; ACI28454; AAH06391; CAA01158; CAA28040; AAP35600; AAA59166; AAA59167; ; P05111; NP_002182 | IgM | SLMO2 | Q9Y3B1 | Q9Y3B1; ; NP_057129; AAH13969; AAD34102; NP_001243332; EAW75443; BAG60414; AAH10649; EAW75442; BAA92114 |
| 1 | IgG | INHA | P05111 | EAW70774; ACI28454; AAH06391; CAA01158; CAA28040; AAP35600; AAA59166; AAA59167; ; P05111; NP_002182 | IgM | GRAP2 | O75791 | AAC69273; AAF60319; NP_001278755; EAW60357; EAW60360; AAF31758; AAD41782; BAH14008; CAG46647; AAD13027; CAA09757; BAH13929; XP_006724439; EAW60356; BAH13978; NP_001278753; NP_001278754; NP_001278757; |

TABLE 2B-continued

SCLC 2-marker combinations.
Table 2B. AUCs of 2-autoantibody combination in FH Cohort

| | | Marker 1 | | | | Marker 2 | | |
|---|---|---|---|---|---|---|---|---|
| AUC | Antigen | UniProt Accession Number | GenBank Protein Accession Number | Isotype | Antigen | Isotype | UniProt Accession Number | GenBank Protein Accession Number |
| | | | | | | | | O75791; AAD04926; AAL58573; AAH26002; CAG30384; NP_004801; ; CAG38761; EAW60358; EAW60359; EAW60361; AAF60320; BAH13944; BAH13969; BAG35685; AAH25692; CAA77021 |
| 1 | IgG | INHBC | P55103 | EAW97011; BAG37366; NP_005529; ; P55103; AAI30325; AAI30327 | IgG | B3GNT6 | Q6ZMB0 | BAB88882; BAD18819; BAG36432; ; AAI03909; AAI03910; BAC87028; AAI03911; EAW75013; AAH25357; NP_619651; Q6ZMB0; BAF85462 |
| 1 | IgG | INHBC | P55103 | EAW97011; BAG37366; NP_005529; ; P55103; AAI30325; AAI30327 | IgG | ACP1 | P24666 | CAA76416; NP_004291; AAB59628; BAF82623; AAI06012; AAP35800; AAB59355; AAC52067; EAX01115; EAX01116; AAH07422; AAY14958; EAX01111; BAD93075; AAB27085; NP_001035739; EAX01112; P24666; AEE61174; AAB59354; NP_009030; ; EAX01113; EAX01114; BAF84550 |
| 1 | IgG | INHBC | P55103 | EAW97011; BAG37366; NP_005529; ; P55103; AAI30325; AAI30327 | IgM | SPINT2 | O43291 | ; BAA25024; AAV38918; AAC02781; EAW56766; AAB84031; AAV38919; CAG28532; NP_001159575; EAW56767; AAH11951; O43291; BAG59653; CAE06264; AAH11955; BAF84221; AAH12868; NP_066925; AAH07705; |

TABLE 2B-continued

SCLC 2-marker combinations.
Table 2B. AUCs of 2-autoantibody combination in FH Cohort

| AUC | Marker 1 | | | | Marker 2 | | | |
|---|---|---|---|---|---|---|---|---|
| | Antigen | UniProt Accession Number | GenBank Protein Accession Number | Isotype | Antigen | Isotype | UniProt Accession Number | GenBank Protein Accession Number |
| 1 | IgG | CTSB | P07858 | AAL99369; EAW65631; EAW65632; CAI46053; NP_680093; EAW65633; CAA77178; XP_006716308; XP_016868588; EAW65634; BAG52127; BAG59411; XP_016868586; P07858; BAG52477; XP_011542114; XP_016868590; EAW65630; EAW65635; XP_006716307; XP_016868587; XP_016868589; ; AAL99368; NP_680090; EAW65636; BAF82928; AAH95408; AAC37547; AAA52125; NP_001899; NP_680092; BAG53460; BAG60046; AAH10240; AAA52129; NP_001304166; NP_680091 | IgG | ACP1 | P24666 | AAV38920; AEE61093; AAH01668; CAA76416; NP_004291; AAB59628; BAF82623; AAI06012; AAP35800; AAB59355; AAC52067; EAX01115; EAX01116; AAH07422; AAY14958; EAX01111; BAD93075; AAB27085; NP_001035739; EAX01112; P24666; AEE61174; AAB59354; NP_009030; ; EAX01113; EAX01114; BAF84550 |
| 1 | IgG | CTSB | P07858 | AAL99369; EAW65631; EAW65632; CAI46053; NP_680093; EAW65633; CAA77178; XP_006716308; XP_016868588; EAW65634; BAG52127; BAG59411; XP_016868586; P07858; BAG52477; XP_011542114; XP_016868590; EAW65630; EAW65635; XP_006716307; XP_016868587; XP_016868589; ; AAL99368; NP_680090; EAW65636; BAF82928; AAH95408; AAC37547; AAA52125; NP_001899; | IgM | HSPG2 | P98160 | AAB95116; P98160; AAI09205; AAA52700; XP_016856611; NP_001278789; EAW94994; EAW94995; EAW94996; CAA44373; CAC18534; EAW94997; BAD93088; XP_011539620; XP_016856609; NP_005520; AAL79552; AAB21121; ; AAA52699; XP_016856610 |

TABLE 2B-continued

SCLC 2-marker combinations.
Table 2B. AUCs of 2-autoantibody combination in FH Cohort

| | Marker 1 | | | | Marker 2 | | | |
|---|---|---|---|---|---|---|---|---|
| AUC | Antigen | UniProt Accession Number | GenBank Protein Accession Number | Isotype | Antigen | Isotype | UniProt Accession Number | GenBank Protein Accession Number |
| 1 | IgG | CTSB | P07858 | NP_680092; BAG53460; BAG60046; AAH10240; AAA52129; NP_001304166; NP_680091 AAL99369; EAW65631; EAW65632; CAI46053; NP_680093; EAW65633; CAA77178; XP_006716308; χP_016868588; EAW65634; BAG52127; BAG59411; XP_016868586; P07858; BAG52477; XP_011542114; XP_016868590; EAW65630; EAW65635; XP_006716307; XP_016868587; XP_016868589; ; AAL99368; NP_680090; EAW65636; BAF82928; AAH95408; AAC37547; AAA52125; NP_001899; NP_680092; BAG53460; BAG60046; AAH 10240; AAA52129; NP_001304166; NP_680091 | IgM | NADSYN1 | Q6IA69 | BAC65148; Q6IA69; EAW74792; BAB14034; CAG33567; BAA91722; BAG53556; AAH03638; AAH03666; NP_060631; ; EAW74793 |
| 1 | IgG | MMP15 | P51511 | ; AAP35361; EAW82966; P51511; BAA13071; CAA88373; NP_002419; EAW82965; AAH55428; ABJ53423; BAA22225; AAH36495 | IgG | ACP1 | P24666 | CAA76416; NP_004291; AAB59628; BAF82623; AAI06012; AAP35800; AAB59355; AAC52067; EAX01115; EAX01116; AAH07422; AAY14958; EAX01111; BAD93075; AAB27085; NP_001035739; EAX01112; P24666; AEE61174; AAB59354; NP_009030; ; EAX01113; EAX01114; BAF84550 |

Since we have run these arrays on over 1,000 control specimens over the past several years for various studies, we queried our database to determine how frequently these markers are identified in control specimens and found that they are not (X/Y positive).

A unique feature of SCLC, which also serves as a proof of concept, is that autoantibodies targeting CNS antigens are frequently encountered in SCLC patients which occasionally give rise PNS. Highlighting a key advantage to the disclosed autoantibody-antigen complex detection method, we can identify several PNS autoantibody-antigen complexes in the majority of our SCLC cases, while un-complexed autoantibodies (which are used clinically to diagnose PNS) are reportedly present in less than 20% of SCLC (32) (Table 2B).

TABLE 2B

Paraneoplastic syndrome-associated antibodies in SCLC

| Antibody | Syndrome | Approximate frequency of free autoantibody in SCLC patient without PNS | Correct call averages of autoantibody-antigen complexes at 92% NPV in FH and VB cohorts |
| --- | --- | --- | --- |
| Anti-CRMP | Encephalomyelitis | 10% | 50% |
| Anti-VGCC | Lambert-Eaton | 5% | 38% |
| Anti-SOX | Lambert-Eaton | 25-35% | 50% |
| Anti-GAD65 | Lambert-Eaton | 15% | 64% |
| Anti-Rc | CAR | 10-15% | 42% |

Additionally, we had added some of the PNS markers from Table 2A to our panel prior to running Fred Hutch specimens (the CHS specimens were analyzed earlier in the year) and found four markers capable of distinguishing SCLC case from control with perfect or nearly perfect sensitivity and specificity (Table 3, the top 7 entries are for IgG and the bottom 7 for IgM). Specifically, anti-Ma and anti-Ta displayed 100% sensitivity and specificity within the Fred Hutch cohort.

TABLE 3

Fred Hutch PNS Autoantibodies (N = 26)

| | AUC | Specificity | Sensitivity |
| --- | --- | --- | --- |
| IgG CRMP5 | 0.883 | 0.947368 | 0.785714 |
| IgG PNMA1 (Ma) | 1 | 1 | 1 |
| IgG PNMA2 (Ta) | 1 | 1 | 1 |
| IgG CDR2 (Yo) | 0.928 | 0.769231 | 1 |
| IgG Sox | 0.876 | 0.846154 | 0.846154 |
| IgG GABA.b | 0.627 | 0.538462 | 0.769231 |
| IgG GAD65 | 0.963 | 0.923077 | 0.884615 |
| IgM CRMP5 | 0.692 | 0.736842 | 0.642857 |
| IgM PNMA1 (Ma) | 0.635 | 0.538462 | 0.730769 |
| IgM PNMA2 (Ta) | 0.525 | 0.96 | 0.230769 |

TABLE 3-continued

Fred Hutch PNS Autoantibodies (N = 26)

| | AUC | Specificity | Sensitivity |
| --- | --- | --- | --- |
| IgM CDR2 (Yo) | 0.642 | 0.538462 | 0.769231 |
| IgM Sox | 0.436 | 0.846154 | 0.230769 |
| IgM GABA.b | 0.781 | 0.653846 | 0.846154 |
| IgM GAD65 | 0.541 | 0.192308 | 1 |

We have not previously encountered autoantibody markers with this degree of performance in any other dataset of any cancer type. This unexpected result is based on the disclosed technique, as we are identifying autoantibody-antigen complexes, and not free circulating antibody (FIG. 2).

We also subjected the CHS SCLC specimens to the proteomic and glycomic probing strategies. We were able to identify 51 markers that were significantly up-regulated and 32 markers that were significantly down-regulated between cases and controls (Table 4). The glycomic analyses revealed 4 anti-SleX up-regulated markers and 34 anti-SleX down-regulated markers (Table 4). Anti-SleA studies also identified significantly different markers, 13 of which were up-regulated and 17 of which were down-regulated.

TABLE 4

Proteomic and Glycomic Biomarkers for SCLC

| Marker Type and Direction in SCLC Cases Compared to Controls | Gene Name | UniProt Accession | GenBank Protein Accession |
| --- | --- | --- | --- |
| Proteomic Up | PSENEN | Q9NZ42 | NP_758844; BAG35166; AAH09575; NP_001268461; Q9NZ42; AAF67646 |
| Proteomic Up | ERCC1 | P07992 | AAL56574; AAA35810; XP_016881950; AAH52813; XP_016881949; EAW57350; BAB62810; NP_001974; NP_973730; BAG52472; AAH08930; AAV38609; AAA52394; XP_016881952; XP_016881955; |

TABLE 4-continued

Proteomic and Glycomic Biomarkers for SCLC

| Marker Type and Direction in SCLC Cases Compared to Controls | Gene Name | UniProt Accession | GenBank Protein Accession |
|---|---|---|---|
| | | | AAC16253; BAG37398; XP_005258692; XP_016881954; AAA52395; AAM34796; XP_005258693; NP_001159521; EAW57348; EAW57349; P07992; XP_005258691; XP_011524912; XP_016881951; XP_016881953; AAD14434; XP_005258694; XP_016881948 |
| Proteomic Up | PDIA3 | P30101 | BAG56782; AAC51518; EAW77236; CEO43495; AAH36000; AAH71878; AAC50331; CAA89996; BAA11928; CAK18760; CCD35251; EAW77234; EAW77235; P30101; BAG52144; ; BAA03759; ACF94491; BAG52151; AAH14433; ACI46022; NP_005304 |
| Proteomic Up | TIMP1 | P01033 | CAR95107; EAW59316; CAG28566; CAG46779; CAA26902; AAA75558; P01033; BAG52016; BAG58865; ; CAA00898; AAH00866; AAD14009; CAA26443; EAW59315; BAG34878; AAA52436; AAA63234; AAX47478; NP_003245; CBX47572; XP_016885255; BAA01913; CAS92765 |
| Proteomic Up | LPXN | O60711 | EAW73809; BAG36111; CAG38768; XP_011543690; BAG62693; XP_011543693; XP_016874068; NP_001137467; AAC16014; BAH12983; AAH19035; ; EAW73808; XP_011543695; O60711; BAG62583; XP_006718813; NP_001294880; XP_011543692; NP_004802; EAW73807; BAD96885; XP_011543696 |
| Proteomic Up | CTLA4 | P16410 | ADV60199; NP_005205; AAA52127; AAF02499; ADV60197; ADV60200; AAH74893; NP_001032720; AAL40932; ABG78999; EAW70354; AAL07473; AAH69566; AAB59385; ; ADV60198; AAV66331; AAY00166; P16410; BAG36473; AAH74842; AAD00698; AAA52773; AAK13084; ABC67470; AAO17066; AAX93176; ABG79000; CAY55959; AAL96664; AAH70162; ABG85285 |
| Proteomic Up | PSCD4 | Q9UIA0 | AAH41161; EAW60155; AAF28896; BAA92107; AAH17780; NP_001304953; ; BAG37529; EAW60154; BAB15718; XP_011528450; NP_037517; EAW60156; BAG65270; CAG30437; Q9UIA0; AAF15389; XP_011528449 |
| Proteomic Up | ORM1 | P02763 | BAH 14578; AAI04819; CAA29229; BAG34972; NP_000598; AAI43315; AAA35515; CAA26397; EAW87416; P02763; AAH26238; AAI04821; AAV38593; ; BAA34292; AAI43314; ACJ13638 |
| Proteomic Up | AARS | P49588 | EAW51839; ; AAH11451; P49588; BAG61157; BAA06808; EAW51838; NP_001596; EAW51840; BAD96544 |
| Proteomic Up | TXN | P10599 | BAF82197; AAA74596; CAA38410; CAG28593; AAN33187; AEE61109; AAF86466; AAH03377; EAW59060; AAG34699; BAA05742; NP_003320; AAH54866; CAA54687; NP_001231867; AAC17430; AFH41799; ; EAW59059; P10599; AAF87085 |
| Proteomic Up | RANBP1 | P43487 | EAX02988; EAX02989; BAG56987; XP_016884379; BAG53504; EAX02991; EAX02993; XP_011528592; EAX02990; AEE61231; XP_011528591; EAX02992; BAH13377; CAG30442; XP_011528593; XP_016884380; NP_001265570; EAX02986; P43487; BAA07269; NP_002873; ; EAX02987; BAD97226; CAA58592; XP_016884381; NP_001265568; EAX02994; NP_001265569 |
| Proteomic Up | IL13 | P35225 | AAH96141; AAA36107; NP_001341922; AAA83738; AAB01681; CBX47445; EAW62326; CAA48823; NP_001341920; NP_001341921; NP_002179; AAH96139; AAH96140; AAH96138; CAA48824; P35225; ; AAK53823; EAW62327; AAC03535; EAW62324; EAW62325 |
| Proteomic Up | STK11 | Q15831 | AAB97833; AAF97257; EAW69538; EAW69540; XP_005259674; AAC39527; CAH59749; XP_011526511; BAD92790; AAG17221; AAH19334; ALQ33798; XP_005259675; AAC15742; AAB05809; AAH07981; ABR45718; ADD71158; ; NP_000446; EAW69539; Q15831; BAG37374; ALQ33797 |
| Proteomic Up | PHLPPL | Q6ZVD8 | EAW59226; AAH35267; AAI29984; ; BAC85924; EAW59225; Q6ZVD8; BAA76775; BAA91943; NP_001275932; AAI29928; NP_055835 |
| Proteomic Up | PPIE | Q9UNP9 | EAX07255; BAG52903; BAG36418; AAI07737; AAC00006; XP_016855540; NP_001306222; AAZ93379; XP_006710353; NP_001181936; BAG65464; XP_006710352; XP_016855541; AAD19906; BAF85783; ; EAX07256; Q9UNP9; AAC00007; AAH04898; NP_006103; AAD19907; AAH08451; NP_982281; XP_011538803 |
| Proteomic Up | ENO2 | P09104 | CBN61368; NP_001966; EAW88710; AAB59554; AAH02745; AAA52388; CAA36215; EAW88709; P09104; CAG38819; AAB51320; BAH12015; BAG35316; ACJ13661; CAA32505; ; EAW88711; CAA31512; BAG54062; BAF83214; AAP36047 |
| Proteomic Up | LAMB1 | P07942 | EAL24388; EAW83423; AAA59485; EAW83424; AAA59482; AAA59486; P07942; AAH26018; AAS07514; BAG64534; XP_016867691; CCQ43174; AAI13456; NP_002282; AAA59487; XP_016867690 |
| Proteomic Up | IL17RA | Q96F46 | EAW57741; NP_001276834; CAL44890; NP_055154; ADY18334; ; CAV28582; AAB99730; CCB07364; EAW57739; EAW57738; Q96F46; AAH11624; CAJ86450; EAW57740 |

TABLE 4-continued

Proteomic and Glycomic Biomarkers for SCLC

| Marker Type and Direction in SCLC Cases Compared to Controls | Gene Name | UniProt Accession | GenBank Protein Accession |
|---|---|---|---|
| Proteomic Up | TYR | P14679 | AAA61242; AGV39053; AGV39060; AGV39067; AGV39068; AGV39078; AGV39080; AGV39117; AGV39126; AGV39133; AGV39134; AGV39141; AGV39143; AGV39144; AGV39150; AGV39174; AGV39178; AGV39186; AGV39190; AGV39198; AGV39199; AGV39200; XP_011541272; AGV39064; AGV39073; AGV39074; AGV39075; AGV39098; AGV39107; AGV39112; AGV39125; AGV39128; AGV39129; AGV39130; AGV39138; AGV39142; AGV39145; AGV39152; AGV39153; AGV39204; AGV39207; EAW59357; P14679; BAM75356; NP_000363; AGV39065; AGV39100; AGV39103; AGV39106; AGV39121; AGV39146; AGV39149; AGV39155; AGV39158; AGV39161; AGV39177; AGV39197; AGV39203; AGV39208; BAM75358; AAA61241; ; AGV39062; AGV39085; AGV39093; AGV39105; AGV39116; AGV39120; AGV39131; AGV39140; AGV39154; AGV39210; EAW59356; AAH27179; AAB60319; AGV39056; AGV39072; AGV39079; AGV39081; AGV39097; AGV39115; AGV39118; AGV39124; AGV39137; AGV39147; AGV39148; AGV39157; AGV39182; AGV39196; AGV39201; AGV39202; AAA61244; AAK00805; AGV39055; AGV39059; AGV39063; AGV39066; AGV39069; AGV39076; AGV39088; AGV39101; AGV39109; AGV39110; AGV39114; AGV39136; AGV39139; AGV39179; AGV39180; AGV39183; AGV39189; AHZ44440; CAA34205; BAM75357; AAG38762; AGV39057; AGV39058; AGV39061; AGV39119; AGV39127; AGV39160; AGV39169; AGV39185; AGV39191; AGV39206; AAD13984; CAA68756; AAD13985; AGV39051; AGV39052; AGV39070; AGV39071; AGV39077; AGV39094; AGV39099; AGV39108; AGV39111; AGV39113; AGV39135; AGV39151; AGV39156; AGV39159; AGV39163; AGV39181; AGV39184; AGV39187; AGV39193; AGV39195; AGV39205; AGV39209; AAB37227 |
| Proteomic Up | GRIN2D | O15399 | XP_011525174; NP_000827; AAC15910; O15399; EAW52346; BAD92529 |
| Proteomic Up | ENPEP | Q07075 | CAP09202; CAP09197; CAP09200; CAP09201; AAA16876; XP_016863366; CAP09203; CAP09206; EAX06261; CAP09205; AAA35522; CCQ43158; CAP09199; CAP09204; Q07075; BAG36206; CAP09198; AAH94770; NP_001968; CAP09207 |
| Proteomic Up | NOTCH3 | Q9UM47 | ACL52278; CAA55955; AAB91371; AAC14346; AAC15789; AAC04897; EAW84466; XP_005259981; ; Q9UM47; BAD92684; NP_000426 |
| Proteomic Up | LGALS7 | P47929 | EAW56817; CAG33198; NP_002298; AAH61588; AAA86820; AAH42911; EAW56818; NP_001035972; CAD48636; AAH73743; AAA67899; P47929 |
| Proteomic Up | GDF11 | O95390 | AAF21630; NP_005802; ; AAF21631; EAW96831; O95390; EAW96830; AAC72852; CAD38427; XP_006719257 |
| Proteomic Up | CEACAM5 | P06731 | CAA79884; AAH34671; XP_016881634; XP_016881635; CAA44076; BAN83790; EAW57059; P06731; CAH18191; AAA51967; AAA62835; EAW57060; BAN83789; AAA51963; NP_001278413; AAA51964; AAA51972; NP_004354; AAB59513; CAG27582; CAA34474; XP_005258470; NP_001295327; ; BAD96821; AAA51968; XP_011524624 |
| Proteomic Up | RBL1 | P28749 | NP_001310210; NP_002886; AAD14290; AAH32247; AAA36397; XP_011527257; EAW76088; EAW76089; P28749; XP_011527260; NP_001310211; BAF83069; NP_899662; AAA02489; XP_006723905; XP_016883481 |
| Proteomic Up | CEP164 | Q9UPV0 | AAH00602; AAH54015; XP_016872856; XP_016872861; XP_016872866; XP_011540976; XP_016872859; XP_016872860; XP_016872862; XP_016872868; ; CAB56023; XP_005271510; XP_006718851; XP_011540992; XP_016872870; EAW67319; BAG64184; XP_016872869; XP_016872873; EAW67321; BAA83004; XP_005271513; XP_005271514; XP_016872855; XP_016872863; XP_016872867; Q9UPV0; BAC86384; BAH 13870; XP_016872864; XP_016872865; XP_016872874; XP_016872875; NP_001258862; NP_055771; EAW67318; XP_016872857; XP_016872871; XP_016872872; CCQ43474; EAW67320; BAA91677; CAB70664; XP_006718857; XP_016872853; XP_016872854; XP_016872858 |
| Proteomic Up | CSRP1 | P21291 | EAW91371; AAH04265; CAH10559; ACF94473; ; AAV38327; NP_001180499; AAA58431; CDI44529; BAG63590; AAA35720; NP_004069; AAH32493; NP_001180501; P21291; BAD92993; BAF85742; CAH10496; EAW91370; ACV87179; BAG53741; BAD18652; BAF82822; BAG65246; NP_001180500 |

TABLE 4-continued

Proteomic and Glycomic Biomarkers for SCLC

| Marker Type and Direction in SCLC Cases Compared to Controls | Gene Name | UniProt Accession | GenBank Protein Accession |
|---|---|---|---|
| Proteomic Up | EPHB6 | O15197 | AAD03058; XP_011514181; BAA21560; ABV55388; NP_001267724; EAW51902; AAI10607; XP_011514182; XP_011514183; EAL23775; XP_011514184; XP_006715944; EAW51901; AAI10608; ; EAW51903; O15197; NP_001267723; NP_004436; AAP20939; EAW51900 |
| Proteomic Up | CTSC | P53634 | AFK75980; AFK76003; AFK76008; AAQ08887; BAG34864; AAI09387; AAI13851; AAI13898; AFK75978; AFK75979; AFK75986; AFK75989; AFK75990; AFK75992; AFK75997; AFK75998; AFK76029; EAW59364; AAL48195; AAI00893; AAI00894; AFK75981; AFK75987; AFK75995; AFK75999; AFK76007; AFK76011; AFK76023; CAA60671; AFK75988; AFK76001; AFK76006; AFK76012; AFK76016; AFK76025; AFK76026; AFK76028; EAW59363; AAI10072; NP_001107645; AFK75983; AFK76013; AFK76027; AAL48192; BAD96758; BAF84806; AAH54028; AAI00895; CAD97897; AFK75976; AFK75977; AFK75984; AFK75996; AFK76017; P53634; AAL48191; NP_001805; NP_680475; AAC51341; AFK75982; AFK75985; AFK75993; AFK76002; AFK76005; AFK76009; AFK76010; AFK76014; AFK76024; AAQ08888; AAI00892; ; AFK75991; AFK75994; AFK76000; AFK76004; AFK76015; AFK76018; AFK76019; AFK76020; AFK76021; AFK76022; BAG58920 |
| Proteomic Up | IL12RB2 | Q99665 | AAT45456; EAX06499; AAI04773; XP_011539686; Q99665; AAB36675; NP_001245145; AAI04775; XP_005270884; XP_011539685; NP_001306162; ; EAX06500; BAG61833; XP_016856691; BAH14896; AAI43250; XP_006710680; NP_001245144; BAG57715; XP_016856692; NP_001245143; XP_005270882; XP_005270885; XP_016856693; NP_001550 |
| Proteomic Up | PPP2R4 | Q15257 | CAB77602; EAW87883; BAG64070; NP_821067; EAW87878; BAD96508; XP_011517138; XP_016870377; CAB77601; XP_011517137; NP_001180326; NP_821070; AAF24143; EAW87877; EAW87884; EAW87885; CAA60163; EAW87881; XP_011517139; BAG56817; XP_011517140; NP_001258761; ; EAW87876; BAG59687; BAG63436; CAH18670; NP_066954; CAB77603; EAW87879; EAW87880; EAW87882; Q15257; AAH02545; AAH11605; AAV38922; CAA51873; XP_011517136; NP_821068 |
| Proteomic Up | IL10 | P22301 | AAI04253; AAI04254; CAG46825; AAL06594; CAA51942; AAA63207; AAA80104; AAC03534; ACE95684; ; AAK19173; ACV30066; CAG46790; ABB01008; EAW93524; AAK38162; NP_000563; P22301; CAA55201; CAA82914; ACE95685 |
| Proteomic Up | CCR2 | P41597 | AGC02842; P41597; AAB57791; AGC02846; EAW64761; AAA19120; ; ABW17217; AGC02843; AGC02847; EAW64760; AAI36397; XP_011532371; AGC02849; AGC02850; NP_001116513; AAC51636; AGC02848; CAD88094; EAW64762; AAH95540; BAA06253; AAB57792; AAC51637; AAN16400; AGC02851; BAF85374; BAF85609; CAA64835; ABW17216; AGC02844; AGC02845; AAH74751; AAI26453; AAA19119; NP_001116868 |
| Proteomic Up | HLADR | P01903 | ARB08430; ARB08434; ARB08447; CAA23783; CAP40293; BAG35943; CAG33294; AAA59787; CAA23782; CAA23787; AAV74560; AHW47952; ARB08429; ARB08431; ARB08432; ARB08442; ARB08444; EAX03629; BAH13427; AAA36283; NP_061984; ARB08428; ARB08433; ARB08437; ARB08441; ARB08443; ARB08445; ARB08446; AAH32350; AAA36302; AAV74559; AHW47969; ARB08439; CAA25076; EAX03631; BAG62899; AAA59783; ARB08435; ARB08438; P01903; BAG59560; AAA36272; AAA36275; AAA59785; AAA36301; AHW47918; ARB08440; CAB06609; CAP40292; EAX03630; BAG62726; AAO23887; AHW47935; ARB08436; AAH71659; ; BAG65256 |
| Proteomic Up | CCSP2 | Q5GFL6 | ; XP_016871668; Q5GFL6; XP_011538056; XP_016871667; BAC87116; AAT77225; AAI28589; XP_011538059; NP_001258975; CAD60276; NP_001307733; AAT77226; BAC85505; XP_016871669; EAW49475; CAE83814; XP_016871666; XP_016871670 |
| Proteomic Up | ILK | Q13418 | EAW68688; AAH01554; XP_005252962; ; BAH 12404; NP_001014794; NP_001265371; Q13418; BAD92653; BAH11516; NP_001265370; NP_004508; AAF74449; XP_011518367; XP_016873161; CAB99253; CAG28601; EAW68690; AAC16892; EAW68689; CAH18077; ACJ13679; XP_005252961; NP_001014795 |
| Proteomic Up | SERPIND1 | P05546 | EAX02941; P05546; ; AAA36185; CAG30459; AAA52642; AAA52641; NP_000176; EAX02942; CAA27218; BAG36878; AAH35028 |
| Proteomic Up | CASP3 | P42574 | NP_001341708; CAC88866; NP_001341706; CBX53864; EAX04676; CAI46084; AAA65015; AAA74929; NP_001341711; NP_001341712; ; EAX04674; AAH16926; AAB60355; NP_001341709; NP_001341710; |

TABLE 4-continued

Proteomic and Glycomic Biomarkers for SCLC

| Marker Type and Direction in SCLC Cases Compared to Controls | Gene Name | UniProt Accession | GenBank Protein Accession |
|---|---|---|---|
| | | | NP_004337; NP_116786; AAO25654; CAG17895; CAV28500; CBX53863; EAX04673; P42574; BAF84026; NP_001341707; EAX04675; XP_011530603; NP_001341713 |
| Proteomic Up | CCSP1 | Q8WUJ3 | Q8WUJ3; AAG41059; BAD02451; EAW99111; AAU06219; CDI30208; AAH20256; ; AAU06220; AAU06221; BAA86513; NP_001280233; CAB94391; NP_001280227; NP_061159 |
| Proteomic Up | USH1c | Q9Y6N9 | EAW68433; AAC18048; BAB15040; DAA00086; ALQ33957; BAA81740; XP_011518134; XP_011518136; XP_016872563; BAA81739; BAF83477; ALQ33956; NP_005700; Q9Y6N9; AAH16057; XP_016872562; NP_001284693; EAW68431; EAW68432; EAW68434; BAG62565; XP_016872561; XP_016872564; NP_710142; ; AAC18049 |
| Proteomic Up | PLA12 | G0Y0V0 | AAB50262; AAC82596; NP_057856 |
| Proteomic Up | NID1 | P14543 | CCQ43182; P14543; BAD92685; EAW70039; AAA57261; EAW70041; AAA59932; XP_011542497; AAH45606; CAA57709; NP_002499; EAW70040; BAG59717 |
| Proteomic Up | RIPK2 | O43353 | BAH13484; AAS94254; AAC24561; AAQ89173; AAH04553; XP_005251149; AAC27722; ALQ33896; ALQ33895; NP_003812; AAC34970; BAG52085; EAW91655; EAW91656; O43353; AAC25668; AAQ89172; AAS75586; XP_011515659 |
| Proteomic Up | KDM5B | Q9UGL1 | EAW91432; BAG51084; BAG53706; EAW91435; CAB61368; CAB61375; CAB61395; XP_011507393; XP_011507394; Q9UGL1; BAA34803; BAG51090; XP_011507392; EAW91433; CAB63108; EAW91434; CAB43532; XP_011507390; NP_001300971; NP_001334520; AAD16061; BAG50904; AAQ82849; CAB70847; NP_006609 |
| Proteomic Up | DPP7 | Q9UHL4 | BAG60548; BAD93024; XP_011516902; EAW88349; Q9UHL4; BAG57135; AAF12747; AAH16961; XP_016870141; AAH11907; XP_005266132; XP_011516901; XP_016870140; BAF84801; XP_006717146; NP_037511 |
| Proteomic Up | TMPRSS11E | Q9UL52 | NP_054777; ; AAF04328; AAQ89376; BAG36587; XP_011530198; AAY40995; Q9UL52; BAF85476; AAI13413; EAX05573; AAY41025; AAI13415 |
| Proteomic Up | MAP3K8 | P41279 | P41279; FAA00321; XP_016871196; XP_016871201; EAW86004; EAW86005; EAW86006; EAW86007; AAI04834; NP_001231063; NP_005195; BAD92776; AAI13567; XP_016871197; CAG47079; BAA03387; XP_016871203; NP_001307890; AAP45053; BAF83009; CAA78512; XP_016871200; XP_016871198; BAG36102; XP_016871199; XP_016871202 |
| Proteomic Up | ETV6 | P41212 | CAA84815; XP_011518910; AAB39882; XP_011518909; XP_016874479; AAB17135; P41212; ALQ33508; AAB17016; AAC50690; CAJ57643; AAA19786; AAB17134; ALQ33507; XP_011518911; XP_011518913; XP_011518914; XP_016874480; AAB39862; EAW96240; BAF82130; AAH43399; NP_001978 |
| Proteomic Up | CDH5 | P33151 | AAI17521; P33151; BAG62180; BAG62074; BAD93145; AAH96364; XP_011521103; BAA87418; CAA42468; AAH96363; AAH96365; EAW83009; BAG62052; AAB41796; CAA56306; NP_001786 |
| Proteomic Up | CSNK1G2 | P78368 | AAC26983; BAG70092; XP_005259556; XP_005259557; XP_016881787; EAW69426; EAW69431; AAG01997; AAH18693; XP_016881786; EAW69427; XP_005259555; XP_005259558; EAW69429; EAW69430; BAG70224; AAC00212; AAH18699; AAH20972; EAW69428; P78368; AAP88924; AAB88627; NP_001310 |
| Proteomic Up | MALT1 | Q9UDY8 | BAA83099; Q9UDY8; AAG38589; XP_011524096; BAF84075; CAB70725; NP_006776; EAW63079; AAD38507; AAH30143; NP_776216; EAW63078 |
| Proteomic Up | TAL1 | P17542 | AAA36599; CAA41478; AAB19683; NP_001277332; CAA41477; CDL93504; NP_001277334; XP_016857676; XP_016857677; NP_001274276; CAA41476; EAX06875; P17542; CAA36246; XP_016857681; CAB72254; EAX06876; EAX06877; XP_005271217; XP_016857680; NP_001277335; AAA36600; ; NP_003180; CAB72103; XP_016857678; XP_016857679; XP_016857682; NP_001277333 |
| Proteomic Up | PPARA | Q07869 | CAD55571; CAQ09267; EAW73402; BAH02281; CAQ09265; EAW73404; CAG33716; ABY73535; XP_005261713; XP_006724333; NP_001001928; ABI52419; ABI52420; ABI52421; BAF82510; AAO89524; AAA36468; CAA68898; XP_011528545; XP_011528547; ABI52422; CAQ09266; Q07869; AAO89523; CAG30433; XP_011528546; EAW73403; AAO89526; ACD12656; CAA76112; ABI52417; CAI22450; CBX54356; AAO89522; XP_006724332; XP_011528542; XP_016884329; NP_005027; ; AAO13489; ABI52418; |

TABLE 4-continued

Proteomic and Glycomic Biomarkers for SCLC

| Marker Type and Direction in SCLC Cases Compared to Controls | Gene Name | UniProt Accession | GenBank Protein Accession |
|---|---|---|---|
| | | | AAO89521; AAO89525; ADZ17373; AAB32649; XP_011528541; XP_011528543; XP_016884328; BAG34887; XP_005261712; XP_011528544 |
| Proteomic Up | LRG1 | P02750 | BAG64800; NP_443204; EAW69211; P02750; BAG37106; AAH34389; AAH70198; BAD38644; AAK95527; BAG51312 |
| Proteomic Down | AXIN1 | O15169 | ALQ33873; XP_016879232; XP_016879234; XP_016879235; XP_016879237; AAK61224; O15169; ALQ33872; XP_011520984; XP_011520988; NP_003493; NP_851393; EAW85835; AAH17447; EAW85836; BAD92113; XP_011520985; CAI95589; CAI95590; CAQ09649; XP_011520986; AAH44648; XP_016879233; XP_016879236; AAC51624; ALQ33871 |
| Proteomic Down | CAT | P04040 | ; AAA16651; AAI12218; AAS37679; AAK29181; EAW68170; P04040; AAB59522; CAA27721; EAW68171; BAF84274; BAG37746; AAH27300; AOP17813; BAG63070; NP_001743; AAI12220; AAI10399; CAA27717 |
| Proteomic Down | LRP6 | O75581 | EAW96253; XP_006719141; CCF76957; ; BAG51971; NP_002327; CDM49020; AAI26406; XP_016874793; AAC33006; AAD21410; BAG52027; AAI17137; O75581; XP_011518973; BAD92920; AAI43726 |
| Proteomic Down | IL4 | P05112 | ADD60204; ADN03411; AAH67515; NP_000580; NP_001341919; ADN03418; CAA29925; ADN03412; ADN03415; CAJ75955; CBL86566; EAW62322; AAC03537; CAP72493; AAA59149; AAA59150; ADN03410; ADN03416; ADN03422; AAH70123; CAA57444; ADN03408; ADN03414; CBX32734; AGM38212; ; AAK71324; ADN03419; CAV32874; BAD89396; AAH66277; ADN03413; ADN03417; ADN03420; ADN03423; NP_758858; ADN03409; ADN03421; EAW62323; P05112; AAH67514; ABM53124 |
| Proteomic Down | S100A8 | P05109 | P05109; AAH05928; CAA68390; ; NP_001306130; NP_001306130; AAA36817; BAF84017; CAA29580; NP_002955; NP_001306127; CAA01001; EAW53330; EAW53331; AAP36042; NP_001306125; CAG28602 |
| Proteomic Down | Cx44 | P17302 | P17302; BAD97009; CAG46461; BAG57837; BAG59841; AAD37802; EAW48178; BAG35246; AAH26329; BAG60109; BAG60112; NP_000156; BAG58393; CAA37122; ; AAA52131 |
| Proteomic Down | IL24 | Q13007 | AAL34146; Q13007; ; AAP35820; AAO67513; AAA91780; XP_016855610; AAG41401; CAJ18816; EAW93518; NP_001172086; NP_006841; AAK52589; AAV52801; CAJ98561; AAV52800; XP_011507403; EAW93519; NP_001172085; NP_001172087; CAY39296; CAY86021; AAH09681 |
| Proteomic Down | HSPB1 | P04792 | AAA62175; EAW71803; AAH00510; AAH12768; ACI46015; AAB20722; AAH14920; CAA34498; AAH12292; AAV38691; ABC88475; NP_001531; CDM22284; BAG59449; BAG34835; CAG38728; P04792; BAB17232; AAH73768; CAG28542; AAB51056; CAA38016 |
| Proteomic Down | ZYX | Q15942 | EAW51849; AAH08743; EAL23788; CAA65050; AAS07459; NP_001010972; EAW51850; BAG61089; CAA64447; NP_003452; BAH14598; AAH10031; ; CBX47470; BAG61030; AAH02323; AAH09360; AAH17183; EAW51848; EAW51851; BAG63647; CAG33712; AAA78902; CBX47471; Q15942; XP_011514871; XP_016668076 |
| Proteomic Down | BCL3 | P20749 | BAH12275; AAH64993; EAW57291; NP_005169; P20749; AAA51816; AAC51348; XP_011525502; XP_011525500; XP_016882598; AAA51815; ; XP_011525499; XP_016882599 |
| Proteomic Down | IFNAR1 | P17181 | EAX09838; BAD96532; AFN73228; EAX09839; AFN73226; AFN73227; ; CAA42992; P17181; AAH21825; AFN73229; NP_000620; EAX09837; BAD96490; AAT49100; BAG60345; AAA52730; XP_005261021; BAG35516; AAH02590; XP_011527854 |
| Proteomic Down | SMAD5 | Q99717 | AAD20799; AAD20801; AAB95090; XP_016864959; BAG36195; ; AAD20803; AAB92396; AAB66353; AAD20800; AAD20802; Q99717; AAH09682; NP_001001419; NP_001001420; CAG33705; CAH18219; CAH18303; EAW62194; EAW62196; AAC50791; EAW62195; AAB72180; NP_005894 |
| Proteomic Down | LGALS3BP | Q08380 | AAH02403; ALQ33622; EAW89546; BAG58382; EAW89544; Q08380; CAA55699; AAA36193; EAW89543; EAW89545; BAG62653; NP_005558; BAG51600; BAG56725; BAG62970; AAH02998; AAH15761; ALQ33623 |
| Proteomic Down | SEPT9* | Q9UHD8 | EAW89463; CAC42221; AAH21192; AAP35879; NP_001280627; EAW89461; EAW89464; AAD39749; BAH13140; XP_011522509; NP_001106966; NP_001280625; EAW89468; AAG27922; CAC42225; AAI28417; ALQ33996; NP_001106965; EAW89462; EAW89466; EAW89467; Q9UHD8; BAB14057; BAF83057; BAH14844; ALQ33997; XP_005257019; XP_006721707; NP_001106963; NP_001106968; |

TABLE 4-continued

Proteomic and Glycomic Biomarkers for SCLC

| Marker Type and Direction in SCLC Cases Compared to Controls | Gene Name | UniProt Accession | GenBank Protein Accession |
|---|---|---|---|
| | | | NP_006631; BAG62029; BAG64494; BAG65036; AAI14551; XP_016879520; NP_001106964; NP_001280624; EAW89465; AAF23374; CAC42224; BAG51732; CAB45728; NP_001280626; ; AAH54004; XP_006721706; XP_011522506; NP_001106967; BAA76835; AAG27919; AAF23373; CAC42222; CAC42223; BAG62031; XP_011522508; XP_011522510; XP_016879521 |
| Proteomic Down | MARCO | Q9UEW3 | BAG59558; AQN67651; AAC08800; XP_016860660; AAX88875; AAD41064; CAD36112; EAW95207; BAG62941; BAG35958; XP_011510384; NP_006761; Q9UEW3; AAH16004; XP_011510385 |
| Proteomic Down | PF4 | P02776 | AAI12094; AAY41003; AAA60066; EAX05694; AAH93965; CAG28605; AAK29643; NP_002610; P02776; XP_005265753 |
| Proteomic Down | THBS4 | P35443 | BAH13818; XP_016865287; AAS66982; XP_016865288; XP_016865289; NP_001293142; P35443; CAA79635; NP_003239; BAG36356; NP_001293143; EAW95841; AAH50456; NP_001293141 |
| Proteomic Down | NOS3 | P29474 | ABB79840; XP_016867721; AAA36365; EAL24494; BAH13275; AAH69465; ABB79839; NP_001153583; ; AAA36374; AAL07497; EAW54069; AAK83389; BAG37648; AAH63294; AAA36372; XP_016867723; P29474; AFX88321; AAD14336; XP_006716065; NP_001153582; ABY87544; NP_000594; AAM74944; BAF85617; BAH13779; XP_016867722; NP_001153581; CDI44688; AFX88322; CAA53950; BAD97356; ABB79838; AFX88320; AAA36364 |
| Proteomic Down | CHRDL1 | Q9BU40 | EAX02655; NP_001137454; NP_660277; ; EAX02657; AAU25841; XP_005262278; XP_016885448; Q9BU40; BAG52508; NP_001137453; XP_005262279; XP_005262280; EAX02656; BAG59955; BAD92785; BAF85795; AAH02909; XP_005262281; NP_001137455 |
| Proteomic Down | GRB2 | P62993 | AAC72075; ABY87532; P62993; AAG44485; BAG52262; AAM21073; BAG37940; CAG46740; AAA58448; ; EAW89271; AAH00631; NP_002077; NP_987102; AGC09591; AAG27442; BAB14923; EAW89272; AAC37549; EAW89270; AAQ13606; CAG29359; CAA44664 |
| Proteomic Down | CXCL11 | O14625 | AAD10206; CAB69205; O14625; NP_005400; ; CAB51859; AAH12532; NP_001289052; EAX05774; AAC39775; AAC51845; CAA75510; AAK52900; AAH05292; AAB17374; AAD38327; AAI10987; AAP35433; AAD38867 |
| Proteomic Down | SPARC | P09486 | P09486; AAA60570; NP_003109; EAW61667; NP_001296373; EAW61672; BAG61416; BAG37963; AAH08011; CAG33080; CAA68724; ; AAH72457; AAA60993; EAW61668; EAW61670; AAH04974; EAW61669; EAW61671; BAA05747; NP_001296372; AAS50152 |
| Proteomic Down | PHB | P35232 | AAH13401; AAB21614; NP_001268425; NP_002625; ; EAW94681; CAL48156; BAF83455; BAG35532; AAP36079; P35232; ACS44653; EAW94680; AAO18340; BAG63609; AAS88903; AAH95460; CAG46507; XP_016880251; XP_016880252; NP_001268426; ACI46033; NP_001268644; AAA86691; BAD96901 |
| Proteomic Down | ATP6V1G1 | O75348 | NP_004879; AAH08452; EAW87424; CAG33252; EAW87425; CAG47033; O75348; AAC39868 |
| Proteomic Down | CSF2 | P04141 | AAC08707; AAA52578; NP_000749; CBH19850; AAI14000; AAA52122; AAA98768; CAA26822; EAW62353; P04141; AAU21240; AAI13925; CAL40350; AJC19278; AAM44054; AAA52121; CBX47495; AAK51563; AAI08725 |
| Proteomic Down | CTTN | Q14247 | XP_016872801; EAW74766; Q14247; XP_006718510; XP_006718511; EAW74770; AAH33889; NP_001171669; NP_005222; NP_612632; BAF83786; BAG65370; EAW74767; EAW74769; AAH08799; CEF49523; AAA58455; BAD06416; EAW74768; BAG52416; BAD96333 |
| Proteomic Down | A2M | P01023 | XP_006719119; NP_000005; CAA48670; BAD92851; ; AAK38109; CCO13665; CAH18188; NP_001334354; EAW88590; AAH40071; CAA77774; AAT02228; AAA51552; NP_001334352; AAK38110; NP_001334353; P01023; AAH26246; AAA51551 |
| Proteomic Down | GABARAP | O95166 | AAD32455; BAG35138; CAH10737; AAD47641; CAG47031; EAW90238; BAB21549; ; AAG09694; AAI06749; AEZ06293; NP_009209; O95166; CAG33324; EAW90234; AAD02337; AAI06750 |
| Proteomic Down | ALDOB | P05062 | NP_000026; BAA00125; EAW58951; EAW58952; CAA25072; P05062; AAH29399; CAA25572; BAF83484; AAA51691; ; CAA26526 |
| Proteomic Down | NCOR1 | O75376 | EAX04496; XP_005256925; XP_005256930; XP_011522388; XP_016880886; XP_016880902; XP_016880906; XP_016880909; NP_001177369; EAX04494; O75376; AAO32942; XP_005256923; XP_005256932; XP_016880887; XP_016880888; BAA83818; BAG58687; AAH58511; XP_005256929; XP_006721665; |

TABLE 4-continued

Proteomic and Glycomic Biomarkers for SCLC

| Marker Type and Direction in SCLC Cases Compared to Controls | Gene Name | UniProt Accession | GenBank Protein Accession |
|---|---|---|---|
| | | | XP_006721667; XP_011522387; XP_016880895; XP_016880897; EAX04493; EAX04495; AAO32941; CAB70854; AAH50594; XP_011522386; XP_016880908; NP_001177367; NP_006302; BAA83819; AAP97166; XP_005256928; XP_011522385; XP_016880890; XP_016880900; XP_016880901; XP_016880903;; AAH56862; AAH68996; AAI67431; XP_016880889; XP_016880892; XP_016880905; XP_016880907; EAX04492; AAC33550; AAO32940; XP_005256931; XP_006721664; XP_006721666; XP_016880885; XP_016880891; XP_016880893; XP_016880894; XP_016880904; BAA82999; BAG63960; AAH26028; AAI07773; AAI42649; XP_016880896; XP_016880898; XP_016880899 |
| Proteomic Down | CCNB1 | P14635 | BAF82120; CAO99273; AAD14154; AAK27418; AAK27425; AAH06510; AAP88038; CBX86318; AAK27417; NP_001341773; AAD14818; EAW51306; AAK27420; AAK27424; AAV38930; P14635; AAK27419; AAK27421; AAK27422; AAK27423; NP_001341774; NP_114172 |
| Proteomic Down | AXIN1 | O15169 | ALQ33873; XP_016879232; XP_016879234; XP_016879235; XP_016879237; AAK61224; O15169; ALQ33872; XP_011520984; XP_011520988; NP_003493; NP_851393; EAW85835; AAH17447; ; EAW85836; BAD92113; XP_011520985; CAI95589; CAI95590; CAQ09649; XP_011520986; AAH44648; XP_016879233; XP_016879236; AAC51624; ALQ33871 |
| Proteomic Down | PEPD | P12955 | AAH28295; AAA60064; CAG46470; P12955; BAG56678; BAF83445; BAF83470; AEE61049; BAF84250; NP_001159528; AAH15027; AAP35338; NP_001159529; NP_000276; BAG57802; AAH04305 |
| Proteomic Down | CALR | P27797 | AMR60715; AMR60716; AMR60721; EAW84330; BAG65301; ACI46003; AAA36582; AMR60718; AMR60722; EAW84331; P27797; BAD96780; AAP36116; AAA51916; AMR60712; CCD35250; CEO43494; NP_004334; AMR60709; ; AMR60711; AMR60720; CAK18761; CRH09108; AAL13126; AAB51176; AMR60706; AMR60707; BAG58223; AAH07911; AAH20493; AMR60705; AMR60708; AMR60710; EAW84332; BAG70222; AMR60713; AMR60714; AMR60717; AMR60719; AAH02500; CAG33351 |
| Proteomic Down | MAPK14 | Q16539 | EAX03867; EAX03870; XP_016865791; NP_001306; CIW96073; BAB85654; XP_011512612; XP_016865789; AGC09599; EAX03869; EAX03873; AAH00092; AAA57456; ABY87549; CAA80919; EAX03871; EAX03872; Q16539; BAF84398; AAP35579; XP_016865793; NP_620583; AAC50329; AAF36770; AAH31574; CAG38743; ACI00233; AAA57455; XP_016865788; NP_620581; NP_620582; ; XP_016865792; EAX03868; BAG64467; ACI00234; XP_006715061; XP_016865790 |
| Proteomic Down | PTPRC | P08575 | AAM12758; AAS46930; AAS46962; EAW91301; AAS75254; AAI27658; ; AAS46922; CBU83087; AAH17863; XP_006711537; AAS46946; BAG61807; CAA68269; CAA68669; XP_006711536; EAW91300; XP_006711535; NP_563578; BAF84820; AAH14239; AAI21087; AAD15274; AAS46938; EAW91302; AAD15275; AAG26082; AAS46954; CBU30438; EAW91303; P08575; AAI21088; NP_001254727; AAA59497; BAG64565; AAI27657; AAI48258; NP_002829 |
| Proteomic Down | PTBP1 | P26599 | EAW61155; XP_005259654; NP_114368; EAW61156; EAW61157; EAW61158; BAD92147; AAH13694; CAA46444; CAA47386; EAW61154; AAH02397; CAA43056;; AAC99798; EAW61152; AAP35465; AAH04383; CAA46443; NP_002810; NP_114367; CAA43973; EAW61153; P26599; XP_005259655 |
| Proteomic Down | PPP2CA | P67775 | EAW62268; BAG70054; AAH 19275; AAH31696; BAG51913; CAA31176; AAA36466; EAW62269; BAG70179; ; BAG53493; AAH02657; CAG33698; AAB38019; NP_002706; P67775; AAH00400; NP_001341948 |
| Proteomic Down | LTBP1 | Q14766 | AAY14953; EAX00435; XP_011531163; NP_996826; ; AAY15036; EAX00437; BAG61269; BAH14362; XP_005264374; XP_011531164; NP_001159738; AAA96327; AAF08252; AAF08253; AAY24260; XP_005264375; EAX00439; BAG64043; AAI44129; XP_016859598; NP_001159736; Q14766; BAD92038; AAM03124; XP_011531160; XP_011531161; XP_016859597; EAX00438; BAG61750; XP_011531155; XP_011531159; XP_011531162; EAX00436; AAI30290; AAA61160; XP_011531157; XP_011531158; XP_016859599; NP_000618; BAG60329; NP_001159737 |
| Proteomic Down | APOBEC3F | Q8IUX4 | AAZ38720; EAW60289; AEA39617; XP_016884131; BAG57929; AAH38808; NP_001006667; XP_016884132; ; EAW60288; Q8IUX4; AGI04218; CAG30281; NP_660341; XP_011528296 |

TABLE 4-continued

Proteomic and Glycomic Biomarkers for SCLC

| Marker Type and Direction in SCLC Cases Compared to Controls | Gene Name | UniProt Accession | GenBank Protein Accession |
|---|---|---|---|
| Proteomic Down | ERG | P11308 | AAB65763; NP_891548; CDL93500; CDL93501; CDM55455; CDM55456; AAA35811; AJT59682; XP_016883776; NP_001129626; NP_001278320; NP_004440; AAA52398; ASY97863; CDI44159; EAX09679; P11308; AAB65762; AAP41719; XP_011527788; NP_001230361; ; ASY97862; CDM55454; BAG62127; BAG64546; AAH40168; AAB29724; XP_016883777; NP_001230357; CCV19969; EAX09680; BAG60145; XP_011527789; NP_001129627; NP_001230358; AAB37717; CAD79711; CDM55453; BAG62837; BAG65437; AAP41720; XP_016883778; NP_001317954 |
| SLEA Down | PPP2CA | P67775 | EAW62268; BAG70054; AAH 19275; AAH31696; BAG51913; CAA31176; AAA36466; EAW62269; BAG70179; ; BAG53493; AAH02657; CAG33698; AAB38019; NP_002706; P67775; AAH00400; NP_001341948 |
| SLEA Down | FETUB | Q9UGM5 | BAA78341; AAR22508; NP_055190; CAB62538; EAW78185; EAW78186; AAQ10515; XP_011510983; XP_011510984; NP_1295006; AAH74734; XP_011510985; ; BAH14069; CAC24999; BAG37713; AAH69670; AAH69820; Q9UGM5; AAR22507; AAI14617; XP_005247408; NP_001295008 |
| SLEA Down | CD44 | P16070 | BAH30705; EAW68149; BAG65282; AAM50041; AAH04372; AAH67348; AAB13627; AAB13628; EAW68148; EAW68151; CAD89965; AAA36138; CAA47271; XP_005253290; XP_011518789; XP_011518790; AAB13622; AAB13625; BAH57879; EAW68153; CAB61878; AAA35674; XP_005253288; XP_011518784; XP_011518786; NP_001001391; CBX54346; EAW68152; AAB27918; XP_005253297; XP_006718451; XP_011518787; XP_011518791; NP_000601; NP_001001389; NP_001189486; AAB30429; AAD14279; ABW75083; EAW68146; EAW68154; EAW68155; P16070; AAC70782; BAG60121; AAA51950; XP_005253289; XP_011518788; NP_001001392; NP_001189484; AAB13623; ARX77882; BAH57528; CDM22272; EAW68144; EAW68145; EAW68147; ACI46596; AAD14389; AAA82949; AAD00766; XP_005253292; XP_005253295; XP_005253296; XP_011518785; NP_001001390; AAB13624; AAB13626; BAH57527; BAF83113; AAH52287; BAA05813; ABQ59315; CAA44602; XP_005253291; XP_006718453; XP_016874072; XP_016874074; NP_001189485; BAH57857; EAW68150; AAM50040; AAB27917; AAB27919; CAA38951; CAA39404; CAA40133; XP_016874073 |
| SLEA Down | LASP1 | Q14847 | BAG58436; CAA57833; ; EAW60543; BAG57861; EAW60545; BAF82536; BAG58846; AAH12460; NP_006139; EAW60544; AAH07560; Q14847; NP_001258537 |
| SLEA Down | C5orf4 | Q96IV6 | EAW61630; AAH04506; XP_006714816; XP_016864454; XP_016864455; CCQ42941; BAG58453; BAG62567; EAW61629; Q96IV6; XP_005268415; NP_115761; AAF22611; EAW61631; AAH07216 |
| SLEA Down | CLDN12 | P56749 | BAG35384; AAH36754; AAH68532; CAG38501; AAP22363; EAW76876; CAB60617; CAD35081; CAB66704; NP_001172002; NP_036261; EAW76877; EAL24163; NP_001172001; ; P56749 |
| SLEA Down | ADAM7 | Q9H2U9 | AAG43987; AAH43207; BAF85181; NP_003808; ; Q9H2U9; AAH58037; EAW63606; AAC36742; XP_016869432 |
| SLEA Down | BCL2 | P10415 | API71152; API71157; API71160; API71168; API71170; CAR95112; AAA35591; NP_000624; API71147; API71153; EAW63138; AAH27258; AAA51814; ; API71164; AAD14111; API71156; API71159; API71162; API71163; API71165; CDM22285; EAW63136; ABX60202; XP_016881406; API71149; API71151; API71161; API71169; CCA94580; CDM22286; NP_000648; AAO26045; API71150; API71155; CAR95111; AAL02169; API71166; API71167; EAW63139; AAA51813; API71154; API71158; API71171; EAW63137; P10415; CAA29778; XP_011524437 |
| SLEA Down | VNN1 | O95497 | BAF83114; AAH96268; EAW48020; AAH96266; AAF21453; NP_004657; O95497; AAH96267; AAY88742; CAA10568; BAG36929; AAH96265 |
| SLEA Down | CLDN6 | P56747 | EAW85432; EAW85431; AAH08934; BAG52111; AAK02013; AAQ88844; CAI72055; P56747; AAP36063; CAB56533; NP_067018 |
| SLEA Down | RNF39 | Q9H2S5 | AQY77079; AAG40629; AAG40630; NP_739575; EAX03255; AQY77080; AQY77082; XP_016866815; AQY77083; AQY77085; AQY77086; BAB63333; AAG40628; BAC54920; EAX03256; Q9H2S5; NP_079512; AQY77081; AQY77084; BAE78602; XP_016866814; AQY77078 |

TABLE 4-continued

Proteomic and Glycomic Biomarkers for SCLC

| Marker Type and Direction in SCLC Cases Compared to Controls | Gene Name | UniProt Accession | GenBank Protein Accession |
|---|---|---|---|
| SLEA Down | RGS14 | O43566 | AAM12650; AAH14094; XP_005265852; NP_006471; EAW85011; AAB92613; BAG53582; XP_005265851; EAW85013; AAY26402; EAW85012; O43566; BAC85600; AAB92614 |
| SLEA Down | POLG2 | Q9UHN1 | ADP91697; ADP91707; ADP91709; ADP91713; ADP91721; ADP91722; EAW94204; Q9UHN1; NP_009146; ADP91695; ADP91700; ADP91702; ADP91708; ADP91711; ADP91712; ADP91716; ADP91719; ADP91720; ADP91723; ADP91727; ADP91729; AAD56640; ADP91694; ADP91698; ADP91730; ADP91731; AAD50382; AAD56542; ADP91705; ADP91710; ADP91718; XP_006721714; ADP91703; ADP91717; ADP91728; AAC51321; ADP91732; AAH00913; ADP91701; ADP91704; ADP91706; ADP91715; ; ADP91696; ADP91699; ADP91714; ADP91724; ADP91725; ADP91726; ADP91733; AAH09194; XP_016879561 |
| SLEA Down | PTGFRN | Q9P2B2 | EAW56663; BAA92674; AAH98142; AAI39719; NP_065173; BAB20271; BAC11104; AAI14521; AAI52455; ; Q9P2B2; EAW56662; XP_016857363 |
| SLEA Down | FAM48A | Q8NEM7 | Q8NEM7; XP_005266514; XP_016876146; NP_060039; EAX08582; EAX08583; EAX08584; EAX08585; AAQ15220; AAH01145; XP_005266511; XP_005266513; XP_016876145; NP_001265409; CAB62207; XP_005266518; XP_005266524; ; AAD40550; AAL38587; XP_005266508; XP_005266517; XP_016876143; NP_001265411; EAX08586; BAG51343; XP_005266506; XP_005266519; XP_016876148; NP_001014308; NP_001265410; XP_005266504; XP_005266512; XP_005266515; XP_016876142; XP_016876147; BAG65097; AAH30686; XP_005266521; XP_005266522; XP_016876144; XP_016876149; XP_016876150; BAF85065 |
| SLEA Down | NPAS4 | Q8IUM7 | AAI05002; XP_016873026; BAC04271; AAI05004; NP_849195; BAC04738; XP_016873028; BAC19830; AAI43631; EAW74525; Q8IUM7; XP_016873027; NP_001305733 |
| SLEA Down | RPLP2 | P05387 | CAG47044; CAG47008; AAH05354; AAH62314; EAX02394; P05387; AAH05920; AAH07573; BAG34894; BAA05777; BAB79475; EAX02393; NP_000995; AAA36472 |
| SLEA Up | TTR | P02766 | AAA73473; NP_000362; AAA60018; AAB36045; AAL92041; AAL92042; EAX01264; EAX01265; AAA60012; BAG34987; AAA36784; AAP35853; BAA00059; AAD45014; ACJ13724; AAA98771; AAD14098; EAX01266; P02766; ADU87635; AAA60013; AAD14937; AAL92043; AAH05310; AAH20791; CAA42087; CAG33189; ABI63351; AAA60011; AAA61181 |
| SLEA Up | FOXO1 | Q12778 | AAP36123; XP_011533310; NP_002006; ; XP_011533312; AAC39591; AAA03629; AAH21981; AAH70065; EAX08627; Q12778 |
| SLEA Up | VWF | P04275 | AAA61294; CCQ25771; EAW88817; BAG60382; NP_000543; AAB59458; EAW88815; EAW88816; BAG62791; AAA61293; AAA65940; CAA26503; AEY75227; EAW88814; P04275; CDI44165; CAA27765; CAA29985; BAG59985; CAA27972; BAF84811; AAH22258; AAB39987; ; AAA61295; CBX54458; EAW88818; AAB59512 |
| SLEA Up | MUC16 | Q8WXI7 | BAG54742; BAG54743; AAL65133; XP_016882975; Q8WXI7; AAK74120; XP_016882977; XP_016882981; BAB14899; CAP17281; XP_016882978; XP_016882982; XP_016882985; XP_016882986; XP_016882989; ; BAC87568; XP_016882979; NP_078966; XP_016882976; XP_016882980; XP_016882983; XP_016882984; XP_016882987; XP_016882988; XP_016882990 |
| SLEA Up | UCHL3 | P15374 | AEE61131; NP_001257881; CCQ43344; EAW80543; EAW80546; P15374; BAG36417; XP_011533515; XP_016876214; XP_016876215; CCQ43343; EAW80542; EAW80547; AAH18125; AAV38166; CAG33136; ; EAW80545; AAA36791; XP_011533514; XP_011533516; NP_005993; EAW80544; XP_016876216 |
| SLEA Up | CD71 | P02786 | AAH01188; CAD97930; NP_001121620; NP_001300895; NP_003225; EAW53670; EAW53672; AAF04564; EAW53671; EAW53673; AAA61153; BAF84412; BAD92491; CAA25527; ABF47088; P02786; NP_001300894; ; BAH11872 |
| SLEA Up | USP8 | P40818 | BAA06225; XP_016878207; XP_016878208; NP_001122082; EAW77399; XP_006720825; XP_016878210; XP_016878211; BAF85089; EAW77401; EAW77402; EAW77400; P40818; AAH15545; XP_006720824; AAH26954; AAH38801; XP_016878209; BAG59120; BAG62288; AAH51345; AAI10591; CAD97662; XP_011520495; NP_001269978; ; BAG52415; NP_005145 |
| SLEA Up | YES1 | P07947 | ; XP_016881449; EAX01709; BAG36767; AAA35735; XP_005258196; EAX01710; NP_005424; CCQ43321; P07947; AAH48960 |

TABLE 4-continued

Proteomic and Glycomic Biomarkers for SCLC

| Marker Type and Direction in SCLC Cases Compared to Controls | Gene Name | UniProt Accession | GenBank Protein Accession |
|---|---|---|---|
| SLEA Up | RECQL4 | O94761 | BAA86899; XP_016869490; EAW82070; BAA74453; AAH11602; AAH13277; NP_004251; XP_016869480; XP_016869483; XP_016869484; XP_016869489; XP_016869482; XP_016869487; ; O94761; XP_016869481; XP_016869485; XP_011515686; XP_016869486; AAZ85145; EAW82071; AHN60090; XP_016869488 |
| SLEA Up | CCNE1 | P24864 | P24864; BAF84238; AEF32520; AHC02488; NP_001309190; AAA83269; AAM54043; CAA64688; XP_011525742; NP_001309188; CAA64687; AAH35498; AKJ51805; NP_001229; NP_001309191; AHC02489; |
| SLEA Up | HLA-A | P01891 | AAA03603; AAA59613; AAA84994; AAA98118; AAA98727; AAB60653; AAB87051; AAB87060; AAB87423; AAB87425; AAC14104; AAC72736; AAD00912; AAD02208; AAD22271; AAD38681; AAD39980; AAD48507; AAD53402; AAF03239; AAF04849; AAG10040; AAK49190; AAK52487; AAK52516; AAK58590; AAK94510; AAL32021; AAL33641; AAL35387; AAM78538; AAN01238; AAN01241; AAO17717; AAO49823; AAP21777; AAP32699; AAP49445; AAT35595; AAT41623; AAW83823; AAX94767; AAZ15017; ABA29233; ABC79293; ABC79296; ABD75333; ABD93917; ABF54964; ABF67610; ABG91056; ABK97608; ABL67641; ABL98038; ABL98041; ABM97536; ABP02054; ABP88249; ABQ45970; ABQ45971; ABR08288; ABU86839; ABU96767; ABW38317; ABW38319; ABX60509; ABY21176; ABY26525; ACA35000; ACA35004; ACA51866; ACD49990; ACF95805; ACH56947; ACH57398; ACI15740; ACI26702; ACJ53924; ACJ71689; ACJ71691; ACL51723; ACL99858; ACN76763; ACN76770; ACN81181; ACN81184; ACN81188; ACN81204; ACN81209; ACN81214; ACN81234; ACN81240; ACN89870; ACN89875; ACN91032; ACN91038; ACN91039; ACO44530; ACO44543; ACO44548; ACO44551; ACO44552; ACO44553; ACO44554; ACO44565; ACO44602; ACO44608; ACO44627; ACO44632; ACO44635; ACO48410; ACO48415; ACO48417; ACO58646; ACO87716; ACP27869; ACP27872; ACQ99524; ACR54304; ACR54311; ACR54328; ACR55724; ACR55731; ACR55732; ACS12733; ACS12734; ACS27555; ACS27564; ACS27571; ACS27576; ACS27689; ACS36355; ACS36365; ACS36384; ACS36385; ACS36396; ACT76259; ACT76260; ACT79395; ACT83688; ACU02130; ACU02136; ACU02144; ACU02163; ACU02170; ACU02198; ACU27243; ACU27251; ACU29568; ACU29573; ACU78156; ACU78157; ACU78163; ACU78169; ACV40691; ACV52060; ACV52062; ACV89432; ACV89434; ACV95338; ACX42600; ACX42612; ACX50458; ACX55002; ACX81370; ACZ56418; ACZ65011; ADB81928; ADB81931; ADC32155; ADC32182; ADC32234; ADC32240; ADC32241; ADC32245; ADC32246; ADC32260; ADC79893; ADC79906; ADC79930; ADC79936; ADC79940; ADC79951; ADC79963; ADC81010; ADC81012; ADC81013; ADC81014; ADC81025; ADC81027; ADC81035; ADC81043; ADC81045; ADC81059; ADC81077; ADC81080; ADC81081; ADC81082; ADD14008; ADD97837; ADD97839; ADD97840; ADD97845; ADE58586; ADE58597; ADE58606; ADE58628; ADE58630; ADE58646; ADE58651; ADE62147; ADE72803; ADE72804; ADE72829; ADE72840; ADE72850; ADE72856; ADE72860; ADE72863; ADE72868; ADE73014; ADE73015; ADE73018; ADE73022; ADE73026; ADE73027; ADE73028; ADE73053; ADE73106; ADE73117; ADE73193; ADE73236; ADE73288; ADE73300; ADE73343; ADE73347; ADE73355; ADE73465; ADE73471; ADE73495; ADE73540; ADE73608; ADE73609; ADE73612; ADE73659; ADE73666; ADE73777; ADE73781; ADE73787; ADE73801; ADE73812; ADI95501; ADI95505; ADM72723; ADM72725; ADM72741; ADN86006; ADN92578; ADN92579; ADN92583; ADN92593; ADN92595; ADQ55907; ADQ55908; ADR72653; ADW24256; ADW24259; ADW24284; ADX21062; ADZ31209; ADZ38939; ADZ73071; ADZ73077; ADZ73080; ADZ73085; AEA49769; AEA49775; AEA49790; AEA49801; AEB26702; AEF13098; AEF13103; AEF13110; AEF13787; AEF13807; AEF13808; AEF13816; AEF13827; AEF13829; AEF13831; AEI00960; AEI00965; AEI00968; AEI00974; AEI30760; AEI30769; AEI59543; AEI59549; AEI59559; AEJ90498; AEK67314; AEK94818; AEK94884; AEK94886; AEK94911; AEK94912; AEK94913; AEK94919; AEK94974; AEK94981; AEK95021; AEK95022; AEK95032; AEK95104; AEK95290; AEK95305; AEK95345; AEK95490; AEK95493; AEK95499; AEK95504; AEK95508; AEK95517; AEK95529; AEK95714; AEK95721; AEK95734; AEK95763; AEK95767; AEK95770; AEK95775; AEK95789; AEK95803; AEK95804; AEK95806; AEK95817; AEK95823; |

TABLE 4-continued

Proteomic and Glycomic Biomarkers for SCLC

| Marker Type and Direction in SCLC Cases Compared to Controls | Gene Name | UniProt Accession | GenBank Protein Accession |
|---|---|---|---|
| | | | AEK95829; AEK95846; AEK95851; AEK95860; AEK95861; AEK95870; AEK95874; AEK95877; AEK95879; AEK95892; AEK95893; AEP39698; AEQ26027; AER92532; AET98769; AEU10176; AEV23222; AEV42056; AEW23007; AEW23011; AEW23013; AEW23016; AEW23055; AEW23057; AEW90659; AFA42426; AFA42444; AFA42457; AFA42461; AFA42470; AFA42472; AFA42535; AFA42579; AFA42631; AFA42697; AFA42746; AFC95812; AFD23760; AFD23770; AFD36921; AFD36955; AFD36958; AFD36988; AFD61652; AFD61657; AFD62790; AFD62797; AFE48715; AFE88961; AFH66652; AFH66662; AFH78045; AFH78048; AFH78050; AFH78052; AFH78057; AFI14686; AFI57823; AFJ44813; AFK08514; AFK08515; AFK76448; AFK87751; AFK87752; AFK87776; AFL91483; AFM44677; AFM44702; AFM55924; AFN88140; AFP43712; AFP72372; AFU81189; AFU81190; AFU93083; AFV73985; AFV73991; AFV73997; AFV74006; AFV74055; AFV74056; AFV74072; AFV99140; AFX84018; AFX84022; AFZ93938; AFZ93963; AFZ93973; AFZ94386; AFZ94457; AFZ94463; AFZ94490; AFZ94549; AFZ94585; AGC82236; AGD91923; AGG56510; AGG56517; AGG79785; AGG79878; AGG79893; AGG79961; AGG79992; AGG80016; AGH39910; AGH58089; AGH62645; AGI48702; AGJ52182; AGJ52188; AGJ84086; AGJ84087; AGJ95107; AGK44346; AGL09213; AGL73113; AGL73117; AGL93364; AGN74859; AG006070; AGQ03749; AGQ03753; AGQ03758; AGT37254; AGT79675; AGZ87478; AGZ87482; AGZ87508; AGZ87523; AGZ87534; AGZ87537; AGZ87552; AGZ87563; AGZ87567; AGZ87569; AGZ87570; AGZ87571; AGZ87576; AGZ87582; AGZ87591; AGZ87592; AGZ87609; AGZ87610; AGZ92790; AGZ92792; AGZ92800; AGZ92802; AGZ92813; AGZ92825; AGZ92844; AGZ92846; AGZ92848; AGZ92850; AGZ95029; AHA49735; AHF20808; AHF71344; AH 185959; AHN92455; AHV90562; AHY61466; AHY61491; AHY61502; AHY61519; AHY61523; AHY61555; AHY61560; AHY61562; AHY61580; AHY61583; AHY61584; AHY61591; AHY61621; AHY61627; AHY81345; AHY81356; AHY81364; AHY81379; AHY81386; AHY81391; AHY81405; AHY81409; AHY81424; AHY81430; AHY81442; AHY81457; AHY81458; AHY81477; AHY81498; AHY81505; AHY81520; AHY81527; AHY81538; AHY81547; AHY81558; AHY81562; AHY81565; AHZ30688; AHZ30689; AHZ30693; AHZ30698; AHZ30700; AHZ30739; AHZ30744; AHZ30758; AHZ30770; AHZ30806; AHZ30809; AIE39132; AIE39134; AIE39147; AIE39155; AIE39171; AIN41814; AIN41815; AIN41827; AIN41830; AIN41835; AIN41854; AIN41858; AIN41859; AIX94090; AIX94098; AIX94115; AIX94120; AIX94131; AIY63475; AJ143017; AJ143025; AJ143029; AJ143036; AJ143059; AJ143074; AKA93888; AKA93892; AKK23738; AKK75093; AKO90352; ALD83653; ALP46214; ALT08035; ALY06086; AMK47898; AMP83988; BAC02897; BAD20748; BAD29714; BAD30023; BAD99518; BAE48523; BAF37072; BAG15909; BAI50006; BAI59699; BAI66259; BAI66263; BAJ25761; BAJ46510; BAK53227; BAN62611; BAO02310; CAA06807; CAA61854; CAA73073; CAA96532; CAB64340; CAD20188; CAD22452; CAD30043; CAD60933; CAD61024; CAD61338; CAD87772; CAD92641; CAE01416; CAE46482; CAF06506; CAG23922; CAG27088; CAG28694; CAI45286; CAJ09236; CAJ34946; CAJ70623; CAL48952; CAL59517; CAL85627; CAM12538; CAN89177; CAO78190; CAO85640; CAO98726; CAQ37790; CAQ68183; CAV31552; CBL59219; CBL59222; CBL59225; CBL59251; CBM42056; CBM43070; CBN86245; CBW44087; CBW44120; CBX19696; CBX19772; CBX19773; CBX25642; CBY83775; CBY89318; CBZ46994; CCA61008; CCA62424; CCB78844; CCB78847; CCB78851; CCB78854; CCB78860; CCB78863; CCB78864; CCB78879; CCB78881; CCB78889; CCB78890; CCB78891; CCB78902; CCB78970; CCB78976; CCB78982; CCB78983; CCD33126; CCH75804; CCJ51909; CCK73125; CDF59527; CDF59528; CDF63774; CDF63777; CDI48076; CDJ26751; CDM99291; CDO19445; CDO33930; CDO33931; CDO33936; CDO33938; CDO33949; CDO67969; CDO67974; CDO67978; CDP32916; CDQ37741; CDQ51637; CDQ51659; CDQ51671; CDW91874; CDX10189; CEF48054; CEG29843; CRG63508; CU125654; CUS06604; CUT08916; CUV66676; CUV66681; CUV66688; CUV66689; CUV66694; CUV66702; CUV66709; CUV66733; CUV66753; CUV66756; CUV66757; CUV66773; CUV66780; CUV66785; CUV66790; CUV66796; CUV66799; CUV66801; CUV66803; CUV66809; CUX90945; CUX90951; CUX90953; CUX90965; CUX90967; CUX90988; CUX90999; EAX03240; P01891; P05534; P16188; P16190; P30512; SAL89098; SAP17550; BAD92354; BAG35940; AAV53343; AAV53344; BAA08783; |

TABLE 4-continued

Proteomic and Glycomic Biomarkers for SCLC

| Marker Type and Direction in SCLC Cases Compared to Controls | Gene Name | UniProt Accession | GenBank Protein Accession |
|---|---|---|---|
| | | | CDG23669; AAA17889; AAA59637; AAA59603; AAA59606; AAB38491; CAA41022; CAA43872; CAB38057; CAA81644; AAB70275; AAC17178; AAC18859; AAC24825; AAD02205; AAD02207; AAD02210; AAD02224; AAD02225; AAD28171; AAD30272; AAD33849; AAD33894; AAD45690; AAD56941; AAF03241; AAF59927; AAK32955; AAK38635; AAM77796; AAN64246; AAO47730; AAP44396; AAT44890; AAW65995; AAW81981; AAW81983; AAX18628; AAX73212; ABB00701; ABB43072; ABC79295; ABC79297; ABD93913; ABF93214; ABI54281; ABI63914; ABI78963; ABJ90453; ABK60080; ABK97607; ABL09833; ABO61519; ABP01670; ABQ96855; ABR08286; ABR08291; ABR68010; ABS18720; ABU62816; ABU86830; ABV53970; ABV66222; ABY21169; ABY21688; ABY64666; ABZ89503; ACA34998; ACA34999; ACA35001; ACA35003; ACA51037; ACD62376; ACE63267; ACE88695; ACF54638; ACI22945; ACJ05911; ACJ09051; ACJ71684; ACL34371; ACN76767; ACN76769; ACN76772; ACN81186; ACN81187; ACN81199; ACN81206; ACN81215; ACN81230; ACN81231; ACN89841; ACN89876; ACN91029; ACN91030; ACO44536; ACO44556; ACO44557; ACO44559; ACO44561; ACO44563; ACO44564; ACO44578; ACO44582; ACO44583; ACO44591; ACO44593; ACO44600; ACO44604; ACO44617; ACO44618; ACO44628; ACO48405; ACO48412; ACO87720; ACO87726; ACO87730; ACP40976; ACR54303; ACR54306; ACR54308; ACR54315; ACR54325; ACR54326; ACR55712; ACR55713; ACR55715; ACR55729; ACR55730; ACS12746; ACS27552; ACS27557; ACS27575; ACS27578; ACS27579; ACS27688; ACS36352; ACS36354; ACS36357; ACS36378; ACS36382; ACS36406; ACS36408; ACT76256; ACT76261; ACT83690; ACT83693; ACT83697; ACU02148; ACU02157; ACU02165; ACU02167; ACU02172; ACU02204; ACU29572; ACU29575; ACU78131; ACU78161; ACU78167; ACU78172; ACU78178; ACV40702; ACV89442; ACV89445; ACX42593; ACX42615; ACX42619; ACX81361; ACX81371; ACZ04957; ACZ73426; ADB25042; ADB81927; ADB81929; ADC32156; ADC32163; ADC32238; ADC32252; ADC32253; ADC32258; ADC32259; ADC32265; ADC79910; ADC79943; ADC79953; ADC81015; ADC81053; ADC81060; ADC81062; ADD17359; ADD97830; ADE58580; ADE58617; ADE58625; ADE58627; ADE58634; ADE58638; ADE58639; ADE58645; ADE58655; ADE72798; ADE72808; ADE72811; ADE72812; ADE72823; ADE72826; ADE72844; ADE73011; ADE73012; ADE73037; ADE73038; ADE73055; ADE73109; ADE73229; ADE73234; ADE73346; ADE73352; ADE73356; ADE73454; ADE73467; ADE73491; ADE73500; ADE73597; ADE73607; ADE73611; ADE73614; ADE73769; ADE73802; ADE73804; ADE73809; ADE73811; ADF58787; ADG34823; ADI75500; ADI75501; ADJ95498; ADJ67215; ADM72711; ADM72716; ADN87366; ADN92574; ADN92581; ADN92590; ADN92598; ADN92601; ADN92603; ADP09051; ADP09052; ADQ48107; ADQ48110; ADQ55899; ADQ86004; ADW24278; ADW24280; ADW24293; ADZ73062; ADZ73078; ADZ73087; AEA49770; AEA49772; AEA49778; AEA49786; AEA49793; AEA49795; AEA49802; AEA49807; AEA49812; AEA50948; AEA51187; AEC33253; AEF13114; AEF13795; AEF13809; AEF13819; AEF13835; AEF13841; AEI00993; AEI17784; AEI30758; AEI30761; AEI30766; AEI30770; AEI30772; AEI30781; AEI59542; AEI59545; AEI59550; AEI98740; AEJ22068; AEJ22071; AEJ87203; AEK67316; AEK86202; AEK94822; AEK94824; AEK94829; AEK94887; AEK94922; AEK94975; AEK95020; AEK95028; AEK95297; AEK95307; AEK95342; AEK95349; AEK95483; AEK95502; AEK95515; AEK95516; AEK95712; AEK95723; AEK95731; AEK95766; AEK95793; AEK95837; AEK95839; AEK95843; AEK95844; AEK95867; AEK95887; AEK95890; AEK95896; AEK95906; AEK95910; AEP16360; AEP17321; AEP17323; AEQ28961; AER23868; AER92531; AEU10166; AEW23054; AEW23061; AEW23067; AEW90664; AEY80132; AFA42475; AFA42499; AFA42515; AFA42518; AFA42532; AFA42537; AFA42577; AFA42629; AFA42696; AFA42700; AFA42706; AFA42744; AFA42745; AFA42747; AFC91649; AFD23751; AFD23753; AFD23757; AFD23772; AFD36893; AFD36895; AFD36919; AFD36968; AFD36979; AFD36981; AFD62771; AFD62783; AFD97748; AFE48706; AFE48708; AFH66638; AFH66651; AFH66658; AFH78040; AFH78047; AFH78054; AFH88380; AFI25182; AFI25185; AFJ44805; AFJ44807; AFJ79206; AFK08506; AFK08512; AFK08513; AFK24405; AFK24408; AFK24417; AFK64699; AFK64712; AFK64717; AFK76449; AFM44680; AFM44692; AFM44696; AFM77784; AFM77786; AFM77788; |

TABLE 4-continued

Proteomic and Glycomic Biomarkers for SCLC

| Marker Type and Direction in SCLC Cases Compared to Controls | Gene Name | UniProt Accession | GenBank Protein Accession |
|---|---|---|---|
| | | | AFN66535; AFN89847; AFO62998; AFP43705; AFP43707; AFP72373; AFR69124; AFR69127; AFS64118; AFS64119; AFT82614; AFU81194; AFU93084; AFU93838; AFV73993; AFV73999; AFV74005; AFV74013; AFV74019; AFV74050; AFV74069; AFX62381; AFX84021; AFX95920; AFZ93937; AFZ93943; AFZ93944; AFZ93974; AFZ94387; AFZ94388; AFZ94392; AFZ94397; AFZ94398; AFZ94461; AFZ94485; AFZ94489; AFZ94491; AFZ94561; AFZ94582; AGC82235; AGD80268; AGE97322; AGG68829; AGG68831; AGG79669; AGG79701; AGG79722; AGG79724; AGG79726; AGG79802; AGG79925; AGG79989; AGH25493; AGH58092; AGJ52180; AGK44310; AGK44313; AGK44314; AGK44345; AGK44380; AGL07600; AGL09214; AGL73111; AGO32831; AGO86844; AGQ03754; AGQ03762; AGS42401; AGV54900; AGV68803; AGZ87471; AGZ87485; AGZ87499; AGZ87504; AGZ87509; AGZ87513; AGZ87519; AGZ87543; AGZ87549; AGZ87550; AGZ87559; AGZ87560; AGZ87561; AGZ87578; AGZ87583; AGZ87588; AGZ87589; AGZ87595; AGZ87596; AGZ87597; AGZ92789; AGZ92791; AGZ92794; AGZ92801; AGZ92808; AGZ92811; AGZ92812; AGZ92818; AGZ92823; AGZ92827; AGZ92831; AGZ92843; AHA11844; AHA49738; AHF52841; AHF71338; AHF71346; AHG52865; AHG52867; AHI42990; AHN92454; AHN92458; AHN92460; AHY61451; AHY61464; AHY61487; AHY61504; AHY61527; AHY61531; AHY61559; AHY61577; AHY61578; AHY61582; AHY61592; AHY61606; AHY61623; AHY61626; AHY81363; AHY81381; AHY81383; AHY81396; AHY81407; AHY81417; AHY81429; AHY81437; AHY81445; AHY81451; AHY81455; AHY81460; AHY81462; AHY81464; AHY81467; AHY81468; AHY81469; AHY81475; AHY81476; AHY81480; AHY81485; AHY81488; AHY81492; AHY81493; AHY81499; AHY81508; AHY81522; AHY81533; AHY81539; AHY81540; AHY81546; AHY81550; AHY81552; AHY81555; AHY81556; AHZ30687; AHZ30692; AHZ30694; AHZ30701; AHZ30716; AHZ30718; AHZ30719; AHZ30727; AHZ30734; AHZ30738; AHZ30745; AHZ30746; AHZ30748; AHZ30751; AHZ30754; AHZ30756; AHZ30757; AHZ30760; AHZ30764; AHZ30779; AHZ30780; AHZ30786; AHZ30789; AHZ30807; AIA66931; AIA98431; AIC77109; AIE39126; AIE39131; AIE39141; AIE39144; AIE39146; AIE39148; AIE39154; AIE39157; AIE39168; AIN41805; AIN41806; AIN41808; AIN41824; AIN41840; AIN41846; AIN41856; AIX94092; AIX94097; AIX94104; AIX94118; AIX94130; AIY25917; AJI43006; AJI43007; AJI43012; AJI43015; AJI43016; AJI43018; AJI43049; AJI43058; AJI43060; AJI43062; AJI43065; AJI43069; AJI43076; AJI43080; AJM87486; AKA93870; AKA93883; AKA93899; AKA93903; AKP49082; AKU19359; ALA65388; ALD83649; ALF37830; ALG04358; ALG76662; ALH21895; ALM96678; ALN39129; ALO24306; ALP46209; ALP46213; ALS46615; ALT08036; AMB21151; AMP83989; AMR70862; AMR70865; AMR70870; AMR70926; AMR70929; AMR70989; ANG08799; BAA84645; BAB71760; BAD19045; BAE78598; BAE87033; BAG12800; BAG12801; BAG30710; BAG30812; BAI50007; BAI52764; BAI52915; BAI66261; BAI66267; BAN04714; BAN59832; BAN59844; CAA39243; CAB41999; CAB43110; CAB57318; CAB96870; CAB96998; CAC00689; CAC36395; CAC37336; CAC44382; CAD24477; CAD44640; CAD48117; CAD61867; CAD66674; CAE22481; CAE45179; CAG38621; CAH25490; CAJ01785; CAJ21345; CAJ41178; CAJ66086; CAL59518; CAM12704; CAM90933; CAP58182; CAQ68182; CAX48969; CBL59231; CBL59234; CBL59243; CBM41441; CBM42058; CBW44094; CBW44118; CBW47476; CBW69643; CBW94250; CBX19695; CBX19704; CBX19705; CBX19706; CBX19817; CBX24358; CBX87026; CBX87027; CBX87028; CCA61234; CCB78843; CCB78846; CCB78857; CCB78858; CCB78861; CCB78880; CCB78884; CCB78895; CCB78912; CCB78951; CCB78965; CCB78966; CCB78977; CCC15080; CCC15144; CCF17390; CCF23461; CCF78535; CCH57804; CCK33017; CCL98004; CCM43937; CCV02677; CCW36800; CDF63775; CDK41204; CDO33933; CDO33934; CDO67976; CDQ51631; CDQ51636; CDQ51667; CDR19365; CDX47509; CEE15325; CEF48094; CEG29829; CEO43662; CEP28081; CQR91471; CUV66662; CUV66668; CUV66675; CUV66677; CUV66678; CUV66686; CUV66712; CUV66723; CUV66731; CUV66748; CUV66755; CUV66775; CUV66791; CUV66792; CUV66797; CUV66800; CUV66805; CUV66807; CUX90949; CUX90954; CUX90955; CUX90962; CUX90964; CUX90973; CUX90980; CUX90984; CUX90990; CUX91007; EAX03244; P30453; SAP17543; CAA04647; CAC27416; BAA05549; BAA07530; BAA11935; BAA11936; ABC55710; ABC55714; AAA59600; AAA59599; CAA26297; CAA69599; CAA80612; AAA03604; AAA36218; AAA76608; |

TABLE 4-continued

Proteomic and Glycomic Biomarkers for SCLC

| Marker Type and Direction in SCLC Cases Compared to Controls | Gene Name | UniProt Accession | GenBank Protein Accession |
|---|---|---|---|
| | | | AAB02120; AAB16923; AAB87057; AAC06320; AAC18858; AAD02206; AAD23437; AAD28168; AAD33739; AAD33859; AAD33865; AAF03242; AAF25960; AAF64506; AAF70298; AAF73063; AAF78045; AAG21403; AAL10675; AAL10684; AAL87131; AAP32698; AAP88042; AAQ67705; AAQ72733; AAR28200; AAS48457; AAW22618; AAW58069; AAW63722; AAW66599; AAW81982; AAX18627; AAY23009; AAY85375; AAZ32761; AAZ32762; ABB00702; ABB00703; ABC74568; ABC79294; ABD62871; ABD62872; ABE00934; ABE27974; ABF71073; ABF71714; ABG43098; ABI64161; ABK60079; ABL98043; ABN45878; ABN51227; ABO86192; ABQ45967; ABQ96854; ABU86832; ABU86841; ABW86960; ABY26534; ABY64662; ABZ89499; ACA34992; ACA34995; ACA51867; ACA79968; ACB45596; ACG49999; ACH56946; ACI22667; ACI22947; ACI43208; ACJ06427; ACJ24536; ACJ31783; ACJ71677; ACJ71688; ACJ71692; ACL51037; ACL51727; ACN76766; ACN76771; ACN76774; ACN76776; ACN81182; ACN81196; ACN81211; ACN81235; ACN81237; ACN91031; ACO40325; ACO44524; ACO44525; ACO44527; ACO44531; ACO44535; ACO44542; ACO44550; ACO44560; ACO44573; ACO44576; ACO44580; ACO44581; ACO44585; ACO44597; ACO44599; ACO44601; ACO44609; ACO44621; ACO44633; ACO44643; ACO48411; ACO87714; ACO87725; ACO87727; ACO90214; ACP27988; ACP27989; ACP40975; ACQ99525; ACR25161; ACR54307; ACR54329; ACR55721; ACS12740; ACS12754; ACS12757; ACS27547; ACS27573; ACS27687; ACS36349; ACS36351; ACS36356; ACS36371; ACS36374; ACS36391; ACS36394; ACS36403; ACS36405; ACT76255; ACT83687; ACT99993; ACT99994; ACU02132; ACU02135; ACU02138; ACU02140; ACU02143; ACU02152; ACU02159; ACU02166; ACU02168; ACU02173; ACU29562; ACU78164; ACU78171; ACU78188; ACV30340; ACV40698; ACV52061; ACV66341; ACV89433; ACV92041; ACV92042; ACX42604; ACX42607; ACX50456; ACX71598; ACX71838; ACZ56419; ACZ56420; ACZ56423; ADB25044; ADC32160; ADC32183; ADC32231; ADC32239; ADC32263; ADC32264; ADC45399; ADC45438; ADC79891; ADC79915; ADC79917; ADC79920; ADC79925; ADC79926; ADC79934; ADC79944; ADC79950; ADC81026; ADC81040; ADC81041; ADC81042; ADC81047; ADC81052; ADC81055; ADC81068; ADC81075; ADC81083; ADD17360; ADD23525; ADD97841; ADE42864; ADE58592; ADE58593; ADE58600; ADE58611; ADE58615; ADE58641; ADE58642; ADE58653; ADE58656; ADE72805; ADE72820; ADE72821; ADE72824; ADE72827; ADE72834; ADE72838; ADE72848; ADE72851; ADE72858; ADE73003; ADE73004; ADE73107; ADE73113; ADE73293; ADE73349; ADE73353; ADE73468; ADE73494; ADE73496; ADE73539; ADE73542; ADE73596; ADE73661; ADE73776; ADE73783; ADE73786; ADE73795; ADE73798; ADE80888; ADE80889; ADH04230; ADI95496; ADI95503; ADJ54141; ADM72715; ADM72717; ADM72721; ADM72735; ADN87360; ADN87367; ADN92575; ADN92589; ADN92597; ADN92599; ADN92606; ADP09050; ADQ12886; ADQ48106; ADQ55909; ADQ55912; ADW24255; ADW24265; ADW24271; ADW24273; ADX94775; ADZ31204; ADZ38938; ADZ38946; ADZ73065; ADZ73079; ADZ73082; ADZ73086; AEA49774; AEA49783; AEA49811; AEB65790; AEF13090; AEF13091; AEF13092; AEF13111; AEF13784; AEF13798; AEF13802; AEF13820; AEF13825; AEG64621; AEI00952; AEI00959; AEI00963; AEI00971; AEI00983; AEI00985; AEI00987; AEI59556; AEI91788; AEI98729; AEJ90502; AEJ90504; AEK32811; AEK67312; AEK94826; AEK94916; AEK94918; AEK95023; AEK95033; AEK95035; AEK95291; AEK95302; AEK95303; AEK95346; AEK95350; AEK95496; AEK95523; AEK95525; AEK95711; AEK95738; AEK95749; AEK95753; AEK95773; AEK95794; AEK95805; AEK95809; AEK95838; AEK95842; AEK95853; AEK95859; AEK95862; AEK95901; AEP17317; AER92533; AEU10178; AEU10180; AEV23664; AEW23014; AEW23017; AEW23018; AEW90652; AEW90655; AFA42428; AFA42500; AFA42575; AFA42583; AFA42634; AFA42636; AFA42742; AFD23764; AFD23768; AFD23773; AFD23776; AFD23778; AFD36894; AFD36896; AFD36918; AFD36967; AFD62784; AFD62787; AFD62789; AFD62792; AFE48716; AFH66634; AFH66635; AFH66647; AFH66649; AFH66650; AFH66657; AFH78049; AFH89646; AFI57820; AFJ04126; AFJ44773; AFK08516; AFK24403; AFK64686; AFK64690; AFK64691; AFK87761; AFM44683; AFM44685; AFM44693; AFM44700; AFM56240; AFM56243; AFM77791; AFN61284; AFN88136; AFN89844; AFP20869; AFP58879; |

TABLE 4-continued

Proteomic and Glycomic Biomarkers for SCLC

| Marker Type and Direction in SCLC Cases Compared to Controls | Gene Name | UniProt Accession | GenBank Protein Accession |
|---|---|---|---|
| | | | AFU81191; AFV73990; AFV73996; AFV74007; AFV74047; AFV74067; AFV74071; AFX84020; AFX84023; AFZ93931; AFZ93932; AFZ93935; AFZ93939; AFZ93962; AFZ94381; AFZ94459; AFZ94487; AFZ94493; AFZ94552; AFZ94555; AFZ94557; AGC51043; AGG11861; AGG68826; AGG79703; AGG79737; AGG79782; AGG79787; AGG79887; AGG79891; AGG80009; AGG80014; AGH39852; AGH58091; AGI02598; AGI65159; AGJ95110; AGK44308; AGK44312; AGL73110; AGQ03760; AGU13630; AGU13633; AGZ87481; AGZ87487; AGZ87490; AGZ87492; AGZ87506; AGZ87522; AGZ87532; AGZ87536; AGZ87564; AGZ87581; AGZ87586; AGZ87593; AGZ87602; AGZ87605; AGZ87606; AGZ92814; AGZ92820; AGZ92821; AGZ92830; AGZ92842; AGZ92845; AHA44502; AHA49734; AHA49737; AHJ80989; AHN92459; AHN92461; AHV90273; AHW45891; AHY61459; AHY61467; AHY61469; AHY61473; AHY61476; AHY61477; AHY61483; AHY61497; AHY61539; AHY61543; AHY61544; AHY61551; AHY61568; AHY61572; AHY61573; AHY61586; AHY61603; AHY81346; AHY81358; AHY81359; AHY81366; AHY81368; AHY81370; AHY81374; AHY81375; AHY81390; AHY81392; AHY81395; AHY81399; AHY81406; AHY81433; AHY81440; AHY81452; AHY81456; AHY81461; AHY81471; AHY81497; AHY81501; AHY81503; AHY81523; AHY81526; AHY81543; AHY81544; AHZ30697; AHZ30720; AHZ30728; AHZ30736; AHZ30737; AHZ30747; AHZ30755; AHZ30759; AHZ30762; AHZ30769; AHZ30784; AHZ30785; AHZ30792; AHZ30794; AHZ30796; AHZ30812; AIA66933; AIB52375; AIB55777; AIB55786; AIE39143; AIE39166; AIE39176; AII80554; AIK28511; AIN41810; AIN41828; AIN41837; AIN41843; AIN41844; AIN41857; AIN41861; AIX09858; AIX94086; AIX94117; AIX94125; AIX94127; AIX94132; AIY26931; AJA90812; AJI43002; AJI43005; AJI43019; AJI43026; AJI43035; AJI43043; AJI43047; AJI43048; AJI43054; AJI43055; AJI43057; AJI43067; AJI43077; AKA93875; AKA93885; AKG95443; AKJ75507; AKL83124; ALA10821; ALA65386; ALG76651; ALH21902; ALO23540; ALS55299; AMB21152; AMD39525; AME17705; AMO26192; AMR70308; AMR70988; BAD36754; BAD77818; BAD77942; BAD95617; BAD95618; BAE48524; BAE78473; BAE93145; BAH09092; BAH23561; BAH85290; BAI59696; BAI59698; BAI66260; BAI66262; BAI66266; BAJ25762; BAJ83600; BAK53479; BAM28631; BAN59784; BAN59838; CAB09723; CAB42000; CAB57306; CAB65738; CAC06086; CAC27518; CAD26949; CAD45178; CAD45434; CAD66673; CAD79469; CAD79470; CAF18417; CAF33344; CAG27089; CAH59953; CAI26292; CAI96181; CAJ43230; CAJ70701; CAJ84550; CAL18290; CAL69123; CAL80737; CAM34677; CAN89495; CAQ16345; CAR66114; CAR94521; CAX33835; CAZ66352; CAZ66354; CAZ66355; CAZ66356; CBB38510; CBH26012; CBI61642; CBJ18094; CBL86580; CBM41039; CBN72525; CBW31642; CBW44121; CBW47474; CBW94246; CBX36124; CBY93684; CBZ39250; CCB78840; CCB78841; CCB78856; CCB78870; CCB78877; CCB78892; CCB78901; CCB78904; CCB78907; CCB78954; CCB78960; CCB78978; CCB78979; CCC55552; CCD04083; CCF23448; CCG14227; CCH27328; CCM12467; CCN97890; CCW36807; CDJ79535; CDJ79538; CDK41189; CDK41200; CDL72710; CDM99289; CDO67965; CDO67977; CDQ51630; CDQ51655; CDQ51664; CDQ51673; CDR98157; CDX10186; CDX10188; CEF52522; CEH11576; CQR91467; CQR91470; CTQ48003; CTQ48004; CUH74625; CUI25653; CUR70744; CUV66666; CUV66669; CUV66670; CUV66687; CUV66695; CUV66707; CUV66714; CUV66729; CUV66734; CUV66736; CUV66742; CUV66752; CUV66754; CUV66774; CUV66778; CUW00372; CUW00373; CUW00374; CUW01267; CUX90940; CUX90943; CUX90956; CUX90960; CUX90970; CUX90971; CUX90987; CUX91003; CUX91009; CUX91010; CVK15079; CZQ50133; P04439; P30443; P30455; P30459; Q09160; SAL89094; AAB66704; AAD05568; AAF25781; AAG27626; CAA04643; BAG62841; AAH08611; BAA03279; AAA80569; AAB60406; AAB08574; CAA43873; CAA43880; CAA66389; AAA59612; AAA59838; AAA59839; AAA65449; AAB48628; AAB50149; AAB70278; AAB82079; AAB87048; AAB87054; AAB87058; AAB92550; AAC28559; AAD09489; AAD28170; AAD34010; AAD39981; AAD44708; AAD45369; AAD48505; AAD53014; AAF19525; AAF34685; AAF61965; AAK49189; AAL01996; AAL10676; AAL38666; AAM77210; AAP49444; AAP49446; AAP55807; AAQ96777; AAR07615; AAR28202; AAS75118; AAT41625; AAT44889; AAW30168; AAZ28909; AAZ28919; AAZ75663; ABB00704; ABB00707; ABB13527; ABC79298; ABD64774; ABF18978; ABF58776; ABK63711; |

TABLE 4-continued

Proteomic and Glycomic Biomarkers for SCLC

| Marker Type and Direction in SCLC Cases Compared to Controls | Gene Name | UniProt Accession | GenBank Protein Accession |
|---|---|---|---|
| | | | ABM92294; ABO14984; ABO87673; ABP57138; ABP73295; ABQ08748; ABQ08750; ABQ45961; ABQ45966; ABR21559; ABS18722; ABS85167; ABU86834; ABU86835; ABU86836; ABU86840; ABU86844; ABV66224; ACA28730; ACA28732; ACE76868; ACF24760; ACF95802; ACH73187; ACI43211; ACJ71678; ACJ71679; ACL51721; ACM24226; ACN76768; ACN81185; ACN81190; ACN81192; ACN81202; ACN81213; ACN81242; ACN89869; ACN91037; ACO44529; ACO44534; ACO44537; ACO44545; ACO44547; ACO44570; ACO44572; ACO44592; ACO44595; ACO44603; ACO44606; ACO44613; ACO44614; ACO44630; ACO44636; ACO44637; ACO44642; ACO48406; ACO48418; ACO48420; ACP27992; ACR54310; ACR54316; ACR54318; ACR54330; ACR54331; ACR55734; ACS27554; ACS27570; ACS27572; ACS36362; ACS36381; ACS36387; ACS36390; ACS36393; ACS36395; ACS36399; ACS36400; ACS36404; ACT64610; ACT76258; ACT79396; ACT79397; ACT83686; ACT83699; ACU00666; ACU02131; ACU02151; ACU02153; ACU02160; ACU02171; ACU02175; ACU02176; ACU27249; ACU27250; ACU27253; ACU78159; ACU78175; ACV40689; ACV40700; ACV89431; ACV89439; ACV89443; ACV92040; ACX42592; ACX42597; ACX42599; ACX42605; ACX42613; ACX50455; ACX71599; ACX81362; ACX81363; ACX81367; ACX81369; ACY41034; ACZ56422; ACZ64210; ADB27768; ADB55625; ADB81930; ADC32159; ADC32162; ADC32181; ADC32184; ADC32185; ADC32233; ADC32235; ADC32244; ADC32249; ADC32255; ADC32256; ADC79896; ADC79900; ADC79916; ADC79923; ADC79927; ADC79937; ADC79945; ADC79948; ADC79955; ADC79966; ADC79967; ADC81007; ADC81020; ADC81029; ADC81033; ADC81044; ADC81046; ADC81072; ADC81076; ADD97829; ADD97831; ADD97834; ADD97836; ADD97842; ADD97843; ADD97844; ADE18745; ADE58582; ADE58585; ADE58594; ADE58595; ADE58598; ADE58599; ADE58602; ADE58613; ADE58626; ADE58631; ADE58649; ADE72797; ADE72801; ADE72806; ADE72809; ADE72815; ADE72817; ADE72818; ADE72841; ADE72852; ADE72865; ADE72866; ADE73029; ADE73034; ADE73056; ADE73108; ADE73232; ADE73235; ADE73265; ADE73266; ADE73267; ADE73357; ADE73466; ADE73545; ADE73601; ADE73657; ADE73772; ADE73774; ADI95499; ADI95502; ADJ67225; ADM52299; ADM72714; ADM72742; ADN92604; ADP09053; ADQ48103; ADQ55910; ADT71648; ADW24267; ADW24268; ADW24276; ADW24288; ADZ05619; ADZ05621; ADZ73066; ADZ73070; ADZ73084; AEA49771; AEA49780; AEA49782; AEA49792; AEA49799; AEA49808; AEF13106; AEF13108; AEF13790; AEF13794; AEF13815; AEF13838; AEF13842; AEI00945; AEI00953; AEI00964; AEI00969; AEI30773; AEI30775; AEI30778; AEI30780; AEI59541; AEJ22075; AEJ90499; AEK67315; AEK94821; AEK94830; AEK94980; AEK95025; AEK95289; AEK95300; AEK95301; AEK95306; AEK95495; AEK95503; AEK95719; AEK95727; AEK95736; AEK95750; AEK95786; AEK95792; AEK95797; AEK95798; AEK95818; AEK95822; AEK95828; AEK95835; AEK95845; AEK95852; AEK95856; AEK95857; AEK95883; AEK95885; AEK95898; AEP17316; AEP17319; AEP17320; AER92535; AEU10167; AEU10181; AEW23008; AEW23020; AEW23052; AEW23065; AEW23066; AEW23068; AEW90661; AEW90662; AEX25776; AEY80133; AFA42425; AFA42471; AFA42502; AFA42538; AFA42578; AFA42698; AFA42737; AFA42739; AFA42740; AFA42749; AFD23749; AFD23761; AFD23774; AFD23777; AFD36922; AFD36925; AFD36969; AFD61653; AFD62775; AFE48718; AFE48720; AFE88965; AFH66645; AFH66646; AFH66655; AFH66659; AFH78034; AFH78036; AFH78038; AFH78055; AFI55464; AFI57821; AFI57824; AFJ04127; AFK08500; AFK08507; AFK08511; AFK24410; AFK24416; AFK24418; AFK49810; AFK64688; AFK64695; AFK64698; AFK76447; AFK87750; AFL91481; AFM44669; AFM44670; AFM44672; AFM44675; AFM44681; AFM44686; AFM44688; AFM44698; AFN61285; AFN88127; AFN88131; AFN88132; AFN88135; AFN89848; AFT82612; AFU93836; AFV73995; AFV74011; AFV74012; AFV74017; AFV74018; AFV74051; AFV74070; AFV74680; AFW99834; AFX62377; AFX62378; AFX84019; AFZ93928; AFZ94389; AFZ94488; AFZ94556; AFZ94583; AFZ94617; AFZ94618; AGD80567; AGE97320; AGE97321; AGG56509; AGG68830; AGG79670; AGG79786; AGG79803; AGG79873; AGG79928; AGG79991; AGG80017; AGH58093; AGH70373; AGJ52189; AGJ84085; AGJ84088; AGJ95111; AGK44350; AGL07597; AGL73108; AGL73115; AGL73116; AGM53430; AGQ03757; |

TABLE 4-continued

Proteomic and Glycomic Biomarkers for SCLC

| Marker Type and Direction in SCLC Cases Compared to Controls | Gene Name | UniProt Accession | GenBank Protein Accession |
|---|---|---|---|
| | | | AGS38344; AGU13640; AGU38489; AGX13923; AGZ87468; AGZ87470; AGZ87483; AGZ87486; AGZ87488; AGZ87491; AGZ87493; AGZ87500; AGZ87503; AGZ87507; AGZ87514; AGZ87516; AGZ87517; AGZ87533; AGZ87542; AGZ87572; AGZ87573; AGZ87587; AGZ87600; AGZ87607; AGZ92806; AGZ92819; AGZ92826; AGZ92851; AGZ95028; AHA49716; AHA49717; AHF71342; AHN52943; AHY61470; AHY61471; AHY61484; AHY61493; AHY61494; AHY61505; AHY61530; AHY61533; AHY61535; AHY61536; AHY61542; AHY61550; AHY61556; AHY61561; AHY61576; AHY61581; AHY61587; AHY61595; AHY61602; AHY61614; AHY61616; AHY81360; AHY81361; AHY81382; AHY81385; AHY81389; AHY81397; AHY81400; AHY81402; AHY81412; AHY81419; AHY81422; AHY81423; AHY81463; AHY81472; AHY81478; AHY81479; AHY81489; AHY81504; AHY81507; AHY81516; AHY81534; AHY81541; AHY81548; AHY81549; AHY81559; AHY81566; AHZ30715; AHZ30717; AHZ30722; AHZ30730; AHZ30743; AHZ30776; AHZ30778; AHZ30783; AHZ30798; AHZ30801; AHZ30808; AHZ30811; AID53086; AIE39136; AIE39139; AIE39150; AIE39158; AIE39162; AIE39165; AIE39170; AIE39174; AII80553; AIN41802; AIN41813; AIN41820; AIN41822; AIN41825; AIN41832; AIN41848; AIN41849; AIN41850; AIN41860; AIV00670; AIX94096; AIX94102; AIX94110; AIX94122; AJA90814; AJI43003; AJI43020; AJI43033; AJI43034; AJI43038; AJI43045; AJI43051; AJI43063; AJI43081; AKA93873; AKA93877; AKA93878; AKA93881; AKA93904; AKE47352; AKJ66245; ALJ77678; AMO26194; AMR93990; ANG08796; BAA84643; BAD00981; BAD30024; BAD77941; BAD77943; BAD98466; BAF46392; BAK53480; BAM28627; BAM28629; BAM72630; BAN59790; BAN59808; BAN59814; BAN62612; CAA73072; CAB07989; CAB41636; CAB43622; CAB56605; CAC27241; CAD23134; CAD30042; CAD44950; CAD45435; CAD61025; CAE53175; CAG24006; CAI34859; CAI39219; CAI84068; CAJ32464; CAJ66087; CAL34150; CAL80735; CAM28531; CAM98059; CAN85194; CAN89497; CAO98862; CAP58181; CAP60755; CAU70302; CAZ66353; CAZ66358; CAZ90644; CAZ90645; CBA35167; CBH20089; CBL51955; CBL59232; CBL59249; CBL59250; CBM41440; CBW44117; CBW44119; CBW47472; CBW69639; CBW69644; CBX19770; CBX19816; CBY83773; CCB78849; CCB78866; CCB78868; CCB78869; CCB78871; CCB78876; CCB78878; CCB78887; CCB78914; CCB78953; CCB78963; CCB78972; CCB78981; CCE73899; CCF03534; CCG14175; CCK73123; CCQ18709; CCW03265; CDF63776; CDH35264; CDI30154; CDI43893; CDK13052; CDK41171; CDM87252; CDN39948; CDO33940; CDO67967; CDO67968; CDQ51660; CDQ51669; CDQ51670; CDQ51679; CDQ51680; CDQ51681; CDR98158; CEF48045; CEN31973; CQR91465; CRG63509; CUU97276; CUV03801; CUV66679; CUV66680; CUV66690; CUV66696; CUV66699; CUV66706; CUV66717; CUV66724; CUV66726; CUV66740; CUV66746; CUV66760; CUV66763; CUV66766; CUV66767; CUV66779; CUX90977; CUX90979; CUX90996; CUX91015; EAX03242; EAX03245; P10316; P30450; SAI78371; SAI78377; SAL89097; AAD02067; CAA04209; CAB56838; BAC86217; AAO20854; AAH19236; BAA03280; BAA03282; BAA04119; ABC55713; AFH41801; AAB59614; AAA59598; AAB47873; AAA59653; AAA73518; AAA87572; CAA31503; CAA73716; AAA59615; AAA76609; AAB70277; AAB82080; AAB82081; AAC14103; AAC26020; AAC79721; AAD22269; AAD22272; AAD27539; AAD33737; AAD34883; AAF04848; AAF05535; AAF23125; AAF29553; AAF66709; AAF73068; AAF73862; AAG01872; AAG16251; AAG27627; AAG38635; AAG42276; AAG49321; AAK09376; AAK49188; AAK52517; AAK58591; AAL09700; AAL55399; AAN52398; AAN64244; AAP94631; AAQ72734; AAT35596; AAW21338; AAW81710; AAX07135; AAX58630; AAZ28911; AAZ40332; AAZ66805; ABA29234; ABB00705; ABB00706; ABF54961; ABL98210; ABM98423; ABO87665; ABP57139; ABP96833; ABQ01715; ABQ45965; ABS18723; ABS18724; ABS29696; ABU86831; ABW21689; ACA34990; ACA34997; ACB45878; ACB98185; ACE60612; ACF19761; ACG59279; ACI15742; ACI43212; ACJ71686; ACJ71693; ACK44105; ACL34370; ACL51724; ACN76765; ACN81176; ACN81179; ACN81180; ACN81200; ACN81232; ACN81236; ACN81238; ACN81239; ACN89874; ACO44523; ACO44526; ACO44544; ACO44549; ACO44571; ACO44610; ACO44615; ACO44616; ACO44619; ACO44620; ACO44622; ACO44626; ACO44629; ACO44639; ACO48404; ACO48407; ACO87722; ACO87731; ACP27866; ACP27870; ACP27995; ACQ99523; ACR23346; |

TABLE 4-continued

Proteomic and Glycomic Biomarkers for SCLC

| Marker Type and Direction in SCLC Cases Compared to Controls | Gene Name | UniProt Accession | GenBank Protein Accession |
|---|---|---|---|
| | | | ACR25159; ACR54309; ACR54314; ACR54317; ACR54319; ACR54321; ACR54327; ACR55725; ACR55727; ACR55733; ACS27556; ACS27558; ACS27560; ACS27561; ACS27678; ACS36353; ACS36358; ACS36360; ACS36366; ACS36377; ACS36401; ACS36402; ACT34382; ACT64611; ACT83696; ACT97163; ACU02133; ACU02147; ACU02154; ACU02196; ACU27248; ACU27255; ACU29574; ACU29580; ACU29582; ACU29584; ACU46619; ACU78162; ACU78170; ACU78173; ACU78190; ACV40688; ACV40695; ACV40696; ACV87226; ACV89446; ACX42596; ACX42602; ACX42617; ACX50454; ACX81360; ACZ04959; ADC32157; ADC32186; ADC32237; ADC32254; ADC32261; ADC45434; ADC79892; ADC79898; ADC79913; ADC79921; ADC79922; ADC79931; ADC79933; ADC79935; ADC79939; ADC79954; ADC79958; ADC81019; ADC81021; ADC81030; ADC81036; ADC81048; ADC81051; ADC81054; ADC81056; ADC81057; ADC81061; ADC81064; ADC81069; ADD71847; ADD97827; ADD97846; ADE58574; ADE58576; ADE58588; ADE58590; ADE58601; ADE58614; ADE58632; ADE58640; ADE58650; ADE72828; ADE72830; ADE72837; ADE72864; ADE73013; ADE73016; ADE73019; ADE73023; ADE73025; ADE73031; ADE73100; ADE73102; ADE73105; ADE73114; ADE73115; ADE73264; ADE73294; ADE73359; ADE73450; ADE73455; ADE73490; ADE73493; ADE73598; ADE73600; ADE73602; ADE73603; ADE73655; ADE73663; ADE73665; ADE73667; ADE73768; ADE73780; ADE73788; ADE73793; ADE73796; ADE73797; ADE73810; ADE80887; ADI24376; ADI56258; ADI95504; ADM26765; ADM72712; ADM72730; ADM72737; ADN87365; ADN87369; ADN92586; ADN92605; ADW24257; ADW24262; ADW24264; ADW24269; ADW24277; ADW24279; ADX86747; ADZ31205; ADZ31207; ADZ31208; ADZ38940; ADZ73067; AEA49784; AEA49785; AEA; |
| SLEA UP | HLA-B | P30488 | AAA52657; AAA52659; AAA52664; AAA59620; AAB00197; AAB02607; AAB06739; AAB07700; AAB48493; AAB49760; AAB50151; AAB51453; AAB62223; AAB67809; AAB67816; AAB67818; AAB70250; AAB70281; AAB70282; AAB70295; AAB82056; AAB84035; AAB87726; AAB96792; AAC07913; AAC08026; AAC14124; AAC17712; AAC18388; AAC18816; AAC33187; AAC67567; AAC67570; AAD14426; AAD19591; AAD23392; AAD23461; AAD27537; AAD28165; AAD28166; AAD28167; AAD51743; AAD51748; AAD55793; AAF19426; AAF32321; AAF36681; AAF70328; AAF89550; AAF97850; AAG01821; AAG42279; AAG42280; AAK07653; AAK07654; AAK31806; AAK38401; AAK57737; AAK69671; AAK94505; AAK94512; AAK97443; AAK97445; AAL18232; AAL59421; AAN16457; AAO18660; AAO21940; AAO21942; AAQ16164; AAT11511; AAT35594; AAU89133; AAV91504; AAW88384; AAX56911; AAX73223; AAX73224; AAY26573; AAY96636; AAZ15022; ABA07958; ABA07959; ABA29237; ABB51135; ABD64574; ABE27965; ABE27970; ABF18980; ABF60560; ABF93211; ABH03381; ABH03570; ABI26620; ABI95095; ABJ90454; ABK33465; ABL63749; ABM92296; ABM92298; ABN11363; ABN51218; ABP87680; ABS59404; ABU63662; ABU96080; ACA28733; ACB45466; ACD01090; ACD87747; ACI45411; ACJ71680; ACK37875; ACL34365; ACL34366; ACM68929; ACM90164; ACN12930; ACN12948; ACN38392; ACN76608; ACN76612; ACN81074; ACN81087; ACN81111; ACN81118; ACN81122; ACN81123; ACN81126; ACN81156; ACN81160; ACN81161; ACN81164; ACN81171; ACN81223; ACN81271; ACN81272; ACN81273; ACN89863; ACN91041; ACO70684; ACO70688; ACO70697; ACO70702; ACO70706; ACO70707; ACO70722; ACO70730; ACO70749; ACO70753; ACO70754; ACO82431; ACO82442; ACO82448; ACO82476; ACO82514; ACO82529; ACO90078; ACO91532; ACO91533; ACO91543; ACO91546; ACO91556; ACO94130; ACO94140; ACO94152; ACO94154; ACO94155; ACO94159; ACP27885; ACP27891; ACP27893; ACP27896; ACP27901; ACP27906; ACP27964; ACP27966; ACP27970; ACP27980; ACR54337; ACR54344; ACR81567; ACR83851; ACS27583; ACS27587; ACS27679; ACS31817; ACS37225; ACT64594; ACT64608; ACT64621; ACT76265; ACU00002; ACU01992; ACU02083; ACU02096; ACU02098; ACU02099; ACU02100; ACU02101; ACU02105; ACU02106; ACU02109; ACU02177; ACU02191; ACU27264; ACU27268; ACU29552; ACU46617; ACV30331; ACV31935; ACV31965; ACV40713; ACV40717; ACV92045; ACV92049; ACX42627; ACX42629; ACX42634; ACX81377; ACX81380; ACY09097; ACZ26469; |

TABLE 4-continued

Proteomic and Glycomic Biomarkers for SCLC

| Marker Type and Direction in SCLC Cases Compared to Controls | Gene Name | UniProt Accession | GenBank Protein Accession |
|---|---|---|---|
| | | | ACZ54646; ACZ54648; ACZ54665; ACZ54666; ADB27758; ADC32147; ADD10596; ADD97859; ADE58670; ADE58671; ADE73084; ADE73120; ADE73126; ADE73132; ADE73134; ADE73195; ADE73198; ADE73222; ADE73226; ADE73302; ADE73369; ADE73373; ADE73501; ADE73515; ADE73560; ADE73562; ADE73620; ADE73623; ADE73625; ADE73680; ADE73686; ADE73691; ADF58790; ADJ56363; ADJ67223; ADK88901; ADM16682; ADM72744; ADM72756; ADN92672; ADN94472; ADQ48113; ADQ48123; ADQ48126; ADQ55924; ADU18062; ADU18065; ADU18072; ADU18075; ADV71253; ADW24301; ADW24331; ADX97430; ADZ38952; ADZ38955; ADZ73098; ADZ73110; ADZ73111; AEA51190; AEB21055; AEB66065; AEB66069; AEB66079; AEB66080; AEB66091; AEB66094; AEB66095; AEC47992; AEF12652; AEF13124; AEF13867; AEF13873; AEF13883; AEH95527; AEI01003; AEI01021; AEI01052; AEI30799; AEI30800; AEI59573; AEI59586; AEJ87202; AEJ87319; AEK94831; AEK94995; AEK95057; AEK95108; AEK95109; AEK95114; AEK95152; AEK95315; AEK95353; AEK95464; AEK95470; AEK95479; AEK95533; AEK95544; AEK95547; AEK95560; AEK95571; AEK95912; AEK95914; AEK95922; AEK95966; AEK95986; AEK95996; AEK96009; AEK96013; AEK96071; AEK96075; AEK96081; AEK96093; AEK96094; AER25321; AER92538; AET21249; AEU10148; AEU43542; AEW23031; AEW23037; AEW23074; AEW46916; AEY80121; AEY80127; AFA42553; AFA42586; AFA42659; AFA42751; AFA42756; AFA43494; AFD36903; AFD36916; AFD36917; AFE48752; AFH88385; AFI57825; AFJ04136; AFJ04143; AFK08606; AFK24431; AFK24437; AFK27532; AFM44706; AFN88151; AFN89850; AFP43721; AFP87507; AFQ37291; AFQ62727; AFR69130; AFS64122; AFU93073; AFV73989; AFV74025; AFV74046; AFV74078; AFV74081; AFV74083; AFV74085; AFX62386; AFX84025; AFZ93958; AFZ94402; AFZ94407; AFZ94498; AFZ94502; AFZ94527; AFZ94539; AFZ94540; AGE97340; AGG79727; AGG79794; AGG79894; AGG79898; AGG79963; AGG79966; AGK07563; AGK38318; AGK44322; AGK44377; AGL34716; AGL34724; AGL73123; AGM48499; AGO86845; AGT79701; AGT79703; AGT79704; AGU13623; AGU13631; AGU13634; AGU13639; AGW47691; AGZ87638; AGZ87639; AGZ87651; AHA37284; AHA37285; AHA37293; AHA37295; AHA37298; AHA37313; AHA53624; AHA53626; AHA53634; AHA53635; AHA90554; AHA90559; AHA92980; AHA92981; AHA92986; AHA92987; AHA92989; AHA92991; AHA92995; AHA93014; AHG52854; AHG52856; AHG52868; AHG54852; AHM24912; AHN52941; AHX83048; AHX83056; AHY61651; AHY61685; AHY61687; AHY61693; AHY61700; AHY61701; AHY61733; AHY61747; AHY61754; AHY61763; AHY61767; AHY61773; AHY61774; AHY61793; AHY61795; AHY61798; AHY61805; AHY61813; AHY61819; AHY81572; AHY81596; AHY81603; AHY81606; AHY81611; AHY81625; AHY81634; AHY81638; AHY81678; AHY81692; AHZ30852; AHZ30873; AHZ30875; AHZ30877; AHZ30882; AHZ30886; AIA10258; AIB06694; AIC77119; AIE39181; AIE39183; AIE39193; AIE39199; AIE39205; AIE39209; AIE39220; AIK19711; AIN41876; AIN41881; AIN41883; AIN41905; AIN41928; AIX09860; AIX94145; AIX94151; AIX94173; AJG01750; AJI43107; AJI43119; AJI43146; AJM93393; ALA11181; ALD83654; ALH21889; ALL98853; ALS55305; ALS87624; ALT55323; ALZ40818; AMC30598; AMH87644; AMO26197; AMO26201; AMR70991; AMR70992; AMS35084; ANG08653; ANG08654; ANG08657; ANG08663; ANG08678; ANG08682; ANG08703; ANG08706; ANG08713; ANG08719; ANG08724; ANG08726; ANG08742; ANG08746; BAA82678; BAA84113; BAB64902; BAB64906; BAB71761; BAD29715; BAD29719; BAD82816; BAF36836; BAF37802; BAF46253; BAG30816; BAG30944; BAG31991; BAH11161; BAJ83598; BAJ83632; BAK52278; BAN59797; BAO73032; BAU45194; CAA08965; CAA10726; CAA39244; CAA58070; CAA58086; CAA58090; CAA58097; CAA71137; CAA77102; CAA77194; CAA77242; CAB40714; CAB44775; CAB56342; CAB57307; CAB86196; CAB91090; CAB98266; CAC00639; CAC03611; CAC10402; CAC15501; CAC17137; CAC17463; CAC33441; CAC34573; CAC34836; CAC38391; CAC38393; CAC41989; CAD10399; CAD10408; CAD43055; CAD43721; CAD48120; CAD54119; CAD55950; CAD67713; CAD68158; CAD68985; CAD79563; CAD89002; CAD89532; CAE30300; CAE54963; CAG24074; CAG26751; CAG33759; CAG44444; CAH04149; CAH23707; CAH61728; CAH61735; CAH61742; CAH61751; CAH61771; CAH61776; CAH61777; CAH61779; |

TABLE 4-continued

Proteomic and Glycomic Biomarkers for SCLC

| Marker Type and Direction in SCLC Cases Compared to Controls | Gene Name | UniProt Accession | GenBank Protein Accession |
|---|---|---|---|
| | | | CAH61780; CAH61784; CAH89320; CAI39231; CAI54297; CAI91563; CAI94608; CAJ18634; CAJ31317; CAJ76277; CAJ80804; CAJ84020; CAJ85742; CAJ85743; CAJ85792; CAJ90723; CAK02793; CAK22320; CAL85405; CAM33242; CAM35493; CAM54065; CAN89176; CAN89606; CAO00139; CAP62365; CAP66397; CAQ17034; CAQ17036; CAQ77248; CAZ66362; CBG37836; CBH41119; CBJ05864; CBL87045; CBL94703; CBM41445; CBN82207; CBW44096; CBW44101; CBX36122; CBZ05557; CBZ47000; CCA61266; CCA63180; CCA63200; CCA63208; CCA63224; CCA63266; CCA63272; CCA63290; CCA63315; CCA63328; CCA64020; CCB84713; CCB84715; CCB84719; CCC33057; CCD32994; CCF23450; CCH03682; CCH22527; CCI61548; CCK73128; CCK73129; CCK73130; CCO56212; CCO56216; CCV19550; CCW03241; CCW36810; CCX35396; CCX39670; CCX39696; CDG32166; CDG43873; CDH35267; CDN33433; CDO33948; CDQ51703; CDX10183; CEO86997; CEO87026; CFW94257; CUX07554; CVK15080; CVK15082; CZF95219; EAX03385; SAL89105; SAP17547; AAF01052; BAG36634; BAA03277; BAA08821; ABC59614; AAA59694; AAA56835; AAA56834; AAA96733; AAC41941; AAA69724; AAL40073; AAA53258; AAA57145; AAA59641; AAA59630; AAA59684; AAA19926; AAB06829; AAB60357; AAB60359; AAA75321; AAC35422; AAC50447; AAB80796; CAA62035; CAA70199; CAA70261; CAA80366; XP_011512859; ; AAA59616; AAA59666; AAB07699; AAB47480; AAB62541; AAB66705; AAB69444; AAB70283; AAB70284; AAB70298; AAB84307; AAB96791; AAC14580; AAC33189; AAD13298; AAD14427; AAD16176; AAD22265; AAD23393; AAD23460; AAD38675; AAD38676; AAD46382; AAF00932; AAF08610; AAF19424; AAF20156; AAF24484; AAF24857; AAF59417; AAF81600; AAF81601; AAF81609; AAF97847; AAF97852; AAG01820; AAG02198; AAK66765; AAK97441; AAL10678; AAL10683; AAL18236; AAL18241; AAL31360; AAL58574; AAL62464; AAM89239; AAN05037; AAP70484; AAQ13834; AAR15394; AAT74665; AAU88210; AAV54588; AAX18629; AAX18630; AAX34394; AAX59047; AAY25028; AAY26571; AAY85374; AAZ28920; AAZ28932; AAZ67357; AAZ67358; AAZ95952; ABA07957; ABA08413; ABC55316; ABC61960; ABD62870; ABD64575; ABD64578; ABE27966; ABG23665; ABH03572; ABH85354; ABJ52524; ABJ55656; ABK96991; ABL98119; ABN15022; ABN49619; ABO10496; ABO93325; ABQ09223; ABQ09226; ABQ23499; ABS89174; ABS89175; ABW38321; ABW38323; ABY64664; ACB45469; ACB45471; ACB46958; ACC93940; ACD01074; ACD01083; ACD01086; ACM17889; ACN12928; ACN56333; ACN56337; ACN76583; ACN76586; ACN76597; ACN76603; ACN76613; ACN81065; ACN81068; ACN81077; ACN81085; ACN81091; ACN81095; ACN81112; ACN81114; ACN81125; ACN81136; ACN81138; ACN81151; ACN81154; ACN81170; ACN81244; ACN81247; ACN81250; ACN81253; ACN81278; ACN81280; ACN89838; ACN89839; ACN91040; ACO58651; ACO70683; ACO70689; ACO70695; ACO70698; ACO70716; ACO70727; ACO70728; ACO70744; ACO70745; ACO70748; ACO70760; ACO82435; ACO82450; ACO82457; ACO82474; ACO82480; ACO82522; ACO82530; ACO91514; ACO91519; ACO91520; ACO91523; ACO91544; ACO94123; ACO94135; ACO94150; ACO94153; ACP27880; ACP27888; ACP27889; ACP27899; ACP27903; ACP27907; ACR38911; ACR54333; ACS27582; ACS27592; ACS31816; ACS31819; ACS37215; ACS37234; ACS37235; ACT21196; ACT63864; ACT64591; ACT64603; ACT76266; ACT79387; ACT99999; ACU00005; ACU02042; ACU02043; ACU02050; ACU02052; ACU02058; ACU02062; ACU02077; ACU02081; ACU02090; ACU02108; ACU02180; ACU02206; ACU27279; ACU27282; ACU29548; ACU29560; ACV30330; ACV31933; ACV31942; ACV40715; ACV40718; ACV89348; ACV91888; ACY09096; ACY24447; ACZ04963; ACZ04965; ACZ04967; ADB27762; ADB55617; ADC32148; ADC81084; ADD10590; ADD10790; ADD10793; ADE58659; ADE58661; ADE58662; ADE72869; ADE72870; ADE73062; ADE73067; ADE73072; ADE73073; ADE73078; ADE73121; ADE73218; ADE73316; ADE73375; ADE73377; ADE73386; ADE73475; ADE73505; ADE73516; ADE73567; ADE73571; ADE73619; ADE73627; ADE73673; ADE73755; ADE73820; ADI24355; ADM72755; ADN92636; ADN92638; ADN92649; ADO22684; ADQ48115; ADQ48116; ADQ48118; ADQ48119; ADQ55922; ADU18060; ADU18061; ADU18073; ADV71244; ADV71251; ADW24298; ADW24308; ADW24327; ADW24328; |

TABLE 4-continued

Proteomic and Glycomic Biomarkers for SCLC

| Marker Type and Direction in SCLC Cases Compared to Controls | Gene Name | UniProt Accession | GenBank Protein Accession |
|---|---|---|---|
| | | | ADZ05623; ADZ38949; ADZ73108; ADZ73117; ADZ73118; ADZ73119; ADZ73121; AEA49740; AEA49746; AEA49750; AEA49752; AEA49872; AEA49875; AEA50947; AEB21054; AEB65791; AEB66061; AEB66096; AEF13851; AEF13852; AEF13881; AEI00996; AEI01028; AEI01032; AEI01037; AEI01050; AEI30786; AEI30796; AEI59569; AEI59576; AEI59585; AEI98732; AEJ22086; AEJ22088; AEJ87325; AEJ90515; AEJ90517; AEK67319; AEK94927; AEK94935; AEK94938; AEK95013; AEK95121; AEK95469; AEK95539; AEK95574; AEK95587; AEK95919; AEK95929; AEK95931; AEK95951; AEK95970; AEK95974; AEK96001; AEK96042; AEK96045; AEK96063; AEK96065; AEK96087; AEK96096; AEK96103; AEK96106; AEP27188; AEV45764; AEW23032; AEW23035; AEW23079; AEY80123; AFA42546; AFA42549; AFA42597; AFA42710; AFD23802; AFD23804; AFD36902; AFD36930; AFD36960; AFD36962; AFD36998; AFD64703; AFD64710; AFH78067; AFH78078; AFK24423; AFK24436; AFK87769; AFL91485; AFM91112; AFN88155; AFN88156; AFP43719; AFP73454; AFQ62718; AFQ62721; AFQ62725; AFQ62735; AFR69135; AFV73987; AFV73994; AFV74032; AFV74040; AFV74080; AFV74094; AFW98275; AFX62385; AFX62388; AFX84024; AFX84027; AFZ93947; AFZ93959; AFZ93966; AFZ94400; AFZ94411; AFZ94468; AFZ94496; AGB06225; AGE97332; AGG56514; AGG68843; AGG79674; AGG79708; AGG79747; AGG79780; AGG79935; AGI02597; AGI37645; AGI48704; AGJ52185; AGK07564; AGK38447; AGK44362; AGK44366; AGK44369; AGK44378; AGK44384; AGL73125; AGL73133; AGL93380; AGM48500; AGM53426; AGO28197; AGQ03747; AGS42402; AGT79702; AGU13614; AGZ87615; AGZ87621; AGZ87625; AGZ87632; AGZ87634; AGZ87636; AGZ87645; AGZ87649; AGZ87652; AHA37287; AHA37319; AHA44854; AHA46394; AHA53621; AHA90549; AHA90565; AHA92985; AHA92999; AHA93009; AHA93012; AHA93029; AHF71354; AHG52842; AHG54850; AHM24915; AHN65173; AHX83053; AHY61638; AHY61644; AHY61660; AHY61668; AHY61677; AHY61679; AHY61683; AHY61697; AHY61707; AHY61748; AHY61752; AHY61753; AHY61788; AHY81574; AHY81623; AHY81648; AHY81652; AHY81656; AHY81657; AHY81663; AHY81709; AHZ30826; AHZ30829; AHZ30832; AHZ30845; AHZ30860; AHZ30865; AHZ30870; AHZ30876; AHZ30888; AHZ30896; AHZ30903; AIB06697; AIC77112; AIC77124; AIE39196; AIE39227; AIL88458; AIN41869; AIN41871; AIN41892; AIN41895; AIN41902; AIN41916; AIN41918; AIQ80895; AIX09859; AIX94157; AIX94161; AIY26929; AJI43082; AJI43097; AJI43099; AJI43108; AJI43117; AJI76868; AKA93914; AKA93915; AKA93916; AKA93917; AKA93927; AKA93929; AKA93933; AKH87437; ALA10822; ALD83651; ALG76652; ALG76660; ALH21900; ALH21906; ALO24301; ALS87656; ALT45948; ALZ40836; AMB37048; AME17692; AML03226; AMR70985; ANG08651; ANG08655; ANG08658; ANG08662; ANG08667; ANG08674; ANG08729; ANG08732; ANG08741; ANG08744; ANG08747; BAA22205; BAA23588; BAA88572; BAB62097; BAC02740; BAD13378; BAD29720; BAD30027; BAD99583; BAE93429; BAG30941; BAG30945; BAG30956; BAG31389; BAG32143; BAH85286; BAH85287; BAI48381; BAJ78303; BAJ83602; BAL72668; BAL72727; BAL72730; BAL72732; BAM24701; BAN59779; BAN59815; BAN59821; BA002311; BAT51026; CAA07578; CAA58078; CAA58080; CAA58082; CAA58092; CAA64228; CAA76681; CAB37943; CAB42825; CAB50864; CAB69069; CAB72096; CAC08201; CAC11131; CAC12838; CAC12864; CAC12874; CAC17462; CAC21498; CAC27238; CAC29021; CAC29240; CAC33891; CAC41988; CAC87878; CAD11988; CAD12426; CAD42656; CAD42873; CAD45438; CAD45442; CAD47824; CAD47825; CAD47828; CAD48118; CAD48121; CAD55949; CAD60653; CAD79567; CAD88897; CAD89529; CAE01414; CAE22451; CAE30299; CAE45007; CAE46109; CAE55199; CAF05628; CAG15346; CAG25514; CAG25773; CAG44552; CAH61731; CAH61755; CAH61759; CAH61765; CAH68435; CAI39218; CAI54296; CAI54298; CAI56420; CAI59269; CAI78825; CAI91545; CAJ01383; CAJ18324; CAJ27509; CAJ27510; CAJ30029; CAJ30030; CAJ31083; CAJ76276; CAJ83997; CAL30081; CAM 12256; CAM34698; CAM54069; CA000631; CAP09889; CAP46845; CAP46862; CAQ37792; CAQ55956; CAQ65001; CAX33860; CAY86113; CAZ64216; CAZ66363; CAZ90646; CBG40701; CBK62708; CBL88502; CBL88503; CBX02937; CBX25643; CBX25644; CBX25673; CBX45565; CBX55581; CBZ05558; CBZ41208; CCA63188; CCA63196; CCA63217; CCA63229; CCA63267; CCA63278; CCA63283; CCA94559; CCB84711; CCB84716; |

TABLE 4-continued

Proteomic and Glycomic Biomarkers for SCLC

| Marker Type and Direction in SCLC Cases Compared to Controls | Gene Name | UniProt Accession | GenBank Protein Accession |
|---|---|---|---|
| | | | CCD31480; CCF55431; CCG14230; CCG58704; CCH27331; CCI69287; CCK33881; CCM12468; CCW03238; CCW43248; CCX39630; CDF59530; CDI43895; CDI48078; CDI48079; CDK41172; CDO33945; CDO58209; CDQ51632; CDQ51638; CDQ51677; CDQ51705; CEF48120; CEJ95860; CEO86994; CEO86995; CEO86996; CEO86998; CEO87003; CEO87004; CEO87016; CEO87019; CEO87030; CEO87034; CEO90880; CQR91443; CRK76916; CUH74624; CUT08905; CUU97278; CUU97283; CUU97286; CUU97317; CZF95220; CZS63623; P03989; P10319; P30475; Q29836; Q29940; SAI78381; SAL89112; SAL89120; AAF27539; AAL26324; AAL30414; CAA11468; BAG64567; CAM98308; AAG02001; AAM50088; BAA08822; BAA08826; BAA08827; BAA08829; BAA12868; ABC59615; AAA59621; AAA18249; AAA56837; AAC37548; AAA65639; AAC41980; AAL77533; AAL40070; AAL40071; AAA59665; AAA59647; AAA59608; AAA03687; AAA61268; AAA58628; AAD13875; AAA87396; AAB60349; AAB60360; AAC32741; AAC50392; AAB61773; AAC35423; AAA81336; AAB18369; AAC31793; CAA62864; CAA65327; CAA78849; AAA59644; AAB00144; AAB07726; AAB39106; AAB51452; AAB51454; AAB65424; AAB66706; AAB66707; AAB67810; AAB67817; AAB67821; AAB70280; AAC18817; AAC25920; AAC29503; AAC32199; AAC32561; AAC32997; AAC35939; AAC35940; AAC35941; AAC79719; AAD19590; AAD22267; AAD23458; AAD50969; AAD51971; AAF00934; AAF08606; AAF08608; AAF09480; AAF17097; AAF20813; AAF36714; AAF67340; AAF73065; AAF78090; AAF85974; AAF97848; AAF97851; AAF97853; AAF97854; AAG42274; AAG42278; AAG42281; AAG53946; AAK50429; AAL04501; AAL18234; AAL40076; AAL93257; AAN64245; AAO37684; AAR07617; AAS75119; AAT27439; AAT40957; AAT99913; AAV84071; AAV85897; AAV85899; AAV85901; AAW62302; AAW81707; AAW81709; AAW83824; AAW88317; AAX58628; AAY26572; AAY59439; AAZ15021; AAZ15025; AAZ20629; AAZ28916; AAZ67360; AAZ95953; ABA60115; ABB00288; ABB55456; ABC55315; ABC61959; ABC61961; ABC61965; ABD64572; ABD75758; ABE27967; ABF93213; ABG38307; ABK20869; ABK97605; ABL84351; ABM53026; ABM53027; ABM69180; ABM97534; ABR22623; ABS59405; ABY21170; ABY85895; ACA51865; ACB20807; ACB20808; ACC97176; ACC97179; ACC97182; ACD63063; ACK99599; ACK99600; ACN12942; ACN12946; ACN29617; ACN38393; ACN56328; ACN76594; ACN81069; ACN81078; ACN81131; ACN81141; ACN81158; ACN81163; ACN81248; ACN81257; ACN81259; ACN81277; ACN81279; ACN91043; ACO70692; ACO70693; ACO70725; ACO70726; ACO70732; ACO70734; ACO70738; ACO82434; ACO82441; ACO82443; ACO82459; ACO82475; ACO82477; ACO82479; ACO82493; ACO82495; ACO82506; ACO82509; ACO82516; ACO82525; ACO82535; ACO91529; ACO91530; ACO91541; ACO91559; ACO94131; ACO94136; ACO94138; ACO94149; ACP27892; ACP27904; ACP27960; ACP27972; ACP27978; ACR38914; ACR54356; ACR81568; ACR81574; ACS27584; ACS31814; ACS37213; ACS37217; ACS37226; ACS92458; ACT64596; ACT64618; ACT64619; ACT65992; ACT76263; ACT76684; ACT79388; ACT79392; ACT83712; ACT83715; ACU02070; ACU02071; ACU02082; ACU02086; ACU02089; ACU02093; ACU02189; ACU02220; ACU27261; ACU27262; ACU27281; ACU29547; ACU29556; ACV31931; ACV40710; ACV89457; ACV92043; ACV92046; ACX42620; ACX42626; ACX42643; ACX81372; ACX81381; ACX81383; ACZ04964; ACZ54663; ACZ54668; ACZ54672; ADB81936; ADC79835; ADD10782; ADD71855; ADD83055; ADE58658; ADE58667; ADE58668; ADE58674; ADE73063; ADE73092; ADE73093; ADE73124; ADE73194; ADE73277; ADE73308; ADE73381; ADE73400; ADE73510; ADE73559; ADE73617; ADE73626; ADE73628; ADE73690; ADE73752; ADE73817; ADE73821; ADF58789; ADF83884; ADI24371; ADJ67227; ADM72743; ADM72760; ADN92645; ADN92648; ADN92669; ADN92674; ADU18064; ADU18068; ADU18071; ADV71246; ADZ38953; ADZ73094; ADZ73096; ADZ73114; ADZ73125; AEA48886; AEA48984; AEA49731; AEA49759; AEB66062; AEB66066; AEB66067; AEB66068; AEB66092; AEE39324; AEF12647; AEF12648; AEF13121; AEF13871; AEF13876; AEF13888; AEI00994; AEI01011; AEI01023; AEI01047; AEI30797; AEI30798; AEI59563; AEI59564; AEI59588; AEI70713; AEI98731; AEJ10022; AEK94931; AEK94941; AEK95062; AEK95115; AEK95127; AEK95129; AEK95132; AEK95144; AEK95147; AEK95321; AEK95357; AEK95466; AEK95478; AEK95540; AEK95541; AEK95556; AEK95561; |

TABLE 4-continued

Proteomic and Glycomic Biomarkers for SCLC

| Marker Type and Direction in SCLC Cases Compared to Controls | Gene Name | UniProt Accession | GenBank Protein Accession |
|---|---|---|---|
| | | | AEK95583; AEK95584; AEK95586; AEK95589; AEK95594; AEK95917; AEK95981; AEK95999; AEK96014; AEK96017; AEK96025; AEK96083; AEK96092; AEK96100; AEK96107; AEO22186; AEP17329; AEP17330; AEU 10142; AEV53354; AEW23027; AEW23028; AEW23034; AEW23038; AEW68006; AEW90675; AEY80122; AFA41740; AFA42476; AFA42482; AFA42555; AFA42592; AFA42649; AFA42664; AFA42711; AFD23788; AFD23796; AFD36899; AFD36906; AFD36936; AFD36996; AFD64693; AFD64713; AFE88967; AFH78063; AFH78069; AFH78071; AFH78082; AFI57832; AFJ04145; AFJ44774; AFJ44775; AFK08521; AFK24429; AFK24435; AFK64708; AFK87767; AFM77796; AFN88145; AFO66770; AFO66771; AFO70113; AFQ62722; AFQ90207; AFR54425; AFU93074; AFU93841; AFV74023; AFV74038; AFV74084; AFV74093; AFV74674; AFZ93956; AFZ93957; AFZ94399; AFZ94500; AFZ94591; AFZ94592; AGD99114; AGG68840; AGG79683; AGG79685; AGG79743; AGG79744; AGG79795; AGG80026; AGH25494; AGK44368; AGM20578; AGN74857; AGO59961; AGX13896; AGX13904; AGZ87618; AGZ87619; AGZ87620; AGZ87622; AGZ87628; AGZ87629; AGZ87644; AGZ87654; AGZ87663; AGZ87664; AGZ87671; AGZ87683; AHA37274; AHA37279; AHA37282; AHA37307; AHA37317; AHA46396; AHA46398; AHA46400; AHA46405; AHA92979; AHA92988; AHA93007; AHF52839; AHF52846; AHF71353; AHH92856; AHK23752; AHY61634; AHY61637; AHY61658; AHY61686; AHY61722; AHY61769; AHY61777; AHY61781; AHY61809; AHY81590; AHY81594; AHY81629; AHY81681; AHY81683; AHY81698; AHY81703; AHZ30816; AHZ30833; AHZ30834; AHZ30840; AHZ30855; AHZ30869; AHZ30871; AHZ30878; AHZ30887; AHZ30891; AHZ30904; AHZ62763; AIB06696; AIC77106; AIC77114; AIC77123; AIE39185; AIE39216; AIN40495; AIN41863; AIN41866; AIN41868; AIN41901; AIN41922; AIQ78392; AIX94135; AIX94142; AIX94144; AIX94155; AJA90832; AJI43101; AJI43115; AJI43116; AKA93911; AKA93919; AKE47355; AKK23740; AKN09957; AKQ99119; ALA65381; ALA65382; ALL25695; ALO23538; ALT08033; ALT31486; AMB37049; AMD16555; AML03224; AML81031; AMO26202; AMQ81183; AMR70923; AMR70927; AMR70986; AMR70987; ANG08665; ANG08670; ANG08680; ANG08688; ANG08692; ANG08698; ANG08716; ANG08720; ANG08730; ANG08745; BAA07944; BAB18306; BAC02738; BAC02741; BAC11811; BAC54941; BAD27528; BAD29717; BAD30026; BAE78655; BAE93256; BAE95334; BAF63624; BAG30916; BAG30917; BAG30947; BAH48247; BAH85285; BAI52765; BAI52850; BAI52963; BAI66042; BAI66045; BAJ25766; BAL72729; BAM24700; BAN51778; BAN63380; CAA06616; CAA10754; CAA27302; CAA58088; CAA58099; CAA74916; CAA76612; CAA94390; CAB37940; CAB40715; CAB43478; CAB83041; CAB86194; CAB92313; CAB98264; CAC01694; CAC07211; CAC12861; CAC12862; CAC12866; CAC12876; CAC24484; CAC33440; CAC33892; CAC38066; CAC38763; CAC87132; CAD10406; CAD10413; CAD10414; CAD12423; CAD12425; CAD22131; CAD22132; CAD22133; CAD43056; CAD43645; CAD47829; CAD79562; CAD79566; CAD87773; CAD90011; CAD91416; CAD92861; CAE12197; CAE30458; CAE45177; CAE46176; CAG44445; CAH55767; CAH61726; CAH61729; CAH61730; CAH61734; CAH61738; CAH61743; CAH61744; CAH61762; CAI29181; CAI46274; CAI46900; CAI79093; CAI94663; CAJ01770; CAJ18327; CAJ29287; CAJ30031; CAJ38413; CAJ77418; CAJ80870; CAJ91096; CAL36609; CAL47252; CAM33395; CAM33599; CAM84027; CAN84677; CAO94504; CAP17405; CAP58275; CAQ35181; CAR67866; CAT99520; CAX12624; CBI71169; CBK52926; CBX19707; CBX36120; CBX45600; CBY83777; CCA28517; CCA63174; CCA63176; CCA63177; CCA63187; CCA63195; CCA63203; CCA63212; CCA63223; CCA63225; CCA63227; CCA63270; CCA63271; CCA63279; CCA63288; CCB84714; CCG14229; CCH57811; CCI55631; CCI61354; CCO56210; CCV19548; CDH92860; CDH97909; CDI27938; CDI44685; CDI48080; CDK41191; CDL74822; CDO58211; CDR89236; CDX10187; CEE15327; CEF48040; CEH24664; CEO86990; CEO87001; CEO87005; CEO87009; CEO87017; CEO87024; CTP93520; CUR70741; CUR70746; CUU97281; CUU97282; CUU97287; CUU97288; CUX07549; CUX91848; CZF95218; CZT32967; CZT32968; EAX03384; EAX03386; P30480; P30483; P30491; P30498; SAL89101; SAL89114; AAD50968; AAL30412; AAL30413; CAA05834; CAB88037; BAG54016; BAF83259; AAO34409; CDH93737; AAA36217; AAC37572; AAL77528; AAC41979; AAL77530; AAL77532; AAL77531; AAA61297; AAA60305; |

TABLE 4-continued

Proteomic and Glycomic Biomarkers for SCLC

| Marker Type and Direction in SCLC Cases Compared to Controls | Gene Name | UniProt Accession | GenBank Protein Accession |
|---|---|---|---|
| | | | AAA50577; AAA03719; AAA92997; AAA19925; AAA75592; AAB40632; AAB41720; AAB39257; CAA59215; CAA62036; CAA73901; AAA52658; AAA52661; AAA59627; AAA59662; AAA59664; AAA65040; AAA74045; AAA97481; AAB03576; AAB50143; AAB50146; AAB50417; AAB50419; AAB62540; AAB67807; AAB67811; AAB67812; AAB70286; AAB82333; AAB96793; AAC26002; AAC32568; AAC32570; AAC32821; AAC35937; AAD02035; AAD22273; AAD23459; AAD26151; AAD28786; AAD30276; AAD46385; AAD51744; AAF04579; AAF05596; AAF20814; AAF26413; AAF29556; AAF73067; AAF78047; AAF78080; AAF89555; AAF97855; AAF97856; AAG01819; AAG10154; AAG27470; AAG31646; AAG40883; AAG42271; AAG42282; AAK31805; AAK57725; AAK57734; AAK94506; AAK94508; AAK94513; AAL08024; AAL18233; AAP55803; AAQ13832; AAQ55467; AAQ75375; AAR15889; AAR87010; AAT74662; AAT74664; AAT74666; AAU06587; AAV54589; AAV85898; AAW65334; AAW66600; AAX63419; AAZ15020; AAZ28913; AAZ28914; AAZ73722; ABB52626; ABC84218; ABD93918; ABE27968; ABF60563; ABG37693; ABG66731; ABH03576; ABI64162; ABI74453; ABI96691; ABJ09708; ABK20870; ABL98036; ABM67084; ABN42643; ABN51224; ABO14986; ABO69698; ABP51958; ABQ08745; ABQ09222; ABQ09225; ABQ16592; ABQ23496; ABR24118; ABW38025; ABW38324; ABY85892; ACA48229; ACB05659; ACB13199; ACB45464; ACC97172; ACD01073; ACD01088; ACD63062; ACF20359; ACF75465; ACF77152; ACH61853; ACI04546; ACI43064; ACJ09137; ACK37874; ACK99604; ACK99607; ACL51023; ACM17888; ACM17892; ACM24221; ACN12939; ACN12950; ACN29616; ACN56338; ACN58389; ACN76580; ACN76582; ACN76599; ACN81073; ACN81092; ACN81135; ACN81148; ACN81243; ACN81251; ACN81263; ACN81270; ACN81274; ACN81281; ACN81282; ACN89837; ACN96127; ACO35692; ACO70680; ACO70694; ACO70709; ACO82436; ACO82461; ACO82491; ACO82496; ACO82500; ACO82517; ACO82518; ACO82532; ACO91540; ACO94124; ACO94134; ACP27882; ACP27886; ACP27900; ACP27902; ACP27979; ACP27985; ACR38910; ACR54339; ACR54340; ACR54355; ACS27676; ACS31815; ACS37219; ACS37228; ACS37230; ACT64617; ACT64625; ACT83701; ACT83710; ACU01987; ACU01991; ACU02040; ACU02059; ACU02087; ACU02091; ACU02094; ACU02104; ACU02182; ACU02208; ACU02211; ACU02213; ACU02218; ACU27257; ACU27267; ACU27273; ACU29553; ACU29554; ACU29555; ACU31097; ACU68588; ACU86977; ACV31937; ACV31941; ACV31945; ACV40705; ACV89471; ACX34101; ACX42635; ACX42637; ACX81384; ACY24885; ACZ54652; ACZ54655; ACZ54660; ACZ54667; ACZ73427; ADB25053; ADB55622; ADB81937; ADC79836; ADC81085; ADD10588; ADD10595; ADD10784; ADD97858; ADE58663; ADE58677; ADE73060; ADE73082; ADE73086; ADE73130; ADE73139; ADE73142; ADE73225; ADE73274; ADE73287; ADE73306; ADE73310; ADE73312; ADE73364; ADE73368; ADE73476; ADE73478; ADE73479; ADE73683; ADE73685; ADE73819; ADI24372; ADI25073; ADI75497; ADJ67216; ADN92654; ADN92670; ADN93294; ADP09055; ADQ48124; ADQ55918; ADU18063; ADU18506; ADW24302; ADW24304; ADW24315; ADW24321; ADZ73099; ADZ73113; ADZ73115; ADZ73128; AEA49768; AEB65805; AEB65806; AEB66057; AEB66070; AEF13115; AEF13858; AEF13866; AEF13869; AEI01005; AEI01014; AEI01033; AEI30790; AEI30793; AEI30794; AEI59572; AEJ08641; AEJ87204; AEJ87332; AEJ88778; AEJ90505; AEJ90516; AEK94900; AEK94929; AEK94934; AEK94937; AEK94940; AEK94942; AEK94943; AEK95063; AEK95112; AEK95134; AEK95148; AEK95308; AEK95311; AEK95324; AEK95458; AEK95460; AEK95472; AEK95545; AEK95563; AEK95916; AEK95927; AEK95935; AEK95939; AEK95963; AEK95977; AEK96026; AEK96032; AEK96068; AEK96073; AEK96076; AEK96078; AEK96090; AEK96101; AEK96102; AEL16987; AEP16443; AEP17325; AER92536; AET21250; AET98767; AEW23026; AEW23033; AEW90668; AEW90669; AEW90670; AEW90671; AEW90676; AEW90680; AEY77525; AEZ49178; AFA42545; AFA42647; AFA42712; AFD23781; AFD23793; AFD36934; AFD36995; AFD64690; AFD64698; AFJ04138; AFJ04141; AFJ04146; AFJ44772; AFJ44782; AFJ44783; AFJ44784; AFJ44799; AFK24419; AFK24422; AFK24439; AFK64706; AFK64710; AFL91486; AFM44703; AFM44708; AFM55928; AFP43715; AFP43722; AFP54195; AFP73451; AFP99303; AFQ55484; AFQ55488; AFQ55493; AFQ62733; AFQ62737; AFR68835; AFU73593; |

TABLE 4-continued

Proteomic and Glycomic Biomarkers for SCLC

| Marker Type and Direction in SCLC Cases Compared to Controls | Gene Name | UniProt Accession | GenBank Protein Accession |
|---|---|---|---|
| | | | AFU81205; AFU93844; AFV74041; AFV74076; AFV74088; AFV74097; AFX62389; AFX84026; AFZ93949; AFZ93968; AFZ94495; AFZ94497; AFZ94499; AFZ94534; AFZ94538; AFZ94621; AGC54625; AGC95095; AGC95096; AGE97329; AGG56511; AGG79672; AGG79673; AGG79777; AGG79790; AGG79791; AGG79806; AGG79929; AGG79933; AGG79936; AGG79941; AGI05710; AGI65158; AGJ84090; AGK38319; AGK44315; AGL34710; AGL34712; AGL34717; AGL34720; AGL34722; AGL34723; AGL73118; AGL73128; AGM48494; AGT51198; AGT79696; AGW18229; AGX13891; AGZ87617; AGZ87633; AGZ87637; AGZ87640; AGZ87655; AGZ87659; AGZ87665; AGZ87673; AGZ87674; AGZ87677; AHA37311; AHA37312; AHA37318; AHA37325; AHA46401; AHA46406; AHA53631; AHA90551; AHA90555; AHA90578; AHA92982; AHA92984; AHA92996; AHA92997; AHA93005; AHA93011; AHA93030; AHC92620; AHF71348; AHG54853; AHL39252; AHW68478; AHX83047; AHY61654; AHY61663; AHY61666; AHY61678; AHY61694; AHY61714; AHY61724; AHY61751; AHY61764; AHY61782; AHY61802; AHY61815; AHY61822; AHY81576; AHY81578; AHY81587; AHY81598; AHY81600; AHY81622; AHY81644; AHY81650; AHY81667; AHY81668; AHY81670; AHY81675; AHY81695; AHZ30819; AHZ30823; AHZ30850; AHZ30874; AHZ30900; AHZ30914; AIE39180; AIE39184; AIE39203; AIE39207; AIE39212; AIE39229; AII80552; AIN41873; AIN41874; AIN41893; AIN41929; AIN41931; AIQ80896; AIX94149; AIX94160; AIX94165; AJI43093; AJI43102; AJI43110; AJI43113; AJI43118; AJI43123; AJI43127; AKA93937; AKA93939; AKE14221; AKG62086; AKG95444; AKH87441; AKO84202; ALG76650; ALG76663; ALH21907; ALO23537; ALP73448; ALS55306; ALZ40817; ALZ40828; AMD11595; AMH86043; AML03225; AMP83990; AMS25592; AMX81295; ANG08644; ANG08648; ANG08650; ANG08656; ANG08659; ANG08661; ANG08666; ANG08668; ANG08671; ANG08672; ANG08689; ANG08691; ANG08699; ANG08731; ANG08734; ANG08737; BAA82676; BAA84114; BAC02739; BAC11810; BAD13377; BAD27530; BAD30030; BAD77940; BAD95616; BAD95811; BAD95812; BAD98467; BAE78632; BAF32753; BAF56918; BAG30815; BAG31387; BAG32146; BAH11162; BAH85289; BAI66043; BAL72663; BAM15777; BAN59809; BAN59833; BAN63382; BAP82420; CAA10522; CAA58085; CAA58091; CAA64227; CAA75059; CAA76682; CAA77103; CAB38945; CAB50865; CAB71933; CAB71937; CAB94227; CAC05371; CAC12837; CAC12869; CAC12870; CAC12875; CAC15502; CAC16172; CAC18875; CAC35468; CAC38863; CAC87136; CAD10396; CAD10410; CAD10411; CAD10412; CAD11989; CAD43181; CAD43182; CAD43184; CAD45441; CAD47826; CAD79443; CAD79474; CAD79564; CAD79565; CAD91417; CAE02643; CAE22466; CAE22467; CAE22484; CAE45171; CAE47421; CAE51940; CAE82735; CAE82737; CAE82739; CAG25673; CAH04148; CAH61752; CAH61753; CAH61754; CAH61760; CAH61763; CAH61766; CAJ28576; CAJ85944; CAL36608; CAL90886; CAM34699; CAO00836; CAO85638; CAO85722; CAP20081; CAQ17035; CBW44100; CBW44125; CBW44127; CBW47478; CBW69645; CBX19710; CBX36121; CBZ05559; CBZ47172; CCA63179; CCA63183; CCA63184; CCA63185; CCA63198; CCA63205; CCA63226; CCA63256; CCA63274; CCA63287; CCA63292; CCA63317; CCB63202; CCB84718; CCB84721; CCF23269; CCH35762; CCJ27668; CCJ70647; CCK73127; CCM12470; CCN79819; CCW03232; CCW03236; CCW36811; CCX39681; CDI48083; CDK41190; CDL93446; CDN39815; CDQ51675; CEE15326; CEF48038; CEF48056; CEF48090; CEH11577; CEO86987; CEO86993; CEO87006; CEO87018; CEO87023; CEO87025; CEO87027; CQR75221; CQR91444; CRF45622; CTP93680; CUR44395; CUW00369; P18463; P18464; P18465; P30460; P30462; P30466; P30479; P30492; P30493; SAI83281; SAL89102; SAL89121; SAL89122; AAC17467; AAB81828; AAC42275; BAF84915; AAS79490; BAA08823; BAA08828; AAA73509; AAB59484; AAL77535; AAA59607; AAA03690; AAA03688; AAA59634; AAA17373; AAF70855; AAA91229; AAB19242; AAB70114; AAB16919; CAA43875; CAA45785; CAA53566; CAA58317; AAA02950; AAA59667; AAA59682; AAA74046; AAB03574; AAB18131; AAB29305; AAB39108; AAB50145; AAB61335; AAB67808; AAB67813; AAB67814; AAB67824; AAB67827; AAB67828; AAB70287; AAB70294; AAB80722; AAB82057; AAB82304; AAB82306; AAB87723; AAB94028; AAC14582; AAC14881; AAC18391; AAC25779; AAC25780; AAC26783; AAC32560; AAC32562; AAC32572; AAC33188; AAC35938; AAC41923; AAC79720; AAD02034; |

TABLE 4-continued

Proteomic and Glycomic Biomarkers for SCLC

| Marker Type and Direction in SCLC Cases Compared to Controls | Gene Name | UniProt Accession | GenBank Protein Accession |
|---|---|---|---|
| | | | AAD22266; AAD23395; AAD27536; AAD28172; AAD31431; AAD38677; AAD46386; AAD48506; AAD51746; AAF05898; AAF19393; AAF19425; AAF19428; AAF21438; AAF26305; AAF26751; AAF36715; AAF70329; AAF73066; AAF76144; AAF78083; AAG27466; AAK51092; AAK57736; AAL04500; AAL10679; AAL11335; AAL59419; AAL73385; AAL77051; AAL84755; AAL87224; AAM14398; AAM16153; AAM95705; AAP23305; AAQ55468; AAT74663; AAT99914; AAV36001; AAV54590; AAV54591; AAW47400; AAW71782; AAX22231; AAX56910; AAX63418; AAY40252; AAY57924; AAZ15018; AAZ15024; AAZ23041; AAZ67359; AAZ95590; ABA39797; ABB51651; ABC61958; ABC61963; ABC94580; ABD93914; ABE27964; ABF58778; ABF60561; ABF74595; ABJ99998; ABK51451; ABK90988; ABK96978; ABL73204; ABL98037; ABM97420; ABN49618; ABN51221; ABN51230; ABP57140; ABU94839; ABW38327; ABW38328; ABY64663; ACA51863; ACA79907; ACB45462; ACB56574; ACC97177; ACC97178; ACD63061; ACG55682; ACH57397; ACH57402; ACJ04569; ACL51028; ACL97991; ACL98163; ACM17887; ACM17890; ACN12943; ACN56330; ACN76591; ACN76595; ACN76600; ACN76604; ACN76611; ACN81066; |
| SLEA Up | HLA-C | P30508 | ; AAA59648; AAA59670; AAB03583; AAB03623; AAB66710; AAB66711; AAC17719; AAC17725; AAC17737; AAF19427; AAF65514; AAG42272; AAG49322; AAK31618; AAL87225; AAN33107; AAO49822; AAP30863; AAR06668; AAR15147; AAR87009; AAR99590; AAT65966; AAW88385; AAX18631; AAX94769; ABB52622; ABB52623; ABD60574; ABE00936; ABG43100; ABR31792; ABS29298; ABV58993; ABW21685; ABW86961; ABY74344; ACE63274; ACE63275; ACF54630; ACL34372; ACL37146; ACL98474; ACM78893; ACM78896; ACM78902; ACM78916; ACM78931; ACM78932; ACM78937; ACM78941; ACN24631; ACN81046; ACN81048; ACN81050; ACN81055; ACN81056; ACN81063; ACN81286; ACN81292; ACN89850; ACN89857; ACN89858; ACN91016; ACN91025; ACN91027; ACN97202; AC090079; ACO90083; ACP27913; ACP27944; ACP27956; ACR54368; ACR54378; ACR54383; ACR54391; ACR54393; ACR78562; ACR78564; ACS12735; ACS27603; ACS27607; ACS27628; ACS27633; ACS27638; ACS27662; ACS27668; ACS27694; ACS36190; ACS36192; ACS36194; ACS36202; ACS36419; ACS36435; ACS36440; ACS36453; ACS36454; ACS36464; ACS36472; ACT76247; ACT76254; ACT83720; ACU01995; ACU01997; ACU01999; ACU02003; ACU02012; ACU02018; ACU02116; ACU02120; ACU27291; ACU27292; ACU27294; ACU27309; ACU27312; ACU27315; ACU29590; ACU29591; ACU50938; ACU50945; ACU50947; ACU78141; ACV03835; ACV30334; ACV40724; ACV40726; ACV40736; ACV40738; ACV40741; ACV89476; ACV92057; ACX42656; ACX42668; ACX53677; ACX81408; ADB80083; ADB91969; ADC32130; ADC32131; ADC32132; ADC32136; ADC32139; ADC32166; ADC32178; ADC32179; ADC32190; ADC32206; ADC32224; ADC45460; ADC45470; ADC45480; ADC45483; ADC79685; ADC79844; ADC79850; ADC79868; ADC79870; ADC79881; ADC79983; ADC79986; ADC79994; ADC79999; ADC80000; ADC80006; ADC80016; ADC80019; ADC80035; ADC80039; ADC80041; ADC80066; ADC80069; ADD10599; ADD71850; ADE58708; ADE58734; ADE58743; ADE72879; ADE72904; ADE72910; ADE72912; ADE72933; ADE72946; ADE72949; ADE72977; ADE72982; ADE72988; ADE73040; ADE73147; ADE73155; ADE73160; ADE73183; ADE73206; ADE73215; ADE73245; ADE73250; ADE73257; ADE73321; ADE73332; ADE73404; ADE73424; ADE73458; ADE73459; ADE73483; ADE73487; ADE73488; ADE73520; ADE73533; ADE73535; ADE73574; ADE73584; ADE73630; ADE73714; ADE73731; ADE73733; ADE73738; ADE73828; ADE73830; ADE73834; ADI24370; ADM72761; ADM72769; ADM72772; ADM72781; ADN92613; ADN92615; ADN92616; ADU18056; ADU18057; ADV78237; ADV78582; ADZ05543; ADZ05558; ADZ05566; ADZ05568; ADZ38968; ADZ73132; ADZ73136; ADZ73142; ADZ73147; ADZ73154; AEA49826; AEA49827; AEB91581; AEF13134; AEF13900; AEF13902; AEF13904; AEF13907; AEF13925; AEF13933; AEF13945; AEF13956; AEI01059; AEI01062; AEI01063; AEI01067; AEI01068; AEI30805; AEI30815; AEI30826; AEI58954; AEI58958; AEI59603; AEI59606; AEJ22102; AEJ22103; AEJ90524; AEK67334; AEK67337; AEK67338; AEK67343; AEK67351; AEK94845; AEK94890; AEK94894; AEK94951; AEK94952; AEK94954; AEK94955; AEK94960; AEK95014; AEK95068; |

TABLE 4-continued

Proteomic and Glycomic Biomarkers for SCLC

| Marker Type and Direction in SCLC Cases Compared to Controls | Gene Name | UniProt Accession | GenBank Protein Accession |
|---|---|---|---|
| | | | AEK95072; AEK95078; AEK95083; AEK95084; AEK95087; AEK95088; AEK95093; AEK95157; AEK95167; AEK95169; AEK95180; AEK95192; AEK95193; AEK95331; AEK95369; AEK95390; AEK95392; AEK95403; AEK95404; AEK95405; AEK95412; AEK95416; AEK95417; AEK95421; AEK95425; AEK95427; AEK95428; AEK95439; AEK95442; AEK95447; AEK95453; AEK95456; AEK95598; AEK95607; AEK95612; AEK95615; AEK95620; AEK95622; AEK95630; AEK95632; AEK95645; AEK95650; AEK95698; AEK95699; AEK95704; AEK95706; AEK95710; AEK96112; AEK96120; AEK96122; AEK96123; AEK96130; AEK96144; AEK96146; AEK96153; AEK96159; AEK96170; AEK96171; AEK96186; AEK96188; AEK96205; AEK96207; AEK96224; AEK96228; AEK96253; AEK96266; AEK96294; AEK96307; AET21253; AET21254; AEW23046; AEW23051; AEW23094; AEW23095; AEW23098; AEW90701; AFA41746; AFA41753; AFA42443; AFA42510; AFA42565; AFA42604; AFA42609; AFA42612; AFA42615; AFA42667; AFA42670; AFA42677; AFA42728; AFA42762; AFA42772; AFD23815; AFD23818; AFD23842; AFD23843; AFD23852; AFD36911; AFD36912; AFD36953; AFD36976; AFD37005; AFD64715; AFD64716; AFD64718; AFD64726; AFD64730; AFD64733; AFD64740; AFD64743; AFE48726; AFE48742; AFE48743; AFE83588; AFE88959; AFG26503; AFL91490; AFM35817; AFM77808; AFM77809; AFM77813; AFM77815; AFM77817; AFM77818; AFN88161; AFN88162; AFN88164; AFN88175; AFQ62760; AFQ62761; AFQ62765; AFQ62770; AFU93090; AFU93092; AFU93094; AFU93095; AFU93096; AFZ93990; AFZ94012; AFZ94025; AFZ94031; AFZ94032; AFZ94036; AFZ94040; AFZ94051; AFZ94053; AFZ94057; AFZ94060; AFZ94080; AFZ94083; AFZ94084; AFZ94103; AFZ94104; AFZ94115; AFZ94117; AFZ94119; AFZ94121; AFZ94129; AFZ94130; AFZ94134; AFZ94136; AFZ94143; AFZ94146; AFZ94149; AFZ94150; AFZ94162; AFZ94168; AFZ94208; AFZ94212; AFZ94219; AFZ94222; AFZ94230; AFZ94239; AFZ94241; AFZ94246; AFZ94414; AFZ94418; AFZ94439; AFZ94443; AFZ94446; AFZ94471; AFZ94513; AFZ94517; AFZ94519; AFZ94545; AFZ94594; AFZ94600; AGC22563; AGG40972; AGG79687; AGG79713; AGG79813; AGG79905; AGG79999; AGI48710; AGK44329; AGK44332; AGL09219; AGL73134; AGL73136; AGL73144; AGL93374; AGM48501; AGM48504; AGQ16892; AGQ16895; AGQ16905; AGQ16919; AGQ16923; AGQ16937; AGQ16939; AGQ16944; AGQ16977; AGQ16979; AGQ16987; AGS13720; AGV53072; AGX13915; AGZ87701; AGZ87709; AGZ87713; AGZ87730; AGZ87743; AGZ87747; AGZ87763; AGZ87765; AGZ87779; AGZ87780; AGZ87782; AGZ87802; AGZ87809; AGZ87813; AGZ87826; AHA46414; AHA46416; AHA46436; AHA53645; AHA53648; AHA53649; AHA80969; AHA90714; AHA90725; AHA90741; AHA90749; AHA90765; AHA90773; AHA90774; AHA90784; AHA90796; AHA90800; AHA90801; AHA93023; AHC08481; AHF52847; AHG52873; AHL20279; AHY61830; AHY61831; AHY61841; AHY61852; AHY61857; AHY61878; AHY61890; AHY61900; AHY61909; AHY61911; AHY61918; AHY61936; AHY61937; AHY61942; AHY61949; AHY61958; AHY61963; AHY61991; AHY62006; AHY81714; AHY81726; AHY81732; AHY81738; AHY81744; AHY81752; AHY81762; AHY81764; AHY81771; AHY81783; AHY81785; AHY81788; AHY81794; AHY81809; AHY81812; AHY81820; AHY81832; AHY81833; AHY81836; AHZ30938; AHZ30943; AHZ30945; AHZ30950; AHZ30967; AHZ30989; AHZ30996; AHZ31005; AHZ31014; AIB55780; AIE39250; AIE39267; AIE39278; AIE39284; AIE39291; AIE39292; AIN41953; AIN41964; AIN41981; AIN41984; AIR95105; AIX94181; AIX94186; AIX94192; AIX94194; AIX94197; AIX94199; AIX94206; AIX94207; AIX94211; AJA90819; AJA90821; AJI43152; AJI43154; AJI43160; AJI43161; AJI43162; AJI43167; AJI43170; AJI43173; AJI43182; AJI43210; AJI43214; AJI43221; AJI43225; AJW76731; AJW76741; AKA93944; AKA93947; AKA93971; AKA93981; AKA93985; AKJ66248; AKP18566; ALL98858; ALM26180; ALO24303; ALO24304; ALZ40825; AMD11594; AMD16554; AMR70859; AMR70924; AMR74920; ANG08617; ANG08629; ANG08630; ANG08640; BAB63310; BAE76022; BAJ12111; BAJ39877; BAJ83635; BAK82020; BAK82023; BAL41374; BAL41376; BAL41478; BAL41479; BAN59816; BAN59834; BAN60467; BAO02314; CAA75756; CAB44356; CAB71800; CAC11132; CAC79613; CAD12428; CAD12436; CAD12437; CAD12801; CAD47856; CAD90009; CAE22465; CAE84101; CAF33342; CAH40829; CAI48027; CAJ97443; CAK02799; CAL33985; CAM23859; CAM23874; CAQ51272; CAQ60108; CBK13146; CBL88505; CBV65829; CBW44114; CBW47475; |

TABLE 4-continued

Proteomic and Glycomic Biomarkers for SCLC

| Marker Type and Direction in SCLC Cases Compared to Controls | Gene Name | UniProt Accession | GenBank Protein Accession |
|---|---|---|---|
| | | | CBW52907; CBX19684; CBX19688; CBX19689; CBX24359; CBX25670; CBX36126; CBX36133; CBX45593; CBY83776; CCB84260; CCB84264; CCB84271; CCB84272; CCB84283; CCB84304; CCB84306; CCB84307; CCB84337; CCB84340; CCB84347; CCB84350; CCB84394; CCB84397; CCB84402; CCB84409; CCB84420; CCB84425; CCD28284; CCD31403; CCH23040; CCH57805; CCH57810; CCO56208; CDG23682; CDG23683; CDK41193; CDO33942; CDO67986; CDQ51634; CDQ51650; CDQ51653; CDQ51678; CDQ51694; CDQ51699; CEF48046; CEF48058; CEF48075; CEG29916; CEP25294; CEP25308; CEP25312; CEP25317; CEP25332; CEP25338; CQR75219; CRK76920; CTQ34887; CUH82789; CUI25656; CUU97107; CUU97108; CUU97118; CUU97130; CUU97161; CUU97169; CUU97171; CUU97178; CUU97194; CUU97197; CUU97211; CUU97216; CUU97244; CUU97246; CUU97249; CUU97250; CUU97254; CUU97296; CUU97301; CUV03804; CUX91021; CUX91028; CUX91041; CUX91053; CUX91849; EAX03376; P30508; Q29960; BAA32615; CBJ19438; AFH75432; AAA52666; AAA36235; AAA57258; AAA59685; AAA59686; CAA50210; CAA65986; CAA86839; AAA81371; AAB03581; AAB03624; AAB48516; AAB70288; AAC17716; AAC17721; AAC17722; AAF33239; AAK69510; AAM14725; AAM44831; AAM91947; AAO73564; AAR10880; AAT39989; AAT46360; AAU14145; AAW21339; AAX98239; AAZ28915; AAZ28917; ABB16354; ABB55457; ABC47332; ABC59292; ABD64576; ABJ52522; ABN79858; ACA51861; ACC86064; ACF54637; ACF95806; ACG50686; ACI62420; ACK77783; ACM78904; ACM78913; ACM78923; ACM78925; ACM78927; ACM78928; ACM78938; ACM78942; ACN24627; ACN24630; ACN24632; ACN81044; ACN81057; ACN81217; ACN81222; ACN81287; ACN81288; ACN89847; ACN91012; ACN91013; ACN91015; ACN91022; ACN91023; ACN97192; ACO06754; ACP27909; ACP27916; ACP27954; ACQ76715; ACR54361; ACR54385; ACR54390; ACR78567; ACS12741; ACS12748; ACS12749; ACS16070; ACS27606; ACS27635; ACS27640; ACS27656; ACS27658; ACS27659; ACS27700; ACS36182; ACS36203; ACS36423; ACS36424; ACS36445; ACS36457; ACS36460; ACS36462; ACS36469; ACS36474; ACS93143; ACT76249; ACT76253; ACT79367; ACT79380; ACT79384; ACT83722; ACT83724; ACU02031; ACU02032; ACU02125; ACU27284; ACU27295; ACU27314; ACU50930; ACU50940; ACU50941; ACU50948; ACV40733; ACV40742; ACV89473; ACV91114; ACV91117; ACV91124; ACV92060; ACX42654; ACX81397; ACX81400; ACX81407; ACX94082; ADB80078; ADB81945; ADB81946; ADC32140; ADC32188; ADC32193; ADC32195; ADC32200; ADC32203; ADC32204; ADC32217; ADC32220; ADC45456; ADC45466; ADC45467; ADC45476; ADC79848; ADC79859; ADC79863; ADC79880; ADC79973; ADC79976; ADC79984; ADC79991; ADC80008; ADC80013; ADC80014; ADC80021; ADC80052; ADC80054; ADC80056; ADC80059; ADC80063; ADD10604; ADD97863; ADE58700; ADE58701; ADE58704; ADE58705; ADE58706; ADE58709; ADE58715; ADE58716; ADE58719; ADE58721; ADE58733; ADE58737; ADE58747; ADE58753; ADE72889; ADE72891; ADE72893; ADE72903; ADE72905; ADE72922; ADE72942; ADE72969; ADE72981; ADE72995; ADE73039; ADE73041; ADE73048; ADE73149; ADE73161; ADE73174; ADE73238; ADE73240; ADE73249; ADE73269; ADE73336; ADE73394; ADE73413; ADE73422; ADE73486; ADE73518; ADE73523; ADE73529; ADE73583; ADE73585; ADE73587; ADE73633; ADE73637; ADE73694; ADE73704; ADE73707; ADE73709; ADE73734; ADE73740; ADE73743; ADE73745; ADE73746; ADE73833; ADH04229; ADI24365; ADI24369; ADM72779; ADM72782; ADM72788; ADM72789; ADN92618; ADQ55904; ADU18051; ADU18500; ADX97429; ADZ05538; ADZ05541; ADZ05548; ADZ05553; ADZ05564; ADZ31189; ADZ73150; ADZ73153; ADZ73157; AEA49816; AEA49831; AEA49836; AEA49838; AEA49841; AEB21065; AEB21069; AEB26707; AEB65788; AEF13147; AEF13898; AEF13903; AEF13911; AEF13951; AEF13958; AEF13959; AEF13964; AEH41458; AEI01065; AEI01070; AEI30804; AEI30816; AEI30825; AEI58955; AEI59596; AEI59607; AEI87646; AEJ87317; AEJ87330; AEJ90523; AEK94834; AEK94949; AEK94957; AEK95011; AEK95016; AEK95017; AEK95019; AEK95096; AEK95174; AEK95175; AEK95182; AEK95184; AEK95203; AEK95207; AEK95360; AEK95364; AEK95375; AEK95376; AEK95398; AEK95434; AEK95437; AEK95445; AEK95454; AEK95455; AEK95609; AEK95610; AEK95613; AEK95621; AEK95625; AEK95633; AEK95637; AEK95642; AEK95659; |

TABLE 4-continued

Proteomic and Glycomic Biomarkers for SCLC

| Marker Type and Direction in SCLC Cases Compared to Controls | Gene Name | UniProt Accession | GenBank Protein Accession |
|---|---|---|---|
| | | | AEK95672; AEK95688; AEK95701; AEK95705; AEK95707; AEK96111; AEK96124; AEK96125; AEK96133; AEK96147; AEK96190; AEK96198; AEK96199; AEK96202; AEK96216; AEK96226; AEK96237; AEK96238; AEK96242; AEK96278; AEP39695; AEP39697; AER28318; AEW22797; AEW23084; AEW23091; AEW23092; AEW23102; AEW90683; AEW90691; AEW90693; AEY80116; AFA41752; AFA42062; AFA42520; AFA42558; AFA42559; AFA42567; AFA42610; AFA42680; AFA42770; AFC90105; AFD23820; AFD23821; AFD23828; AFD23829; AFD23846; AFD23848; AFD23856; AFD29103; AFD36908; AFD36943; AFD36972; AFD36975; AFD37007; AFD37010; AFD64720; AFD64724; AFD64728; AFD64738; AFE48732; AFI25177; AFI25183; AFM36912; AFM55925; AFM55927; AFN88167; AFP43726; AFP43727; AFQ55482; AFQ62738; AFQ62745; AFQ62752; AFQ62757; AFQ90213; AFQ90221; AFQ90235; AFU93086; AFU93091; AFX62394; AFX62399; AFZ93991; AFZ93992; AFZ94003; AFZ94004; AFZ94008; AFZ94019; AFZ94023; AFZ94030; AFZ94033; AFZ94034; AFZ94038; AFZ94039; AFZ94072; AFZ94095; AFZ94106; AFZ94108; AFZ94122; AFZ94132; AFZ94135; AFZ94140; AFZ94178; AFZ94185; AFZ94187; AFZ94191; AFZ94196; AFZ94199; AFZ94201; AFZ94204; AFZ94207; AFZ94215; AFZ94224; AFZ94424; AFZ94425; AFZ94427; AFZ94444; AFZ94447; AFZ94509; AFZ94512; AFZ94516; AFZ94518; AFZ94542; AGG79686; AGG79690; AGG79882; AGG79904; AGG79906; AGG79907; AGG79967; AGG79971; AGI48711; AGJ84093; AGJ84097; AGK07570; AGK07574; AGK30599; AGL93365; AGL93370; AGL93371; AGL93373; AGM48497; AGM48498; AGO86846; AGQ16893; AGQ16902; AGQ16914; AGQ16920; AGQ16921; AGQ16931; AGQ16932; AGQ16940; AGQ16945; AGQ16954; AGQ16974; AGQ16996; AGW17263; AGW52119; AGZ87684; AGZ87685; AGZ87704; AGZ87708; AGZ87712; AGZ87715; AGZ87717; AGZ87739; AGZ87751; AGZ87755; AGZ87760; AGZ87781; AGZ87785; AGZ87794; AGZ87798; AGZ87815; AGZ87819; AHA46421; AHA46432; AHA53657; AHA53669; AHA53679; AHA80968; AHA90712; AHA90718; AHA90720; AHA90734; AHA90789; AHA90790; AHA93038; AHA93039; AHA93054; AHA93057; AHA93062; AHG52860; AHG52872; AHG52874; AHG52878; AHG52880; AHW85474; AHY61835; AHY61854; AHY61858; AHY61859; AHY61864; AHY61868; AHY61895; AHY61905; AHY61910; AHY61923; AHY61939; AHY61943; AHY61947; AHY61959; AHY61966; AHY61972; AHY61974; AHY61984; AHY61987; AHY61988; AHY61989; AHY62000; AHY81719; AHY81734; AHY81746; AHY81747; AHY81760; AHY81763; AHY81784; AHY81800; AHY81822; AHY81831; AHZ30933; AHZ30956; AHZ30975; AHZ30985; AHZ30987; AHZ30991; AHZ31004; AHZ31006; AHZ31007; AHZ31018; AHZ31028; AIB52374; AIE39248; AIE39258; AIK22438; AIN41939; AIN41947; AIN41950; AIN41982; AIN41986; AIN41990; AIN41993; AIR74892; AIW39916; AIX94180; AIX94183; AIX94201; AIX94209; AIX94217; AIX94219; AJA90820; AJI43153; AJI43158; AJI43171; AJI43178; AJI43184; AJI43188; AJI43191; AJI43192; AJI43203; AJI43226; AJW76740; AJW76742; AKA93943; AKA93948; AKA93956; AKA93976; AKA93977; AKA93980; AKA93982; AKA93984; AKA93987; ALH21913; ALL98857; ALS87621; AMK47896; AMR70925; ANG08627; ANG08636; BAE76021; BAG12757; BAJ12110; BAJ12116; BAJ12118; BAK82022; BAL41480; BAM29372; BAM29373; BAM29375; BAM29376; BAN59780; BAR79274; CAB02408; CAB02409; CAB37945; CAB53538; CAB65546; CAB71936; CAB71939; CAD12430; CAD12432; CAD12438; CAE84103; CAE92338; CAF32228; CAI40345; CAL48261; CAM23865; CAM23873; CAM90595; CAO00839; CAO78196; CAO91744; CAP60756; CAP66396; CAQ76695; CAQ77245; CAQ77246; CAR31393; CAR97780; CAX16733; CAX30810; CBI12486; CBJ55212; CBM42642; CBN86244; CBW38077; CBW44108; CBW44115; CBW46373; CBW47559; CBW52906; CBX02939; CBX19685; CBX36134; CCB84273; CCB84275; CCB84293; CCB84296; CCB84302; CCB84305; CCB84308; CCB84315; CCB84336; CCB84343; CCB84344; CCB84359; CCB84362; CCB84380; CCB84393; CCB84412; CCC54374; CCD31402; CCD31404; CCF23446; CCH26300; CCH63458; CCL98003; CCN80305; CCP37718; CCQ71727; CCV02681; CCW36812; CDI48084; CDK13049; CDN40102; CDO67983; CDO67988; CDQ51645; CDQ51646; CDQ51647; CDQ51691; CEF48069; CEF48070; CEF48076; CEF48093; CEF48103; CEF48116; CEH11580; CEP25299; CEP25304; CEP25321; CEP25325; CEP25328; CEP25335; CEP25337; CEP25339; CEP25355; CEP25358; CEP25359; |

TABLE 4-continued

Proteomic and Glycomic Biomarkers for SCLC

| Marker Type and Direction in SCLC Cases Compared to Controls | Gene Name | UniProt Accession | GenBank Protein Accession |
|---|---|---|---|
| | | | CEQ43511; CUU67666; CUU97102; CUU97123; CUU97137; CUU97140; CUU97144; CUU97160; CUU97167; CUU97186; CUU97192; CUU97199; CUU97204; CUU97205; CUU97210; CUU97213; CUU97218; CUU97220; CUU97223; CUU97228; CUU97236; CUU97256; CUU97257; CUU97264; CUU97267; CUU97275; CUU97292; CUU97295; CUU97297; CUU97304; CUX91035; CUX91043; CUX91050; P30499; Q07000; SAI78373; SAL89125; SAP35401; CAA09341; AAH07814; AAH08457; BAA08625; BAA11747; AAA52665; AAA59847; AAA53259; CAA41427; CAA48029; CAA57634; CAA65401; CAA68035; CAA71531; AAA59669; AAA81370; AAB70291; AAC17714; AAD21014; AAD52687; AAD53513; AAF04638; AAF29567; AAK07655; AAK31619; AAL49978; AAN10166; AAQ72735; AAR19102; AAR28679; AAT41622; ABD62875; ABG81862; ABG91051; ABI99472; ABO77641; ACA28734; ACF54634; ACF54635; ACF54636; ACF95804; ACF95810; ACI62421; ACM78934; ACM78936; ACN81043; ACN81052; ACN81054; ACN81172; ACN81219; ACN81220; ACN81295; ACN81297; ACN89859; ACN97198; ACO40493; ACO58590; ACO58644; ACO90082; ACO90084; ACP27910; ACP27917; ACP27953; ACR54363; ACR54370; ACR54376; ACR54380; ACR54381; ACR54395; ACS12736; ACS27620; ACS27627; ACS27629; ACS27630; ACS27639; ACS27664; ACS27666; ACS27692; ACS27693; ACS27695; ACS27702; ACS36191; ACS36201; ACS36206; ACS36414; ACS36415; ACS36417; ACS36420; ACS36443; ACS36448; ACT66300; ACT76682; ACT79366; ACT79371; ACT79377; ACT79379; ACT83089; ACT83719; ACU02008; ACU02011; ACU02019; ACU02035; ACU02119; ACU02122; ACU27287; ACU27304; ACU27305; ACU27306; ACU27308; ACU27313; ACU29586; ACU29587; ACU29588; ACU29589; ACU29599; ACU29600; ACU50928; ACU50939; ACU78145; ACU78153; ACU86978; ACV40737; ACV40743; ACV40746; ACV89474; ACV92055; ACX42647; ACX42650; ACX42660; ACX42662; ACX42669; ACX50448; ACX81389; ACX81396; ACX81405; ADB25036; ADB25037; ADB27759; ADB80084; ADB80086; ADB80087; ADB81942; ADB91968; ADC32129; ADC32133; ADC32189; ADC32191; ADC32198; ADC32215; ADC45457; ADC45475; ADC79686; ADC79839; ADC79853; ADC79860; ADC79865; ADC79869; ADC79871; ADC79873; ADC79877; ADC79878; ADC79974; ADC79989; ADC79993; ADC80002; ADC80032; ADC80037; ADC80047; ADC80049; ADC80061; ADD97868; ADD97869; ADE58698; ADE58702; ADE58729; ADE58740; ADE72884; ADE72900; ADE72914; ADE72923; ADE72925; ADE72927; ADE72937; ADE72943; ADE72944; ADE72957; ADE72968; ADE72973; ADE72983; ADE73051; ADE73148; ADE73170; ADE73172; ADE73178; ADE73179; ADE73200; ADE73204; ADE73209; ADE73242; ADE73243; ADE73255; ADE73327; ADE73328; ADE73334; ADE73389; ADE73393; ADE73396; ADE73407; ADE73460; ADE73522; ADE73525; ADE73527; ADE73638; ADE73706; ADE73716; ADE73730; ADE73744; ADE73838; ADI24378; ADM47606; ADM72771; ADM72773; ADM72776; ADM72780; ADM72785; ADN92612; ADN92625; ADQ55896; ADQ55915; ADT71649; ADU17379; ADU18050; ADU18489; ADU18492; ADU18496; ADZ05539; ADZ05551; ADZ05561; ADZ31192; ADZ38959; ADZ73139; ADZ73140; ADZ73158; ADZ98840; AEA49842; AEA49846; AEA49847; AEB21068; AEB65783; AEE39322; AEF13131; AEF13145; AEF13899; AEF13913; AEF13920; AEF13928; AEF13929; AEF13954; AEF13960; AEF13961; AEF32518; AEI01060; AEI01073; AEI01075; AEI01077; AEI30809; AEI30819; AEI30823; AEI30828; AEI58957; AEI59601; AEI59605; AEJ87639; AEJ22094; AEJ22096; AEJ22100; AEJ87320; AEK67333; AEK67336; AEK94836; AEK94841; AEK94843; AEK94891; AEK94946; AEK94947; AEK94948; AEK95006; AEK95071; AEK95074; AEK95082; AEK95085; AEK95090; AEK95092; AEK95094; AEK95170; AEK95173; AEK95195; AEK95197; AEK95212; AEK95370; AEK95378; AEK95389; AEK95410; AEK95424; AEK95426; AEK95443; AEK95446; AEK95623; AEK95644; AEK95646; AEK95651; AEK95661; AEK95666; AEK95673; AEK95674; AEK95675; AEK95679; AEK95685; AEK95689; AEK95691; AEK95692; AEK95708; AEK96115; AEK96126; AEK96149; AEK96158; AEK96168; AEK96176; AEK96203; AEK96212; AEK96213; AEK96215; AEK96229; AEK96230; AEK96247; AEK96267; AEK96269; AEK96270; AEK96271; AEK96275; AEK96276; AEK96277; AEK96280; AEK96284; AEK96285; AEK96288; AEK96291; AEL87268; AEO45080; AEW23042; AEW23049; AEW23085; AEW90684; AEW90687; |

TABLE 4-continued

Proteomic and Glycomic Biomarkers for SCLC

| Marker Type and Direction in SCLC Cases Compared to Controls | Gene Name | UniProt Accession | GenBank Protein Accession |
|---|---|---|---|
| | | | AEW90688; AEW90692; AEW90697; AEW90703; AEY80111; AEY80117; AEY80119; AFA41747; AFA41755; AFA42460; AFA42490; AFA42560; AFA42598; AFA42607; AFA42669; AFA42678; AFA42681; AFA42685; AFA42725; AFA42730; AFA42771; AFA42774; AFD23807; AFD23814; AFD23824; AFD23831; AFD23835; AFD23837; AFD23849; AFD23854; AFD36942; AFD36950; AFD36952; AFD37003; AFD37004; AFD37009; AFD37013; AFD64729; AFD64735; AFE48741; AFI25180; AFM77804; AFM77805; AFM77820; AFM77823; AFM77826; AFN88176; AFP73457; AFQ62751; AFQ62755; AFQ62756; AFQ90214; AFQ90219; AFQ90223; AFQ90227; AFQ90233; AFQ90234; AFU93093; AFU93104; AFU93106; AFV35204; AFV74672; AFZ93993; AFZ93998; AFZ94017; AFZ94021; AFZ94022; AFZ94024; AFZ94027; AFZ94052; AFZ94055; AFZ94062; AFZ94067; AFZ94075; AFZ94085; AFZ94097; AFZ94111; AFZ94145; AFZ94151; AFZ94152; AFZ94161; AFZ94175; AFZ94176; AFZ94183; AFZ94200; AFZ94210; AFZ94213; AFZ94214; AFZ94232; AFZ94234; AFZ94245; AFZ94428; AFZ94431; AFZ94432; AFZ94436; AFZ94438; AFZ94440; AFZ94470; AFZ94503; AFZ94504; AFZ94508; AFZ94510; AFZ94511; AFZ94522; AFZ94547; AFZ94595; AFZ94596; AFZ94598; AFZ94599; AGC51042; AGE97346; AGG79677; AGG79679; AGG79688; AGG79696; AGG79697; AGG79716; AGG79943; AGG79975; AGK07572; AGK07575; AGK44358; AGL73135; AGL73147; AGL93368; AGL93376; AGM48495; AGM48496; AGN74858; AGQ16899; AGQ16900; AGQ16922; AGQ16941; AGQ16953; AGQ16963; AGQ16965; AGQ16968; AGQ16971; AGQ16972; AGQ16983; AGQ16984; AGQ16993; AGQ16995; AGV08317; AGX13911; AGX13913; AGX13918; AGZ87693; AGZ87694; AGZ87698; AGZ87700; AGZ87722; AGZ87732; AGZ87734; AGZ87738; AGZ87742; AGZ87746; AGZ87766; AGZ87767; AGZ87773; AGZ87776; AGZ87778; AGZ87804; AGZ87808; AGZ87811; AGZ87820; AGZ87822; AGZ87830; AHA46435; AHA53638; AHA53651; AHA53653; AHA53654; AHA53676; AHA80972; AHA90557; AHA90715; AHA90729; AHA90740; AHA90742; AHA90757; AHA90758; AHA90772; AHA90776; AHA90783; AHA90792; AHA90795; AHA90797; AHA90799; AHA93026; AHA93036; AHA93045; AHA93048; AHA93055; AHA93061; AHA93067; AHC53643; AHG52871; AHG52877; AHY61842; AHY61846; AHY61850; AHY61851; AHY61853; AHY61879; AHY61884; AHY61886; AHY61904; AHY61917; AHY61932; AHY61945; AHY61952; AHY61954; AHY61973; AHY61975; AHY61982; AHY61985; AHY62003; AHY62004; AHY81716; AHY81718; AHY81721; AHY81741; AHY81759; AHY81765; AHY81768; AHY81773; AHY81779; AHY81796; AHY81802; AHY81818; AHY81823; AHY81826; AHZ30934; AHZ30937; AHZ30944; AHZ30947; AHZ30953; AHZ30957; AHZ30960; AHZ30973; AHZ30976; AHZ30982; AHZ30990; AHZ30993; AHZ31008; AHZ31012; AHZ31021; AIE39246; AIE39247; AIE39274; AIE39282; AIE39296; AIN41946; AIN41948; AIN41951; AIN41955; AIN41958; AIN41979; AIN41985; AIN41998; AIX94185; AIX94188; AIX94223; AIX94224; AJA90822; AJI43155; AJI43166; AJI43169; AJI43198; AJI43200; AJI43204; AJI43209; AJI43216; AJI43217; AJI43220; AJI43223; AJI43229; AJI43230; AJW76732; AJW76735; AKA93952; AKA93959; AKA93960; AKA93972; AKH87443; AKH87446; ALF62714; ALL25869; ALT55321; ALZ40821; AMY16456; ANG08606; ANG08611; ANG08612; ANG08614; ANG08615; ANG08618; ANG08619; ANG08620; ANG08633; ANG08642; ANG56533; BAF96505; BAJ12112; BAK82021; BAN59828; BAS02390; BAU51805; CAA76197; CAA76614; CAB02077; CAB65545; CAB65548; CAD12429; CAD12433; CAD29450; CAD45557; CAD47827; CAD56468; CAD59685; CAD70711; CAD90010; CAE30287; CAE30456; CAF32229; CAG26753; CAH65480; CAI29271; CAK12752; CAM23866; CAN89179; CAO00835; CAP17410; CAP72284; CAQ35180; CAQ35182; CAR31339; CAR81649; CAX20348; CAZ66350; CBA11527; CBG92451; CBL87902; CBM41836; CBM42645; CBW44105; CBW54814; CBX19376; CBX19686; CBX19687; CBX19691; CBX32752; CBX36127; CBX45592; CBZ05562; CBZ41141; CCB84257; CCB84278; CCB84279; CCB84291; CCB84295; CCB84297; CCB84300; CCB84309; CCB84334; CCB84346; CCB84354; CCB84363; CCB84368; CCB84371; CCB84377; CCB84385; CCB84389; CCB84401; CCB84403; CCB84405; CCB84407; CCB84414; CCB84418; CCB84428; CCB84430; CCB84438; CCB84439; CCD28283; CCD66661; CCF23166; CCF23445; CCF72066; CCG28538; CCG58320; CCH27332; CCJ65512; CCL97791; CCN97891; CCV02680; CDG23678; CDI30221; CDK13051; |

TABLE 4-continued

Proteomic and Glycomic Biomarkers for SCLC

| Marker Type and Direction in SCLC Cases Compared to Controls | Gene Name | UniProt Accession | GenBank Protein Accession |
|---|---|---|---|
| | | | CDN65461; CDO33941; CDO58213; CDO67702; CDO67714; CDQ51692; CDQ51696; CDQ51701; CEF48071; CEF48081; CEF48083; CEF48084; CEF48087; CEF48109; CEF48111; CEP25297; CEP25331; CEP25334; CEP25340; CEP25344; CEP25347; CEP25354; CEP25357; CUU97113; CUU97117; CUU97119; CUU97133; CUU97154; CUU97165; CUU97175; CUU97184; CUU97188; CUU97196; CUU97215; CUU97224; CUU97233; CUU97237; CUU97241; CUU97243; CUU97259; CUU97263; CUU97294; CUU97305; CUX91020; CUX91032; CUX91036; CUX91039; EAX03379; P30504; Q29865; SAI78374; SAI78376; SAL89123; SLI54175; BAG65328; BAA19535; BAA19536; AAA59656; AAA59703; AAA59704; AAA59705; AAA88088; AAA92995; AAA17674; CAA50209; AAA59700; AAB03578; AAB48495; AAB70290; AAB70292; AAC05205; AAC17710; AAC17717; AAC17724; AAD48066; AAF04743; AAF64391; AAO24136; AAP84346; AAV39503; AAX18632; AAZ53372; ABC61964; ABC61966; ABD62869; ABD65644; ABH03035; ABH10663; ABI55240; ABK97602; ABM64722; ABO14989; ABO31936; ABR58850; ABV68908; ABY64665; ABZ89497; ACD63075; ACE63276; ACF54631; ACF54632; ACG61385; ACL37148; ACM78895; ACM78898; ACM78900; ACM78901; ACM78903; ACM78924; ACM78935; ACM78943; ACN24622; ACN24633; ACN81045; ACN81051; ACN81058; ACN81221; ACN81289; ACN89840; ACN91000; ACN91017; ACN91021; ACN91024; ACN97191; ACN97193; ACN97194; ACN97197; ACO37270; ACO58589; ACO90086; ACP27912; ACP27921; ACP27937; ACP27947; ACR54366; ACR54389; ACR54400; ACS12744; ACS12751; ACS27613; ACS27614; ACS27617; ACS27621; ACS27653; ACS36186; ACS36196; ACS36198; ACS36205; ACS36207; ACS36426; ACS36427; ACS36434; ACS36439; ACS36441; ACS36442; ACS36463; ACS36465; ACS36470; ACT76245; ACT79375; ACT79383; ACT79394; ACT79973; ACT83090; ACT83721; ACU02001; ACU02002; ACU02004; ACU02013; ACU02021; ACU02030; ACU02118; ACU02124; ACU02129; ACU27286; ACU27307; ACU27311; ACU29594; ACU33856; ACU43582; ACU50927; ACU50929; ACU78140; ACU78149; ACV40722; ACV40744; ACV40745; ACV89472; ACV89477; ACV89481; ACV91115; ACV91118; ACV91119; ACV91120; ACX42649; ACX42652; ACX42653; ACX42655; ACX42661; ACX42663; ACX42665; ACX42666; ACX81394; ADB27761; ADB55628; ADB80076; ADB80077; ADB80090; ADB81947; ADB81951; ADB91966; ADC29456; ADC32175; ADC32197; ADC32207; ADC32209; ADC32210; ADC32223; ADC45454; ADC45462; ADC45479; ADC45485; ADC79842; ADC79843; ADC79852; ADC79882; ADC79887; ADC79888; ADC79975; ADC79977; ADC79981; ADC80001; ADC80003; ADC80005; ADC80007; ADC80023; ADC80025; ADC80044; ADC80051; ADC80053; ADC80060; ADC80064; ADC80067; ADD10600; ADD10601; ADD10602; ADD97866; ADD97871; ADE58699; ADE58710; ADE58714; ADE58725; ADE58728; ADE58731; ADE58736; ADE58742; ADE58746; ADE58749; ADE58750; ADE72878; ADE72886; ADE72888; ADE72890; ADE72907; ADE72915; ADE72917; ADE72921; ADE72932; ADE72935; ADE72939; ADE72941; ADE72952; ADE72959; ADE72962; ADE72965; ADE72967; ADE72971; ADE72976; ADE72984; ADE72989; ADE73000; ADE73042; ADE73043; ADE73046; ADE73047; ADE73052; ADE73150; ADE73151; ADE73166; ADE73201; ADE73213; ADE73319; ADE73320; ADE73322; ADE73388; ADE73395; ADE73399; ADE73405; ADE73406; ADE73524; ADE73579; ADE73631; ADE73634; ADE73635; ADE73695; ADE73699; ADE73701; ADE73713; ADE73718; ADE73719; ADE73739; ADE73832; ADF58788; ADI75492; ADI75496; ADM47607; ADM72763; ADM72765; ADN87361; ADN92609; ADN92622; ADN92626; ADU18055; ADU18490; ADV71255; ADV78584; ADX94777; ADZ05544; ADZ05546; ADZ05547; ADZ05549; ADZ31199; ADZ38961; ADZ38965; ADZ38966; ADZ73141; ADZ73143; ADZ73149; ADZ73151; AEA49818; AEA49820; AEA49829; AEA49837; AEA49843; AEA49845; AEF13136; AEF13138; AEF13142; AEF13146; AEF13906; AEF13910; AEF13914; AEF13931; AEF13938; AEF13942; AEF13948; AEF13949; AEI01074; AEI30811; AEI58959; AEI59593; AEI59608; AEI59609; AEI87638; AEJ22097; AEJ90525; AEJ90526; AEJ90528; AEK67339; AEK94837; AEK94840; AEK94963; AEK95018; AEK95073; AEK95076; AEK95095; AEK95156; AEK95162; AEK95171; AEK95187; AEK95326; AEK95396; AEK95419; AEK95432; AEK95441; AEK95457; AEK95599; AEK95600; AEK95629; AEK95658; AEK95665; |

TABLE 4-continued

Proteomic and Glycomic Biomarkers for SCLC

| Marker Type and Direction in SCLC Cases Compared to Controls | Gene Name | UniProt Accession | GenBank Protein Accession |
|---|---|---|---|
| | | | AEK95676; AEK95677; AEK95682; AEK95683; AEK95696; AEK95700; AEK96119; AEK96127; AEK96131; AEK96136; AEK96141; AEK96143; AEK96152; AEK96156; AEK96161; AEK96172; AEK96200; AEK96210; AEK96222; AEK96233; AEK96234; AEK96251; AEK96257; AEK96258; AEK96261; AEK96262; AEK96292; AEU43543; AEW90686; AEW90689; AEW90694; AEW90699; AEW90702; AEY80115; AFA42434; AFA42439; AFA42441; AFA42450; AFA42487; AFA42489; AFA42504; AFA42505; AFA42508; AFA42566; AFA42603; AFA42668; AFA42672; AFA42675; AFA42724; AFA42732; AFA42769; AFD23806; AFD23808; AFD23812; AFD23813; AFD23819; AFD23823; AFD23825; AFD23832; AFD23836; AFD23840; AFD23851; AFD23858; AFD23859; AFD36913; AFD36944; AFD36971; AFD37000; AFD64725; AFD64739; AFD64742; AFE48727; AFE48735; AFE48737; AFE88898; AFM77816; AFM77819; AFN88158; AFN88173; AFN88177; AFO66764; AFO66766; AFP73458; AFQ62741; AFQ62749; AFQ62766; AFQ62767; AFQ90220; AFQ90231; AFU93103; AFU93855; AFV35203; AFV74671; AFX62396; AFX62401; AFZ93987; AFZ93999; AFZ94001; AFZ94043; AFZ94056; AFZ94068; AFZ94071; AFZ94087; AFZ94091; AFZ94098; AFZ94099; AFZ94102; AFZ94126; AFZ94139; AFZ94153; AFZ94160; AFZ94163; AFZ94167; AFZ94171; AFZ94172; AFZ94173; AFZ94179; AFZ94194; AFZ94195; AFZ94205; AFZ94211; AFZ94216; AFZ94244; AFZ94445; AFZ94505; AFZ94521; AFZ94544; AFZ94546; AFZ94626; AGE97344; AGG68835; AGG79750; AGG79775; AGG79776; AGG79912; AGG79914; AGG79942; AGG80000; AGK07568; AGK07571; AGK44323; AGK44325; AGK44327; AGL09218; AGL73139; AGL73145; AGL93379; AGM48502; AGO64290; AGO64291; AGQ16894; AGQ16897; AGQ16909; AGQ16929; AGQ16935; AGQ16938; AGQ16946; AGQ16949; AGQ16951; AGQ16957; AGQ16964; AGQ16967; AGQ16970; AGQ16973; AGQ16975; AGQ16989; AGT79678; AGU99986; AGV08372; AGX13912; AGX13917; AGX13919; AGZ87691; AGZ87699; AGZ87710; AGZ87720; AGZ87728; AGZ87735; AGZ87736; AGZ87737; AGZ87741; AGZ87748; AGZ87758; AGZ87771; AGZ87772; AGZ87788; AGZ87792; AGZ87795; AGZ87805; AGZ87829; AGZ95032; AHA46415; AHA46418; AHA46419; AHA46422; AHA46441; AHA50095; AHA53640; AHA53647; AHA53652; AHA53667; AHA53671; AHA53672; AHA53677; AHA53680; AHA80967; AHA80970; AHA80973; AHA90710; AHA90732; AHA90735; AHA90744; AHA90746; AHA90747; AHA90781; AHA90786; AHA90788; AHA90793; AHA93022; AHA93027; AHA93034; AHA93037; AHA93042; AHA93058; AHA93065; AHG52876; AHG52879; AHG52881; AHK05785; AHY61828; AHY61837; AHY61838; AHY61849; AHY61856; AHY61866; AHY61869; AHY61873; AHY61877; AHY61893; AHY61897; AHY61899; AHY61931; AHY61935; AHY61969; AHY61970; AHY61976; AHY61992; AHY61997; AHY81715; AHY81727; AHY81733; AHY81743; AHY81745; AHY81757; AHY81761; AHY81766; AHY81772; AHY81776; AHY81778; AHY81795; AHY81810; AHY81811; AHY81816; AHY81824; AHY81827; AHY81835; AHZ30955; AHZ30958; AHZ30962; AHZ30974; AHZ30977; AHZ30979; AHZ30984; AHZ30994; AHZ30995; AHZ30999; AHZ31001; AHZ31009; AHZ31023; AIB55782; AIE39238; AIE39239; AIE39241; AIE39243; AIE39252; AIE39254; AIE39261; AIE39265; AIE39269; AIE39270; AIE39273; AIE39275; AIE39285; AIE39289; AIN41943; AIN41944; AIN41962; AIN41963; AIN41973; AIN41988; AIN41989; AIQ78393; AIX94179; AIX94184; AIX94189; AIX94198; AIX94204; AJI43164; AJI43174; AJI43176; AJI43189; AJI43195; AJI43197; AJI43205; AJI43228; AJI43233; AJW76729; AJW76744; AKA93953; AKA93954; AKJ66250; ALZ40823; AMB73108; AMC30594; AMD39523; AMO26196; AMR74919; ANG08604; ANG08609; ANG08625; ANG08631; ANG08638; BAD77815; BAD77817; BAJ78306; BAN59786; BAN59792; BAN59798; BAN59804; BAN59840; CAA05125; CAA25190; CAA75755; CAB71935; CAC01936; CAC05372; CAC12745; CAD29451; CAD44641; CAD45440; CAD70710; CAD90008; CAE22463; CAE84097; CAE85468; CAE92337; CAF33343; CAH17687; CAH65479; CAJ32665; CAJ55681; CAJ55741; CAL91416; CAL92190; CAM23862; CAM23864; CAM28533; CAN89496; CAO00838; CAO99143; CAR82587; CAR97781; CAX44302; CAZ66347; CAZ86765; CAZ91489; CBA18267; CBJ19218; CBL93952; CBW38079; CBW38447; CBW44106; CBW44109; CBW47473; CBX19681; CBX36131; CBX45595; CBZ05561; CCA63067; CCA94503; CCB84256; CCB84258; CCB84263; CCB84280; CCB84286; CCB84292; CCB84299; CCB84316; |

TABLE 4-continued

Proteomic and Glycomic Biomarkers for SCLC

| Marker Type and Direction in SCLC Cases Compared to Controls | Gene Name | UniProt Accession | GenBank Protein Accession |
|---|---|---|---|
| | | | CCB84335; CCB84342; CCB84348; CCB84353; CCB84383; CCB84398; CCB84413; CCB84415; CCB84422; CCB84429; CCB84431; CCB84432; CCB84433; CCC15088; CCH57807; CCJ65511; CCK33882; CCN79818; CCP29692; CCQ71728; CDG23680; CDK41198; CDN33434; CDO58212; CDQ37740; CDQ51635; CDQ51649; CDQ51652; CDQ51690; CDQ51693; CED53875; CEF48050; CEF48064; CEF48098; CEO90881; CEP25293; CEP25295; CEP25302; CEP25305; CEP25309; CEP25345; CEP25349; CQR91447; CRL92732; CUU97115; CUU97122; CUU97131; CUU97135; CUU97139; CUU97202; CUU97222; CUU97225; CUU97248; CUU97260; CUU97266; CUU97268; CUU97270; CUU97271; CUU97272; CUU97302; CUX07555; CUX91018; CUX91019; CUX91026; CUX91033; CUX91042; CUX91048; CUX91844; CUX91852; EAX03382; SAI78372; AAM76870; AAL03994; CAD29433; BAG62842; AAH10542; BAA07531; BAA89793; BAA32610; BAA32613; CDP32880; AAA59699; AAA88089; AAD14147; CAA53783; AAA74583; AAB03587; AAC14579; AAC16245; AAC27626; AAD38674; AAD51331; AAD51747; AAF04581; AAG40881; AAK07656; AAR08453; AAR15062; AAR19086; ABB52621; ABD62874; ABD62877; ABI64159; ABK97603; ABS56982; ACA28736; ACA79905; ACF95809; ACG61386; ACL37143; ACL37145; ACM78914; ACM78929; ACM90848; ACN22289; ACN24624; ACN24634; ACN81049; ACN81059; ACN81060; ACN81173; ACN81285; ACN89853; ACN90998; ACN91005; ACN91009; ACN91010; ACN91011; ACN91014; ACN91018; ACN91020; ACN91026; ACN97190; ACN97195; ACN97201; ACO88011; ACO90085; ACP27946; ACP27955; ACR54377; ACR54379; ACR54392; ACR54396; ACR78565; ACR78566; ACS12752; ACS27602; ACS27604; ACS27610; ACS27615; ACS27616; ACS27618; ACS27625; ACS27641; ACS27646; ACS27657; ACS27661; ACS27665; ACS27672; ACS27696; ACS27698; ACS27699; ACS27701; ACS36181; ACS36412; ACS36429; ACS36432; ACS36446; ACS36450; ACS36459; ACT68330; ACT76683; ACT79368; ACT79372; ACT79381; ACU02022; ACU02033; ACU02034; ACU27269; ACU27283; ACU27285; ACU27288; ACU27298; ACU29592; ACU50932; ACU50933; ACU50934; ACU50936; ACU78147; ACU78154; ACU78155; ACV30333; ACV30335; ACV40735; ACV40740; ACV40748; ACV89483; ACV91116; ACV91121; ACV91123; ACX29956; ACX42657; ACX81385; ACX81386; ACX81391; ACX81393; ACX81395; ADB25049; ADB27763; ADB80082; ADB80089; ADB80093; ADB81943; ADB81948; ADB81949; ADB91967; ADC32127; |
| SLEX Down | PPP2CA | P67775 | EAW62268; BAG70054; AAH19275; AAH31696; BAG51913; CAA31176; AAA36466; EAW62269; BAG70179; ; BAG53493; AAH02657; CAG33698; AAB38019; NP_002706; P67775; AAH00400; NP_001341948 |
| SLEX Down | SRGAP2 | O75044 | CAH73674; O75044; AAI44344; BAA32301; BAG56851; BAG57406; AAI32875; XP_011507656; XP_016856327; ; CAH73675; XP_011507657; BAG50836; XP_016856328; NP_056141; CAH73676; AAI32873; AQN67656; XP_005277567; XP_016856329; EAW93550; XP_005277568; XP_005277571; XP_005277572; XP_011507661; NP_001164108; XP_011507658; XP_016856330; NP_001287881; BAH12200 |
| SLEX Down | SHH | Q15465 | BAA34689; AAS01990; ADL14518; NP_001297391; AAB67604; Q15465; XP_011514782; ; AAA62179; EAL23913; AAQ87879; EAX04543; XP_011514781; NP_000184 |
| SLEX Down | FETUB | Q9UGM5 | BAA78341; AAR22508; NP_055190; CAB62538; EAW78185; EAW78186; AAQ10515; XP_011510983; XP_011510984; NP_001295006; AAH74734; XP_011510985; ; BAH14069; CAC24999; BAG37713; AAH69670; AAH69820; Q9UGM5; AAR22507; AAI14617; XP_005247408; NP_001295008 |
| SLEX Down | CHST1 | O43916 | AAH28235; BAA24840; AAH22567; AAC28776; AAP88041; EAW68038; AAD19878; EAW68034; ; EAW68037; EAW68036; EAW68039; EAW68035; O43916; XP_006718419; XP_016873948; NP_003645 |
| SLEX Down | CYR61 | O00622 | AAH09199; CAB10848; EAW73197; ; AAG59863; AAR05446; EAW73196; O00622; BAG58373; CAA72167; EAW73198; AAB84227; BAD97105; AAH01271; CAG38757; AAH16952; AAB58319; AAF21597; AAB61240; CAA72802; NP_001545; BAG37152; CAB09804 |
| SLEX Down | CLDN12 | P56749 | BAG35384; AAH36754; AAH68532; CAG38501; AAP22363; EAW76876; CAB60617; CAD35081; CAB66704; NP_001172002; NP_036261; EAW76877; EAL24163; NP_001172001; ; P56749 |

TABLE 4-continued

Proteomic and Glycomic Biomarkers for SCLC

| Marker Type and Direction in SCLC Cases Compared to Controls | Gene Name | UniProt Accession | GenBank Protein Accession |
|---|---|---|---|
| SLEX Down | INHBE | P58166 | CAF86622; ; P58166; BAC11521; NP_113667; EAW97012; AAN03682; AAH05161 |
| SLEX Down | LASP1 | Q14847 | BAG58436; CAA57833; ; EAW60543; BAG57861; EAW60545; BAF82536; BAG58846; AAH12460; NP_006139; EAW60544; AAH07560; Q14847; NP_001258537 |
| SLEX Down | EGFR | P00533 | AAA63171; AAC50796; AAC50797; AAG35787; AAS07524; AFK93471; AFK93472; CAA29668; CAA34902; CBK51924; CCO75437; BAH11869; AAT97979; ADL28125; AAA52371; NP_001333827; NP_958439; AAG35789; AFK93476; BAF79636; BAF80003; BAF80004; CAJ55813; CEF34368; AAG43240; ADN43066; NP_001333829; NP_958440; AAC50798; AAS83109; ART34941; BAL41217; CBK51923; EAW50963; AAH94761; ADZ75461; ADY76965; NP_001333826; ; AAC50804; CBK51921; CBK51922; P00533; ABQ66238; CAA25282; NP_958441; AAA52370; AAC50799; AFK93475; AFK93478; AIE16170; AIE16171; ART34939; ART34943; ART34944; AAT97978; AAI18666; AAZ66620; AAG35790; AAG43243; AFK93474; ART92273; BAE15958; CCO13722; CCO75439; CCV20014; EAW50964; EAW50965; BAD92679; BAF83041; AAC50802; CAA25240; NP_005219; AAG35786; AAG35788; AAG43245; AFK93473; AFK93477; ART34942; ART34945; BAL40868; EAW50962; AAB53063; NP_001333870; AAC50800; AAC50801; AAC50803; AAG43244; ART34940; CAM91181; CAV33298; AAK01080; AAT52212; AAI28420; ABQ66237; NP_001333828 |
| SLEX Down | FAM48A | Q0D2Q4 | Q8NEM7; XP_005266514; XP_016876146; NP_060039; EAX08582; EAX08583; EAX08584; EAX08585; AAQ15220; AAH01145; XP_005266511; XP_005266513; XP_016876145; NP_001265409; CAB62207; XP_005266518; XP_005266524; ; AAD40550; AAL38587; XP_005266508; XP_005266517; XP_016876143; NP_001265411; EAX08586; BAG51343; XP_005266506; XP_005266519; XP_016876148; NP_001014308; NP_001265410; XP_005266504; XP_005266512; XP_005266515; XP_016876142; XP_016876147; BAG65097; AAH30686; XP_005266521; XP_005266522; XP_016876144; XP_016876149; XP_016876150; BAF85065 |
| SLEX Down | RGS14 | O43566 | AAM12650; AAH14094; XP_005265852; NP_006471; EAW85011; AAB92613; BAG53582; XP_005265851; EAW85013; AAY26402; EAW85012; O43566; BAC85600; AAB92614 |
| SLEX Down | BRCA1 | P38398 | AAC37594; AAZ16492; AAZ79408; AAZ79409; ABA29214; ABA29220; ABA29229; ABB87060; ABB87066; AFU88804; AIC83545; AIC83546; AIC83547; AIC83548; AIC83550; AIC83552; AIC83554; AIC83574; AIC83575; AIC83579; AIY34492; AKE50579; AKG51646; AKR15646; AMO12813; EAW60923; EAW60940; AAH72418; AAI15038; AEQ98814; NP_009225; ; AAF97939; AAM18220; AAZ05886; AAZ79407; ABB87058; ABB87063; ABB87070; ABB87071; AFU88805; AIC83541; AIC83556; AIC83557; AKE50580; AKJ80194; AMO12815; AMO12816; AMO12821; AOG75862; CCD57770; CCD57771; EAW60925; EAW60929; EAW60932; EAW60935; AAH62429; AAI06746; AAA73985; AAB08105; AAB34725; AAM 18223; ABA29217; ABB87057; ABB87067; ABB87068; ABB87069; AFU88803; AFU88807; AIC83540; AIC83542; AIC83551; AIC83580; AIC83581; AKE50577; AKQ62934; AKQ62935; AKR15645; ALF35866; CAA70003; CCD57768; CCD57772; CCD57773; AAU93634; AKG51648; AAC00049; AAM18221; AAN61423; AAN61425; AAZ79406; AAZ79410; ABB87062; ABB87074; AIC83572; AKE50578; AKG51645; ALO20344; AMO12814; AMO12819; CCD57769; CCD57774; EAW60934; EAW60942; AAB61673; BAH 14571; AAH85615; ABC59810; AAP12647; ABA29223; ABB87059; ABB87061; ABF14462; ACR33809; AIC83549; AIC83555; AIC83571; AIC83576; AKE50581; AKG51644; AKJ84699; ALO20343; ALY05710; ALY05711; EAW60924; NP_009230; AAM18218; AAM18219; AAM18225; AAN10167; AAP70031; ABA29211; ABA29226; ABB87064; ABB87077; ABB87079; AFU88802; AIC83558; AIC83559; ALO20345; AMO12818; AMO12820; EAW60922; EAW60933; EAW60939; P38398; AAQ92977; AAI06747; ABC59811; AKG51647; AAM18222; AAM18226; AAN61424; AAU21564; AAU21565; ABA29208; ABB87053; ABB87054; ABB87055; ABB87056; ABB87072; ABB87075; ABB87076; ABB87078; AFU88808; AFU88809; AIC83539; AIC83553; AIC83577; AIC83578; AKE50575; ALD10297; AMO12812; AMO12817; ATE47047; EAW60927; EAW60928; EAW60930; EAW60936; EAW60941; ABC88652; NP_009228; NP_009231; AAM18224; AAN71744; AAU21563; ABB87065; ABB87073; AFU88806; AIC83544; AIC83573; |

TABLE 4-continued

Proteomic and Glycomic Biomarkers for SCLC

| Marker Type and Direction in SCLC Cases Compared to Controls | Gene Name | UniProt Accession | GenBank Protein Accession |
|---|---|---|---|
| | | | AKE50574; AKE50576; AKQ62933; EAW60926; EAW60931; EAW60937; EAW60938; BAK64160; AAH30969; NP_009229 |
| SLEX Down | ADAM7 | Q9H2U9 | AAG43987; AAH43207; BAF85181; NP_003808; ; Q9H2U9; AAH58037; EAW63606; AAC36742; XP_016869432 |
| SLEX Down | CEACAM6 | P40199 | CDM55345; AAH05008; AAA51739; AAA59909; CAG27583; CDM22277; P40199; AAA59908; EAW57061; ; AAA51971; AAA59907; AAA59915; XP_011525292; BAG35441; NP_002474; AAP88776 |
| SLEX Down | VNN1 | O95497 | BAF83114; AAH96268; ; EAW48020; AAH96266; AAF21453; NP_004657; O95497; AAH96267; AAY88742; CAA10568; BAG36929; AAH96265 |
| SLEX Down | CASP9 | P55211 | AAP35557; XP_011540575; NP_001264983; NP_127463; BAA87905; ; BAF84769; AAV33129; XP_005246071; AAO21133; EAW51731; P55211; BAF84800; AAH02452; NP_001220; BAA82697; EAW51730; BAG64715; AAC50776; BAD92384; AAD12248; AAD13615; CAH03131; BAA78780; AAH06463; AAC50640 |
| SLEX Down | CUL2 | Q13617 | BAG53007; AAC51190; XP_011518045; BAH 11667; AEE61248; NP_001185706; EAW85924; EAW85928; EAW85926; BAH 13294; NP_001185707; EAW85922; AAD23581; AAI10902; XP_011518047; NP_001185708; NP_003582; ; EAW85925; Q13617; NP_001311305; EAW85927; AAH09591; XP_011518049; AAC50545; XP_011518046; NP_001311304 |
| SLEX Down | TLX2 | O43763 | ; O43763; BAA83463; AAH06356; EAW99630; BAJ84026; NP_057254 |
| SLEX Down | CSNK1A1 | P48729 | AAG17246; BAG57180; AAC41760; AAH07246; AAH08717; CAA56710; NP_001258670; CAG47002; NP_001883; EAW61767; AAV38632; ACF94482; ; EAW61769; EAW61774; AAF69665; AAL60204; BAG57435; BAG58018; AAH21971; AAV38633; NP_001258671; EAW61771; EAW61772; EAW61773; EAW61776; EAW61768; EAW61775; AAH25371; AAY84562; NP_001020276; EAW61770; P48729; BAG64751 |
| SLEX Down | DDEF1 | Q9ULH1 | CBX47524; AAH20631; XP_016868958; CAD97831; XP_006716626; NP_001234925; BAA86563; AAI37136; XP_006716628; XP_006716629; XP_011515355; ; EAW92131; XP_005250982; EAW92130; AAF67666; XP_006716627; XP_016868956; XP_016868957; CCQ43599; Q9ULH1; XP_011515354; NP_060952 |
| SLEX Down | CLDN6 | P56747 | EAW85432; EAW85431; AAH08934;; BAG52111; AAK02013; AAQ88844; CAI72055; P56747; AAP36063; CAB56533; NP_067018 |
| SLEX Down | TMEFF2 | Q9UIK5 | CCQ43534; AAH08973; NP_001292074; AAX88893; AAY14874; AAG49452; BAG37769; BAG51979; BAD96411; CAG33671; AAF91397; BAA90820; XP_011509192; XP_016859228; NP_057276; AAG49451; Q9UIK5; AAD55776; XP_016859229; NP_001292063; ; AAQ89266; CAH05705; EAX10831; BAA87897; CAR82354; EAX10832; BAC11030; CAB75654; AAZ43216 |
| SLEX Down | NPAS4 | Q8IUM7 | ; AAI05002; XP_016873026; BAC04271; AAI05004; NP_849195; BAC04738; XP_016873028; BAC19830; AAI43631; EAW74525; Q8IUM7; XP_016873027; NP_001305733 |
| SLEX Down | TCEB3 | Q14241 | ; Q14241; AAA75492; EAW95070; EAW95071; BAG35905; AAO15305; AAH02883; NP_003189 |
| SLEX Down | APOE | P02649 | AAG27089; AAL82810; AFS60672; ALQ33371; BAA96080; CAA63051; AAD02505; EAW57306; NP_001289618; ; ACN81314; ADK26133; BAG37412; ALQ33368; AAB59546; ALQ33370; CAA94806; NP_000032; NP_001289620; AAB59397; P02649; AAH03557; ALQ33369; AAB59518; CAA25017; NP_001289617; NP_001289619 |
| SLEX Down | PTMS | P20962 | AAH17025; AAI28230; ; EAW88742; NP_002815; AAA61185; NP_001317262; XP_011519289; CAA73913; P20962 |
| SLEX Down | PSMB9 | P28065 | CAA78700; AAC60646; AHW47978; EAX03654; AQY77063; CAA47024; P28065; AHW47961; EAX03653; CAA44603; AHW47927; AQY77059; AAH65513; CAG46457; AAC50154; NP_002791; AHW47944; AQY77061; AQY77062; AQY77060; BAG64224; ; CAA60784 |
| SLEX Down | RPLP2 | P05387 | CAG47044; CAG47008; AAH05354; AAH62314; EAX02394; P05387; AAH05920; AAH07573; BAG34894; BAA05777; ; BAB79475; EAX02393; NP_000995; AAA36472 |
| SLEX Down | CFL2 | Q9Y281 | AAF64498; AAD31280; AAD31281; AAH22876; NP_068733; AAM10495; AAF97934; EAW65908; XP_011534665; ; Q9Y281; BAG36842; EAW65912; AAH11444; AAH22364; EAW65910; EAW65911; NP_001230574; NP_619579 |
| SLEX Down | CLASP1 | Q7Z460 | EAW95253; XP_011509150; XP_016859147; XP_016859151; XP_016859152; XP_016859174; XP_016859176; XP_016859177; NP_001135746; NP_056097; CAC35156; XP_006712446; XP_016859154; XP_016859158; XP_016859166; XP_016859167; |

TABLE 4-continued

Proteomic and Glycomic Biomarkers for SCLC

| Marker Type and Direction in SCLC Cases Compared to Controls | Gene Name | UniProt Accession | GenBank Protein Accession |
|---|---|---|---|
| | | | XP_016859169; XP_016859170; XP_016859173; Q7Z460; XP_006712440; XP_006712444; XP_006712445; XP_011509151; XP_016859153; XP_016859168; XP_016859175; XP_016859178; XP_016859179; ; AAQ15051; BAH 11926; AAH32563; AAI32724; CAH18421; XP_016859148; XP_016859156; XP_016859165; BAH13003; CAI46251; XP_016859155; XP_016859159; XP_016859163; XP_016859172; NP_001135745; EAW95255; BAH13560; XP_016859160; XP_016859161; XP_016859180; AAX88872; EAW95254; BAA31597; BAH 12576; BAH13694; AAI44108; ABB13627; XP_016859162; XP_016859164; XP_016859171; EAW95252; BAH 12531; AAR07949; AAI12941; XP_006712448; XP_016859146; XP_016859149; XP_016859150; XP_016859157; NP_001193980 |
| SLEX Down | ADAMTS4 | O75173 | O75173; BAA31663; AAD41494; NP_001307265; EAW52627; AAH63293; AAL02262; BAF84262; AAQ89245; ; NP_005090; ABC88384 |
| SLEX Down | PCSK9 | Q8NBP7 | CDM55691; BAC11572; CDM55545; ABV59216; ACN81318; BAG57260; ; EAX06660; BAC85910; NP_777596; CAC38896; Q8NBP7; BAG59894; CAC60361; AAV67948; CDI44158 |
| SLEX Up | WNT4 | P56705 | AAK50427; AAK51699; XP_011539899; NP_110388; AAG38658;; EAW95010; XP_011539901; CAI38644; AAH57781; XP_011539900; AAQ89306; AAV38928; AAK25765; P56705; BAC23080; BAG58821 |
| SLEX Up | ANG | P03950 | NP_001091046; CDG31911; CAG28561; ; AAA51678; AAL67712; AAH20704; AAH62698; ACI45236; AAL67710; AAL67714; AAL67711; AAL67713; EAW66450; EAW66451; P03950; BAG36701; AAH54880; NP_001136 |
| SLEX Up | CTGF | P29279 | AAK60506; AAK60507; CAS92743; EAW48038; AAV38597; CAG46534; P29279; CAA55544; BAG37644; CAG46559; ; AAZ29611; ADL14512; CAA63267; EAW48039; AAH87839; BAG52518; AAQ95223; AAV38598; AAA75378; BAG54167; AAK60505; CBX51740; BAF83573; AAS55639; AAA91279; NP_001892 |
| SLEX Up | RECQL4 | O94761 | BAA86899; XP_016869490; EAW82070; BAA74453; AAH11602; AAH13277; NP_004251; XP_016869480; XP_016869483; XP_016869484; XP_016869489; XP_016869482; XP_016869487; ; O94761; XP_016869481; XP_016869485; XP_011515686; XP_016869486; AAZ85145; EAW82071; AHN60090; XP_016869488 |

Discovery of Autoantibody, Proteomic, and Glycomic Plasma Markers for SCLC Early Detection When diagnosed at limited stage, SCLC carries a much better prognosis than when diagnosed at extensive stage. The low-dose CT screening protocols that have proven effective for NSCLC have not displayed benefit in SCLC. This is likely a result of the aggressive nature of SCLC, such that annual imaging is not sufficient. We would argue that diagnostic methods capable of identifying SCLC at the microscopic stage, prior to clinical detection, would be necessary to reliably identify limited stage SCLC. Our strategy leverages two key molecular features unique to SCLC to achieve our goals. These are: 1) expression of CNS proteins by neuroendocrine cells that could be either directly identified in plasma (proteomic markers) or for which there would exist an autoantibody-antigen complex that could be detected in plasma (autoantibody markers) and 2) SCLC produced carbohydrate modified (glycomic marker) proteins amenable to detection in plasma. Thus, we argue that the amplification present in the immune system and widespread glycosylation "mistakes" could allow detection of even small tumors. There will be two components to these discovery studies. Initially, performed an unbiased screen on human SCLC plasma specimens using HuProt Arrays to comprehensively identify additional SCLC specific antibodies. Subsequently novel, small format antibody arrays were fabricated that include all of the candidates identified in the HuProt Arrays, PNS-related antibodies (including but not limited to those listed in Table 1A), and candidate proteomic and glycomic markers identified on large format arrays studies of CHS specimens. The entire discovery dataset of N=43 SCLC cases and controls were subjected to this array to develop a SCLC hybrid plasma marker panel.

Conditions

Cohorts. All studies proposed are performed on a discovery dataset of N=43 SCLC cases and controls (matched on age, sex, and smoking history (pack-years and current/former/never status)). N=26 of these cases originate from the Fred Hutch LCEDPC cohort and the other N=17 are from the CHS. Only markers with high performance in both cohorts are considered for additional study.

Unbiased SCLC specific antibody detection using HuProt Arrays. HuProt Arrays contain >17,000 recombinant proteins expressed in yeast. These arrays were used to detect circulating free antibody (not autoantibody-antigen complexes). To accomplish this, 2 µl of undepleted human plasma is diluted to 80 µl and incubated on the array for 1.5 h according to manufacturer's directions. After washing, incubation with Alexa Fluor 647-goat anti-human IgG (Jackson Labs) will be performed. These secondary antibodies are highly cross absorbed against other species and will not detect any other IgG species. After washing and scanning, data analysis was performed with the manufacturer-supplied software, ProtoArray Prospector.

Fabrication and incubation of arrays. Triplicate features of each antibody are printed onto Schott Nexterion H slides using a Genetix Q-Array 2 microarray platform. Antibodies are covalently linked via a reactive NHS-ester bound to a 3-D gel polymer coated on the glass slide. Printed arrays have good shelf life (we have seen no deterioration up to 5 years of storage at −80° C. under vacuum). The antibodies printed on these arrays contain all candidates from proteomic, glycomic, and autoantibody-antigen complexes, candidates from the HuProt arrays, control markers, and additional markers for the purposes of normalization.

Detection of differences in protein levels in cases vs. controls. In order to utilize less dye and effectively increase the concentration of less abundant proteins, we deplete albumin and IgG using a Sigma ProtIA spin column and concentrate the sample with a Microcon 10 k cut-off filter.8-10 Proteins (200 μg) from case or control plasma are labeled with the fluorophore Cy5 (NHS-Cy5) and compete with protein from a reference plasma protein pool labeled with NHS-Cy3. Thus, the total amount of any protein bound to an arrayed antibody will only affect signal strength, not the ratio of Cy5/Cy3 assuming no preferential affinity of any antibody for either dye (controlled for by labeling the same sample with both dyes). The relative abundance of the protein in the case and control samples determines the relative fluorescence signal and since we use the same reference throughout a study, values are comparable between experiments allowing calculation of the relative difference between case and control.

Detection of differences in cancer specific-protein glycosylation levels in cases vs. controls. Most current clinical cancer biomarkers are glycoproteins (e.g., CA125, CA15-3, PSA and CEA for ovarian, breast, prostate and colon cancer, respectively) or cancer specific carbohydrate structures (e.g., CA19-9 which recognizes sialyl Lewis A for pancreas cancer). Cancer specific changes in glycosylation can occur due to defects in the complex glycosylation process caused during carcinogenesis and, in particular, sialyl-Lewis structures often result (sialyl-Lewis A, X, Tn). To detect the presence of cancer-specific glycosylation changes, 10 μl of undepleted human plasma is diluted to 80 μl and incubated on the array. After washing, Cy3 labeled anti-sialyl Lewis A (i.e., the CA19.9 antigen) antibody and Cy-5 labeled anti-sialyl Lewis X antibodies detect the presence of these cancer specific carbohydrate modifications. Incubation of the array with only secondary antibodies (i.e., no plasma) yields essentially no background signal from interaction with carbohydrate from >87% of the arrayed antibodies and only low signal from the remaining that can be subtracted out as background.

Detection of differences in cancer specific protein-autoantibody plasma levels in cases vs. controls. To detect the presence of autoantibody-antigen complexes, 2 μl of undepleted human plasma is diluted to 80 μl and incubated on the array as described above. After washing, human bound autoantibody-antigen complexes are detected with Alexa Fluor 546-goat anti-human IgG and Alexa Fluor 647-goat anti-human IgM (Jackson Labs, both highly cross absorbed). The secondary antibodies are highly specific and background levels from secondary antibodies alone (no plasma added) yield essentially no signal for >95% of the spots.

Array analysis, normalization, reproducibility, variability, and consistency. Array data contains a format identical to two-channel gene expression arrays and analysis proceeds analogously. The array image is scanned using a GenePix 4000B (Axon Instruments) scanner. The numerical data processed by Genepix Pro 6.0 is imported to Limma 2.4.11 (Linear Models for Micro Array, a Bioconductor R package) for background adjustment and normalization using loess methods (on print-tip, plate and antibody type). For proteomic analysis, the red (R) and green (G) intensities for each spot are corrected using the "subtract" method and M (log 2R-log 2G) and A ((log 2R+log 2G)/2) values are calculated and normalized. The M=log(median value of replicates) are used in each array for all antibodies. We estimate the marginal significance of each feature separately, controlling for operator and batch effects and their interaction effects using logistic regression; We predict Y=case status from batch, and operator (each as linear terms), their interaction, and M. The p-value corresponding to the coefficient of M is converted into false discovery rates (FDR). For glycosylation and autoantibody analysis cases and controls red and green spot intensities are analyzed separately for sialyl Lewis X and A or IgG and IgM specific autoantibody content.

We identified GAD65 autoantibody-antigen complexes in 88% of the Fred Hutch cohort. We also generated similar results using this format for PNMA1 (100%), PNMA2 (100%), and CRMP5 (78%). The nature of these relationships is determined by assaying for free antibody and autoantibody-antigen complexes alike.

ii. Refinement and Validation of Hybrid Plasma Marker Panel for SCLC Early Detection It is essential that biomarker panels be refined and validated in independent datasets. It is also essential that biomarker panels ultimately be transferred to formats that can be performed at most institutions. We will refine our preliminary biomarker panel in a total of N=131 SCLC plasma and matched controls from the PLCO, NLST, and WHI cohorts. These studies will be performed using the same small format arrays disclosed herein. This will enable us to adjust the biomarker panel if the performance characteristics of one of the primary candidates should falter, or if the performance characteristics of one of the secondary candidates should outperform its preliminary tests. Following the analysis of these assays, we will "fix" a rule, meaning that we will determine a final panel of biomarkers (likely 4-7 markers total), transfer these antibodies to the Luminex platform (to enhance translational value), and validate the final hybrid marker panel on a dataset of N=102 plasma specimens and matched controls.

Cohorts. The refinement studies will be performed using SCLC plasma specimens and matched controls (age, sex, race, smoking consumption) from the PLCO (N=38), WHI (N=70), and NLST (N=23) (see Table 4). The validation assay will be performed on N=102 SCLC plasma specimens and matched controls.

Refinement (pre-validation) of hybrid plasma marker panel. The small format arrays described above will be used for refinement or pre-validation of the preliminary hybrid marker panel. The probing strategies and analytical techniques will be identical to those described above.

Transfer of hybrid plasma marker panel to Luminex platform. Given the limited available volumes of these samples, coupled with our need to validate multiple candidates, we are employing Luminex assays for our validation studies because they provide the reliability and specificity of an ELISA assay but with significantly reduced volume requirements and the ability to multiplex assays. For this assay, we covalently link the antibody from the array that bound the specified biomarker to a color-coded BioPlex COOH beads according to the method disclosed in Gut, 2018 March; 67(3):473-484 (doi: 10.1136/gutjnl-2016-312794. Epub 2016 Nov. 7.) which is hereby incorporated by reference in its entirety. Instead of linking the plasma proteins to Cy3 or Cy5 as we would for array proteomics, we link them to biotin according to manufacturer's instructions using a Pierce EZ-link Sulfo-NHS-biotinylation kit. The BioPlex beads for each analyte are added to the diluted plasma sample, washed and Phycoerythrin (PE)-conjugated streptavidin is added, washed and signals are read on a dual-laser flow-based BioRad BioPlex detection instrument. One laser identifies the bead while the second determines the magnitude of the PE-derived signal.

Figure 8:
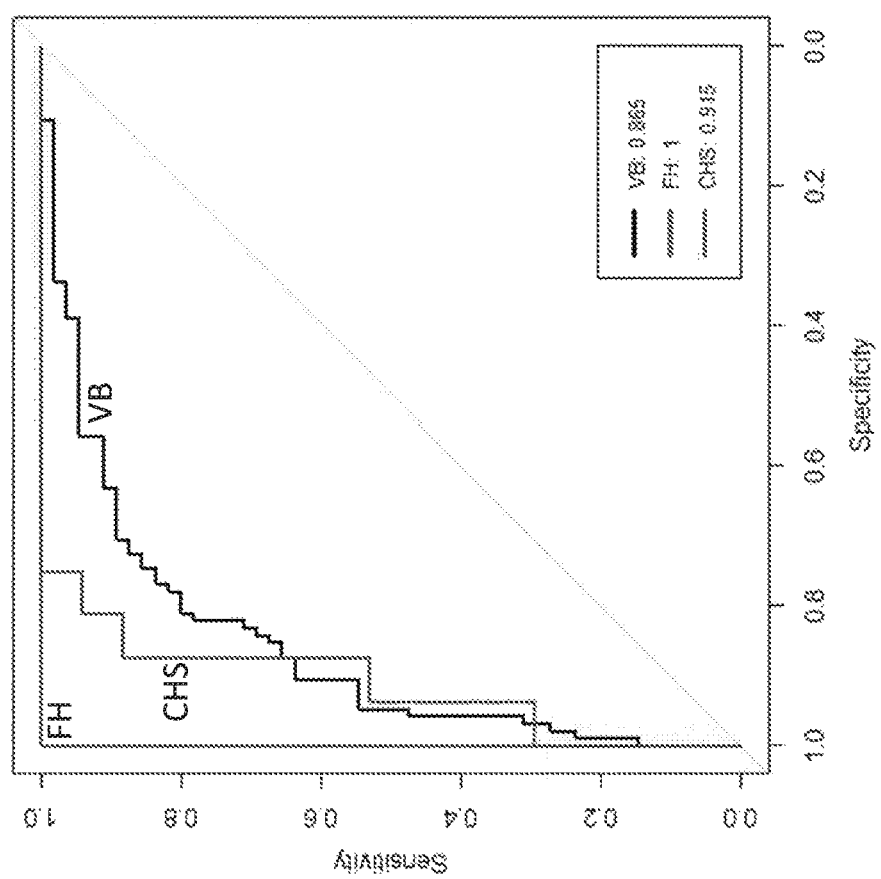
FIG. 8 is a ROC graph illustrating 4 autoantibody panel in 3 independent SCLC cohorts. A panel of 4 validated autoantibodies-antigen complexes (NLRP7-IgM, TFRC-IgM, PLD3-IgG, TIMP2-IgG) performed well in each study with an AUC of 0.915 in CHS (53% sensitivity at 90% specificity), 1.0 in Fred Hutch (100% sensitivity at 90% specificity) and 0.866 in Vanderbilt (64% sensitivity at 90% specificity).
Figure 9:
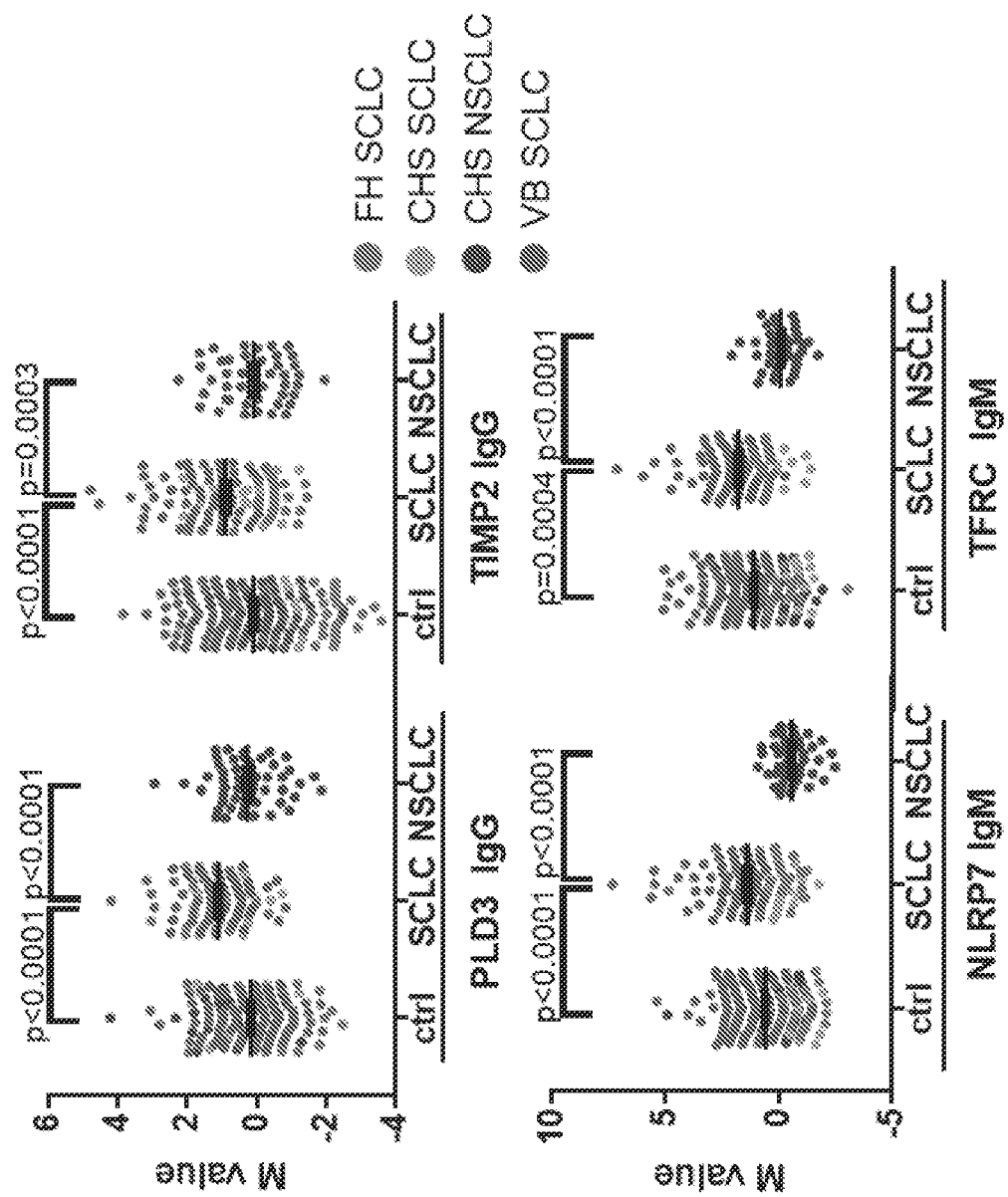
FIG. 9 Panel autoantibodies are specific for SCLC. We have evidence that each autoantibody-antigen complex in our initial 4 marker panel is specific for SCLC as none of these autoantibodies are upregulated in NSCLC samples from a CHS cohort (FIG. 9, N=59).
Figure 10:
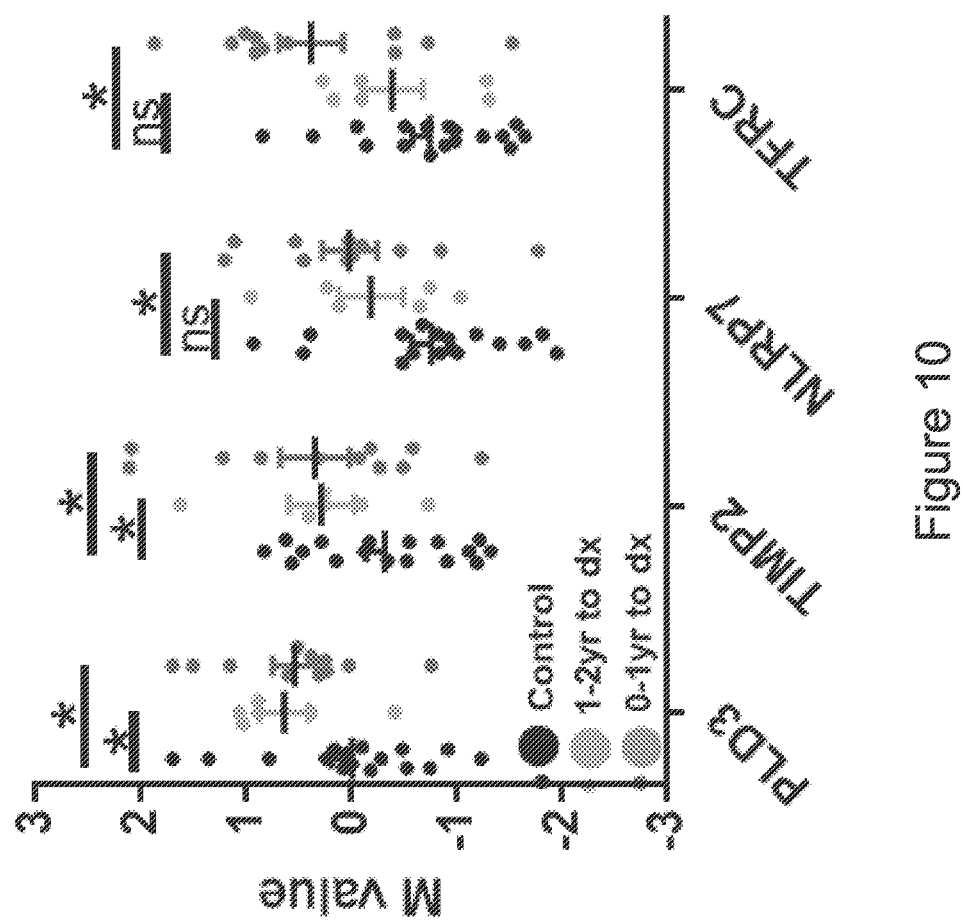

Validation. The final SCLC hybrid plasma marker early detection panel will be validated using N=102 specimens and matched controls on the Luminex platform (described above). The performance of the final panel will be expressed as cumulative sensitivity, specificity, positive predictive value, negative predictive value, and AUC value. We will achieve an AUC of at least 0.9. It is contemplated that gender specific panels may be developed. FIG. 8 illustrates the results of a 4 autoantibody panel in 3 independent SCLC cohorts. A panel of 4 validated autoantibodies-antigen complexes (NLRP7-IgM, TFRC-IgM, PLD3-IgG, TIMP2-IgG) performed well in each study with an AUC of 0.915 in CHS (53% sensitivity at 90% specificity), 1.0 in Fred Hutch (100% sensitivity at 90% specificity) and 0.866 in Vanderbilt (64% sensitivity at 90% specificity). Further, FIG. 9 illustrates that the panel autoantibodies are specific for SCLC. Evidence is provided that each autoantibody-antigen complex in the initial 4 marker panel is specific for SCLC as none of these autoantibodies are upregulated in NSCLC samples from a CHS cohort (N=59). FIG. 10 provides evidence that the disclosed SCLC panel FIG. 10 demonstrates SCLC panel autoantibodies are upregulated over 1 year prior to diagnosis. The CHS specimens (N=17) we utilized to generate preliminary data were drawn either 0-1 or 1-2 years prior to diagnosis. We re-analyzed the data from FIG. 8 as a function of the time of blood draw. The data show that most of the markers were similarly effective when the plasma was drawn 1-2 years prior to diagnosis as when drawn less than one year prior to diagnosis. These data support the hypothesis that autoantibody-antigen complex markers will prove effective at least 2 years prior to clinical diagnosis.

Figure 11:
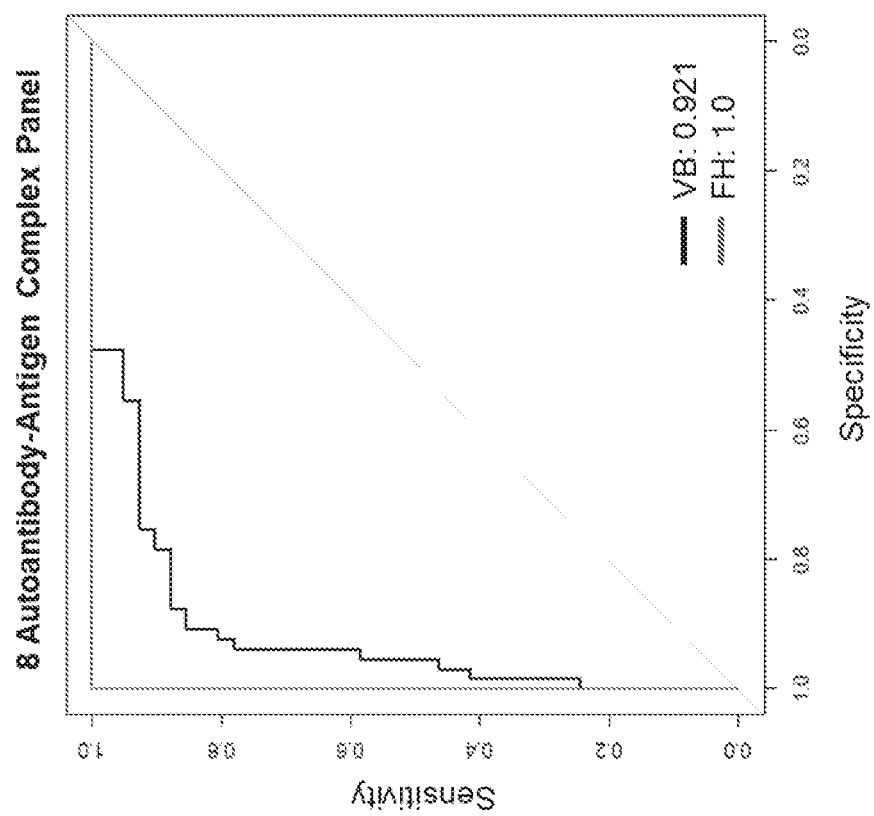
FIG. 11 ROC graph of 8 autoantibody panel in 2 independent SCLC cohorts. When 4 upregulated PNS autoantibodies (GABAb-IgG, GAD65-IgG, HU-IgG, RC-IgG) were added to an existing 4-autoantibody panel, the accuracy of SCLC detection was further increased with an AUC of 1.0 in Fred Hutch (100% sensitivity at 100% specificity) and 0.921 (85% sensitivity at 90% specificity) in the Vanderbilt SCLC cohort. Sample sets of this size are prone to overfitting so performance might be expected to diminish when tested in larger datasets. However, autoantibody markers with this degree of performance in any other dataset of any cancer have not been encountered (12, 16-19, 35). Furthermore, the sensitivity of PNS related markers are much higher than previously reported (for the few that have been looked at in SCLC cohorts). It is believed that these surprising results are due to the disclosed technique of identifying autoantibody-antigen complexes and not free circulating antibody, which appears to not be as abundant.

FIG. 11 is a ROC graph of 8 autoantibody panel in 2 independent SCLC cohorts. When 4 upregulated PNS autoantibodies (GABAb-IgG, GAD65-IgG, HU-IgG, RC-IgG) were added to an existing 4-autoantibody panel, the accuracy of SCLC detection was further increased with an AUC of 1.0 in Fred Hutch (100% sensitivity at 100% specificity) and 0.921 (85% sensitivity at 90% specificity) in the Vanderbilt SCLC cohort. Sample sets of this size are prone to overfitting so performance might be expected to diminish when tested in larger datasets. However, autoantibody markers with this degree of performance in any other dataset of any cancer have not been encountered (12, 16-19, 35). Furthermore, the sensitivity of PNS related markers are much higher than previously reported (for the few that have been looked at in SCLC cohorts). It is believed that these surprising results are due to the disclosed technique of identifying autoantibody-antigen complexes and not free circulating antibody, which appears to not be as abundant.

REFERENCES

1. States D J, Omenn G S, Blackwell T W, Fermin D, Eng J, Speicher D W, Hanash S M. Challenges in deriving high-confidence protein identifications from data gathered by a HUPO plasma proteome collaborative study. Nat Biotechnol. 2006; 24(3):333-8. PubMed PMID: 16525410.
2. Wingren C, Borrebaeck C A. Antibody-based microarrays. Methods Mol Biol. 2009; 509:57-84. Epub 2009/02/13. PubMed PMID: 19212715.
3. Angenendt P, Glokler J, Murphy D, Lehrach H, Cahill D J. Toward optimized antibody microarrays: a comparison of current microarray support materials. Anal Biochem. 2002; 309(2):253-60. PubMed PMID: 12413459.
4. Bereczki E, Gonda S, Csont T, Korpos E, Zvara A, Ferdinandy P, Santha M. Overexpression of biglycan in the heart of transgenic mice: an antibody microarray study. Journal of proteome research. 2007; 6(2):854-61. PubMed PMID: 17269742.
5. Haab B B, Dunham M J, Brown P O. Protein microarrays for highly parallel detection and quantitation of specific proteins and antibodies in complex solutions. Genome Biol. 2001; 2(2):RESEARCH0004. PubMed PMID: 11182887.
6. Haab B B. Antibody arrays in cancer research. Mol Cell Proteomics. 2005; 4(4):377-83. PubMed PMID: 15671041.
7. Chari S T, Leibson C L, Rabe K G, Ransom J, de Andrade M, Petersen G M. Probability of pancreatic cancer following diabetes: a population-based study. Gastroenterology. 2005; 129(2):504-11. PubMed PMID: 16083707.
8. Vazquez-Martin A, Colomer R, Menendez J A. Protein array technology to detect HER2 (erbB-2)-induced 'cytokine signature' in breast cancer. Eur J Cancer. 2007; 43(7):1117-24. PubMed PMID: 17379503.
9. Shafer M W, Mangold L, Partin A W, Haab B B. Antibody array profiling reveals serum TSP-1 as a marker to distinguish benign from malignant prostatic disease. Prostate. 2007; 67(3):255-67. PubMed PMID: 17192876.
10. Yue T, Goldstein I J, Hollingsworth M A, Kaul K, Brand R E, Haab B B. The prevalence and nature of glycan alterations on specific proteins in pancreatic cancer patients revealed using antibody-lectin sandwich arrays. Mol Cell Proteomics. 2009; 8(7):1697-707. Epub 2009/04/21. PubMed PMID: 19377061; PMCID: 2709194.
11. Yue T, Maupin K A, Fallon B, Li L, Partyka K, Anderson M A, Brenner D E, Kaul K, Zeh H, Moser A J, Simeone D M, Feng Z, Brand R E, Haab B B. Enhanced discrimination of malignant from benign pancreatic disease by measuring the C A 19-9 antigen on specific protein carriers. PLoS One. 2011; 6(12):e29180. Epub 2012/01/06. PubMed PMID: 22220206; PMCID: 3248411.
12. Loch C M, Ramirez A B, Liu Y, Sather C L, Delrow J J, Scholler N, Garvik B M, Urban N D, McIntosh M W, Lampe P D. Use of High Density Antibody Arrays to Validate and Discover Cancer Serum Biomarkers. Molecular Oncology. 2007; 1(3):313-20.

13. Rho J H, Lampe P D. High-throughput screening for native autoantigen-autoantibody complexes using antibody microarrays. J Proteome Res. 2013; 12(5):2311-20. Epub 2013/04/02. PubMed PMID: 23541305; PMCID: 3680356.

14. Rho J H, Mead J R, Wright W S, Brenner D E, Stave J W, Gildersleeve J C, Lampe P D. Discovery of sialyl Lewis A and Lewis X modified protein cancer biomarkers using high density antibody arrays. J Proteomics. 2014; 96:291-9. Epub 2013/11/05. PubMed PMID: 24185138.

15. Ramirez A B, Lampe P D. Discovery and validation of ovarian cancer biomarkers utilizing high density antibody microarrays. Cancer Biomarkers. 2011; 8(4-5): 293-307. PubMed PMID: ISI:000296757900011.

16. Ramirez A B, Loch C M, Zhang Y, Liu Y, Wang X, Wayner E A, Sargent J, Sibani S, Mendoza E A, Eugene R, LaBaer J, Urban N, McIntosh M W, Lampe P D. Use of a single chain antibody library for ovarian cancer biomarker discovery. Mol Cell Proteomics. 2010; 9(7): 1449-60. Epub 2010/05/15. PubMed PMID: 20467042.

17. Li C I, Mirus J E, Zhang Y, Ramirez A B, Ladd J J, Prentice R L, McIntosh M W, Hanash S M, Lampe P D. Discovery and preliminary confirmation of novel early detection biomarkers for triple-negative breast cancer using preclinical plasma samples from the Women's Health Initiative observational study. Breast Cancer Res Treat. 2012; 135(2):611-8. Epub 2012/08/21. PubMed PMID: 22903690; PMCID: 3439142.

18. Mirus J E, Zhang Y, Hollingsworth M A, Solan J L, Lampe P D, Hingorani S R. Spatiotemporal proteomic analyses during pancreas cancer progression identifies STK4 as a novel candidate biomarker for early stage disease. Mol Cell Proteomics. 2014; 13(12):3484-96. Epub 2014/09/17. PubMed PMID: 25225358.

19. Mirus J E, Zhang Y, Li C I, Prentice R L, Solan J L, Hingorani S R, Lampe P D. Cross-species antibody microarray interrogation identifies a 3-protein panel of plasma biomarkers for the early detection of pancreas cancer. Clin Cancer Res. 2015; 21(7):1764-71.

20. Lambin P, Rios-Velazquez E, Leijenaar R, Carvalho S, van Stiphout R G, Granton P, Zegers C M, Gillies R, Boellard R, Dekker A, Aerts H J. Radiomics: extracting more information from medical images using advanced feature analysis. Eur J Cancer. 2012; 48(4):441-6. PubMed PMID: 22257792; PMCID: PMC4533986.

21. Lastwika K J, Kargl J, Zhang Y, Zhu X, Lo E, Shelley D, Ladd J J, Wu W, Kinahan P, Pipavath S N J, Randolph T W, Shipley M, Lampe P D, Houghton A M. Tumor-Derived Autoantibodies Identify Malignant Pulmonary Nodules. Am J Respir Crit Care Med. 2018. Epub 2018/11/14. PubMed PMID: 30422669.

22. Yang L, Wang J, Li J, Zhang H, Guo S, Yan M, Zhu Z, Lan B, Ding Y, Xu M, Li W, Gu X, Qi C, Zhu H, Shao Z, Liu B, Tao S C. Identification of Serum Biomarkers for Gastric Cancer Diagnosis Using a Human Proteome Microarray. Molecular & cellular proteomics: MCP. 2016; 15(2):614-23. PubMed PMID: 26598640; PMCID: 4739676.

23. Bast R C, Jr., Feeney M, Lazarus H, Nadler L M, Colvin R B, Knapp R C. Reactivity of a monoclonal antibody with human ovarian carcinoma. J Clin Invest. 1981; 68(5):1331-7. PubMed PMID: 7028788.

24. McIntosh M W, Drescher C, Karlan B, Scholler N, Urban N, Hellstrom K E, Hellstrom I. Combining C A 125 and SMR serum markers for diagnosis and early detection of ovarian carcinoma. Gynecol Oncol. 2004; 95(1):9-15. PubMed PMID: 15385104.

25. Storey J D, Tibshirani R. SAM thresholding and false discovery rate for detecting differential gene expression in DNA microarrays. In: Parmigiani G, Garrett, E. S., Irizarry, R. A., and Zeger, S. L., editor. The Analysis of Gene Expression Data: Methods and Software. New York: Springer; 2003. p. 272-90.

26. Storey J D, Tibshirani R. Statistical significance for genomewide studies. Proceedings of the National Academy of Sciences of the United States of America. 2003; 100(16):9440-5. PubMed PMID: 12883005.

27. Kargl J, Busch S E, Yang G H, Kim K H, Hanke M L, Metz H E, Hubbard J J, Lee S M, Madtes D K, McIntosh M W, Houghton A M. Neutrophils dominate the immune cell composition in non-small cell lung cancer. Nat Commun. 2017; 8:14381. PubMed PMID: 28146145; PMCID: PMC5296654.

28. Thomas A, Pattanayak P, Szabo E, Pinsky P. Characteristics and Outcomes of Small Cell Lung Cancer Detected by C T Screening. Chest. 2018; 154(6):1284-90. Epub 2018/08/07. PubMed PMID: 30080997.

29. Gandhi L, Johnson B E. Paraneoplastic syndromes associated with small cell lung cancer. Journal of the National Comprehensive Cancer Network: JNCCN. 2006; 4(6):631-8. PubMed PMID: 16813730.

30. Semenova E A, Nagel R, Berns A. Origins, genetic landscape, and emerging therapies of small cell lung cancer. Genes & development. 2015; 29(14):1447-62. PubMed PMID: 26220992; PMCID: 4526731.

31. Song H, Yao E, Lin C, Gacayan R, Chen M H, Chuang P T. Functional characterization of pulmonary neuroendocrine cells in lung development, injury, and tumorigenesis. Proceedings of the National Academy of Sciences of the United States of America. 2012; 109(43): 17531-6. PubMed PMID: 23047698; PMCID: 3491514.

32. Kazarian M, Laird-Offringa I A. Small-cell lung cancer-associated autoantibodies: potential applications to cancer diagnosis, early detection, and therapy. Molecular cancer. 2011; 10:33. PubMed PMID: 21450098; PMCID: 3080347.

33. Kanaji N, Watanabe N, Kita N, Bandoh S, Tadokoro A, Ishii T, Dobashi H, Matsunaga T. Paraneoplastic syndromes associated with lung cancer. World J Clin Oncol. 2014; 5(3):197-223. Epub 2014/08/13. PubMed PMID: 25114839; PMCID: PMC4127595.

34. Dalmau J, Rosenfeld M R. Paraneoplastic syndromes of the CNS. Lancet Neurol. 2008; 7(4):327-40. Epub 2008/03/15. PubMed PMID: 18339348; PMCID: PMC2367117.

35. Rho J H, Ladd J J, Li C I, Potter J D, Zhang Y, Shelley D, Shibata D, Coppola D, Yamada H, Toyoda H, Tada T, Kumada T, Brenner D E, Hanash S M, Lampe P D. Protein and glycomic plasma markers for early detection of adenoma and colon cancer. Gut. 2018; 67(3): 473-84. PubMed PMID: 27821646.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A biomarker detection panel for small cell lung cancer (SCLC) comprising four antibodies capable of detecting four autoantibody-autoantigen complexes, respectively, wherein the four antibodies comprise:
   (a) an anti-PLD3 antibody for detecting an anti-PLD3 autoantibody bound to a PLD3 autoantigen,
   (b) an anti-TIMP2 antibody for detecting an anti-TIMP2 autoantibody bound to a TIMP2 autoantigen,
   (c) an anti-NLRP7 antibody for detecting an anti-NLRP7 autoantibody bound to a NLRP7 autoantigen, and
   (d) an anti-TFRC antibody for detecting an anti-TFRC autoantibody bound to a TFRC autoantigen;
   or
   (a) an anti-PLD3 antibody for detecting an anti-PLD3 autoantibody bound to a PLD3 autoantigen,
   (b) an anti-TIMP2 antibody for detecting an anti-TIMP2 autoantibody bound to a TIMP2 autoantigen,
   (c) an anti-GRAP2 antibody for detecting an anti-GRAP2 autoantibody bound to a GRAP2 autoantigen, and
   (d) an anti-SPINK1 antibody for detecting an anti-SPINK1 autoantibody bound to a SPINK1 autoantigen; and
   wherein the biomarker detection panel is capable of detecting SCLC with a sensitivity and specificity of at least 75%.

2. The biomarker detection panel of claim 1, wherein the sensitivity and specificity are at least 95%.

3. The biomarker detection panel of claim 1, wherein the sensitivity and specificity are between 98% to 100%.

4. A method of detecting small cell lung cancer (SCLC), comprising:
   contacting a sample from a subject suspected of being at-risk of acquiring or having SCLC with the biomarker detection panel of claim 1; and
   detecting binding of SCLC autoantibody-antigen complexes, SCLC associated proteins, SCLC autoantibodies and SCLC glycoproteins in the sample, thereby detecting SCLC in the subject.

5. The method of claim 4, wherein the sample is a plasma or serum sample.

6. The method of claim 4, wherein the method further comprises:
   purifying the sample prior to detecting binding of SCLC autoantibody-antigen complexes, SCLC autoantibodies, SCLC associated proteins and SCLC glycoproteins.

7. The method of claim 5, further comprising obtaining the plasma sample from the subject suspected of being at-risk of acquiring or having SCLC.

8. The method of claim 4, wherein the subject suspected of being at-risk of acquiring or having SCLC is a chronic smoker or was a chronic smoker for 10 pack years.

9. The method of claim 4, wherein SCLC glycoproteins are detected by detecting sialyl Lewis-A and sialyl Lewis-X modifications.

10. The method of claim 4, wherein the biomarker detection panel of claim 1 further comprises:
    a PNMA1 antibody for detecting an anti-PNMA1 autoantibody bound to a PNMA1 autoantigen, or
    a PNMA2 antibody for detecting an anti-PNMA2 autoantibody bound to a PNMA2 autoantigen.

11. The method of claim 4, wherein the biomarker detection panel of claim 1 further comprises a GAD65 antibody for detecting an anti-GAD65 autoantibody bound to a GAD65 autoantigen.

12. The method of claim 4, wherein the biomarker detection panel of claim 1 further comprises a CRMP5 antibody for detecting an anti-CRMP5 autoantibody bound to a CRMP5 autoantigen.

13. The method of claim 4, wherein the method is used for diagnosing a subject with early stage SCLC.

14. The method of claim 13, wherein the early stage SCLC is not detectable by CT scans.

15. The method of claim 13, further comprising monitoring the subject diagnosed with SCLC wherein monitoring comprises subjecting the subject to one or more CT scans.

16. The method of claim 13, wherein the method further comprises treating the subject with SCLC by administering an effective amount of an SCLC modulatory agent to reduce, prevent, or inhibit one or more signs and/or symptoms associated with SCLC.

17. The biomarker detection panel of claim 1, wherein the four antibodies comprise an anti-PLD3 antibody for detecting an anti-PLD3 autoantibody bound to a PLD3 autoantigen, an anti-TIMP2 antibody for detecting an anti-TIMP2 autoantibody bound to a TIMP2 autoantigen, an anti-NLRP7 antibody for detecting an anti-NLRP7 autoantibody bound to a NLRP7 autoantigen, and an anti-TFRC antibody for detecting an anti-TFRC autoantibody bound to a TFRC autoantigen.

18. The biomarker detection panel of claim 1, wherein the four antibodies comprise an anti-PLD3 antibody for detecting an anti-PLD3 autoantibody bound to a PLD3 autoantigen, an anti-TIMP2 antibody for detecting an anti-TIMP2 autoantibody bound to a TIMP2 autoantigen, an anti-GRAP2 antibody for detecting an anti-GRAP2 autoantibody bound to a GRAP2 autoantigen, and an anti-SPINK1 antibody for detecting an anti-SPINK1 autoantibody bound to a SPINK1 autoantigen.

19. The biomarker detection panel of claim 18, further comprising an anti-TFRC antibody for detecting an anti-TFRC autoantibody bound to a TFRC autoantigen.

* * * * *